(12) United States Patent
Tanaka et al.

(10) Patent No.: US 12,528,802 B2
(45) Date of Patent: Jan. 20, 2026

(54) HETEROCYCLIC COMPOUND

(71) Applicant: Takeda Pharmaceutical Company Limited, Osaka (JP)

(72) Inventors: Yuta Tanaka, Kanagawa (JP); Yuta Tanaka, Kanagawa (JP); Fumiaki Kikuchi, Kanagawa (JP); Takeshi Yamamoto, Kanagawa (JP); Minoru Nakamura, Kanagawa (JP); Kazuaki Takami, Kanagawa (JP); Masataka Murakami, Kanagawa (JP); Masaki Daini, Kanagawa (JP); Yasufumi Wada, Kanagawa (JP); Keiko Kakegawa, Kanagawa (JP); Takahito Kasahara, Kanagawa (JP); Tomohiro Ohashi, Kanagawa (JP); Junsi Wang, Kanagawa (JP); Zenichi Ikeda, Kanagawa (JP); Florian Puenner, Kanagawa (JP); Masaki Seto, Kanagawa (JP); Satoshi Mikami, Kanagawa (JP); Minoru Sasaki, Kanagawa (JP)

(73) Assignee: Takeda Pharmaceutical Company Limited, Osaka (JP)

( * ) Notice: Subject to any disclaimer, the term of this patent is extended or adjusted under 35 U.S.C. 154(b) by 984 days.

(21) Appl. No.: 17/630,840

(22) PCT Filed: Jul. 28, 2020

(86) PCT No.: PCT/JP2020/028785
§ 371 (c)(1),
(2) Date: Jan. 27, 2022

(87) PCT Pub. No.: WO2021/020363
PCT Pub. Date: Feb. 4, 2021

(65) Prior Publication Data
US 2022/0274982 A1 Sep. 1, 2022

(30) Foreign Application Priority Data

Jul. 29, 2019 (JP) ................................. 2019-139178

(51) Int. Cl.
C07D 471/04 (2006.01)
(52) U.S. Cl.
CPC ................. C07D 471/04 (2013.01)
(58) Field of Classification Search
CPC .. C07D 471/04; C07D 487/04; C07D 498/04; C07D 519/00; A61P 25/28; A61P 39/02; A61P 43/00; A61P 25/16
See application file for complete search history.

(56) References Cited

U.S. PATENT DOCUMENTS

| 7,521,557 | B2 | 4/2009 | Devasthale et al. |
| 8,124,633 | B2 | 2/2012 | Devita et al. |
| 8,642,779 | B2 * | 2/2014 | Binch ............ A61P 3/10 548/360.5 |
| 9,487,545 | B2 | 11/2016 | Zhang et al. |
| 2009/0048248 | A1 | 2/2009 | Devita et al. |
| 2009/0163500 | A1 | 6/2009 | Lingwood et al. |
| 2010/0197724 | A1 | 8/2010 | Bao et al. |
| 2013/0012539 | A1 | 1/2013 | Lingwood et al. |
| 2014/0255381 | A1 | 9/2014 | Bourque et al. |
| 2014/0288093 | A1 | 9/2014 | Krainc et al. |
| 2014/0371460 | A1 | 12/2014 | Bourque et al. |
| 2015/0202185 | A1 | 7/2015 | Lingwood et al. |

(Continued)

FOREIGN PATENT DOCUMENTS

| JP | 2009-067729 A | 4/2009 |
| JP | 2011-505374 A | 2/2011 |

(Continued)

OTHER PUBLICATIONS

Bhattarai et al., "Design, synthesis, and biological evaluation of structurally modified isoindolinone and quinazolinone derivatives as hedgehog pathway inhibitors," European Journal of Medicinal Chemistry, 2017, 125:1036-1050.

(Continued)

*Primary Examiner* — Joseph K Mckane
*Assistant Examiner* — Meghan C Heasley
(74) *Attorney, Agent, or Firm* — Foley & Lardner LLP

(57) ABSTRACT

The present invention provides a compound having a glucosylceramide synthase inhibitory action, which is expected to be useful as an agent for the prophylaxis or treatment of lysosomal storage diseases (e.g., Gaucher's disease, Fabry's disease, GM1-gangliosidosis, GM2 activator deficiency, Tay-Sachs disease, Sandhoffs disease), neurodegenerative diseases (e.g., Parkinson's disease, Lewy body dementia, multiple-system atrophy) and the like.

The present invention relates to a compound represented by the formula (I):

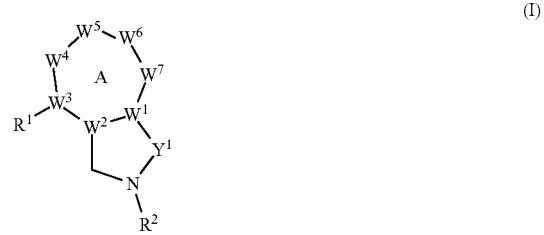

wherein each symbol is as described in the description, or a salt thereof.

17 Claims, No Drawings

(56) References Cited

U.S. PATENT DOCUMENTS

| | | |
|---|---|---|
| 2015/0210681 A1 | 7/2015 | Bourque et al. |
| 2016/0207933 A1 | 7/2016 | Bourque et al. |
| 2016/0229830 A1 | 8/2016 | Wang et al. |
| 2016/0361301 A1 | 12/2016 | Leonard et al. |
| 2018/0044302 A1 | 2/2018 | Wang |
| 2019/0194208 A1 | 6/2019 | Fan et al. |
| 2019/0241558 A1 | 8/2019 | Cyr et al. |
| 2019/0248754 A1 | 8/2019 | Wang |
| 2019/0263775 A1 | 8/2019 | Wang et al. |
| 2020/0048266 A1 | 2/2020 | Bourque et al. |
| 2021/0087186 A1 | 3/2021 | Tanaka et al. |
| 2021/0261557 A1 | 8/2021 | Bourque et al. |

FOREIGN PATENT DOCUMENTS

| | | |
|---|---|---|
| JP | 2014-523881 A | 9/2014 |
| JP | 2018-507887 A | 3/2018 |
| WO | WO-2012/129084 A2 | 9/2012 |
| WO | WO-2015/042397 A1 | 3/2015 |
| WO | WO-2017/205538 A1 | 11/2017 |
| WO | WO-2018/004213 A1 | 1/2018 |
| WO | WO-2019/151269 A1 | 8/2019 |
| WO | WO-2021/020362 A1 | 2/2021 |

OTHER PUBLICATIONS

Coskun, Necdet, "Regio and Diastereoselective Addition of Imidazoline 3-oxides to Aryl Isocyanates," Tetrahedron Letters, 1997, 38(13):2299-2302.

Coskun, Necdet, "Regio and Diastereoselective Addition of Imidazoline 3-oxides to Aryl Isocyanates," Tetrahedron, 1997, 53(40):13873-13882.

Costantino et al., "Further Insights in 5-phenyl-2-[2-(1-piperidinylcarbonyl) Phenyl]-2,3-dihydro-1H-pyrrolo[1,2-c]imidazol-1-ones, a Recently Disclosed Class of neuropeptide S Antagonists," Letters in Drug Design & Discovery, 2013, 10:396-401.

Fischer et al., "Synthesis of Naphthylpyridines from Unsymmetrical Naphthylheptadiynes and the Configurational Stability of the Biaryl Axis," The Journal of Organic Chemistry, 2016, 81(8):3087-3102.

Kassick et al., "2-[(3aR,4R,5S,7aS)-5-{(1S)-1-[3,5-Bis(trifluoromethyl)phenyl]-2-hydroxyethoxy}-4-(2-methylphenyl)octahydro-2H-isoindol-2-yl]-1,3-oxazol-4(5H)-one: A Potent Human NK1 Receptor Antagonist with Multiple Clearance Pathways," Journal of Medicinal Chemistry, J. Med. Chem., Jun. 28, 2013, 56:5940-5948.

Malik et al., "Suppression of gyrase-mediated resistance by C7 aryl fluoroquinolones," Nucleic Acids Research, 2016, 44(7):3304-3316.

Rocha et al., "Progressive decline of glucocerebrosidase in aging and Parkinson's disease," Annals of Clinical and Translational Neurology, 2015, 2(4):433-438.

Sardi et al., "Glucosylceramide synthase inhibition alleviates aberrations in synucleinopathy models," PNAS, Mar. 7, 2017, 114(10):2699-2704.

Schengrund, Cara-Lynne, "The Role(s) of Gangliosides in Neural Differentiation and Repair: A Perspective," Brain Research Bulletin, 1990, 24:131-141.

Wang et al., "7-Oxopyrrolopyridine-derived DPP4 inhibitors-mitigation of CYP and hERG liabilities via introduction of polar functionalities in the active site," Bioorganic & Medicinal Chemistry Letters, 2011, 21:6646-6651.

\* cited by examiner

HETEROCYCLIC COMPOUND

CROSS-REFERENCE TO RELATED APPLICATIONS

This application is the U.S. National Stage of PCT/JP2020/028785, filed Jul. 28, 2020, which claims priority to JP 2019-139178, filed Jul. 29, 2019.

TECHNICAL FIELD

The present invention relates to a heterocyclic compound having a glucosylceramide synthase inhibitory action, which is useful for the treatment of lysosomal storage diseases (e.g., Gaucher's disease), neurodegenerative diseases (e.g., Parkinson's disease, Lewy body dementia, multiple-system atrophy) and the like, medicament comprising the same, and the like.

BACKGROUND OF THE INVENTION

Glycosphingolipid is a ceramide to which sugars such as glucose, galactose, N-acetylglucosamine, N-acetylgalactosamine, sialic acid and the like are added stepwise by an enzyme. Many glycolipid-accumulating diseases such as lysosomal diseases caused by the accumulation of glycosphingolipid due to mutation of glycosphingolipid-degrading enzyme have been reported. Glycosphingolipid is considered to be essential for the construction and function performance of nervous system tissues (Non-Patent Document 1), and quantitative and qualitative abnormalities of glycosphingolipids are known to contribute to neurodegenerative diseases. From the above, suppression of glycosphingolipid accumulation may lead to treatment of these diseases.

Glucosylceramide is an important glycosphingolipid that is present in all tissues and cells and is a precursor glycolipid common to 400 types or more of glycolipids. Glucosylceramide synthase is an enzyme that synthesizes glucosylceramide from uridine diphosphate glucose and ceramide. Since its inhibitors suppress the abnormal accumulation of glycosphingolipid by suppressing the production of glycosphingolipid, it has been proposed for the treatment of various diseases (Patent Document 1 and Patent Document 2). For example, it has been reported that glycosphingolipids are accumulated in the substantia nigra of the lesion site in patients with Parkinson's disease, which is a neurodegenerative disease (Non-Patent Document 2), and it has been suggested that glucosylceramide synthase inhibitors have the potential to be therapeutic agents for neurodegenerative diseases such as Parkinson's disease, Lewy body dementias and the like (Non-Patent Document 3).

From the above, it is suggested that the glucosylceramide synthase inhibitors have the potential to be prophylactic or therapeutic agent for lysosomal storage diseases (e.g., Gaucher's disease, Fabry's disease, GM1-gangliosidosis, GM2 activator deficiency, Tay-Sachs disease, Sandhoffs disease), neurodegenerative diseases (e.g., Parkinson's disease, Lewy body dementia, multiple-system atrophy) and the like.

As glucosylceramide synthase inhibitors, Patent Document 1 describes a compound represented by the following formula:

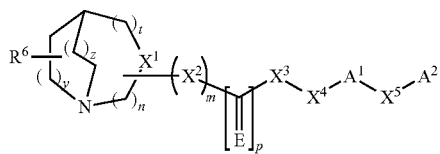

wherein each symbol is as defined in Patent Document 1, and Patent Document 2 describes a compound represented by the following formula:

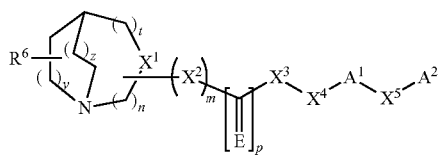

wherein each symbol is as defined in Patent Document 2.

In addition, Non-Patent Document 3 describes the compounds described in Patent Document 1 and Patent Document 2.

As compounds having a glucosylceramide lowering action, Patent Document 3 describes a compound represented by the following formula:

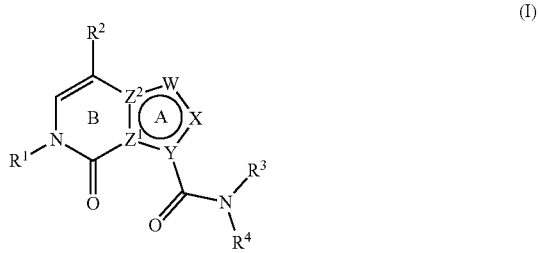

(I)

wherein each symbol is as defined in Patent Document 3.

As heterocyclic compounds, the following compounds are known.

Patent Document 4 and Non-Patent Document 4 describe that a compound represented by the following formula:

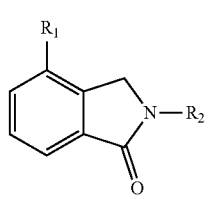

wherein each symbol is as defined in Patent Document 4, is useful for the treatment of cancers.

Patent Document 5 describes that a compound represented by the following formula:

wherein each symbol is as defined in Patent Document 5, is useful for the treatment of cancers.

Patent Document 6 describes that a compound represented by the following formula:

wherein each symbol is as defined in Patent Document 6, is useful for the treatment of depression.

Non-Patent Document 5 describes a compound represented by the following formula:

wherein each symbol is as defined in Non-Patent Document 5, which has suppression of gyrase-mediated resistance.

Non-Patent Document 6 describes a NK1 antagonist represented by the following formula:

and, the compound wherein the hydroxy group is substituted.

Patent Document 7 describes a therapeutic agent for infections, which is represented by the following formula:

wherein each symbol is as defined in Patent Document 7.

Non-Patent Document 7 describes a therapeutic agent for diabetes, which is represented by the following formula:

wherein each symbol is as defined in Non-Patent Document 7.

Patent Document 8 describes a therapeutic agent for cancer, which is represented by the following formula:

(III)

wherein each symbol is as defined in Patent Document 8.

Patent Document 9 describes an NK1 antagonist represented by the following formula:

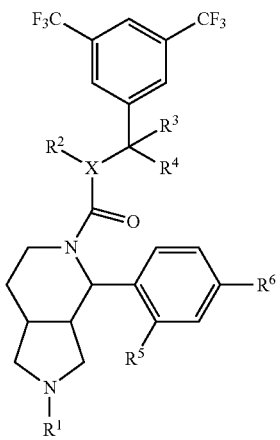

wherein each symbol is as defined in Patent Document 9.

Patent Document 10 describes an NK1 antagonist represented by the following formula:

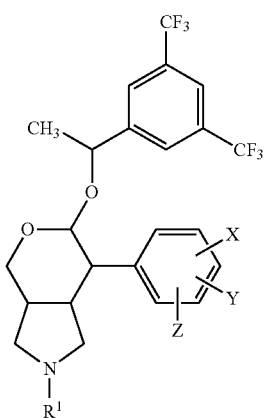

wherein each symbol is as defined in Patent Document 10.

Patent Document 11 describes a therapeutic agent for diabetes, which is represented by the following formula:

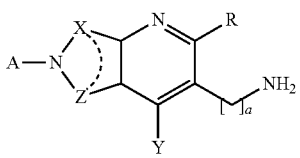

wherein each symbol is as defined in Patent Document 11.

Non-Patent Document 8 and Non-Patent Document 9 are Literatures on a synthetic reaction, which describe a compound represented by

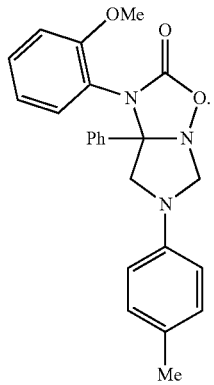 [SMILES: COc1ccccc1N1C(=O)ON2CN(c3ccc(C)cc3)CC21c1ccccc1]

DOCUMENT LIST

Patent Document

Patent Document 1: US 2016/0361301
Patent Document 2: US 2015/0210681
Patent Document 3: WO 2019/151269
Patent Document 4: WO 2018/004213
Patent Document 5: WO 2017/205538
Patent Document 6: U.S. Pat. No. 8,124,633
Patent Document 7: U.S. Pat. No. 9,487,545
Patent Document 8: JP 2009-067729
Patent Document 9: US 2010/0197724
Patent Document 10: US 2009/0048248
Patent Document 11: U.S. Pat. No. 7,521,557

Non-Patent Document

Non-Patent Document 1: Brain Res Bull 24, 131-141
Non-Patent Document 2: Ann Clin Transl Neurol. 2015 April; 2(4): 433-438.
Non-Patent Document 3: Proceedings of the National Academy of Sciences of the United States of America (2017), 114(10), 2699-2704
Non-Patent Document 4: European Journal of Medicinal Chemistry (2017), 125, 1036-1050
Non-Patent Document 5: Nucleic Acids Research (2016), 44(7), 3304-3316
Non-Patent Document 6: Journal of Medicinal Chemistry (2013), 56(14), 5940-5948
Non-Patent Document 7: Bioorganic and Medicinal Chemistry Letters (2011), 21(22), 6646-6651
Non-Patent Document 8: Tetrahedron (1997), 53(40), 13873-13882
Non-Patent Document 9: Tetrahedron Letters (1997), 38(13), 2299-2302

SUMMARY OF THE INVENTION

Problems to be Solved by the Invention

An object of the present invention is to provide a compound having a glucosylceramide synthase inhibitory action, which is useful as an agent for the prophylaxis or treatment of lysosomal storage diseases (e.g., Gaucher's disease), neurodegenerative diseases (e.g., Parkinson's disease, Lewy body dementia, multiple-system atrophy) and the like.

Means of Solving the Problems

The present inventors have conducted intensive studies in an attempt to solve the above-mentioned problems and found that a compound represented by the following formula (I) has a glucosylceramide synthase inhibitory action, and therefore, the compound is useful as an agent for the prophylaxis or treatment of lysosomal storage diseases (e.g., Gaucher's disease), neurodegenerative diseases (e.g., Parkinson's disease, Lewy body dementia, multiple-system atrophy) and the like, which resulted in the completion of the present invention.

Accordingly, the present invention provides the following.

(1) A compound represented by the formula (I):

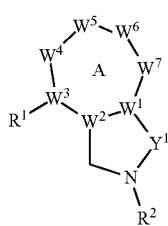

wherein

Ring A is a 5- to 7-membered unsaturated ring containing 1 to 3 double bonds in the ring, $W^1$ is $CR^a$ wherein $R^a$ is absent, a hydrogen atom or a substituent, or N, $W^2$ is $CR^b$ wherein $R^b$ is absent, a hydrogen atom or a substituent, or N, $W^3$ is $CR^c$ wherein $R^c$ is absent, a hydrogen atom or a substituent, or N, $W^4$ is (1) $CR^d$ wherein $R^d$ is (i) a hydrogen atom, (ii) a halogen atom, (iii) a cyano group, (iv) an optionally substituted hydroxy group, (v) an optionally substituted cyclic group, or (vi) a $C_{1-6}$ alkyl group optionally substituted by 1 to 5 substituents selected from (a) a halogen atom, (b) a cyano group, (c) a hydroxy group, (d) a $C_{1-6}$ alkoxy group, (e) a carbamoyl group, and (f) a cyclic group, (2) $CR^eR^f$ wherein $R^e$ and $R^f$ are each independently a hydrogen atom or a substituent, (3) $NR^g$ wherein $R^g$ is absent, a hydrogen atom or a substituent, (4) O, (5) S, or (6) C(O), $W^5$ is (1) $CR^h$ wherein $R^h$ is (i) a hydrogen atom, (ii) a halogen atom, (iii) a cyano group, (iv) an optionally substituted hydroxy group, (v) an optionally substituted cyclic group, or (vi) a $C_{1-6}$ alkyl group optionally substituted by 1 to 5 substituents selected from (a) a halogen atom, (b) a cyano group, (c) a hydroxy group, (d) a $C_{1-6}$ alkoxy group, (e) a carbamoyl group, and (f) a cyclic group, (2) $CR^iR^j$ wherein $R^i$ and $R^j$ are each independently a hydrogen atom or a substituent, (3) $NR^k$ wherein $R^k$ is absent, a hydrogen atom or a substituent, (4) O, (5) S, or (6) C(O), $W^6$ is (1) a bond, (2) $CR^l$ wherein $R^l$ is (i) a hydrogen atom, (ii) a halogen atom, (iii) a cyano group, (iv) an optionally substituted hydroxy group, (v) an optionally substituted cyclic group, or (vi) a $C_{1-6}$ alkyl group optionally substituted by 1 to 5 substituents selected from (a) a halogen atom, (b) a cyano group, (c) a hydroxy group, (d) a $C_{1-6}$ alkoxy group, (e) a carbamoyl group, and (f) a cyclic group, (3) $CR^mR^n$ wherein $R^m$ and $R^n$ are each independently a hydrogen atom or a substituent, (4) $NR^o$ wherein $R^o$ is absent, a hydrogen atom or a substituent, (5) O, (6) S, or (7) C(O), $W^7$ is (1) a bond, (2) $CR^p$ wherein $R^p$ is (i) a hydrogen atom, (ii) a halogen atom, (iii) a cyano group, (iv) an optionally substituted hydroxy group, (v) an optionally substituted cyclic group, or (vi) a $C_{1-6}$ alkyl group optionally substituted by 1 to 5 substituents selected from (a) a halogen atom, (b) a cyano group, (c) a hydroxy group, (d) a $C_{1-6}$ alkoxy group, (e) a carbamoyl group, and (f) a cyclic group, (3) $CR^qR^r$ wherein $R^q$ and $R^r$ are each independently a hydrogen atom or a substituent, (4) $NR^s$ wherein $R^s$ is absent, a hydrogen atom or a substituent, (5) O, (6) S, or (7) C(O), $R^1$ is

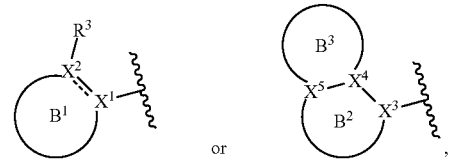

wherein $X^1$ is C or N, $X^2$ is C or N, $X^3$ is C or N, $X^4$ is C or N, $X^5$ is C or N, Ring $B^1$ is an optionally further substituted 5- or 6-membered aromatic ring, Ring $B^2$ is an optionally further substituted 6-membered aromatic ring, $R^3$ is (1) a cyano group, (2) an optionally substituted $C_{1-6}$ alkyl group, (3) an optionally substituted hydroxy group, (4) an optionally substituted amino group, (5) an optionally substituted sulfanyl group, (6) $SO_2R^w$ wherein $R^w$ is a substituent, or (7) an optionally substituted cyclic group, and Ring $B^3$ is an optionally substituted ring, $Y^1$ is C(=O), $CH_2$, CHF or $CF_2$, and $R^2$ is

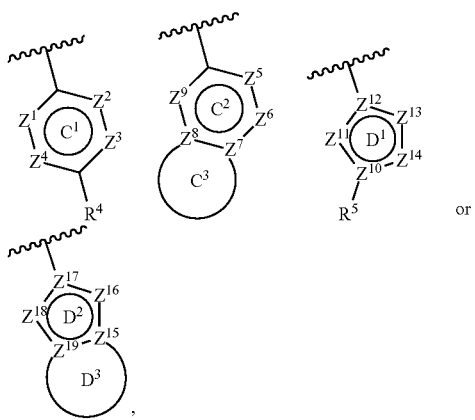

wherein
$Z^1$ is $CR^x$ wherein $R^x$ is a hydrogen atom or a halogen atom, or N,
$Z^2$ is $CR^y$ wherein $R^y$ is a hydrogen atom or a halogen atom, or N,
$Z^3$ is $CR^z$ wherein $R^z$ is a hydrogen atom or a substituent, or N,
$Z^4$ is $CR^{aa}$ wherein $R^{aa}$ is a hydrogen atom or a substituent, or N,
$Z^5$ is $CR^{bb}$ wherein $R^{bb}$ is a hydrogen atom or a substituent, or N,
$Z^6$ is $CR^{cc}$ wherein $R^{cc}$ is a hydrogen atom or a substituent, or N,
$Z^7$ is C or N,
$Z^8$ is C or N,
$Z^9$ is $CR^{dd}$ wherein $R^{dd}$ is a hydrogen atom or a substituent, or N,
Ring $C^1$ and Ring $C^2$ are each independently a 6-membered aromatic ring,
Ring $C^3$ is an optionally substituted ring,
$R^4$ is a substituent,
$Z^{10}$ is C or N,
$Z^{11}$ is $CR^{ee}$ wherein $R^{ee}$ is a hydrogen atom or a substituent, $NR^{ff}$ wherein $R^{ff}$ is absent, a hydrogen atom or a substituent, O or S,
$Z^{12}$ is C or N,
$Z^{13}$ is $CR^{gg}$ wherein $R^{gg}$ is a hydrogen atom or a substituent, $NR^{hh}$ wherein $R^{hh}$ is absent, a hydrogen atom or a substituent, O or S,
$Z^{14}$ is $CR^{ii}$ wherein $R^{ii}$ is a hydrogen atom or a substituent, $NR^{jj}$ wherein $R^{jj}$ is absent, a hydrogen atom or a substituent, O or S,
$Z^{15}$ is C or N,
$Z^{16}$ is $CR^{kk}$ wherein $R^{kk}$ is a hydrogen atom or a substituent, $NR^{ll}$ wherein $R^{ll}$ is absent, a hydrogen atom or a substituent, O or S,
$Z^{17}$ is C or N,
$Z^{18}$ is $CR^{mm}$ wherein $R^{mm}$ is a hydrogen atom or a substituent, $NR^{nn}$ wherein $R^{nn}$ is absent, a hydrogen atom or a substituent, O or S,
$Z^{19}$ is C or N,
Ring $D^1$ and Ring $D^2$ are each independently a 5-membered aromatic ring,
Ring $D^3$ is an optionally substituted ring, and
$R^5$ is a substituent,
or a salt thereof.

(2) The compound or salt according to (1), wherein
$W^1$ is C or N;
$W^2$ is C;
$W^3$ is C or N;
$W^4$ is
(1) CH,
(2) $CH_2$,
(3) $NR^{g'}$ wherein $R^{g'}$ is (i) absent, (ii) a hydrogen atom, or (iii) a $C_{1-6}$ alkyl group, or
(4) C(O);
$W^5$ is
(1) $CR^{h'}$ wherein $R^{h'}$ is (i) a hydrogen atom, (ii) a halogen atom, (iii) a $C_{1-6}$ alkyl group optionally substituted by 1 to 3 substituents selected from (a) a halogen atom, (b) a hydroxy group, and (c) a $C_{1-6}$ alkoxy group, (iv) a $C_{3-6}$ cycloalkyl group, or (v) a 3- to 8-membered non-aromatic heterocyclic group optionally substituted by 1 to 3 $C_{1-6}$ alkyl groups,
(2) $CHR^{i'}$ wherein $R^{i'}$ is (i) a hydrogen atom, or (ii) a $C_{1-6}$ alkyl group,
(3) $NR^{k'}$ wherein $R^{k'}$ is (i) absent, (ii) a hydrogen atom, or (iii) a $C_{1-6}$ alkyl group optionally substituted by 1 to 3 substituents selected from a halogen atom and a cyano group, or (iv) a $C_{3-6}$ cycloalkyl group, or
(4) C(O);
$W^6$ is
(1) a bond,
(2) CH,
(3) $CHR^{m'}$ wherein $R^{m'}$ is (i) a hydrogen atom, or (ii) a $C_{1-6}$ alkyl group, or
(4) N;
$W^7$ is
(1) a bond, (2) CH, (3) $NR^{s'}$ wherein $R^{s'}$ is (i) a hydrogen atom, or (ii) a $C_{1-6}$ alkyl group, or (4) O;
$R^1$ is a group represented by the formula:

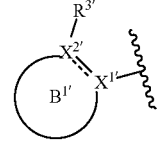

wherein
$X^{1'}$ is C,
$X^{2'}$ is C,
Ring $B^{1'}$ is a 6-membered aromatic ring optionally further substituted by 1 to 3 substituents selected from
(1) a halogen atom,
(2) a cyano group,
(3) a carboxy group,
(4) a $C_{1-6}$ alkyl group optionally substituted by 1 to 3 hydroxy groups,
(5) a $C_{1-6}$ alkoxy group,
(6) a $C_{1-6}$ alkoxy-carbonyl group,
(7) a carbamoyl group,
(8) a N,N-di$C_{1-6}$ alkyl-carbamoyl group,
(9) a 3- to 8-membered heterocyclylcarbonyl group, and
(10) a $C_{1-6}$ alkylsulfonyl group, and
$R^{3'}$ is
(1) an optionally halogenated $C_{1-6}$ alkyl group,
(2) a $C_{1-6}$ alkoxy group optionally substituted by 1 to 3 substituents selected from
(i) a halogen atom,
(ii) a cyano group,
(iii) a $C_{3-6}$ cycloalkyl group optionally substituted by 1 to 3 halogen atoms, (iv) a $C_{6-10}$ aryl group,
(v) an optionally halogenated $C_{1-6}$ alkoxy group,
(vi) a 3- to 8-membered non-aromatic heterocyclic group optionally substituted by 1 to 3 halogen atoms,
(vii) a 3- to 8-membered non-aromatic heterocyclyl-carbonyl group optionally substituted by 1 to 3 halogen atoms,
(viii) a carboxy group,
(ix) a $C_{1-6}$ alkoxy-carbonyl group, and
(x) a N,N-di$C_{1-6}$ alkyl-carbamoyl group,
(3) a hydroxy group,
(4) a $C_{1-6}$ alkylthio group, or
(5) a 3- to 8-membered non-aromatic heterocyclic group optionally substituted by 1 to 3 substituents selected from a $C_{1-6}$ alkyl-carbonyl group and a $C_{1-6}$ alkoxy-carbonyl group;
$Y^1$ is C(=O) or $CH_2$; and
$R^2$ is a group represented by the formula:

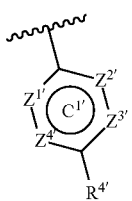

wherein
$Z^{1'}$ is CH or N,
$Z^{2'}$ is CH or N,
$Z^{3'}$ is $CR^{z'}$ wherein $R^{z'}$ is a hydrogen atom or a halogen atom, or N,
$Z^{4'}$ is CH or N,
Ring $C^{1'}$ is a benzene ring, a pyridine ring, a pyrimidine ring, a pyrazine ring or a pyridazine ring, and
$R^{4'}$ is
(1) a halogen atom,
(2) a cyano group,
(3) a hydroxy group,
(4) a $C_{1-6}$ alkyl group optionally substituted by 1 to 6 substituents selected from
  (i) a halogen atom,
  (ii) a cyano group,
  (iii) a hydroxy group,
  (iv) a $C_{1-6}$ alkoxy group,
  (v) a $C_{3-6}$ cycloalkyl group, and
  (vi) a 3- to 6-membered non-aromatic heterocyclic group optionally having an oxo group,
(5) a $C_{3-6}$ cycloalkyl group optionally substituted by 1 to 3 substituents selected from
  (i) a halogen atom,
  (ii) a cyano group,
  (iii) a hydroxy group,
  (iv) a $C_{7-16}$ aralkyloxy group, and
  (v) a tri-$C_{1-6}$ alkyl silyloxy group,
(6) a $C_{1-6}$ alkyl-carbonyl group,
(7) a $C_{1-6}$ alkoxy-carbonyl group,
(8) a N,N-di$C_{1-6}$ alkyl-carbamoyl group,
(9) a $C_{1-6}$ alkoxy group optionally substituted by 1 to 3 substituents selected from
  (i) a halogen atom,
  (ii) a hydroxy group,
  (iii) a cyano group,
  (iv) a $C_{2-6}$ alkynyl group,
  (v) a $C_{3-6}$ cycloalkyl group optionally substituted by 1 to 3 substituents selected from a hydroxy group and a 3- to 8-membered non-aromatic heterocyclyloxy group,
  (vi) a diazirene group, and
  (vii) a 3- to 8-membered non-aromatic heterocyclic group optionally substituted by 1 to 3 halogen atoms,
(10) a $C_{6-10}$ aryloxy group,
(11) an optionally halogenated $C_{1-6}$ alkylsulfonyl group,
(12) a 3- to 8-membered non-aromatic heterocyclic group optionally substituted by 1 to 3 substituents selected from
  (i) a halogen atom,
  (ii) a hydroxy group,
  (iii) a cyano group,
  (iv) a $C_{1-6}$ alkoxy group,
  (v) a $C_{1-6}$ alkyl-carbonyl group, and
  (vi) a $C_{3-6}$ cycloalkyl-carbonyl group,
(13) a 3- to 8-membered non-aromatic heterocyclyloxy group optionally substituted by 1 to 3 $C_{1-6}$ alkyl groups, or
(14) a 3- to 8-membered non-aromatic heterocyclylcarbonyl group optionally substituted by 1 to 3 halogen atoms, a group represented by the formula:

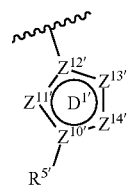

wherein
$Z^{10'}$ is C or N,
$Z^{11'}$ is CH, N or S,
$Z^{12'}$ is C,
$Z^{13'}$ is CH or N,
$Z^{14'}$ is $CR^{ii'}$ wherein $R^{ii'}$ is a hydrogen atom or a $C_{1-6}$ alkyl group, or $NR^{ij'}$ wherein $R^{ij'}$ is absent, or a $C_{1-6}$ alkyl group, Ring $D^1$ is a 5-membered aromatic ring, and
$R^{5'}$ is
(1) a cyano group,
(2) a $C_{1-6}$ alkyl group optionally substituted by 1 to 3 substituents selected from
  (i) a halogen atom,
  (ii) a $C_{3-6}$ cycloalkyl group optionally substituted by 1 to 3 halogen atoms,
  (iii) a $C_{1-6}$ alkoxy group, and
  (iv) a 3- to 8-membered non-aromatic heterocyclic group optionally substituted by 1 to 3 halogen atoms,
(3) a $C_{3-6}$ cycloalkyl group,
(4) a $C_{6-10}$ aryl group,
(5) an optionally halogenated $C_{1-6}$ alkoxy group, or
(6) a N,N-di$C_{1-6}$ alkyl-carbamoyl group, or a dihydrobenzofuryl group.
(3) The compound or salt according to (1), wherein Ring A is a 6-membered unsaturated ring;
$W^1$ is C;
$W^2$ is C;
$W^3$ is C;
$W^4$ is N or C(O);
$W^5$ is $CR^{h''}$ wherein $R^{h''}$ is (i) a hydrogen atom, or (ii) a $C_{1-6}$ alkyl group optionally substituted by 1 to 3 halogen atoms, or NR$^{k''}$ wherein R$^{k''}$ is a C$_{1-6}$ alkyl group optionally substituted by 1 to 3 halogen atoms;
W$^6$ is CH;
W$^7$ is bond;
R$^1$ is a group represented by the formula:

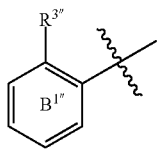

wherein
R$^{3''}$ is a C$_{1-6}$ alkoxy group optionally substituted by 1 to 3 halogen atoms, and
Ring B$^{1''}$ is a benzene ring optionally further substituted by 1 to 3 halogen atoms;
Y$^1$ is C(=O); and
R$^2$ is a group represented by the formula:

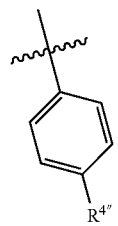

wherein R$^{4''}$ is a C$_{1-6}$ alkyl group optionally substituted by 1 to 3 hydroxy groups, or a C$_{1-6}$ alkoxy group optionally substituted by 1 to 3 hydroxy groups,
a group represented by the formula:

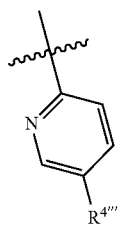

wherein R$^{4'''}$ is a C$_{1-6}$ alkoxy group optionally substituted by 1 to 3 hydroxy groups, or
a group represented by the formula:

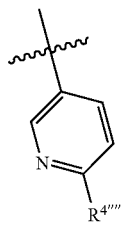

wherein R$^{4''''}$ is a C$_{1-6}$ alkyl group optionally substituted by 1 to 3 hydroxy groups.
(4) 4-[4-Fluoro-2-(2,2,2-trifluoroethoxy)phenyl]-2-[4-(2-hydroxypropan-2-yl)phenyl]-2,3-dihydro-1H-pyrrolo[3,4-c]pyridin-1-one or a salt thereof.

(5) 4-[2-(2,2-Difluoroethoxy)phenyl]-2-[4-(2-hydroxy-2-methylpropoxy)phenyl]-6-methyl-2,3-dihydro-1H-pyrrolo[3,4-c]pyridin-1-one or a salt thereof.
(6) 5-(Difluoromethyl)-2-[4-(2-hydroxypropan-2-yl)phenyl]-7-[2-(2,2,2-trifluoroethoxy)phenyl]-1H-pyrrolo[3,4-c]pyridine-3,6(2H,5H)-dione or a salt thereof.
(7) A medicament comprising the compound or salt according to (1).
(8) The medicament according to (7), which is a glucosylceramide synthase inhibitor.
(9) The medicament according to (7), which is an agent for the prophylaxis or treatment of a lysosomal storage disease or a neurodegenerative disease.
(10) The medicament according to (9), wherein the lysosomal storage disease is Gaucher's disease, Fabry's disease, GM1-gangliosidosis, GM2 activator deficiency, Tay-Sachs disease or Sandhoffs disease.
(11) The medicament according to (9), wherein the neurodegenerative disease is Parkinson's disease, Lewy body dementia or multiple-system atrophy.
(12) The compound or salt according to (1) for use in the prophylaxis or treatment of a lysosomal storage disease or a neurodegenerative disease.
(13) The compound or salt according to (12), wherein the lysosomal storage disease is Gaucher's disease, Fabry's disease, GM1-gangliosidosis, GM2 activator deficiency, Tay-Sachs disease or Sandhoffs disease.
(14) The compound or salt according to (12), wherein the neurodegenerative disease is Parkinson's disease, Lewy body dementia or multiple-system atrophy.
(15) A method for inhibiting glucosylceramide synthase in a mammal, which comprises administering an effective amount of the compound or salt according to (1) to the mammal.
(16) A method for preventing or treating a lysosomal storage disease or a neurodegenerative disease in a mammal, which comprises administering an effective amount of the compound or salt according to (1) to the mammal.
(17) The method according to (16), wherein the lysosomal storage disease is Gaucher's disease, Fabry's disease, GM1-gangliosidosis, GM2 activator deficiency, Tay-Sachs disease or Sandhoffs disease.
(18) The method according to (16), wherein the neurodegenerative disease is Parkinson's disease, Lewy body dementia or multiple-system atrophy.
(19) Use of the compound or salt according to (1) for the manufacture of an agent for the prophylaxis or treatment of a lysosomal storage disease or a neurodegenerative disease.
(20) The use according to (19), wherein the lysosomal storage disease is Gaucher's disease, Fabry's disease, GM1-gangliosidosis, GM2 activator deficiency, Tay-Sachs disease or Sandhoffs disease.
(21) The use according to (19), wherein the neurodegenerative disease is Parkinson's disease, Lewy body dementia or multiple-system atrophy.

Effect of the Invention

According to the present invention, a compound having an excellent glucosylceramide synthase inhibitory action, which is useful as an agent for the prophylaxis or treatment of lysosomal storage diseases (e.g., Gaucher's disease), neurodegenerative diseases (e.g., Parkinson's disease, Lewy body dementia, multiple-system atrophy) and the like, can be provided.

DETAILED DESCRIPTION OF THE INVENTION

The present invention is explained in detail in the following.

The definition of each substituent used in the present specification is described in detail in the following. Unless otherwise specified, each substituent has the following definition.

In the present specification, examples of the "halogen atom" include fluorine, chlorine, bromine and iodine.

In the present specification, examples of the "$C_{1-6}$ alkyl group" include methyl, ethyl, propyl, isopropyl, butyl, isobutyl, sec-butyl, tert-butyl, pentyl, isopentyl, neopentyl, 1-ethylpropyl, hexyl, isohexyl, 1,1-dimethylbutyl, 2,2-dimethylbutyl, 3,3-dimethylbutyl and 2-ethylbutyl.

In the present specification, examples of the "optionally halogenated $C_{1-6}$ alkyl group" include a $C_{1-6}$ alkyl group optionally having 1 to 7, preferably 1 to 5, halogen atoms. Specific examples thereof include methyl, chloromethyl, difluoromethyl, trichloromethyl, trifluoromethyl, ethyl, 2-bromoethyl, 2,2,2-trifluoroethyl, tetrafluoroethyl, pentafluoroethyl, propyl, 2,2-difluoropropyl, 3,3,3-trifluoropropyl, isopropyl, butyl, 4,4,4-trifluorobutyl, isobutyl, sec-butyl, tert-butyl, pentyl, isopentyl, neopentyl, 5,5,5-trifluoropentyl, hexyl and 6,6,6-trifluorohexyl.

In the present specification, examples of the "$C_{2-6}$ alkenyl group" include ethenyl, 1-propenyl, 2-propenyl, 2-methyl-1-propenyl, 1-butenyl, 2-butenyl, 3-butenyl, 3-methyl-2-butenyl, 1-pentenyl, 2-pentenyl, 3-pentenyl, 4-pentenyl, 4-methyl-3-pentenyl, 1-hexenyl, 3-hexenyl and 5-hexenyl.

In the present specification, examples of the "$C_{2-6}$ alkynyl group" include ethynyl, 1-propynyl, 2-propynyl, 1-butynyl, 2-butynyl, 3-butynyl, 1-pentynyl, 2-pentynyl, 3-pentynyl, 4-pentynyl, 1-hexynyl, 2-hexynyl, 3-hexynyl, 4-hexynyl, 5-hexynyl and 4-methyl-2-pentynyl.

In the present specification, examples of the "$C_{3-10}$ cycloalkyl group" include cyclopropyl, cyclobutyl, cyclopentyl, cyclohexyl, cycloheptyl, cyclooctyl, bicyclo[2.2.1]heptyl, bicyclo[2.2.2]octyl, bicyclo[3.2.1]octyl and adamantyl.

In the present specification, examples of the "optionally halogenated $C_{3-10}$ cycloalkyl group" include a $C_{3-10}$ cycloalkyl group optionally having 1 to 7, preferably 1 to 5, halogen atoms. Specific examples thereof include cyclopropyl, 2,2-difluorocyclopropyl, 2,3-difluorocyclopropyl, cyclobutyl, difluorocyclobutyl, cyclopentyl, cyclohexyl, cycloheptyl and cyclooctyl.

In the present specification, examples of the "$C_{3-10}$ cycloalkenyl group" include cyclopropenyl, cyclobutenyl, cyclopentenyl, cyclohexenyl, cycloheptenyl and cyclooctenyl.

In the present specification, examples of the "$C_{6-14}$ aryl group" include phenyl, 1-naphthyl, 2-naphthyl, 1-anthryl, 2-anthryl and 9-anthryl.

In the present specification, examples of the "$C_{7-16}$ aralkyl group" include benzyl, phenethyl, naphthylmethyl and phenylpropyl.

In the present specification, examples of the "$C_{1-6}$ alkoxy group" include methoxy, ethoxy, propoxy, isopropoxy, butoxy, isobutoxy, sec-butoxy, tert-butoxy, pentyloxy and hexyloxy.

In the present specification, examples of the "optionally halogenated $C_{1-6}$ alkoxy group" include a $C_{1-6}$ alkoxy group optionally having 1 to 7, preferably 1 to 5, halogen atoms. Specific examples thereof include methoxy, difluoromethoxy, trifluoromethoxy, ethoxy, 2,2,2-trifluoroethoxy, propoxy, isopropoxy, butoxy, 4,4,4-trifluorobutoxy, isobutoxy, sec-butoxy, pentyloxy and hexyloxy.

In the present specification, examples of the "$C_{3-10}$ cycloalkyloxy group" include cyclopropyloxy, cyclobutyloxy, cyclopentyloxy, cyclohexyloxy, cycloheptyloxy and cyclooctyloxy.

In the present specification, examples of the "$C_{1-6}$ alkylthio group" include methylthio, ethylthio, propylthio, isopropylthio, butylthio, sec-butylthio, tert-butylthio, pentylthio and hexylthio.

In the present specification, examples of the "optionally halogenated $C_{1-6}$ alkylthio group" include a $C_{1-6}$ alkylthio group optionally having 1 to 7, preferably 1 to 5, halogen atoms. Specific examples thereof include methylthio, difluoromethylthio, trifluoromethylthio, ethylthio, propylthio, isopropylthio, butylthio, 4,4,4-trifluorobutylthio, pentylthio and hexylthio.

In the present specification, examples of the "$C_{1-6}$ alkyl-carbonyl group" include acetyl, propanoyl, butanoyl, 2-methylpropanoyl, pentanoyl, 3-methylbutanoyl, 2-methylbutanoyl, 2,2-dimethylpropanoyl, hexanoyl and heptanoyl.

In the present specification, examples of the "optionally halogenated $C_{1-6}$ alkyl-carbonyl group" include a $C_{1-6}$ alkyl-carbonyl group optionally having 1 to 7, preferably 1 to 5, halogen atoms. Specific examples thereof include acetyl, chloroacetyl, trifluoroacetyl, trichloroacetyl, propanoyl, butanoyl, pentanoyl and hexanoyl.

In the present specification, examples of the "$C_{1-6}$ alkoxy-carbonyl group" include methoxycarbonyl, ethoxycarbonyl, propoxycarbonyl, isopropoxycarbonyl, butoxycarbonyl, isobutoxycarbonyl, sec-butoxycarbonyl, tert-butoxycarbonyl, pentyloxycarbonyl and hexyloxycarbonyl.

In the present specification, examples of the "$C_{6-14}$ aryl-carbonyl group" include benzoyl, 1-naphthoyl and 2-naphthoyl.

In the present specification, examples of the "$C_{7-16}$ aralkyl-carbonyl group" include phenylacetyl and phenylpropionyl.

In the present specification, examples of the "5- to 14-membered aromatic heterocyclylcarbonyl group" include nicotinoyl, isonicotinoyl, thenoyl and furoyl.

In the present specification, examples of the "3- to 14-membered non-aromatic heterocyclylcarbonyl group" include morpholinylcarbonyl, piperidinylcarbonyl and pyrrolidinylcarbonyl.

In the present specification, examples of the "mono- or di-$C_{1-6}$ alkyl-carbamoyl group" include methylcarbamoyl, ethylcarbamoyl, dimethylcarbamoyl, diethylcarbamoyl and N-ethyl-N-methylcarbamoyl.

In the present specification, examples of the "mono- or di-$C_{7-16}$ aralkyl-carbamoyl group" include benzylcarbamoyl and phenethylcarbamoyl.

In the present specification, examples of the "$C_{1-6}$ alkylsulfonyl group" include methylsulfonyl, ethylsulfonyl, propylsulfonyl, isopropylsulfonyl, butylsulfonyl, sec-butylsulfonyl and tert-butylsulfonyl.

In the present specification, examples of the "optionally halogenated $C_{1-6}$ alkylsulfonyl group" include a $C_{1-6}$ alkylsulfonyl group optionally having 1 to 7, preferably 1 to 5, halogen atoms. Specific examples thereof include methylsulfonyl, difluoromethylsulfonyl, trifluoromethylsulfonyl, ethylsulfonyl, propylsulfonyl, isopropylsulfonyl, butylsulfonyl, 4,4,4-trifluorobutylsulfonyl, pentylsulfonyl and hexylsulfonyl.

In the present specification, examples of the "$C_{6-14}$ arylsulfonyl group" include phenylsulfonyl, 1-naphthylsulfonyl and 2-naphthylsulfonyl.

In the present specification, examples of the "substituent" include a halogen atom, a cyano group, a nitro group, an optionally substituted hydrocarbon group, an optionally substituted heterocyclic group, an acyl group, an optionally substituted amino group, an optionally substituted carbamoyl group, an optionally substituted thiocarbamoyl group, an optionally substituted sulfamoyl group, an optionally substituted hydroxy group, an optionally substituted sulfanyl (SH) group and an optionally substituted silyl group.

In the present specification, examples of the "hydrocarbon group" (including "hydrocarbon group" of "optionally substituted hydrocarbon group") include a $C_{1-6}$ alkyl group, a $C_{2-6}$ alkenyl group, a $C_{2-6}$ alkynyl group, a $C_{3-10}$ cycloalkyl group, a $C_{3-10}$ cycloalkenyl group, a $C_{6-14}$ aryl group and a $C_{7-16}$ aralkyl group.

In the present specification, examples of the "optionally substituted hydrocarbon group" include a hydrocarbon group optionally having substituent(s) selected from the following Substituent Group A.

[Substituent Group A]
(1) a halogen atom,
(2) a nitro group,
(3) a cyano group,
(4) an oxo group,
(5) a hydroxy group,
(6) an optionally halogenated $C_{1-6}$ alkoxy group,
(7) a $C_{6-14}$ aryloxy group (e.g., phenoxy, naphthoxy),
(8) a $C_{7-16}$ aralkyloxy group (e.g., benzyloxy),
(9) a 5- to 14-membered aromatic heterocyclyloxy group (e.g., pyridyloxy),
(10) a 3- to 14-membered non-aromatic heterocyclyloxy group (e.g., morpholinyloxy, piperidinyloxy),
(11) a $C_{1-6}$ alkyl-carbonyloxy group (e.g., acetoxy, propanoyloxy),
(12) a $C_{6-14}$ aryl-carbonyloxy group (e.g., benzoyloxy, 1-naphthoyloxy, 2-naphthoyloxy),
(13) a $C_{1-6}$ alkoxy-carbonyloxy group (e.g., methoxycarbonyloxy, ethoxycarbonyloxy, propoxycarbonyloxy, butoxycarbonyloxy),
(14) a mono- or di-$C_{1-6}$ alkyl-carbamoyloxy group (e.g., methylcarbamoyloxy, ethylcarbamoyloxy, dimethylcarbamoyloxy, diethylcarbamoyloxy),
(15) a $C_{6-14}$ aryl-carbamoyloxy group (e.g., phenylcarbamoyloxy, naphthylcarbamoyloxy),
(16) a 5- to 14-membered aromatic heterocyclylcarbonyloxy group (e.g., nicotinoyloxy),
(17) a 3- to 14-membered non-aromatic heterocyclylcarbonyloxy group (e.g., morpholinylcarbonyloxy, piperidinylcarbonyloxy),
(18) an optionally halogenated $C_{1-6}$ alkylsulfonyloxy group (e.g., methylsulfonyloxy, trifluoromethylsulfonyloxy),
(19) a $C_{6-14}$ arylsulfonyloxy group optionally substituted by a $C_{1-6}$ alkyl group (e.g., phenylsulfonyloxy, toluenesulfonyloxy),
(20) an optionally halogenated $C_{1-6}$ alkylthio group,
(21) a 5- to 14-membered aromatic heterocyclic group,
(22) a 3- to 14-membered non-aromatic heterocyclic group,
(23) a formyl group,
(24) a carboxy group,
(25) an optionally halogenated $C_{1-6}$ alkyl-carbonyl group,
(26) a $C_{6-14}$ aryl-carbonyl group,
(27) a 5- to 14-membered aromatic heterocyclylcarbonyl group,
(28) a 3- to 14-membered non-aromatic heterocyclylcarbonyl group,
(29) a $C_{1-6}$ alkoxy-carbonyl group,
(30) a $C_{6-14}$ aryloxy-carbonyl group (e.g., phenyloxycarbonyl, 1-naphthyloxycarbonyl, 2-naphthyloxycarbonyl),
(31) a $C_{7-16}$ aralkyloxy-carbonyl group (e.g., benzyloxycarbonyl, phenethyloxycarbonyl),
(32) a carbamoyl group,
(33) a thiocarbamoyl group,
(34) a mono- or di-$C_{1-6}$ alkyl-carbamoyl group,
(35) a $C_{6-14}$ aryl-carbamoyl group (e.g., phenylcarbamoyl),
(36) a 5- to 14-membered aromatic heterocyclylcarbamoyl group (e.g., pyridylcarbamoyl, thienylcarbamoyl),
(37) a 3- to 14-membered non-aromatic heterocyclylcarbamoyl group (e.g., morpholinylcarbamoyl, piperidinylcarbamoyl),
(38) an optionally halogenated $C_{1-6}$ alkylsulfonyl group,
(39) a $C_{6-14}$ arylsulfonyl group,
(40) a 5- to 14-membered aromatic heterocyclylsulfonyl group (e.g., pyridylsulfonyl, thienylsulfonyl),
(41) an optionally halogenated $C_{1-6}$ alkylsulfinyl group,
(42) a $C_{6-14}$ arylsulfinyl group (e.g., phenylsulfinyl, 1-naphthylsulfinyl, 2-naphthylsulfinyl),
(43) a 5- to 14-membered aromatic heterocyclylsulfinyl group (e.g., pyridylsulfinyl, thienylsulfinyl),
(44) an amino group,
(45) a mono- or di-$C_{1-6}$ alkylamino group (e.g., methylamino, ethylamino, propylamino, isopropylamino, butylamino, dimethylamino, diethylamino, dipropylamino, dibutylamino, N-ethyl-N-methylamino),
(46) a mono- or di-$C_{6-14}$ arylamino group (e.g., phenylamino),
(47) a 5- to 14-membered aromatic heterocyclylamino group (e.g., pyridylamino),
(48) a $C_{7-16}$ aralkylamino group (e.g., benzylamino),
(49) a formylamino group,
(50) a $C_{1-6}$ alkyl-carbonylamino group (e.g., acetylamino, propanoylamino, butanoylamino),
(51) a ($C_{1-6}$ alkyl) ($C_{1-6}$ alkyl-carbonyl) amino group (e.g., N-acetyl-N-methylamino),
(52) a $C_{6-14}$ aryl-carbonylamino group (e.g., phenylcarbonylamino, naphthylcarbonylamino),
(53) a $C_{1-6}$ alkoxy-carbonylamino group (e.g., methoxycarbonylamino, ethoxycarbonylamino, propoxycarbonylamino, butoxycarbonylamino, tert-butoxycarbonylamino),
(54) a $C_{7-16}$ aralkyloxy-carbonylamino group (e.g., benzyloxycarbonylamino),
(55) a $C_{1-6}$ alkylsulfonylamino group (e.g., methylsulfonylamino, ethylsulfonylamino),
(56) a $C_{6-14}$ arylsulfonylamino group optionally substituted by a $C_{1-6}$ alkyl group (e.g., phenylsulfonylamino, toluenesulfonylamino),
(57) an optionally halogenated $C_{1-6}$ alkyl group,
(58) a $C_{2-6}$ alkenyl group,
(59) a $C_{2-6}$ alkynyl group,
(60) a $C_{3-10}$ cycloalkyl group,
(61) a $C_{3-10}$ cycloalkenyl group, and
(62) a $C_{6-14}$ aryl group.

The number of the above-mentioned substituents in the "optionally substituted hydrocarbon group" is, for example, 1 to 5, preferably 1 to 3. When the number of the substituents is two or more, the respective substituents may be the same or different.

In the present specification, examples of the "heterocyclic group" (including "heterocyclic group" of "optionally substituted heterocyclic group") include (i) an aromatic heterocyclic group, (ii) a non-aromatic heterocyclic group and (iii) a 7- to 10-membered bridged heterocyclic group, each containing, as a ring-constituting atom besides carbon atom, 1 to 4 heteroatoms selected from a nitrogen atom, a sulfur atom and an oxygen atom.

In the present specification, examples of the "aromatic heterocyclic group" (including "5- to 14-membered aromatic heterocyclic group") include a 5- to 14-membered (preferably 5- to 10-membered) aromatic heterocyclic group containing, as a ring-constituting atom besides carbon atom, 1 to 4 heteroatoms selected from a nitrogen atom, a sulfur atom and an oxygen atom.

Preferable examples of the "aromatic heterocyclic group" include 5- or 6-membered monocyclic aromatic heterocyclic groups such as thienyl, furyl, pyrrolyl, imidazolyl, pyrazolyl, thiazolyl, isothiazolyl, oxazolyl, isoxazolyl, pyridyl, pyrazinyl, pyrimidinyl, pyridazinyl, 1,2,4-oxadiazolyl, 1,3,4-oxadiazolyl, 1,2,4-thiadiazolyl, 1,3,4-thiadiazolyl, triazolyl, tetrazolyl, triazinyl and the like; and 8- to 14-membered fused polycyclic (preferably bi or tricyclic) aromatic heterocyclic groups such as benzothiophenyl, benzofuranyl, benzimidazolyl, benzoxazolyl, benzisoxazolyl, so benzothiazolyl, benzisothiazolyl, benzotriazolyl, imidazopyridinyl, thienopyridinyl, furopyridinyl, pyrrolopyridinyl, pyrazolopyridinyl, oxazolopyridinyl, thiazolopyridinyl, imidazopyrazinyl, imidazopyrimidinyl, thienopyrimidinyl, furopyrimidinyl, pyrrolopyrimidinyl, pyrazolopyrimidinyl, oxazolopyrimidinyl, thiazolopyrimidinyl, pyrazolotriazinyl, naphtho[2,3-b]thienyl, phenoxathiinyl, indolyl, isoindolyl, 1H-indazolyl, purinyl, isoquinolyl, quinolyl, phthalazinyl, naphthyridinyl, quinoxalinyl, quinazolinyl, cinnolinyl, carbazolyl, β-carbolinyl, phenanthridinyl, acridinyl, phenazinyl, phenothiazinyl, phenoxazinyl and the like.

In the present specification, examples of the "non-aromatic heterocyclic group" (including "3- to 14-membered non-aromatic heterocyclic group") include a 3- to 14-membered (preferably 4- to 10-membered) non-aromatic heterocyclic group containing, as a ring-constituting atom besides carbon atom, 1 to 4 heteroatoms selected from a nitrogen atom, a sulfur atom and an oxygen atom.

Preferable examples of the "non-aromatic heterocyclic group" include 3- to 8-membered monocyclic non-aromatic heterocyclic groups such as aziridinyl, oxiranyl, thiiranyl, azetidinyl, oxetanyl, thietanyl, tetrahydrothienyl, tetrahydrofuranyl, pyrrolinyl, pyrrolidinyl, imidazolinyl, imidazolidinyl, oxazolinyl, oxazolidinyl, pyrazolinyl, pyrazolidinyl, thiazolinyl, thiazolidinyl, tetrahydroisothiazolyl, tetrahydrooxazolyl, tetrahydroisooxazolyl, piperidinyl, piperazinyl, tetrahydropyridinyl, dihydropyridinyl, dihydrothiopyranyl, tetrahydropyrimidinyl, tetrahydropyridazinyl, dihydropyranyl, tetrahydropyranyl, tetrahydrothiopyranyl, morpholinyl, thiomorpholinyl, azepanyl, diazepanyl, azepinyl, oxepanyl, azocanyl, diazocanyl and the like; and 9- to 14-membered fused polycyclic (preferably bi or tricyclic) non-aromatic heterocyclic groups such as dihydrobenzofuranyl, dihydrobenzimidazolyl, dihydrobenzoxazolyl, dihydrobenzothiazolyl, dihydrobenzisothiazolyl, dihydronaphtho[2,3-b]thienyl, tetrahydroisoquinolyl, tetrahydroquinolyl, 4H-quinolizinyl, indolinyl, isoindolinyl, tetrahydrothieno[2,3-c]pyridinyl, tetrahydrobenzazepinyl, tetrahydroquinoxalinyl, tetrahydrophenanthridinyl, hexahydrophenothiazinyl, hexahydrophenoxazinyl, tetrahydrophthalazinyl, tetrahydronaphthyridinyl, tetrahydroquinazolinyl, tetrahydrocinnolinyl, tetrahydrocarbazolyl, tetrahydro-β-carbolinyl, tetrahydroacrydinyl, tetrahydrophenazinyl, tetrahydrothioxanthenyl, octahydroisoquinolyl and the like.

In the present specification, preferable examples of the "7- to 10-membered bridged heterocyclic group" include quinuclidinyl and 7-azabicyclo[2.2.1]heptanyl.

In the present specification, examples of the "nitrogen-containing heterocyclic group" include a "heterocyclic group" containing at least one nitrogen atom as a ring-constituting atom.

In the present specification, examples of the "optionally substituted heterocyclic group" include a heterocyclic group optionally having substituent(s) selected from the above-mentioned Substituent Group A.

The number of the substituents in the "optionally substituted heterocyclic group" is, for example, 1 to 3. When the number of the substituents is two or more, the respective substituents may be the same or different.

In the present specification, examples of the "acyl group" include a formyl group, a carboxy group, a carbamoyl group, a thiocarbamoyl group, a sulfino group, a sulfo group, a sulfamoyl group and a phosphono group, each optionally having "1 or 2 substituents selected from a $C_{1-6}$ alkyl group, a $C_{2-6}$ alkenyl group, a $C_{3-10}$ cycloalkyl group, a $C_{3-10}$ cycloalkenyl group, a $C_{6-14}$ aryl group, a $C_{7-16}$ aralkyl group, a 5- to 14-membered aromatic heterocyclic group and a 3- to 14-membered non-aromatic heterocyclic group, each of which optionally has 1 to 3 substituents selected from a halogen atom, an optionally halogenated $C_{1-6}$ alkoxy group, a hydroxy group, a nitro group, a cyano group, an amino group and a carbamoyl group".

Examples of the "acyl group" also include a hydrocarbon-sulfonyl group, a heterocyclylsulfonyl group, a hydrocarbon-sulfinyl group and a heterocyclylsulfinyl group.

Here, the hydrocarbon-sulfonyl group means a hydrocarbon group-bonded sulfonyl group, the heterocyclylsulfonyl group means a heterocyclic group-bonded sulfonyl group, the hydrocarbon-sulfinyl group means a hydrocarbon group-bonded sulfinyl group and the heterocyclylsulfinyl group means a heterocyclic group-bonded sulfinyl group.

Preferable examples of the "acyl group" include a formyl group, a carboxy group, a $C_{1-6}$ alkyl-carbonyl group, a $C_{2-6}$ alkenyl-carbonyl group (e.g., crotonoyl), a $C_{3-10}$ cycloalkyl-carbonyl group (e.g., cyclobutanecarbonyl, cyclopentanecarbonyl, cyclohexanecarbonyl, cycloheptanecarbonyl), a $C_{3-10}$ cycloalkenyl-carbonyl group (e.g., 2-cyclohexenecarbonyl), a $C_{6-14}$ aryl-carbonyl group, a $C_{7-16}$ aralkyl-carbonyl group, a 5- to 14-membered aromatic heterocyclylcarbonyl group, a 3- to 14-membered non-aromatic heterocyclylcarbonyl group, a $C_{1-6}$ alkoxy-carbonyl group, a $C_{6-14}$ aryloxy-carbonyl group (e.g., phenyloxycarbonyl, naphthyloxycarbonyl), a $C_{7-16}$ aralkyloxy-carbonyl group (e.g., benzyloxycarbonyl, phenethyloxycarbonyl), a carbamoyl group, a mono- or di-$C_{1-6}$ alkyl-carbamoyl group, a mono- or di-$C_{2-6}$ alkenyl-carbamoyl group (e.g., diallylcarbamoyl), a mono- or di-$C_{3-10}$ cycloalkyl-carbamoyl group (e.g., cyclopropylcarbamoyl), a mono- or di-$C_{6-14}$ aryl-carbamoyl group (e.g., phenylcarbamoyl), a mono- or di-$C_{7-16}$ aralkyl-carbamoyl group, a 5- to 14-membered aromatic heterocyclylcarbamoyl group so (e.g., pyridylcarbamoyl), a thiocarbamoyl group, a mono- or di-$C_{1-6}$ alkyl-thiocarbamoyl group (e.g., methylthiocarbamoyl, N-ethyl-N-methylthiocarbamoyl), a mono- or di-$C_{2-6}$ alkenyl-thiocarbamoyl group (e.g., diallylthiocarbamoyl), a mono- or di-$C_{3-10}$ cycloalkyl-thiocarbamoyl group (e.g., cyclopropylthiocarbamoyl, cyclohexylthiocarbamoyl), a mono- or di-$C_{6-14}$ aryl-thiocarbamoyl group (e.g., phenylthiocarbamoyl), a mono- or di-$C_{7-16}$ aralkyl-thiocarbamoyl group (e.g., benzylthiocarbamoyl, phenethylthiocarbamoyl), a 5- to 14-membered aromatic heterocyclylthiocarbamoyl group (e.g., pyridylthiocarbamoyl), a sulfino group, a $C_{1-6}$ alkylsulfinyl group (e.g., methylsulfinyl, ethylsulfinyl), a sulfo group, a $C_{1-6}$ alkylsulfonyl group, a $C_{6-14}$ arylsulfonyl group, a phosphono group and a mono- or di-$C_{1-6}$ alkylphosphono group (e.g., dimethylphosphono, diethylphosphono, diisopropylphosphono, dibutylphosphono).

In the present specification, examples of the "optionally substituted amino group" include an amino group optionally having "1 or 2 substituents selected from a $C_{1-6}$ alkyl group, a $C_{2-6}$ alkenyl group, a $C_{3-10}$ cycloalkyl group, a $C_{6-14}$ aryl group, a $C_{7-16}$ aralkyl group, a $C_{1-6}$ alkyl-carbonyl group, a $C_{6-14}$ aryl-carbonyl group, a $C_{7-16}$ aralkyl-carbonyl group, a 5- to 14-membered aromatic heterocyclylcarbonyl group, a 3- to 14-membered non-aromatic heterocyclylcarbonyl group, a $C_{1-6}$ alkoxy-carbonyl group, a 5- to 14-membered aromatic heterocyclic group, a carbamoyl group, a mono- or di-$C_{1-6}$ alkyl-carbamoyl group, a mono- or di-$C_{7-16}$ aralkyl-carbamoyl group, a $C_{1-6}$ alkylsulfonyl group and a $C_{6-14}$ arylsulfonyl group, each of which optionally has 1 to 3 substituents selected from Substituent Group A".

Preferable examples of the optionally substituted amino group include an amino group, a mono- or di-(optionally halogenated $C_{1-6}$ alkyl) amino group (e.g., methylamino, trifluoromethylamino, dimethylamino, ethylamino, diethylamino, propylamino, dibutylamino), a mono- or di-$C_{2-6}$ alkenylamino group (e.g., diallylamino), a mono- or di-$C_{3-10}$ cycloalkylamino group (e.g., cyclopropylamino, cyclohexylamino), a mono- or di-$C_{6-14}$ arylamino group (e.g., phenylamino), a mono- or di-$C_{7-16}$ aralkylamino group (e.g., benzylamino, dibenzylamino), a mono- or di-(optionally halogenated $C_{1-6}$ alkyl)-carbonylamino group (e.g., acetylamino, propionylamino), a mono- or di-$C_{6-14}$ aryl-carbonylamino group (e.g., benzoylamino), a mono- or di-$C_{7-16}$ aralkyl-carbonylamino group (e.g., benzylcarbonylamino), a mono- or di-5- to 14-membered aromatic heterocyclylcarbonylamino group (e.g., nicotinoylamino, isonicotinoylamino), a mono- or di-3- to 14-membered non-aromatic heterocyclylcarbonylamino group (e.g., piperidinylcarbonylamino), a mono- or di-$C_{1-6}$ alkoxy-carbonylamino group (e.g., tert-butoxycarbonylamino), a 5- to 14-membered aromatic heterocyclylamino group (e.g., pyridylamino), a carbamoylamino group, a (mono- or di-$C_{1-6}$ alkyl-carbamoyl) amino group (e.g., methylcarbamoylamino), a (mono- or di-$C_{7-16}$ aralkyl-carbamoyl) amino group (e.g., benzylcarbamoylamino), a $C_{1-6}$ alkylsulfonylamino group (e.g., methylsulfonylamino, ethylsulfonylamino), a $C_{6-14}$ arylsulfonylamino group (e.g., phenylsulfonylamino), a ($C_{1-6}$ alkyl) ($C_{1-6}$ alkyl-carbonyl) amino group (e.g., N-acetyl-N-methylamino) and a ($C_{1-6}$ alkyl) ($C_{6-14}$ aryl-carbonyl) amino group (e.g., N-benzoyl-N-methylamino).

In the present specification, examples of the "optionally substituted carbamoyl group" include a carbamoyl group optionally having "1 or 2 substituents selected from a $C_{1-6}$ alkyl group, a $C_{2-6}$ alkenyl group, a $C_{3-10}$ cycloalkyl group, a $C_{6-14}$ aryl group, a $C_{7-16}$ aralkyl group, a $C_{1-6}$ alkyl-carbonyl group, a $C_{6-14}$ aryl-carbonyl group, a $C_{7-16}$ aralkyl-carbonyl group, a 5- to 14-membered aromatic heterocyclylcarbonyl group, a 3- to 14-membered non-aromatic heterocyclylcarbonyl group, a $C_{1-6}$ alkoxy-carbonyl group, a 5- to 14-membered aromatic heterocyclic group, a carbamoyl group, a mono- or di-$C_{1-6}$ alkyl-carbamoyl group and a mono- or di-$C_{7-16}$ aralkyl-carbamoyl group, each of which optionally has 1 to 3 substituents selected from Substituent Group A".

Preferable examples of the optionally substituted carbamoyl group include a carbamoyl group, a mono- or di-$C_{1-6}$ alkyl-carbamoyl group, a mono- or di-$C_{2-6}$ alkenyl-carbamoyl group (e.g., diallylcarbamoyl), a mono- or di-$C_{3-10}$ cycloalkyl-carbamoyl group (e.g., cyclopropylcarbamoyl, cyclohexylcarbamoyl), a mono- or di-$C_{6-14}$ aryl-carbamoyl group (e.g., phenylcarbamoyl), a mono- or di-$C_{7-16}$ aralkyl-carbamoyl group, a mono- or di-$C_{1-6}$ alkyl-carbonyl-carbamoyl group (e.g., acetylcarbamoyl, propionylcarbamoyl), a mono- or di-$C_{6-14}$ aryl-carbonyl-carbamoyl group (e.g., benzoylcarbamoyl) and a 5- to 14-membered aromatic heterocyclylcarbamoyl group (e.g., pyridylcarbamoyl).

In the present specification, examples of the "optionally substituted thiocarbamoyl group" include a thiocarbamoyl group optionally having "1 or 2 substituents selected from a $C_{1-6}$ alkyl group, a $C_{2-6}$ alkenyl group, a $C_{3-10}$ cycloalkyl group, a $C_{6-14}$ aryl group, a $C_{7-16}$ aralkyl group, a $C_{1-6}$ alkyl-carbonyl group, a $C_{6-14}$ aryl-carbonyl group, a $C_{7-16}$ aralkyl-carbonyl group, a 5- to 14-membered aromatic heterocyclylcarbonyl group, a 3- to 14-membered non-aromatic heterocyclylcarbonyl group, a $C_{1-6}$ alkoxy-carbonyl group, a 5- to 14-membered aromatic heterocyclic group, a carbamoyl group, a mono- or di-$C_{1-6}$ alkyl-carbamoyl group and a mono- or di-$C_{7-16}$ aralkyl-carbamoyl group, each of which optionally has 1 to 3 substituents selected from Substituent Group A".

Preferable examples of the optionally substituted thiocarbamoyl group include a thiocarbamoyl group, a mono- or di-$C_{1-6}$ alkyl-thiocarbamoyl group (e.g., methylthiocarbamoyl, ethylthiocarbamoyl, dimethylthiocarbamoyl, diethylthiocarbamoyl, N-ethyl-N-methylthiocarbamoyl), a mono- or di-$C_{2-6}$ alkenyl-thiocarbamoyl group (e.g., diallylthiocarbamoyl), a mono- or di-$C_{3-10}$ cycloalkyl-thiocarbamoyl group (e.g., cyclopropylthiocarbamoyl, cyclohexylthiocarbamoyl), a mono- or di-$C_{6-14}$ aryl-thiocarbamoyl group (e.g., phenylthiocarbamoyl), a mono- or di-$C_{7-16}$ aralkyl-thiocarbamoyl group (e.g., benzylthiocarbamoyl, phenethylthiocarbamoyl), a mono- or di-$C_{1-6}$ alkyl-carbonyl-thiocarbamoyl group (e.g., acetylthiocarbamoyl, propionylthiocarbamoyl), a mono- or di-$C_{6-14}$ aryl-carbonyl-thiocarbamoyl group (e.g., benzoylthiocarbamoyl) and a 5- to 14-membered aromatic heterocyclylthiocarbamoyl group (e.g., pyridylthiocarbamoyl).

In the present specification, examples of the "optionally substituted sulfamoyl group" include a sulfamoyl group optionally having "1 or 2 substituents selected from a $C_{1-6}$ alkyl group, a $C_{2-6}$ alkenyl group, a $C_{3-10}$ cycloalkyl group, a $C_{6-14}$ aryl group, a $C_{7-16}$ aralkyl group, a $C_{1-6}$ alkyl-carbonyl group, a $C_{6-14}$ aryl-carbonyl group, a $C_{7-16}$ aralkyl-carbonyl group, a 5- to 14-membered aromatic heterocyclylcarbonyl group, a 3- to 14-membered non-aromatic heterocyclylcarbonyl group, a $C_{1-6}$ alkoxy-carbonyl group, a 5- to 14-membered aromatic heterocyclic group, a carbamoyl group, a mono- or di-$C_{1-6}$ alkyl-carbamoyl group and a mono- or di-$C_{7-16}$ aralkyl-carbamoyl group, each of which optionally has 1 to 3 substituents selected from Substituent Group A".

Preferable examples of the optionally substituted sulfamoyl group include a sulfamoyl group, a mono- or di-$C_{1-6}$ alkyl-sulfamoyl group (e.g., methylsulfamoyl, ethylsulfamoyl, dimethylsulfamoyl, diethylsulfamoyl, N-ethyl-N- methylsulfamoyl), a mono- or di-$C_{2-6}$ alkenyl-sulfamoyl group (e.g., diallylsulfamoyl), a mono- or di-$C_{3-10}$ cycloalkyl-sulfamoyl group (e.g., cyclopropylsulfamoyl, cyclohexylsulfamoyl), a mono- or di-$C_{6-14}$ aryl-sulfamoyl group (e.g., phenylsulfamoyl), a mono- or di-$C_{7-16}$ aralkyl-sulfamoyl group (e.g., benzylsulfamoyl, phenethylsulfamoyl), a mono- or di-$C_{1-6}$ alkyl-carbonyl-sulfamoyl group (e.g., acetylsulfamoyl, propionylsulfamoyl), a mono- or di-$C_{6-14}$ arylcarbonyl-sulfamoyl group (e.g., benzoylsulfamoyl) and a 5- to 14-membered aromatic heterocyclylsulfamoyl group (e.g., pyridylsulfamoyl).

In the present specification, examples of the "optionally substituted hydroxy group" include a hydroxy group optionally having "a substituent selected from a $C_{1-6}$ alkyl group, a $C_{2-6}$ alkenyl group, a $C_{3-10}$ cycloalkyl group, a $C_{6-14}$ aryl group, a $C_{7-16}$ aralkyl group, a $C_{1-6}$ alkyl-carbonyl group, a $C_{6-14}$ aryl-carbonyl group, a $C_{7-16}$ aralkyl-carbonyl group, a 5- to 14-membered aromatic heterocyclylcarbonyl group, a 3- to 14-membered non-aromatic heterocyclylcarbonyl group, a $C_{1-6}$ alkoxy-carbonyl group, a 5- to 14-membered aromatic heterocyclic group, a carbamoyl group, a mono- or di-$C_{1-6}$ alkyl-carbamoyl group, a mono- or di-$C_{7-16}$ aralkyl-carbamoyl group, a $C_{1-6}$ alkylsulfonyl group and a $C_{6-14}$ arylsulfonyl group, each of which optionally has 1 to 3 substituents selected from Substituent Group A".

Preferable examples of the optionally substituted hydroxy group include a hydroxy group, a $C_{1-6}$ alkoxy group, a $C_{2-6}$ alkenyloxy group (e.g., allyloxy, 2-butenyloxy, 2-pentenyloxy, 3-hexenyloxy), a $C_{3-10}$ cycloalkyloxy group (e.g., cyclohexyloxy), a $C_{6-14}$ aryloxy group (e.g., phenoxy, naphthyloxy), a $C_{7-16}$ aralkyloxy group (e.g., benzyloxy, phenethyloxy), a $C_{1-6}$ alkyl-carbonyloxy group (e.g., acetyloxy, propionyloxy, butyryloxy, isobutyryloxy, pivaloyloxy), a $C_{6-14}$ aryl-carbonyloxy group (e.g., benzoyloxy), a $C_{7-16}$ aralkyl-carbonyloxy group (e.g., benzylcarbonyloxy), a 5- to 14-membered aromatic heterocyclylcarbonyloxy group (e.g., nicotinoyloxy), a 3- to 14-membered non-aromatic heterocyclylcarbonyloxy group (e.g., piperidinylcarbonyloxy), a $C_{1-6}$ alkoxy-carbonyloxy group (e.g., tert-butoxycarbonyloxy), a 5- to 14-membered aromatic heterocyclyloxy group (e.g., pyridyloxy), a carbamoyloxy group, a $C_{1-6}$ alkyl-carbamoyloxy group (e.g., methylcarbamoyloxy), a $C_{7-16}$ aralkyl-carbamoyloxy group (e.g., benzylcarbamoyloxy), a $C_{1-6}$ alkylsulfonyloxy group (e.g., methylsulfonyloxy, ethylsulfonyloxy) and a $C_{6-14}$ arylsulfonyloxy group (e.g., phenylsulfonyloxy).

In the present specification, examples of the "optionally substituted sulfanyl group" include a sulfanyl group optionally having "a substituent selected from a $C_{1-6}$ alkyl group, a $C_{2-6}$ alkenyl group, a $C_{3-10}$ cycloalkyl group, a $C_{6-14}$ aryl group, a $C_{7-16}$ aralkyl group, a $C_{1-6}$ alkyl-carbonyl group, a $C_{6-14}$ aryl-carbonyl group and a 5- to 14-membered aromatic heterocyclic group, each of which optionally has 1 to 3 substituents selected from Substituent Group A" and a halogenated sulfanyl group.

Preferable examples of the optionally substituted sulfanyl group include a sulfanyl (—SH) group, a $C_{1-6}$ alkylthio group, a $C_{2-6}$ alkenylthio group (e.g., allylthio, 2-butenylthio, 2-pentenylthio, 3-hexenylthio), a $C_{3-10}$ cycloalkylthio group (e.g., cyclohexylthio), a $C_{6-14}$ arylthio group (e.g., phenylthio, naphthylthio), a $C_{7-16}$ aralkylthio group (e.g., benzylthio, phenethylthio), a $C_{1-6}$ alkyl-carbonylthio group (e.g., acetylthio, propionylthio, butyrylthio, isobutyrylthio, pivaloylthio), a $C_{6-14}$ aryl-carbonylthio group (e.g., benzoylthio), a 5- to 14-membered aromatic heterocyclylthio group (e.g., pyridylthio) and a halogenated thio group (e.g., pentafluorothio).

In the present specification, examples of the "optionally substituted silyl group" include a silyl group optionally having "1 to 3 substituents selected from a $C_{1-6}$ alkyl group, a $C_{2-6}$ alkenyl group, a $C_{3-10}$ cycloalkyl group, a $C_{6-14}$ aryl group and a $C_{7-16}$ aralkyl group, each of which optionally has 1 to 3 substituents selected from Substituent Group A".

Preferable examples of the optionally substituted silyl group include a tri-$C_{1-6}$ alkylsilyl group (e.g., trimethylsilyl, tert-butyl(dimethyl)silyl).

In the present specification, examples of the "hydrocarbon ring" include a $C_{6-14}$ aromatic hydrocarbon ring, a $C_{3-10}$ cycloalkane and a $C_{3-10}$ cycloalkene.

In the present specification, examples of the "$C_{6-14}$ aromatic hydrocarbon ring" include benzene and naphthalene.

In the present specification, examples of the "$C_{3-10}$ cycloalkane" include cyclopropane, cyclobutane, cyclopentane, cyclohexane, cycloheptane and cyclooctane.

In the present specification, examples of the "$C_{3-10}$ cycloalkene" include cyclopropene, cyclobutene, cyclopentene, cyclohexene, cycloheptene and cyclooctene.

In the present specification, examples of the "heterocycle" include an aromatic heterocycle and a non-aromatic heterocycle, each containing, as a ring-constituting atom besides carbon atom, 1 to 4 hetero atoms selected from a nitrogen atom, a sulfur atom and an oxygen atom.

In the present specification, examples of the "aromatic heterocycle" include a 5- to 14-membered (preferably 5- to 10-membered) aromatic heterocycle containing, as a ring-constituting atom besides carbon atom, 1 to 4 hetero atoms selected from a nitrogen atom, a sulfur atom and an oxygen atom. Preferable examples of the "aromatic heterocycle" include 5- or 6-membered monocyclic aromatic heterocycles such as thiophene, furan, pyrrole, imidazole, pyrazole, thiazole, isothiazole, oxazole, isoxazole, pyridine, pyrazine, pyrimidine, pyridazine, 1,2,4-oxadiazole, 1,3,4-oxadiazole, 1,2,4-thiadiazole, 1,3,4-thiadiazole, triazole, tetrazole, triazine and the like; and 8- to 14-membered fused polycyclic (preferably bi or tricyclic) aromatic heterocycles such as benzothiophene, benzofuran, benzimidazole, benzoxazole, benzisoxazole, benzothiazole, benzisothiazole, benzotriazole, imidazopyridine, thienopyridine, furopyridine, pyrrolopyridine, pyrazolopyridine, oxazolopyridine, thiazolopyridine, imidazopyrazine, imidazopyrimidine, thienopyrimidine, furopyrimidine, pyrrolopyrimidine, pyrazolopyrimidine, oxazolopyrimidine, thiazolopyrimidine, pyrazolopyrimidine, pyrazolotriazine, naphtho[2,3-b]thiophene, phenoxathiin, indole, isoindole, 1H-indazole, purine, isoquinoline, quinoline, phthalazine, naphthyridine, quinoxaline, quinazoline, cinnoline, carbazole, β-carboline, phenanthridine, acridine, phenazine, phenothiazine, phenoxazine and the like.

In the present specification, examples of the "non-aromatic heterocycle" include a 3- to 14-membered (preferably 4- to 10-membered) non-aromatic heterocycle containing, as a ring-constituting atom besides carbon atom, 1 to 4 hetero atoms selected from a nitrogen atom, a sulfur atom and an oxygen atom. Preferable examples of the "non-aromatic heterocycle" include 3- to 8-membered monocyclic non-aromatic heterocycles such as aziridine, oxirane, thiirane, azetidine, oxetane, thietane, tetrahydrothiophene, tetrahydrofuran, pyrroline, pyrrolidine, imidazoline, imidazolidine, oxazoline, oxazolidine, pyrazoline, pyrazolidine, thiazoline, thiazolidine, tetrahydroisothiazole, tetrahydrooxazole, tetrahydroisoxazole, piperidine, piperazine, tetrahydropyridine, dihydropyridine, dihydrothiopyran, tetrahydropyrimidine, tetrahydropyridazine, dihydropyran, tetrahydropyran, tetrahydrothiopyran, morpholine, thiomorpholine, azepane, diazepane, azepine, azocane, diazocane, oxepane and the like; and 9- to 14-membered fused polycyclic (preferably bi or tricyclic) non-aromatic heterocycles such as dihydrobenzofuran, dihydrobenzimidazole, dihydrobenzoxazole, dihydrobenzothiazole, dihydrobenzisothiazole, dihydronaphtho[2,3-b]thiophene, tetrahydroisoquinoline, tetrahydroquinoline, 4H-quinolizine, so indoline, isoindoline, tetrahydrothieno[2,3-c]pyridine, tetrahydrobenzazepine, tetrahydroquinoxaline, tetrahydrophenanthridine, hexahydrophenothiazine, hexahydrophenoxazine, tetrahydrophthalazine, tetrahydronaphthyridine, tetrahydroquinazoline, tetrahydrocinnoline, tetrahydrocarbazole, tetrahydro-β-carboline, tetrahydroacridine, tetrahydrophenazine, tetrahydrothioxanthene, octahydroisoquinoline and the like.

In the present specification, examples of the "nitrogen-containing heterocycle" include a "heterocycle" containing at least one nitrogen atom as a ring-constituting atom.

In the present specification, examples of the "5- or 6-membered aromatic ring" include a benzene ring and a "5- or 6-membered monocyclic aromatic heterocycle".

In the present specification, examples of the "5-membered aromatic ring" include a 5-membered aromatic ring, from among the "5- or 6-membered monocyclic aromatic heterocycle".

In the present specification, examples of the "6-membered aromatic ring" include a benzene ring, and a 6-membered aromatic heterocycle, from among the "5- or 6-membered monocyclic aromatic heterocycle".

In the present specification, examples of the "5- to 7-membered unsaturated ring" include a benzene ring, a 5- to 7-membered ring from among the "$C_{3-10}$ cycloalkene", a "5- to 6-membered monocyclic aromatic heterocycle", and a 5- to 7-membered unsaturated ring from among the "3- to 8-membered monocyclic non-aromatic heterocycle".

In the present specification, examples of the "cyclic group" include a "$C_{3-10}$ cycloalkyl group", a "$C_{3-10}$ cycloalkenyl group", a "$C_{6-14}$ aryl group" and a "heterocyclic group".

In the present specification, examples of the "ring" include a "hydrocarbon ring" and a "heterocycle".

The definition of each symbol in the formula (I) is explained in detail.

Ring A is a 5- to 7-membered unsaturated ring containing 1 to 3 double bonds in the ring.

Ring A is preferably a 5-membered unsaturated ring (e.g., imidazole, pyrazole), a 6-membered unsaturated ring (e.g., pyridine, pyrimidine, dihydropyridine, tetrahydropyridazine) or a 7-membered unsaturated ring (e.g., 2,3-dihydro-1H-1,4-diazepine, 2,3-dihydro-1,4-oxazepine).

Ring A is more preferably a 6-membered unsaturated ring, particularly preferably pyridine or dihydropyridine.

$W^1$ is $CR^a$ wherein $R^a$ is absent, a hydrogen atom or a substituent, or N. $W^1$ is preferably C or N. $W^1$ is particularly preferably C.

$W^2$ is $CR^b$ wherein $R^b$ is absent, a hydrogen atom or a substituent, or N. $W^2$ is preferably C.

$W^3$ is $CR^c$ wherein $R^c$ is absent, a hydrogen atom or a substituent, or N. $W^3$ is preferably C or N. $W^3$ is particularly preferably C.

$W^4$ is
(1) $CR^d$ wherein $R^d$ is (i) a hydrogen atom, (ii) a halogen atom, (iii) a cyano group, (iv) an optionally substituted hydroxy group, (v) an optionally substituted cyclic group, or (vi) a $C_{1-6}$ alkyl group optionally substituted by 1 to 5 substituents selected from (a) a halogen atom, (b) a cyano group, (c) a hydroxy group, (d) a $C_{1-6}$ alkoxy group, (e) a carbamoyl group, and (f) a cyclic group,
(2) $CR^eR^f$ wherein $R^e$ and $R^f$ are each independently a hydrogen atom or a substituent,
(3) $NR^g$ wherein $R^g$ is absent, a hydrogen atom or a substituent,
(4) O,
(5) S, or
(6) C(O).

Examples of the substituent of the "optionally substituted cyclic group" for $R^d$ include those similar to Substituent Group A. The group optionally has 1 to 3 substituents at substitutable positions.

$W^4$ is preferably
(1) CH,
(2) $CH_2$,
(3) $NR^{g'}$ wherein $R^{g'}$ is (i) absent, (ii) a hydrogen atom, or (iii) a $C_{1-6}$ alkyl group (e.g., methyl), or
(4) C(O).

$W^4$ is particularly preferably is N or C(O).

$W^5$ is
(1) $CR^h$ wherein $R^h$ is (i) a hydrogen atom, (ii) a halogen atom, (iii) a cyano group, (iv) an optionally substituted hydroxy group, (v) an optionally substituted cyclic group, or (vi) a $C_{1-6}$ alkyl group optionally substituted by 1 to 5 substituents selected from (a) a halogen atom, (b) a cyano group, (c) a hydroxy group, (d) a $C_{1-6}$ alkoxy group, (e) a carbamoyl group, and (f) a cyclic group,
(2) $CR^iR^j$ wherein $R^i$ and $R^j$ are each independently a hydrogen atom or a substituent,
(3) $NR^k$ wherein $R^k$ is absent, a hydrogen atom or a substituent,
(4) O,
(5) S, or
(6) C(O).

Examples of the substituent of the "optionally substituted cyclic group" for $R^h$ include those similar to Substituent Group A. The group optionally has 1 to 3 substituents at substitutable positions.

$W^5$ is preferably
(1) $CR^{h'}$ wherein $R^{h'}$ is (i) a hydrogen atom, (ii) a halogen atom (e.g., a bromine atom), (iii) a $C_{1-6}$ alkyl group (e.g., methyl, ethyl, isopropyl, tert-butyl) optionally substituted by 1 to 3 substituents selected from (a) a halogen atom (e.g., a fluorine atom), (b) a hydroxy group, and (c) a $C_{1-6}$ alkoxy group (e.g., as methoxy), (iv) a $C_{3-6}$ cycloalkyl group (e.g., cyclohexyl), or (v) a 3- to 8-membered non-aromatic heterocyclic group (e.g., oxetanyl, tetrahydrofuryl, tetrahydropyranyl) optionally substituted by 1 to 3 $C_{1-6}$ alkyl groups (e.g., methyl),
(2) $CHR^{i'}$ wherein $R^{i'}$ is (i) a hydrogen atom, or (ii) a $C_{1-6}$ alkyl group (e.g., methyl),
(3) $NR^{k'}$ wherein $R^{k'}$ is (i) absent, (ii) a hydrogen atom, or (iii) a $C_{1-6}$ alkyl group (e.g., methyl, ethyl, isopropyl) optionally substituted by 1 to 3 substituents selected from a halogen atom (e.g., a fluorine atom) and a cyano group, or (iv) a $C_{3-6}$ cycloalkyl group (e.g., cyclopropyl)), or
(4) C(O).

$W^5$ is more preferably $CR^{h''}$ wherein $R^{h''}$ is (i) a hydrogen atom, or (ii) a $C_{1-6}$ alkyl group (e.g., methyl) optionally substituted by 1 to 3 halogen atoms (e.g., a fluorine atom), or NR$^{k''}$ wherein R$^{k''}$ is a C$_{1-6}$ alkyl group (e.g., methyl) optionally substituted by 1 to 3 halogen atoms (e.g., a fluorine atom).

W$^6$ is
(1) a bond,
(2) CR$^l$ wherein R$^l$ is (i) a hydrogen atom, (ii) a halogen atom, (iii) a cyano group, (iv) an optionally substituted hydroxy group, (v) an optionally substituted cyclic group, or (vi) a C$_{1-6}$ alkyl group optionally substituted by 1 to 5 substituents selected from (a) a halogen atom, (b) a cyano group, (c) a hydroxy group, (d) a C$_{1-6}$ alkoxy group, (e) a carbamoyl group, and (f) a cyclic group,
(3) CR$^m$R$^n$ wherein R$^m$ and R$^n$ are each independently a hydrogen atom or a substituent,
(4) NR$^o$ wherein R$^o$ is absent, a hydrogen atom or a substituent,
(5) O,
(6) S, or
(7) C(O).

Examples of the substituent of the "optionally substituted cyclic group" for R$^l$ include those similar to Substituent Group A. The group optionally has 1 to 3 substituents at substitutable positions.

W$^6$ is preferably
(1) a bond,
(2) CH,
(3) CHR$^{m'}$ wherein R$^{m'}$ is (i) a hydrogen atom, or (ii) a C$_{1-6}$ alkyl group (e.g., methyl), or
(4) N.

W$^6$ is particularly preferably CH.

W$^7$ is
(1) a bond,
(2) CR$^p$ wherein R$^p$ is (i) a hydrogen atom, (ii) a halogen atom, (iii) a cyano group, (iv) an optionally substituted hydroxy group, (v) an optionally substituted cyclic group, or (vi) a C$_{1-6}$ alkyl group optionally substituted by 1 to 5 substituents selected from (a) a halogen atom, (b) a cyano group, (c) a hydroxy group, (d) a C$_{1-6}$ alkoxy group, (e) a carbamoyl group, and (f) a cyclic group,
(3) CR$^q$R$^r$ wherein R$^q$ and R$^r$ are each independently a hydrogen atom or a substituent,
(4) NR$^s$ wherein R$^s$ is absent, a hydrogen atom or a substituent,
(5) O,
(6) S, or
(7) C(O).

Examples of the substituent of the "optionally substituted cyclic group" for R$^p$ include those similar to Substituent Group A. The group optionally has 1 to 3 substituents at substitutable positions.

W$^7$ is preferably
(1) a bond,
(2) CH,
(3) NR$^{s'}$ wherein R$^{s'}$ is (i) a hydrogen atom, or (ii) a C$_{1-6}$ alkyl group (e.g., methyl), or
(4) O.

W$^7$ is particularly preferably a bond.

R$^1$ is

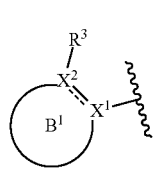 or 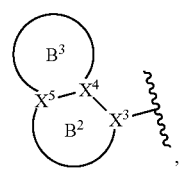

wherein
X$^1$ is C or N,
X$^2$ is C or N,
X$^3$ is C or N,
X$^4$ is C or N,
X$^5$ is C or N,
Ring B$^1$ is an optionally further substituted 5- or 6-membered aromatic ring,
Ring B$^2$ is an optionally further substituted 6-membered aromatic ring,
R$^3$ is (1) a cyano group, (2) an optionally substituted C$_{1-6}$ alkyl group, (3) an optionally substituted hydroxy group, (4) an optionally substituted amino group, (5) an optionally substituted sulfanyl group, (6) SO$_2$R$^w$ wherein R$^w$ is a substituent, or (7) an optionally substituted cyclic group, and Ring B$^3$ is an optionally substituted ring.

Examples of the substituents of the "optionally substituted C$_{1-6}$ alkyl group" and "optionally substituted cyclic group" for R$^3$ include those similar to Substituent Group A. The groups optionally have 1 to 3 substituents at substitutable positions.

The "5- or 6-membered aromatic ring" of the "optionally further substituted 5- or 6-membered aromatic ring" for Ring B$^1$ is optionally further substituted, in addition to Ring A and R$^3$. Examples of the substituent include those similar to Substituent Group A. The ring optionally has 1 to 4 substituents at substitutable positions.

The "6-membered aromatic ring" of the "optionally further substituted 6-membered aromatic ring" for Ring B$^2$ is optionally further substituted, in addition to Ring A. Examples of the substituent include those similar to Substituent Group A. The ring optionally has 1 to 3 substituents at substitutable positions.

Examples of the substituent of the "optionally substituted ring" for Ring B$^3$ include those similar to Substituent Group A. The ring optionally has 1 to 3 substituents at substitutable positions.

R$^1$ is preferably a group represented by the following formula:

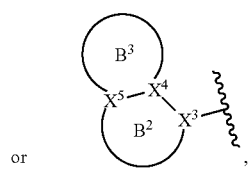

wherein
X$^{1'}$ is C,
X$^{2'}$ is C,
Ring B$^{1'}$ is a 6-membered aromatic ring (e.g., a benzene ring, a pyridine ring) optionally further substituted by 1 to 3 substituents selected from
(1) a halogen atom (e.g., a fluorine atom),
(2) a cyano group,
(3) a carboxy group,
(4) a C$_{1-6}$ alkyl group (e.g., methyl, isopropyl) optionally substituted by 1 to 3 hydroxy groups,
(5) a C$_{1-6}$ alkoxy group (e.g., methoxy),
(6) a C$_{1-6}$ alkoxy-carbonyl group (e.g., methoxycarbonyl, ethoxycarbonyl),
(7) a carbamoyl group,
(8) a N,N-diC$_{1-6}$ alkyl-carbamoyl group (e.g., dimethylcarbamoyl), (9) a 3- to 8-membered heterocyclylcarbonyl group (e.g., azetidinylcarbonyl, morpholinylcarbonyl, 2-oxa-6-azaspiro[3.3]heptylcarbonyl), and
(10) a $C_{1-6}$ alkylsulfonyl group (e.g., methylsulfonyl), and $R^{3'}$ is
(1) an optionally halogenated $C_{1-6}$ alkyl group (e.g., difluoromethyl),
(2) a $C_{1-6}$ alkoxy group (e.g., methoxy, ethoxy, isobutoxy) optionally substituted by 1 to 3 substituents selected from
  (i) a halogen atom (e.g., a fluorine atom),
  (ii) a cyano group,
  (iii) a $C_{3-6}$ cycloalkyl group (e.g., cyclopropyl, cyclobutyl) optionally substituted by 1 to 3 halogen atoms (e.g., a fluorine atom),
  (iv) a $C_{6-10}$ aryl group (e.g., phenyl),
  (v) an optionally halogenated $C_{1-6}$ alkoxy group (e.g., methoxy, trifluoromethoxy),
  (vi) a 3- to 8-membered non-aromatic heterocyclic group (e.g., oxetanyl) optionally substituted by 1 to 3 halogen atoms (e.g., a fluorine atom),
  (vii) a 3- to 8-membered non-aromatic heterocyclylcarbonyl group (e.g., azetidinylcarbonyl, morpholinylcarbonyl) optionally substituted by 1 to 3 halogen atoms (e.g., a fluorine atom),
  (viii) a carboxy group,
  (ix) a $C_{1-6}$ alkoxy-carbonyl group (e.g., methoxycarbonyl), and
  (x) a N,N-di$C_{1-6}$ alkyl-carbamoyl group (e.g., dimethylcarbamoyl),
(3) a hydroxy group,
(4) a $C_{1-6}$ alkylthio group (e.g., methylthio), or
(5) a 3- to 8-membered non-aromatic heterocyclic group (e.g., piperazinyl, morpholinyl) optionally substituted by 1 to 3 substituents selected from a $C_{1-6}$ alkyl-carbonyl group (e.g., acetyl) and a $C_{1-6}$ alkoxy-carbonyl group (e.g., tert-butoxycarbonyl).

$R^1$ is more preferably a group represented by the formula:

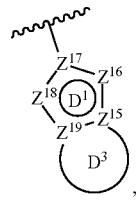

wherein
$R^{3''}$ is a $C_{1-6}$ alkoxy group (e.g., ethoxy) optionally substituted by 1 to 3 halogen atoms (e.g., a fluorine atom), and
Ring $B^{1''}$ is a benzene ring optionally further substituted by 1 to 3 halogen atoms (e.g., a fluorine atom).

$Y^1$ is C(=O), $CH_2$, CHF or $CF_2$.
$Y^1$ is preferably C(=O) or $CH_2$.
$Y^1$ is particularly preferably C(=O).
$R^2$ is

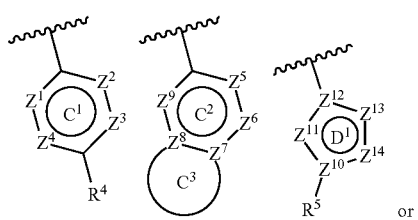

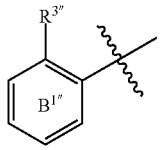

wherein
$Z^1$ is $CR^x$ wherein $R^x$ is a hydrogen atom or a halogen atom, or N,
$Z^2$ is $CR^y$ wherein $R^y$ is a hydrogen atom or a halogen atom, or N,
$Z^3$ is $CR^z$ wherein $R^z$ is a hydrogen atom or a substituent, or N,
$Z^4$ is $CR^{aa}$ wherein $R^{aa}$ is a hydrogen atom or a substituent, or N,
$Z^5$ is $CR^{bb}$ wherein $R^{bb}$ is a hydrogen atom or a substituent, or N,
$Z^6$ is $CR^{cc}$ wherein $R^{cc}$ is a hydrogen atom or a substituent, or N,
$Z^7$ is C or N,
$Z^8$ is C or N,
$Z^9$ is $CR^{dd}$ wherein $R^{dd}$ is a hydrogen atom or a substituent, or N,
Ring $C^1$ and Ring $C^2$ are each independently a 6-membered aromatic ring,
Ring $C^3$ is an optionally substituted ring,
$R^4$ is a substituent,
$Z^{10}$ is C or N,
$Z^{11}$ is $CR^{ee}$ wherein $R^{ee}$ is a hydrogen atom or a substituent, $NR^{ff}$ wherein $R^{ff}$ is absent, a hydrogen atom or a substituent, O or S,
$Z^{12}$ is C or N,
$Z^{13}$ is $CR^{gg}$ wherein $R^{gg}$ is a hydrogen atom or a substituent, $NR^{hh}$ wherein $R^{hh}$ is absent, a hydrogen atom or a substituent, O or S,
$Z^{14}$ is $CR^{ii}$ wherein $R^{ii}$ is a hydrogen atom or a substituent, $NR^{jj}$ wherein $R^{jj}$ is absent, a hydrogen atom or a substituent, O or S,
$Z^{15}$ is C or N,
$Z^{16}$ is $CR^{kk}$ wherein $R^{kk}$ is a hydrogen atom or a substituent, $NR^{ll}$ wherein $R^{ll}$ is absent, a hydrogen atom or a substituent, O or S,
$Z^{17}$ is C or N,
$Z^{18}$ is $CR^{mm}$ wherein $R^{mm}$ is a hydrogen atom or a substituent, $NR^{nn}$ wherein $R^{nn}$ is absent, a hydrogen atom or a substituent, O or S,
$Z^{19}$ is C or N,
Ring $D^1$ and Ring $D^2$ are each independently a 5-membered aromatic ring,
Ring $D^3$ is an optionally substituted ring, and
$R^5$ is a substituent.

Examples of the substituent of the "optionally substituted ring" for Ring $C^3$ include those similar to Substituent Group A. The ring optionally has 1 to 3 substituents at substitutable positions.

Examples of the substituent of the "optionally substituted ring" for Ring $D^3$ include those similar to Substituent Group A. The ring optionally has 1 to 3 substituents at substitutable positions.

$R^2$ is preferably
a group represented by the formula:

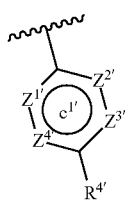

wherein
$Z^{1'}$ is CH or N,
$Z^{2'}$ is CH or N,
$Z^{3'}$ is $CR^{z'}$ wherein $R^{z'}$ is a hydrogen atom or a halogen atom (e.g., a fluorine atom), or N,
$Z^{4'}$ is CH or N,
Ring $C^{1'}$ is a benzene ring, a pyridine ring, a pyrimidine ring, a pyrazine ring or a pyridazine ring, and
$R^{4'}$ is
(1) a halogen atom (e.g., a fluorine atom),
(2) a cyano group,
(3) a hydroxy group,
(4) a $C_{1-6}$ alkyl group (e.g., methyl, ethyl, isopropyl, isobutyl, tert-butyl) optionally substituted by 1 to 6 substituents selected from
　(i) a halogen atom (e.g., a fluorine atom),
　(ii) a cyano group,
　(iii) a hydroxy group,
　(iv) a $C_{1-6}$ alkoxy group (e.g., methoxy),
　(v) a $C_{3-6}$ cycloalkyl group (e.g., cyclopropyl), and
　(vi) a 3- to 6-membered non-aromatic heterocyclic group (e.g., pyrrolidinyl) optionally having an oxo group,
(5) a $C_{3-6}$ cycloalkyl group (e.g., cyclopropyl, cyclobutyl) optionally substituted by 1 to 3 substituents selected from
　(i) a halogen atom (e.g., a fluorine atom),
　(ii) a cyano group,
　(iii) a hydroxy group,
　(iv) a $C_{7-16}$ aralkyloxy group (e.g., benzyloxy), and
　(v) a tri-$C_{1-6}$ alkyl silyloxy group (e.g., tert-butyldimethylsilyloxy),
(6) a $C_{1-6}$ alkyl-carbonyl group (e.g., acetyl, propionyl),
(7) a $C_{1-6}$ alkoxy-carbonyl group (e.g., methoxycarbonyl),
(8) a N,N-di$C_{1-6}$ alkyl-carbamoyl group (e.g., dimethylcarbamoyl),
(9) a $C_{1-6}$ alkoxy group (e.g., methoxy, ethoxy, isobutoxy, pentoxy) optionally substituted by 1 to 3 substituents selected from
　(i) a halogen atom (e.g., a fluorine atom),
　(ii) a hydroxy group,
　(iii) a cyano group,
　(iv) a $C_{2-6}$ alkynyl group (e.g., ethynyl),
　(v) a $C_{3-6}$ cycloalkyl group (e.g., cyclopropyl) optionally substituted by 1 to 3 substituents selected from a hydroxy group and a 3- to 8-membered non-aromatic heterocyclyloxy group (e.g., tetrahydropyranyloxy),
　(vi) a diazirene group, and
　(vii) a 3- to 8-membered non-aromatic heterocyclic group (e.g., oxetanyl) optionally substituted by 1 to 3 halogen atoms (e.g., a fluorine atom),
(10) a $C_{6-10}$ aryloxy group (e.g., phenoxy),
(11) an optionally halogenated $C_{1-6}$ alkylsulfonyl group (e.g., methylsulfonyl, difluoromethylsulfonyl, ethylsulfonyl),
(12) a 3- to 8-membered non-aromatic heterocyclic group (e.g., azetidinyl, oxetanyl, tetrahydrofuryl, tetrahydropyranyl, morpholinyl) optionally substituted by 1 to 3 substituents selected from
　(i) a halogen atom (e.g., a fluorine atom),
　(ii) a hydroxy group,
　(iii) a cyano group,
　(iv) a $C_{1-6}$ alkoxy group (e.g., methoxy),
　(v) a $C_{1-6}$ alkyl-carbonyl group (e.g., acetyl), and
　(vi) a $C_{3-6}$ cycloalkyl-carbonyl group (e.g., cyclopropylcarbonyl),
(13) a 3- to 8-membered non-aromatic heterocyclyloxy group (e.g., oxetanyloxy, tetrahydrofuryloxy, tetrahydropyranyloxy) optionally substituted by 1 to 3 $C_{1-6}$ alkyl groups (e.g., methyl), or
(14) a 3- to 8-membered non-aromatic heterocyclylcarbonyl group (e.g., azetidinylcarbonyl, pyrrolidinylcarbonyl, piperidinylcarbonyl, morpholinylcarbonyl) optionally substituted by 1 to 3 halogen atoms (e.g., a fluorine atom), a group represented by the formula:

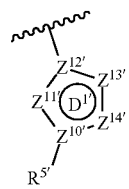

wherein
$Z^{10'}$ is C or N,
$Z^{11'}$ is CH, N or S,
$Z^{12'}$ is C,
$Z^{13'}$ is CH or N,
$Z^{14'}$ is $CR^{ii'}$ wherein $R^{ii'}$ is a hydrogen atom or a $C_{1-6}$ alkyl group (e.g., methyl), or $NR^{jj'}$ wherein $R^{jj'}$ is absent, or a $C_{1-6}$ alkyl group (e.g., methyl),
Ring $D^1$ is a 5-membered aromatic ring (e.g., pyrazole, thiadiazole), and
$R^{5'}$ is
(1) a cyano group,
(2) a $C_{1-6}$ alkyl group (e.g., methyl, ethyl, isopropyl, isobutyl) optionally substituted by 1 to 3 substituents selected from
　(i) a halogen atom (e.g., a fluorine atom),
　(ii) a $C_{3-6}$ cycloalkyl group (e.g., cyclopropyl) optionally substituted by 1 to 3 halogen atoms (e.g., a fluorine atom),
　(iii) a $C_{1-6}$ alkoxy group (e.g., methoxy), and
　(iv) a 3- to 8-membered non-aromatic heterocyclic group (e.g., oxetanyl) optionally substituted by 1 to 3 halogen atoms (e.g., a fluorine atom),
(3) a $C_{3-6}$ cycloalkyl group (e.g., cyclopropyl),
(4) a $C_{6-10}$ aryl group (e.g., phenyl),
(5) an optionally halogenated $C_{1-6}$ alkoxy group (e.g., difluoromethoxy), or
(6) a N,N-di$C_{1-6}$ alkyl-carbamoyl group, or a dihydrobenzofuryl group.

$R^2$ is more preferably
a group represented by the formula:

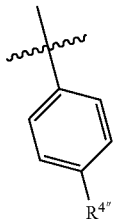

wherein $R^{4''}$ is a $C_{1-6}$ alkyl group (e.g., isopropyl) optionally substituted by 1 to 3 hydroxy groups, or a $C_{1-6}$ alkoxy group (e.g., isobutoxy) optionally substituted by 1 to 3 hydroxy groups,
a group represented by the formula:

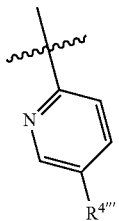

wherein $R^{4'''}$ is a $C_{1-6}$ alkoxy group (e.g., isobutoxy) optionally substituted by 1 to 3 hydroxy groups, or
a group represented by the formula:

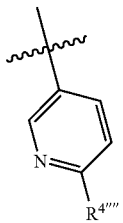

wherein $R^{4''''}$ is a $C_{1-6}$ alkyl group (e.g., isopropyl) optionally substituted by 1 to 3 hydroxy groups.

Compound (I) is preferably compound (I) wherein Ring A is a 5-membered unsaturated ring (e.g., imidazole, pyrazole), a 6-membered unsaturated ring (e.g., pyridine, pyrimidine, dihydropyridine, tetrahydropyridazine) or a 7-membered unsaturated ring (e.g., 2,3-dihydro-1H-1,4-diazepine, 2,3-dihydro-1,4-oxazepine);

$W^1$ is C or N;
$W^2$ is C;
$W^3$ is C or N;
$W^4$ is
(1) CH,
(2) CH$_2$,
(3) NR$^{g'}$ wherein R$^{g'}$ is (i) absent, (ii) a hydrogen atom, or (iii) a $C_{1-6}$ alkyl group (e.g., methyl), or
(4) C(O);
$W^5$ is
(1) CR$^{h'}$ wherein R$^{h'}$ is (i) a hydrogen atom, (ii) a halogen atom (e.g., a bromine atom), (iii) a $C_{1-6}$ alkyl group (e.g., methyl, ethyl, isopropyl, tert-butyl) optionally substituted by 1 to 3 substituents selected from (a) a halogen atom (e.g., a fluorine atom), (b) a hydroxy group, and (c) a $C_{1-6}$ alkoxy group (e.g., methoxy), (iv) a $C_{3-6}$ cycloalkyl group (e.g., cyclohexyl), or (v) a 3- to 8-membered non-aromatic heterocyclic group (e.g., oxetanyl, tetrahydrofuryl, tetrahydropyranyl) optionally substituted by 1 to 3 $C_{1-6}$ alkyl groups (e.g., methyl),
(2) CHR$^{i'}$ wherein R$^{i'}$ is (i) a hydrogen atom, or (ii) a $C_{1-6}$ alkyl group (e.g., methyl),
(3) NR$^{k'}$ wherein R$^{k'}$ is (i) absent, (ii) a hydrogen atom, or (iii) a $C_{1-6}$ alkyl group (e.g., methyl, ethyl, isopropyl) optionally substituted by 1 to 3 substituents selected from a halogen atom (e.g., a fluorine atom) and a cyano group, or (iv) a $C_{3-6}$ cycloalkyl group (e.g., cyclopropyl)), or
(4) C(O);
$W^6$ is
(1) a bond,
(2) CH,
(3) CHR$^{m'}$ wherein R$^{m'}$ is (i) a hydrogen atom, or (ii) a $C_{1-6}$ alkyl group (e.g., methyl), or
(4) N;
$W^7$ is
(1) a bond,
(2) CH,
(3) NR$^{s'}$ wherein R$^{s'}$ is (i) a hydrogen atom, or (ii) a $C_{1-6}$ alkyl group (e.g., methyl), or
(4) O;
$R^1$ is a group represented by the formula:

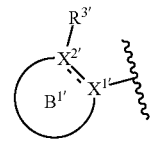

wherein
$X^{1'}$ is C;
$X^{2'}$ is C;
Ring $B^{1'}$ is a 6-membered aromatic ring (e.g., a benzene ring, a pyridine ring) optionally further substituted by 1 to 3 substituents selected from
(1) a halogen atom (e.g., a fluorine atom),
(2) a cyano group,
(3) a carboxy group,
(4) a $C_{1-6}$ alkyl group (e.g., methyl, isopropyl) optionally substituted by 1 to 3 hydroxy groups,
(5) a $C_{1-6}$ alkoxy group (e.g., methoxy),
(6) a $C_{1-6}$ alkoxy-carbonyl group (e.g., methoxycarbonyl, ethoxycarbonyl),
(7) a carbamoyl group,
(8) a N,N-di$C_{1-6}$ alkyl-carbamoyl group (e.g., dimethylcarbamoyl),
(9) a 3- to 8-membered heterocyclylcarbonyl group (e.g., azetidinylcarbonyl, morpholinylcarbonyl, 2-oxa-6-azaspiro[3.3]heptylcarbonyl), and
(10) a $C_{1-6}$ alkylsulfonyl group (e.g., methylsulfonyl); and
$R^{3'}$ is
(1) an optionally halogenated $C_{1-6}$ alkyl group (e.g., difluoromethyl),
(2) a $C_{1-6}$ alkoxy group (e.g., methoxy, ethoxy, isobutoxy) optionally substituted by 1 to 3 substituents selected from
(i) a halogen atom (e.g., a fluorine atom),
(ii) a cyano group, (iii) a $C_{3-6}$ cycloalkyl group (e.g., cyclopropyl, cyclobutyl) optionally substituted by 1 to 3 halogen atoms (e.g., a fluorine atom),
(iv) a $C_{6-10}$ aryl group (e.g., phenyl),
(v) an optionally halogenated $C_{1-6}$ alkoxy group (e.g., methoxy, trifluoromethoxy),
(vi) a 3- to 8-membered non-aromatic heterocyclic group (e.g., oxetanyl) optionally substituted by 1 to 3 halogen atoms (e.g., a fluorine atom),
(vii) a 3- to 8-membered non-aromatic heterocyclylcarbonyl group (e.g., azetidinylcarbonyl, morpholinylcarbonyl) optionally substituted by 1 to 3 halogen atoms (e.g., a fluorine atom),
(viii) a carboxy group,
(ix) a $C_{1-6}$ alkoxy-carbonyl group (e.g., methoxycarbonyl), and
(x) a N,N-di$C_{1-6}$ alkyl-carbamoyl group (e.g., dimethylcarbamoyl),
(3) a hydroxy group,
(4) a $C_{1-6}$ alkylthio group (e.g., methylthio), or
(5) a 3- to 8-membered non-aromatic heterocyclic group (e.g., piperazinyl, morpholinyl) optionally substituted by 1 to 3 substituents selected from a $C_{1-6}$ alkyl-carbonyl group (e.g., acetyl) and a $C_{1-6}$ alkoxy-carbonyl group (e.g., tert-butoxycarbonyl);
$Y^1$ is C(=O) or $CH_2$; and
$R^2$ is a group represented by the formula:

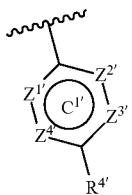

wherein
$Z^{1'}$ is CH or N,
$Z^{2'}$ is CH or N,
$Z^{3'}$ is $CR^{z'}$ wherein $R^{z'}$ is a hydrogen atom or a halogen atom (e.g., a fluorine atom), or N,
$Z^{4'}$ is CH or N,
Ring $C^{1'}$ is a benzene ring, a pyridine ring, a pyrimidine ring, a pyrazine ring or a pyridazine ring, and
$R^{4'}$ is
(1) a halogen atom (e.g., a fluorine atom),
(2) a cyano group,
(3) a hydroxy group,
(4) a $C_{1-6}$ alkyl group (e.g., methyl, ethyl, isopropyl, isobutyl, tert-butyl) optionally substituted by 1 to 6 substituents selected from
  (i) a halogen atom (e.g., a fluorine atom),
  (ii) a cyano group,
  (iii) a hydroxy group,
  (iv) a $C_{1-6}$ alkoxy group (e.g., methoxy),
  (v) a $C_{3-6}$ cycloalkyl group (e.g., cyclopropyl), and
  (vi) a 3- to 6-membered non-aromatic heterocyclic group (e.g., pyrrolidinyl) optionally having an oxo group,
(5) a $C_{3-6}$ cycloalkyl group (e.g., cyclopropyl, cyclobutyl) optionally substituted by 1 to 3 substituents selected from
  (i) a halogen atom (e.g., a fluorine atom),
  (ii) a cyano group,
  (iii) a hydroxy group,
  (iv) a $C_{7-16}$ aralkyloxy group (e.g., benzyloxy), and
  (v) a tri-$C_{1-6}$ alkyl silyloxy group (e.g., tert-butyldimethylsilyloxy),
(6) a $C_{1-6}$ alkyl-carbonyl group (e.g., acetyl, propionyl),
(7) a $C_{1-6}$ alkoxy-carbonyl group (e.g., methoxycarbonyl),
(8) a N,N-di$C_{1-6}$ alkyl-carbamoyl group (e.g., dimethylcarbamoyl),
(9) a $C_{1-6}$ alkoxy group (e.g., methoxy, ethoxy, isobutoxy, pentoxy) optionally substituted by 1 to 3 substituents selected from
  (i) a halogen atom (e.g., a fluorine atom),
  (ii) a hydroxy group,
  (iii) a cyano group,
  (iv) a $C_{2-6}$ alkynyl group (e.g., ethynyl),
  (v) a $C_{3-6}$ cycloalkyl group (e.g., cyclopropyl) optionally substituted by 1 to 3 substituents selected from a hydroxy group and a 3- to 8-membered non-aromatic heterocyclyloxy group (e.g., tetrahydropyranyloxy),
  (vi) a diazirene group, and
  (vii) a 3- to 8-membered non-aromatic heterocyclic group (e.g., oxetanyl) optionally substituted by 1 to 3 halogen atoms (e.g., a fluorine atom),
(10) a $C_{6-10}$ aryloxy group (e.g., phenoxy),
(11) an optionally halogenated $C_{1-6}$ alkylsulfonyl group (e.g., methylsulfonyl, difluoromethylsulfonyl, ethylsulfonyl),
(12) a 3- to 8-membered non-aromatic heterocyclic group (e.g., azetidinyl, oxetanyl, tetrahydrofuryl, tetrahydropyranyl, morpholinyl) optionally substituted by 1 to 3 substituents selected from
  (i) a halogen atom (e.g., a fluorine atom),
  (ii) a hydroxy group,
  (iii) a cyano group,
  (iv) a $C_{1-6}$ alkoxy group (e.g., methoxy),
  (v) a $C_{1-6}$ alkyl-carbonyl group (e.g., acetyl), and
  (vi) a $C_{3-6}$ cycloalkyl-carbonyl group (e.g., cyclopropylcarbonyl),
(13) a 3- to 8-membered non-aromatic heterocyclyloxy group (e.g., oxetanyloxy, tetrahydrofuryloxy, tetrahydropyranyloxy) optionally substituted by 1 to 3 $C_{1-6}$ alkyl groups (e.g., methyl), or
(14) a 3- to 8-membered non-aromatic heterocyclylcarbonyl group (e.g., azetidinylcarbonyl, pyrrolidinylcarbonyl, piperidinylcarbonyl, morpholinylcarbonyl) optionally substituted by 1 to 3 halogen atoms (e.g., a fluorine atom), a group represented by the formula:

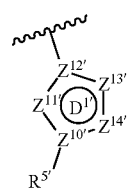

wherein
$Z^{10'}$ is C or N,
$Z^{11'}$ is CH, N or S,
$Z^{12'}$ is C,
$Z^{13'}$ is CH or N,
$Z^{14'}$ is $CR^{ii'}$ wherein $R^{ii'}$ is a hydrogen atom or a $C_{1-6}$ alkyl group (e.g., methyl), or $NR^{jj'}$ wherein $R^{jj'}$ is absent, or a $C_{1-6}$ alkyl group (e.g., methyl)), Ring D¹ is a 5-membered aromatic ring (e.g., pyrazole, thiadiazole), and
R⁵' is
(1) a cyano group,
(2) a $C_{1-6}$ alkyl group (e.g., methyl, ethyl, isopropyl, isobutyl) optionally substituted by 1 to 3 substituents selected from
  (i) a halogen atom (e.g., a fluorine atom),
  (ii) a $C_{3-6}$ cycloalkyl group (e.g., cyclopropyl) optionally substituted by 1 to 3 halogen atoms (e.g., a fluorine atom),
  (iii) a $C_{1-6}$ alkoxy group (e.g., methoxy), and
  (iv) a 3- to 8-membered non-aromatic heterocyclic group (e.g., oxetanyl) optionally substituted by 1 to 3 halogen atoms (e.g., a fluorine atom),
(3) a $C_{3-6}$ cycloalkyl group (e.g., cyclopropyl),
(4) a $C_{6-10}$ aryl group (e.g., phenyl),
(5) an optionally halogenated $C_{1-6}$ alkoxy group (e.g., difluoromethoxy), or
(6) a N,N-di$C_{1-6}$ alkyl-carbamoyl group, or a dihydrobenzofuryl group.

Compound (I) is more preferably compound (I) wherein Ring A is a 6-membered unsaturated ring (e.g., pyridine or dihydropyridine);
W¹ is C;
W² is C;
W³ is C;
W⁴ is N or C(O);
W⁵ is $CR^{h''}$ wherein $R^{h''}$ is (i) a hydrogen atom, or (ii) a $C_{1-6}$ alkyl group (e.g., methyl) optionally substituted by 1 to 3 halogen atoms (e.g., a fluorine atom), or $NR^{k''}$ wherein $R^{k''}$ is a $C_{1-6}$ alkyl group (e.g., methyl) optionally substituted by 1 to 3 halogen atoms (e.g., a fluorine atom);
W⁶ is CH;
W⁷ is bond;
R¹ is a group represented by the formula:

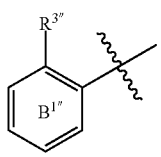

wherein
R³'' is a $C_{1-6}$ alkoxy group (e.g., ethoxy) optionally substituted by 1 to 3 halogen atoms (e.g., a fluorine atom), and
Ring B¹'' is a benzene ring optionally further substituted by 1 to 3 halogen atoms (e.g., a fluorine atom);
Y¹ is C(=O); and
R² is a group represented by the formula:

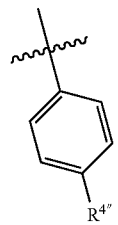

wherein R⁴'' is a $C_{1-6}$ alkyl group (e.g., isopropyl) optionally substituted by 1 to 3 hydroxy groups, or a $C_{1-6}$ alkoxy group (e.g., isobutoxy) optionally substituted by 1 to 3 hydroxy groups, a group represented by the formula:

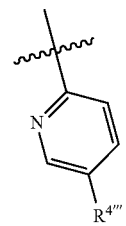

wherein R⁴''' is a $C_{1-6}$ alkoxy group (e.g., isobutoxy) optionally substituted by 1 to 3 hydroxy groups, or
a group represented by the formula:

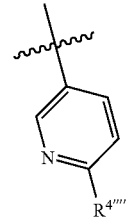

wherein R⁴'''' is a $C_{1-6}$ alkyl group (e.g., isopropyl) optionally substituted by 1 to 3 hydroxy groups.

Compound (I) is particularly preferably
(1) a compound represented by the formula:

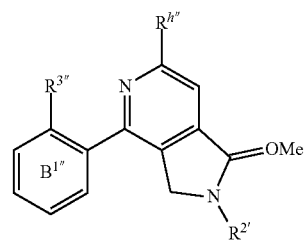

wherein
$R^{h''}$ is (i) a hydrogen atom, or (ii) a $C_{1-6}$ alkyl group (e.g., methyl) optionally substituted by 1 to 3 halogen atoms (e.g., a fluorine atom),
R²' is a group represented by the formula:

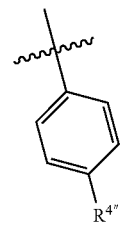

wherein R$^{4'''}$ is a C$_{1-6}$ alkyl group (e.g., isopropyl) optionally substituted by 1 to 3 hydroxy groups, or a C$_{1-6}$ alkoxy group (e.g., isobutoxy) optionally substituted by 1 to 3 hydroxy groups, a group represented by the formula:

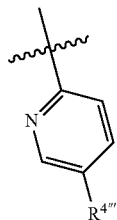

wherein R$^{4'''}$ is a C$_{1-6}$ alkoxy group (e.g., isobutoxy) optionally substituted by 1 to 3 hydroxy groups, or a group represented by the formula:

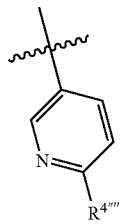

wherein

R$^{4''''}$ is a C$_{1-6}$ alkyl group (e.g., isopropyl) optionally substituted by 1 to 3 hydroxy groups, R$^{3''}$ is a C$_{1-6}$ alkoxy group (e.g., ethoxy) optionally substituted by 1 to 3 halogen atoms (e.g., a fluorine atom), and Ring B$^{1'}$ is a benzene ring optionally further substituted by 1 to 3 halogen atoms (e.g., a fluorine atom), or (2) a compound represented by the formula:

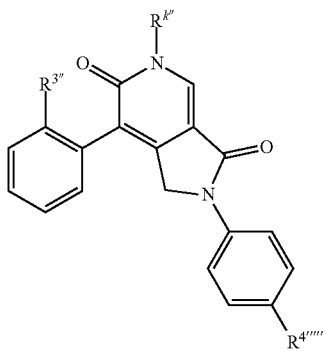

wherein

R$^{k''}$ is a C$_{1-6}$ alkyl group (e.g., methyl) optionally substituted by 1 to 3 halogen atoms (e.g., a fluorine atom), R$^{3''}$ is a C$_{1-6}$ alkoxy group (e.g., ethoxy) optionally substituted by 1 to 3 halogen atoms (e.g., a fluorine atom), and R$^{4''''}$ is a C$_{1-6}$ alkyl group (e.g., isopropyl) optionally substituted by 1 to 3 hydroxy groups.

Specific examples of compound (I) include the compounds of Examples 1 to 390.

Among them, compound (I) is preferably

4-[4-fluoro-2-(2,2,2-trifluoroethoxy)phenyl]-2-[4-(2-hydroxypropan-2-yl)phenyl]-2,3-dihydro-1H-pyrrolo[3,4-c]pyridin-1-one (Example 119) or a salt thereof;

2-[5-(2-hydroxy-2-methylpropoxy)pyridin-2-yl]-4-[2-(2,2,2-trifluoroethoxy)phenyl]-2,3-dihydro-1H-pyrrolo[3,4-c]pyridin-1-one (Example 297) or a salt thereof;

2-[4-(2-hydroxypropan-2-yl)phenyl]-6-methyl-4-[2-(2,2,2-trifluoroethoxy)phenyl]-2,3-dihydro-1H-pyrrolo[3,4-c]pyridin-1-one (Example 324) or a salt thereof;

4-[2-(2,2-difluoroethoxy)phenyl]-2-[4-(2-hydroxypropan-2-yl)phenyl]-6-methyl-2,3-dihydro-1H-pyrrolo[3,4-c]pyridin-1-one (Example 325) or a salt thereof;

6-(difluoromethyl)-2-[4-(2-hydroxypropan-2-yl)phenyl]-4-[2-(2,2,2-trifluoroethoxy)phenyl]-2,3-dihydro-1H-pyrrolo[3,4-c]pyridin-1-one (Example 327) or a salt thereof;

6-(difluoromethyl)-2-[6-(2-hydroxypropan-2-yl)pyridin-3-yl]-4-[2-(2,2,2-trifluoroethoxy)phenyl]-2,3-dihydro-1H-pyrrolo[3,4-c]pyridin-1-one (Example 328) or a salt thereof;

4-[4-fluoro-2-(2,2,2-trifluoroethoxy)phenyl]-2-[4-(2-hydroxypropan-2-yl)phenyl]-6-methyl-2,3-dihydro-1H-pyrrolo[3,4-c]pyridin-1-one (Example 351) or a salt thereof;

4-[2-fluoro-6-(2,2,2-trifluoroethoxy)phenyl]-2-[4-(2-hydroxypropan-2-yl)phenyl]-6-methyl-2,3-dihydro-1H-pyrrolo[3,4-c]pyridin-1-one (Example 353) or a salt thereof;

4-[2-(2,2-difluoroethoxy)phenyl]-2-[4-(2-hydroxy-2-methylpropoxy)phenyl]-6-methyl-2,3-dihydro-1H-pyrrolo[3,4-c]pyridin-1-one (Example 365) or a salt thereof; or 5-(difluoromethyl)-2-[4-(2-hydroxypropan-2-yl)phenyl]-7-[2-(2,2,2-trifluoroethoxy)phenyl]-1H-pyrrolo[3,4-c]pyridine-3,6(2H,5H)-dione (Example 368) or a salt thereof.

Compound (I) is more preferably

4-[4-fluoro-2-(2,2,2-trifluoroethoxy)phenyl]-2-[4-(2-hydroxypropan-2-yl)phenyl]-2,3-dihydro-1H-pyrrolo[3,4-c]pyridin-1-one (Example 119) or a salt thereof;

4-[2-(2,2-difluoroethoxy)phenyl]-2-[4-(2-hydroxy-2-methylpropoxy)phenyl]-6-methyl-2,3-dihydro-1H-pyrrolo[3,4-c]pyridin-1-one (Example 365) or a salt thereof; or 5-(difluoromethyl)-2-[4-(2-hydroxypropan-2-yl)phenyl]-7-[2-(2,2,2-trifluoroethoxy)phenyl]-1H-pyrrolo[3,4-c]pyridine-3,6(2H,5H)-dione (Example 368) or a salt thereof.

When compound (I) is a salt, examples of the salt include metal salts, ammonium salts, salts with organic base, salts with inorganic acid, salts with organic acid, and salts with basic or acidic amino acid. Preferable examples of the metal salt include alkali metal salts such as sodium salts, potassium salts and the like; alkali earth metal salts such as calcium salts, magnesium salts, barium salts and the like; and aluminum salts. Preferable examples of the salt with organic base include salts with trimethylamine, triethylamine, pyridine, picoline, 2,6-lutidine, ethanolamine, diethanolamine, triethanolamine, cyclohexylamine, dicyclohexylamine, N,N'-dibenzylethylenediamine and the like. Preferable examples of the salt with inorganic acid include salts with hydrochloric acid, hydrobromic acid, nitric acid, sulfuric acid, phosphoric acid and the like. Preferable examples of the salt with organic acid include salts with formic acid, acetic acid, trifluoroacetic acid, phthalic acid, fumaric acid, oxalic acid, tartaric acid, maleic acid, citric acid, succinic acid, malic acid, methanesulfonic acid, benzenesulfonic acid, p-toluenesulfonic acid and the like. Preferable examples of the salts with basic amino acid include salts with arginine, lysine, ornithine and the like. Preferable examples of the salt with acidic amino acid include salts with aspartic acid, glutamic acid and the like. Among them, a pharmaceutically acceptable salt is preferable. For example, when a compound has an acidic functional group, examples of the salt include inorganic salts such as alkali metal salts (e.g., sodium salt, potassium salt etc.), alkaline earth metal salts (e.g., calcium salt, magnesium salt, barium salt etc.) and the like, ammonium salt etc., and when a compound has a basic functional group, examples of the salt include salts with inorganic acid such as hydrochloric acid, hydrobromic acid, nitric acid, sulfuric acid, phosphoric acid and the like, and salts with organic acid such as acetic acid, phthalic acid, fumaric acid, oxalic acid, tartaric acid, maleic acid, citric acid, succinic acid, methanesulfonic acid, p-toluenesulfonic acid and the like.

When compound (I) contains isomers such as tautomers, optical isomers, stereoisomers, position isomers and rotational isomers, any of isomers or mixture are also encompassed in the compound of the present invention. Further, when compound (I) contains an optical isomer, the optical isomer separated from the racemate is encompassed in compound (I).

Compound (I) can be obtained in the crystal form. Either single crystalline form or crystalline mixture can be encompassed in compound (I).

Compound (I) can be a pharmaceutically acceptable co-crystal or a co-crystal salt. The co-crystal or co-crystal salt as used herein means a crystalline material composed of two or more unique solids at room temperature, each of which has distinctive physical characteristics such as structure, melting point, and heats of fusion, hygroscopicity, solubility, and stability. A co-crystal or a co-crystal salt can be produced according to co-crystallization method known per se.

Compound (I) may be a solvate (e.g., a hydrate) or a non-solvate and both are encompassed in compound (I).

Compounds labeled with or substituted by isotopes (e.g., $^2$H, $^3$H, $^{11}$C, $^{14}$C, $^{18}$F, $^{35}$S, $^{125}$I, etc.) are also encompassed in compound (I). The compound labeled with or substituted by isotopes can be used as, for example, a tracer used for Positron Emission Tomography (PET) (PET tracer), and are expected to be useful in the field of medical diagnosis and the like.

The production method of the compound of the present invention is explained below.

The raw material compound and reagent used and the compound obtained in each step in the following production method may be each in a form of a salt, and examples of such salt include those similar to the salts of the compound of the present invention and the like.

When the compound obtained in each step is a free form, it can be converted to the objective salt according to a method known per se. When the compound obtained in each step is a salt, it can be converted to the objective free form or the other salt according to a method known per se.

The compound obtained in each step can be used directly as the reaction mixture or as a crude product for the next reaction. Alternatively, the compound obtained in each step can be isolated and purified from a reaction mixture according to a method known per se, for example, a separation means such as concentration, crystallization, recrystallization, distillation, solvent extraction, fractional distillation, column chromatography and the like.

When the raw material compound and reagent used in each step are commercially available, the commercially available product can also be used directly.

In the reaction in each step, while the reaction time varies depending on the kind of the reagent and solvent to be used, it is generally 1 min-48 hr, preferably 10 min-8 hr, unless otherwise specified.

In the reaction in each step, while the reaction temperature varies depending on the kind of the reagent and solvent to be used, it is generally −78° C.-300° C., preferably −78° C.-150° C., unless otherwise specified.

In the reaction in each step, while the pressure varies depending on the kind of the reagent and solvent to be used, it is generally 1 atm-20 atm, preferably 1 atm-3 atm, unless otherwise specified.

Microwave synthesizer such as Initiator manufactured by Biotage and the like may be used for the reaction in each step. While the reaction temperature varies depending on the kind of the reagent and solvent to be used, it is generally room temperature—300° C., preferably 50° C.-250° C., unless otherwise specified. While the reaction time varies depending on the kind of the reagent and solvent to be used, it is generally 1 min-48 hr, preferably 1 min-8 hr, unless otherwise specified.

In the reaction in each step, the reagent is used in an amount of 0.5 equivalents-20 equivalents, preferably 0.8 equivalents-5 equivalents, relative to the substrate, unless otherwise specified. When the reagent is used as a catalyst, the reagent is used in an amount of 0.001 equivalent-1 equivalent, preferably 0.01 equivalent-0.2 equivalent, relative to the substrate. When the reagent is used as a reaction solvent, the reagent is used in a solvent amount.

Unless otherwise specified, the reaction in each step is carried out without solvent, or by dissolving or suspending the raw material compound in a suitable solvent. Examples of the solvent include those described in Examples and the following solvents.
- alcohols: methanol, ethanol, tert-butyl alcohol, 2-methoxyethanol and the like;
- ethers: diethyl ether, diphenyl ether, tetrahydrofuran, 1,2-dimethoxyethane and the like;
- aromatic hydrocarbons: chlorobenzene, toluene, xylene and the like;
- saturated hydrocarbons: cyclohexane, hexane and the like; amides: N,N-dimethylformamide, N-methylpyrrolidone and the like;
- halogenated hydrocarbons: dichloromethane, carbon tetrachloride and the like;
- nitriles: acetonitrile and the like;
- sulfoxides: dimethyl sulfoxide and the like;
- aromatic organic bases: pyridine and the like;
- anhydrides: acetic anhydride and the like;
- organic acids: formic acid, acetic acid, trifluoroacetic acid and the like;
- inorganic acids: hydrochloric acid, sulfuric acid and the like; esters: ethyl acetate and the like;
- ketones: acetone, methyl ethyl ketone and the like;
- water.

The above-mentioned solvent can be used in a mixture of two or more kinds thereof in an appropriate ratio.

When a base is used for the reaction in each step, examples thereof include those described in Examples and the following bases.
- inorganic bases: sodium hydroxide, magnesium hydroxide, sodium carbonate, calcium carbonate, sodium hydrogen carbonate and the like;
- organic bases: triethylamine, diethylamine, pyridine, 4-dimethylaminopyridine, N,N-dimethylaniline, 1,4-diazabicyclo[2.2.2]octane, 1,8-diazabicyclo[5.4.0]-7-undecene, imidazole, piperidine and the like;
- metal alkoxides: sodium ethoxide, potassium tert-butoxide and the like;
- alkali metal hydrides: sodium hydride and the like;

metal amides: sodium amide, lithium diisopropylamide, lithium hexamethyldisilazide and the like;
organic lithiums: n-butyllithium and the like.
When an acid or an acid catalyst is used for the reaction in each step, examples thereof include those described in Examples and the following acids and acid catalysts.
inorganic acids: hydrochloric acid, sulfuric acid, nitric acid, hydrobromic acid, phosphoric acid and the like;
organic acids: acetic acid, trifluoroacetic acid, citric acid, p-toluenesulfonic acid, 10-camphorsulfonic acid and the like;
Lewis acid: boron trifluoride diethyl ether complex, zinc iodide, anhydrous aluminum chloride, anhydrous zinc chloride, anhydrous iron chloride and the like.

Unless otherwise specified, the reaction in each step is carried out according to a method known per se, for example, the method described in Jikken Kagaku Kouza, 5th Edition, vol. 13-19 (the Chemical Society of Japan ed.); Shin Jikken Kagaku Kouza, vol. 14-15 (the Chemical Society of Japan ed.); Fine Organic Chemistry, Revised 2nd Edition (L. F. Tietze, Th. Eicher, Nankodo); Organic Name Reactions, the Reaction Mechanism and Essence, Revised Edition (Hideo Togo, Kodansha); ORGANIC SYNTHESES Collective Volume I-VII (John Wiley & Sons Inc.); Modern Organic Synthesis in the Laboratory A Collection of Standard Experimental Procedures (Jie Jack Li, OXFORD UNIVERSITY); Comprehensive Heterocyclic Chemistry III, Vol. 1-Vol. 14 (Elsevier Japan); Strategic Applications of Named Reactions in Organic Synthesis (translated by Kiyoshi Tomioka, Kagakudojin); Comprehensive Organic Transformations (VCH Publishers Inc.), 1989, or the like, or the method described in Examples.

In each step, the protection or deprotection reaction of a functional group is carried out according to a method known per se, for example, the method described in "Protective Groups in Organic Synthesis, 4th Ed", Wiley-Interscience, Inc., 2007 (Theodora W. Greene, Peter G. M. Wuts); "Protecting Groups 3rd Ed." Thieme, 2004 (P. J. Kocienski), or the like, or the method described in Examples.

Examples of the protecting group for a hydroxy group of an alcohol and the like and a phenolic hydroxy group include ether-type protecting groups such as methoxymethyl ether, benzyl ether, tert-butyldimethylsilyl ether, tetrahydropyranyl ether and the like; carboxylate ester-type protecting groups such as acetate ester and the like; sulfonate ester-type protecting groups such as methanesulfonate ester and the like; carbonate ester-type protecting groups such as tert-butylcarbonate and the like, and the like.

Examples of the protecting group for a carbonyl group of an aldehyde include acetal-type protecting groups such as dimethylacetal and the like; cyclic acetal-type protecting groups such as 1,3-dioxane and the like, and the like.

Examples of the protecting group for a carbonyl group of a ketone include ketal-type protecting groups such as dimethylketal and the like; cyclic ketal-type protecting groups such as 1,3-dioxane and the like; oxime-type protecting groups such as O-methyloxime and the like; hydrazone-type protecting groups such as N,N-dimethylhydrazone and the like, and the like.

Examples of the protecting group for a carboxyl group include ester-type protecting groups such as methyl ester and the like; amide-type protecting groups such as N,N-dimethylamide and the like, and the like.

Examples of the protecting group for a thiol include ether-type protecting groups such as benzyl thioether and the like; ester-type protecting groups such as thioacetate ester, thiocarbonate, thiocarbamate and the like, and the like.

Examples of the protecting group for an amino group and an aromatic heterocycle such as imidazole, pyrrole, indole and the like include carbamate-type protecting groups such as benzyl carbamate and the like; amide-type protecting groups such as acetamide and the like; alkyl amine-type protecting groups such as N-triphenylmethylamine and the like; sulfonamide-type protecting groups such as methanesulfonamide and the like, and the like.

The protecting groups can be removed according to a method known per se, for example, by employing a method using acid, base, ultraviolet rays, hydrazine, phenylhydrazine, sodium N-methyldithiocarbamate, tetrabutylammonium fluoride, palladium acetate, trialkylsilyl halide (e.g., trimethylsilyl iodide, trimethylsilyl bromide) and the like, a reduction method, and the like.

When reduction reaction is carried out in each step, examples of the reducing agent to be used include metal hydrides such as lithium aluminum hydride, sodium triacetoxyborohydride, sodium cyanoborohydride, diisobutylaluminum hydride (DIBAL-H), sodium borohydride, tetramethylammonium triacetoxyborohydride and the like; boranes such as borane tetrahydrofuran complex and the like; Raney nickel; Raney cobalt; hydrogen; formic acid; triethylsilane and the like. When carbon-carbon double bond or triple bond is reduced, a method using a catalyst such as palladium-carbon, Lindlar's catalyst and the like may be employed.

When oxidation reaction is carried out in each step, examples of the oxidizing agent to be used include peroxides such as m-chloroperbenzoic acid (mCPBA), hydrogen peroxide, tert-butylhydroperoxide and the like; perchlorates such as tetrabutylammonium perchlorate and the like; chlorates such as sodium chlorate and the like; chlorites such as sodium chlorite and the like; periodates such as sodium periodate and the like; hypervalent iodine reagents such as iodosylbenzene and the like; reagents containing manganese such as manganese dioxide, potassium permanganate and the like; leads such as lead tetraacetate and the like; reagents containing chromium such as pyridinium chlorochromate (PCC), pyridinium dichromate (PDC), Jones reagent and the like; halogen compounds such as N-bromosuccinimide (NBS) and the like; oxygen; ozone; sulfur trioxide-pyridine complex; osmium tetroxide; selenium dioxide; 2,3-dichloro-5,6-dicyano-1,4-benzoquinone (DDQ) and the like.

When radical cyclization reaction is carried out in each step, examples of the radical initiator to be used include azo compounds such as azobisisobutyronitrile (AIBN) and the like; water-soluble radical initiators such as 4-4'-azobis-4-cyanopentanoic acid (ACPA) and the like; triethylboron in the presence of air or oxygen; benzoyl peroxide and the like. Examples of the radical reagent to be used include tributylstannane, tristrimethylsilylsilane, 1,1,2,2-tetraphenyldisilane, diphenylsilane, samarium iodide and the like.

When Wittig reaction is carried out in each step, examples of the Wittig reagent to be used include alkylidene phosphoranes and the like. The alkylidene phosphoranes can be prepared according to a method known per se, for example, by reacting a phosphonium salt with a strong base.

When Horner-Emmons reaction is carried out in each step, examples of the reagent to be used include phosphonoacetates such as methyl dimethylphosphonoacetate, ethyl diethylphosphonoacetate and the like; and bases such as alkali metal hydrides, organic lithiums and the like.

When Friedel-Crafts reaction is carried out in each step, a combination of a Lewis acid and an acid chloride or a combination of a Lewis acid and an alkylating agent (e.g., an alkyl halide, an alcohol, an olefin etc.) is used as a reagent.

Alternatively, an organic acid or an inorganic acid can also be used instead of a Lewis acid, and an anhydride such as acetic anhydride and the like can also be used instead of an acid chloride.

When aromatic nucleophilic substitution reaction is carried out in each step, a nucleophile (e.g., an amine, imidazole etc.) and a base (e.g., an organic base etc.) are used as a reagent.

When nucleophilic addition reaction by a carbo anion, nucleophilic 1,4-addition reaction (Michael addition reaction) by a carbo anion or nucleophilic substitution reaction by a carbo anion is carried out in each step, and examples of the base to be used for generation of the carbo anion include organic lithiums, metal alkoxides, inorganic bases, organic bases and the like.

When Grignard reaction is carried out in each step, examples of the Grignard reagent to be used include arylmagnesium halides such as phenylmagnesium bromide and the like; and alkylmagnesium halides such as methylmagnesium bromide and the like. The Grignard reagent can be prepared according to a method known per se, for example, by reacting an alkyl halide or an aryl halide with a metal magnesium in an ether or tetrahydrofuran as a solvent.

When Knoevenagel condensation reaction is carried out in each step, a compound having an activated methylene group with two electron withdrawing groups (e.g., malonic acid, diethyl malonate, malononitrile etc.) and a base (e.g., an organic base, a metal alkoxide, an inorganic base) are used as a reagent.

When Vilsmeier-Haack reaction is carried out in each step, phosphoryl chloride and an amide derivative (e.g., N,N-dimethylformamide etc.) are used as a reagent.

When azidation reaction of an alcohol, an alkyl halide or a sulfonate is carried out in each step, examples of the azidating agent to be used include diphenylphosphorylazide (DPPA), trimethylsilylazide, sodium azide and the like. For example, for the azidation reaction of an alcohol, a method using diphenylphosphorylazide and 1,8-diazabicyclo[5.4.0]undec-7-ene (DBU), a method using trimethylsilylazide and a Lewis acid, and the like are employed.

When reductive amination reaction is carried out in each step, examples of the reducing agent to be used include sodium triacetoxyborohydride, sodium cyanoborohydride, hydrogen, formic acid and the like. When the substrate is an amine compound, examples of the carbonyl compound to be used include paraformaldehyde, aldehydes such as acetaldehyde and the like, and ketones such as cyclohexanone and the like. When the substrate is a carbonyl compound, examples of the amine to be used include ammonia, primary amines such as methylamine and the like; secondary amines such as dimethylamine and the like, and the like.

When Mitsunobu reaction is carried out in each step, an azodicarboxylate (e.g., diethyl azodicarboxylate (DEAD), diisopropyl azodicarboxylate (DIAD) etc.) and triphenylphosphine are used as a reagent.

When esterification reaction, amidation reaction or urea formation reaction is carried out in each step, examples of the reagent to be used include acyl halides such as acid chlorides, acid bromides and the like; activated carboxylic acids such as anhydrides, activated esters, sulfates and the like. Examples of the activating agent of the carboxylic acid include carbodiimide condensing agents such as 1-ethyl-3-(3-dimethylaminopropyl)carbodiimide hydrochloride (WSCD) and the like; triazine condensing agents such as 4-(4,6-dimethoxy-1,3,5-triazin-2-yl)-4-methylmorpholinium chloride n-hydrate (DMT-MM) and the like; carbonate condensing agents such as 1,1-carbonyldiimidazole (CDI) and the like; diphenylphosphoryl azide (DPPA); benzotriazol-1-yloxy-trisdimethylaminophosphonium salt (BOP reagent); 2-chloro-1-methyl-pyridinium iodide (Mukaiyama reagent); thionyl chloride; lower alkyl haloformates such as ethyl chloroformate and the like; O-(7-azabenzotriazol-1-yl)-N,N,N',N'-tetramethyluronium hexafluorophosphate (HATU); sulfuric acid; combinations thereof and the like. When carbodiimide condensing agent is used, an additive such as 1-hydroxybenzotriazole (HOBt), N-hydroxysuccinimide (HOSu), dimethylaminopyridine (DMAP) and the like may be added to the reaction system.

When coupling reaction is carried out in each step, examples of the metal catalyst to be used include palladium compounds such as palladium(II) acetate, tetrakis(triphenylphosphine)palladium(0), dichlorobis(triphenylphosphine)palladium(II), dichlorobis(triethylphosphine)palladium(II), tris(dibenzylideneacetone)dipalladium(0), 1,1'-bis(diphenylphosphino)ferrocenepalladium(II) chloride and the like; nickel compounds such as tetrakis(triphenylphosphine)nickel(0) and the like; rhodium compounds such as tris(triphenylphosphine)rhodium(III) chloride and the like; cobalt compounds; copper compounds such as copper oxide, copper(I) iodide and the like; platinum compounds and the like. In addition, a base can be added to the reaction system, and examples thereof include inorganic bases and the like.

When thiocarbonylation reaction is carried out in each step, phosphorus pentasulfide is typically used as the thiocarbonylating agent. Alternatively, a reagent having a 1,3,2,4-dithiadiphosphetane-2,4-disulfide structure (e.g., 2,4-bis(4-methoxyphenyl)-1,3,2,4-dithiadiphosphetane-2,4-disulfide (Lawesson reagent) etc.) can also be used instead of phosphorus pentasulfide.

When halogenation reaction is carried out in each step, examples of the halogenating agent to be used include N-iodosuccinimide, N-bromosuccinimide (NBS), N-chlorosuccinimide (NCS), bromine, sulfuryl chloride and the like. In addition, the reaction can be accelerated by subjecting a radical initiator such as heat, light, benzoyl peroxide, azobisisobutyronitrile and the like to the reaction system reaction.

When halogenation reaction of a hydroxy group is carried out in each step, examples of the halogenating agent to be used include hydrohalic acids and acid halides of inorganic acids, specifically, hydrochloric acid, thionyl chloride, phosphorus oxychloride and the like for chlorination, 48% hydrobromic acid and the like for bromination. In addition, a method of producing an alkyl halide by reacting an alcohol with triphenylphosphine and carbon tetrachloride or carbon tetrabromide or the like can be employed. Alternatively, a method of producing an alkyl halide via two steps comprising converting an alcohol to the corresponding sulfonate, and then reacting the sulfonate with lithium bromide, lithium chloride or sodium iodide can also be employed.

When Arbuzov reaction is carried out in each step, examples of the reagent to be used include alkyl halides such as ethyl bromoacetate and the like; and phosphites such as triethyl phosphite, tri(isopropyl) phosphite and the like.

When sulfonate esterification reaction is carried out in each step, examples of the sulfonating agent to be used include methanesulfonyl chloride, p-toluenesulfonyl chloride, methanesulfonic anhydride, p-toluenesulfonic anhydride and the like.

When hydrolysis reaction is carried out in each step, an acid or a base is used as a reagent. For acid hydrolysis reaction of tert-butyl ester, formic acid, triethylsilane and the like may be added to reductively-trap tert-butyl cation which is by-produced.

When dehydration reaction is carried out in each step, examples of the dehydrating agent to be used include sulfuric acid, diphosphorus pentaoxide, phosphorus oxychloride, N,N'-dicyclohexylcarbodiimide, alumina, polyphosphoric acid and the like.

When alkylation reaction is carried out in each step, a combination of an electrophile (e.g., an alkyl halide etc.) and a base (e.g., an organic base, an inorganic base, a metal alkoxide, a metal amide etc.) is used as a reagent.

Compound (I) can be synthesized according to the following Production Methods A to U or a method analogous thereto. Each symbol in the formulas of the schemes is as defined above, unless otherwise specified. HAL is a halogen atom (e.g., a chlorine atom, a bromine atom, an iodine atom). $R^6$ is a hydrogen atom or a substituent, or $R^6$s are optionally taken together with each other to form a ring. $R^7$ is an optionally substituted $C_{1-6}$ alkyl group (e.g., methyl, ethyl). $R^8$ is a substituent that can be converted to $R^1$, if desired by carrying out a deprotection reaction, an amidation reaction and the like, alone or in combination of two or more. $R^9$ is a substituent that can be converted to $R^2$, if desired by carrying out a deprotection reaction, an amidation reaction and the like, alone or in combination of two or more. $R^{10}$ is an optionally substituted $C_{1-6}$ alkyl group (e.g., methyl, ethyl). $R^{11}$ is a hydroxyl group or a chlorine atom. $R^{k''}$ is a hydrogen atom or a substituent. $R^{k'''}$ is an optionally substituted $C_{1-6}$ alkyl group. $R^{g''}$ is an optionally substituted $C_{1-6}$ alkyl group. $R^{h'''}$ is an optionally substituted $C_{1-6}$ alkyl group or an optionally substituted cyclic group.

Moreover, when desired, compound (I) can be synthesized by performing deprotection reaction, amidation reaction, urea formation, alkylation reaction, Mitsunobu reaction, oxidation reaction, reduction reaction, halogenation reaction, coupling reaction, nucleophilic addition reaction by a carbo anion, Grignard reaction, dehydration reaction and the like singly or two or more thereof in combination.

Production Method A

Among compound (I), the following compound (Ia) can be produced according to the following method.

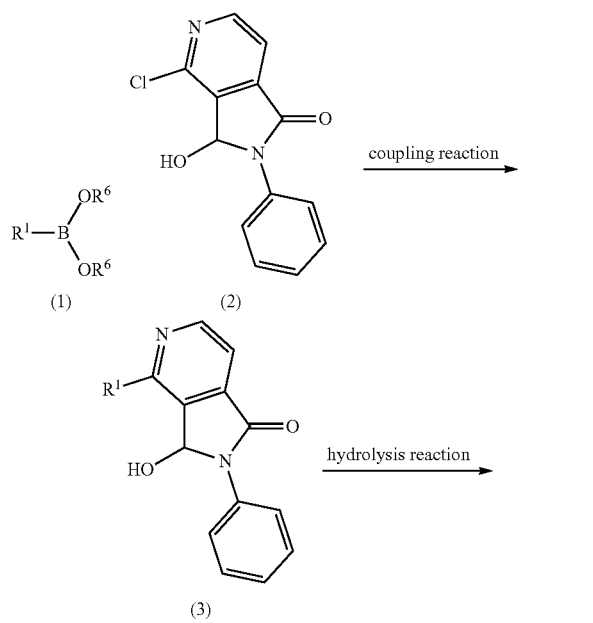

wherein each symbol is as defined above.

Compound (3) can be produced by subjecting compound (2) to a coupling reaction with compound (1).

Compound (4) can be produced by subjecting compound (3) to a hydrolysis reaction.

Compound (Ia) can be produced by subjecting compound (4) to a reductive amination reaction with compound (5), followed by an intramolecular cyclization reaction.

Compound (Ia) can also be produced according to the following method.

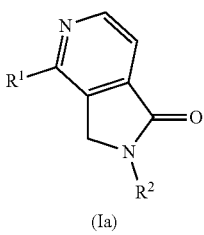

wherein each symbol is as defined above.

Compound (7) can be produced by subjecting compound (6) to an amidation reaction with compound (5).

Compound (8) can be produced by subjecting compound (7) to a formylation reaction.

Compound (9) can be produced by subjecting compound (8) to a reduction reaction.

Compound (Ia) can be produced by subjecting compound (9) to a coupling reaction with compound (1).

Compound (Ia) can also be produced according to the following method.

Compound (11) can be produced by subjecting compound (10) to an amination reaction with ammonia or a salt thereof, followed by an intramolecular cyclization reaction.

Compound (12) can be produced by subjecting compound (11) to a coupling reaction with compound (1').

Compound (9') can be produced by subjecting compound (11) to a coupling reaction with compound (13).

Compound (Ia') can be produced by subjecting compound (12) to a coupling reaction with compound (13).

Compound (Ia') can also be produced by subjecting compound (9') to a coupling reaction with compound (1').

Compound (Ia) can be produced by subjecting compound (Ia') to a deprotection reaction, an amidation reaction or the like, alone or in combination of two or more, if desired.

Production Method B

Among compound (I), the following compound (Ib) can be produced according to the following method.

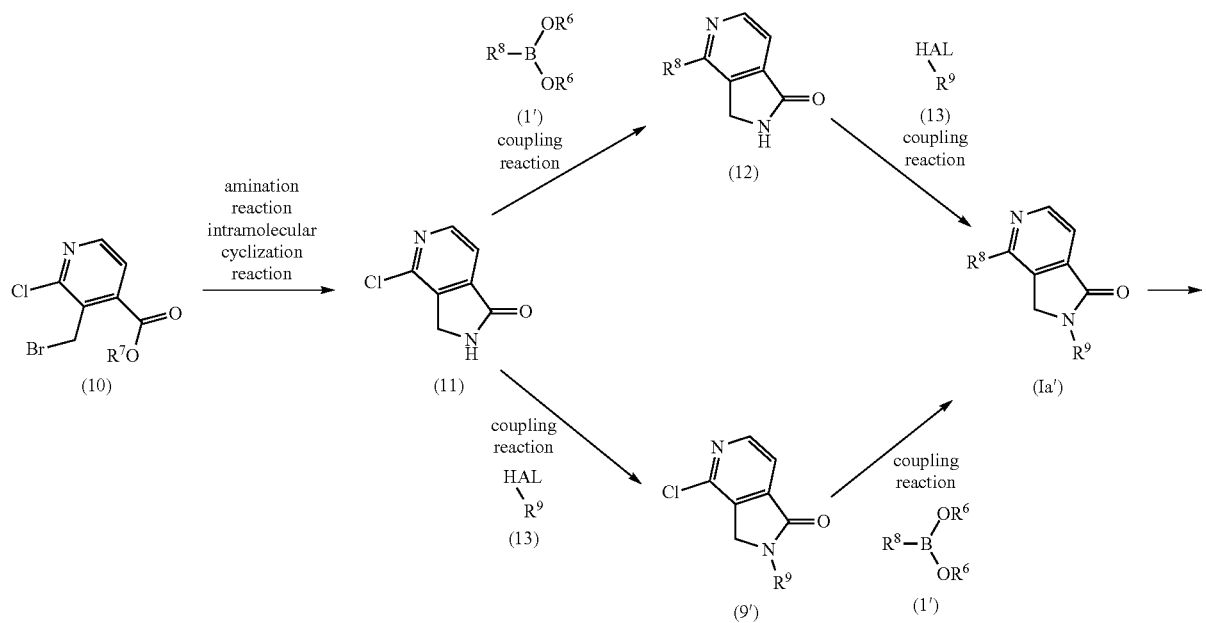

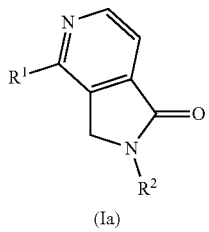

wherein each symbol is as defined above.

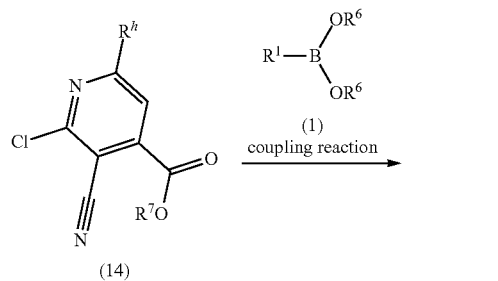

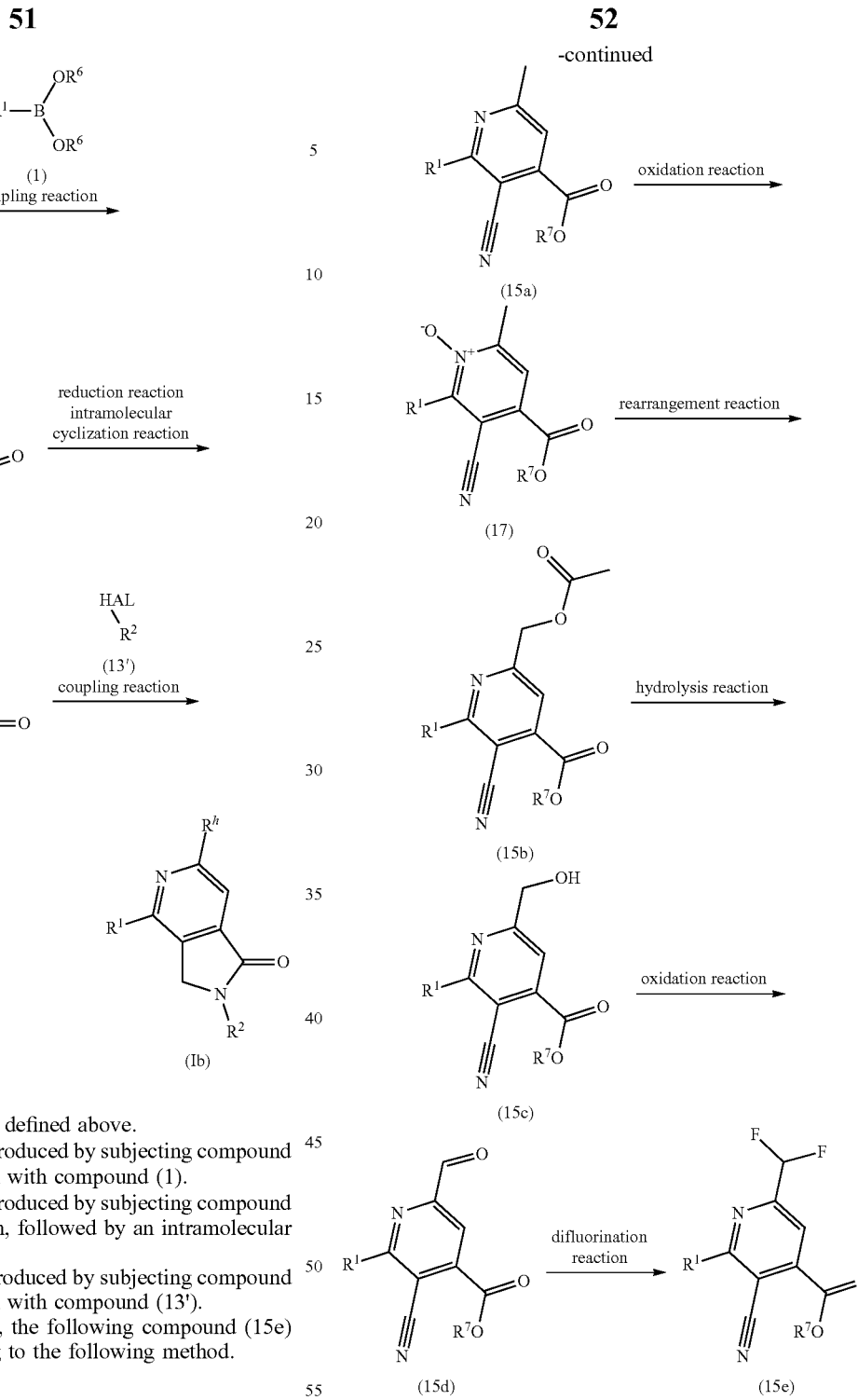

wherein each symbol is as defined above.

Compound (15) can be produced by subjecting compound (14) to a coupling reaction with compound (1).

Compound (16) can be produced by subjecting compound (15) to a reduction reaction, followed by an intramolecular cyclization reaction.

Compound (Ib) can be produced by subjecting compound (16) to a coupling reaction with compound (13').

Among Compound (15), the following compound (15e) can be produced according to the following method.

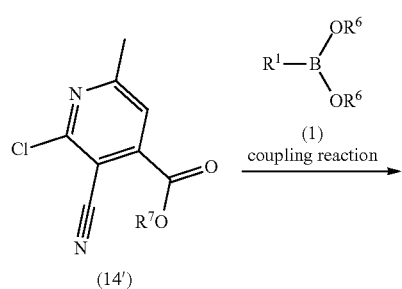

wherein each symbol is as defined above.

Compound (15a) can be produced by subjecting compound (14') to a coupling reaction with compound (1).

Compound (17) can be produced by subjecting compound (15a) to an oxidation reaction.

Compound (15b) can be produced by subjecting compound (17) to a rearrangement reaction. Examples of the reagent to be used include acid anhydrides and the like.

Compound (15c) can be produced by subjecting compound (15b) to a hydrolysis reaction.

Compound (15d) can be produced by subjecting compound (15c) to an oxidation reaction.

Compound (15e) can be produced by subjecting compound (15d) to a difluorination reaction. Examples of the reagent to be used include diethylaminosulfur trifluoride (DAST), bis(2-methoxyethyl)aminosulfur trifluoride (BAST) and the like.

Among Compound (15), the following compound (15f) can be produced according to the following method.

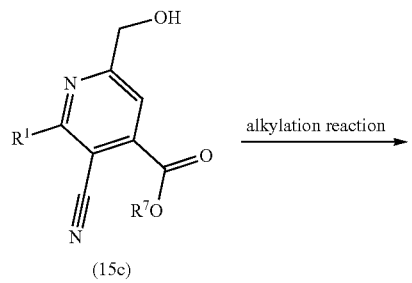

(15c)

alkylation reaction

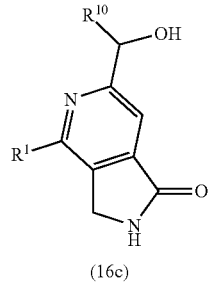

(15f)

wherein each symbol is as defined above.

Compound (15f) can be produced by subjecting compound (15c) to an alkylation reaction.

Among compound (16), the following compound (16c) can be produced according to the following method.

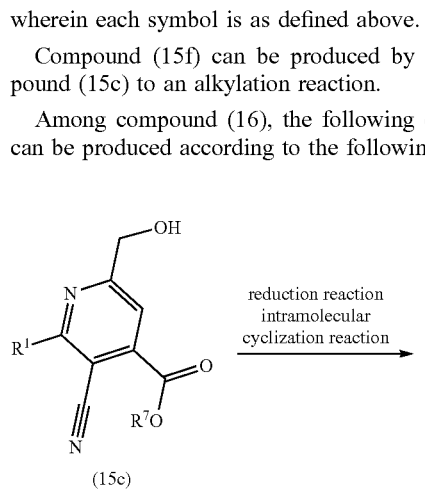

(15c)

reduction reaction
intramolecular cyclization reaction

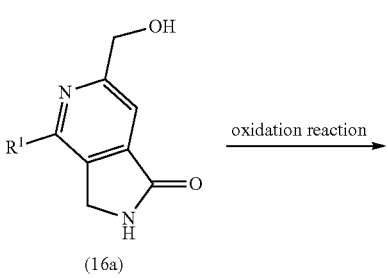

(16a)

oxidation reaction

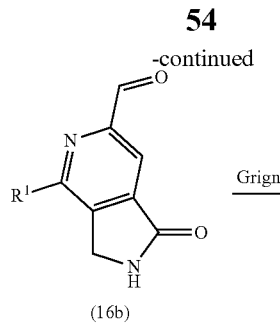

(16b)

Grignard reaction

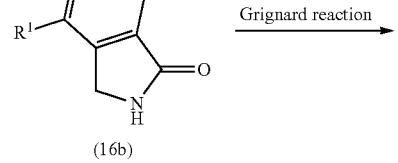

(16c)

wherein each symbol is as defined above.

Compound (16a) can be produced by subjecting compound (15c) to a reduction reaction, followed by an intramolecular cyclization reaction.

Compound (16b) can be produced by subjecting compound (16a) to an oxidation reaction.

Compound (16c) can be produced by subjecting compound (16b) to Grignard reaction.

Among compound (16), the following compound (16f) can be produced according to the following method.

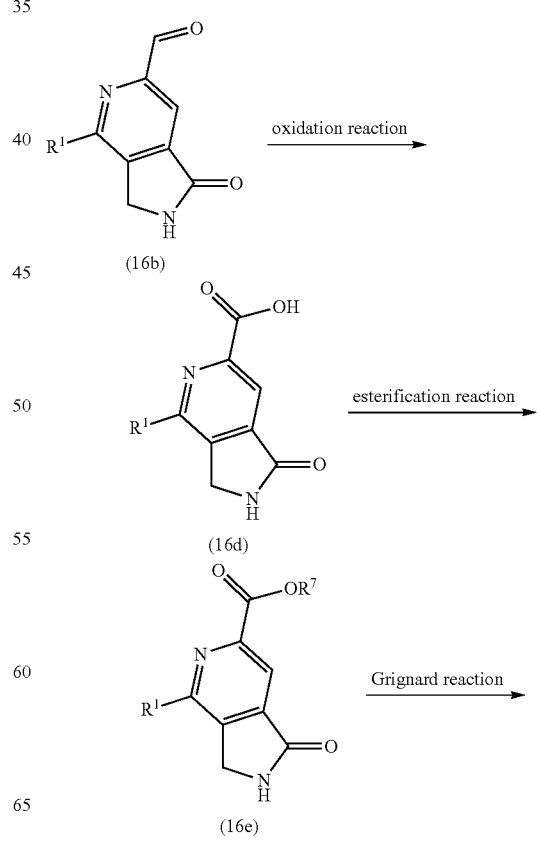

-continued

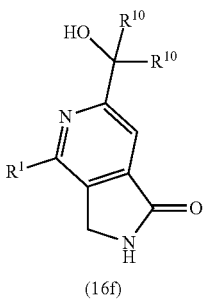

(16f)

wherein each symbol is as defined above.

Compound (16d) can be produced by subjecting compound (16b) to an oxidation reaction.

Compound (16e) can be produced by subjecting compound (16d) to an esterification reaction.

Compound (16f) can be produced by subjecting compound (16e) to Grignard reaction.

Production Method C

Among compound (I), the following compound (Ic) can be produced according to the following method.

Compound (Ic) can be produced by subjecting compound (23) to an amination reaction with compound (5), followed by an intramolecular cyclization reaction.

Compound (Ic) can also be produced by subjecting compound (25) to a coupling reaction with a zinc reagent, trialkyl tin derivative or boronic acid derivative corresponding to $R^h$.

Production Method D

Among compound (I), the following compound (Id) can be produced according to the following method.

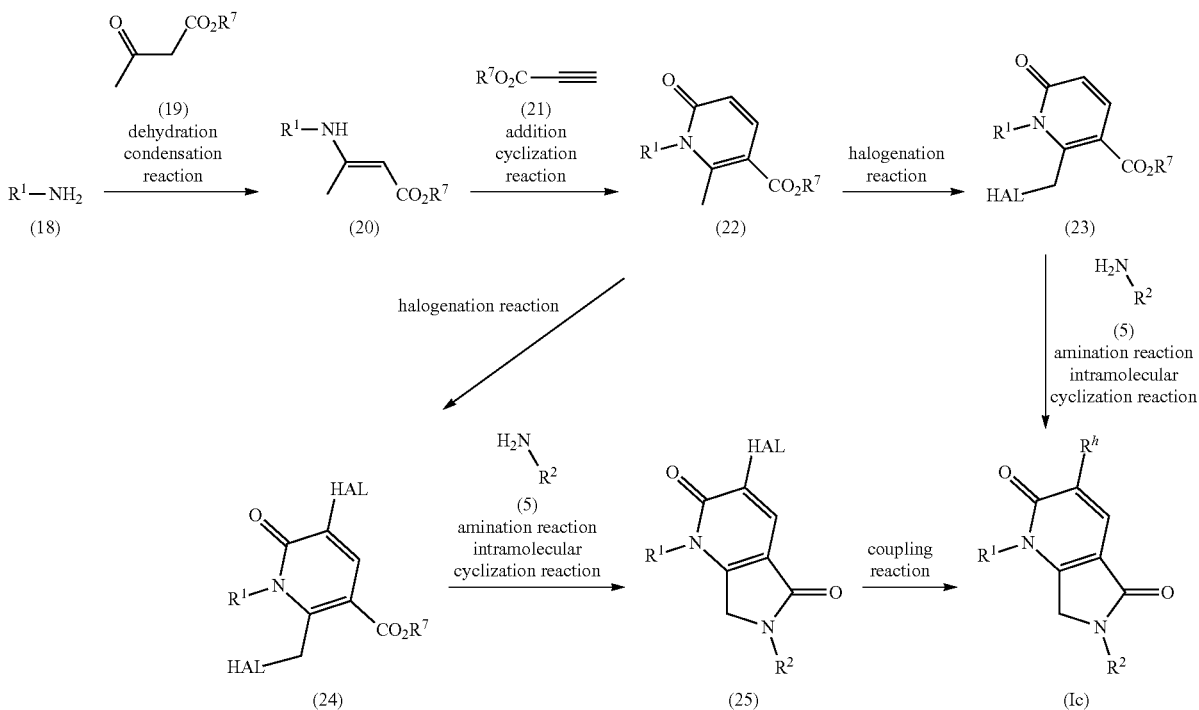

wherein each symbol is as defined above.

Compound (20) can be produced by subjecting compound (18) to a dehydration condensation reaction with compound (19).

Compound (22) can be produced by subjecting compound (20) to an addition cyclization reaction with compound (21).

Compound (23) can be produced by subjecting compound (22) to a halogenation reaction.

Compound (24) can be produced by subjecting compound (22) to a halogenation reaction.

Compound (25) can be produced by subjecting compound (24) to an amination reaction with compound (5), followed by an intramolecular cyclization reaction.

-continued

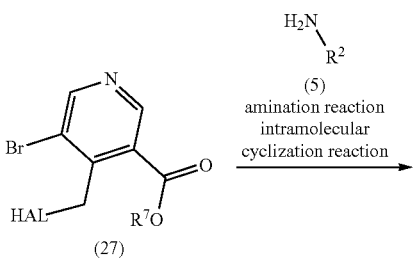

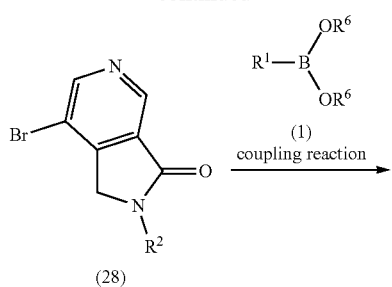

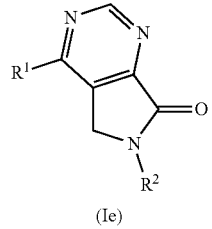

(Ie)

wherein each symbol is as defined above.

Compound (30) can be produced by subjecting compound (29) to a halogenation reaction.

Compound (31) can be produced by subjecting compound (30) to an amination reaction with compound (5).

Compound (Ie) can be produced by subjecting compound (31) to a coupling reaction with compound (1) and an intramolecular cyclization reaction.

Production Method F

Among compound (I), the following compound (If) can be produced according to the following method.

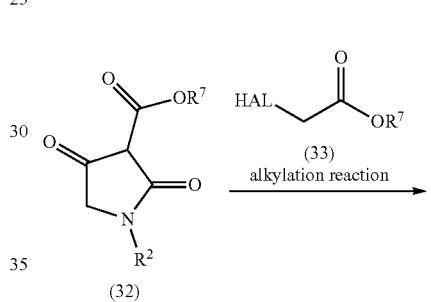

wherein each symbol is as defined above.

Compound (27) can be produced by subjecting compound (26) to a halogenation reaction.

Compound (28) can be produced by subjecting compound (27) to an amination reaction with compound (5), followed by an intramolecular cyclization reaction.

Compound (Id) can be produced by subjecting compound (28) to a coupling reaction with compound (1).

Production Method E

Among compound (I), the following compound (Ie) can be produced according to the following method.

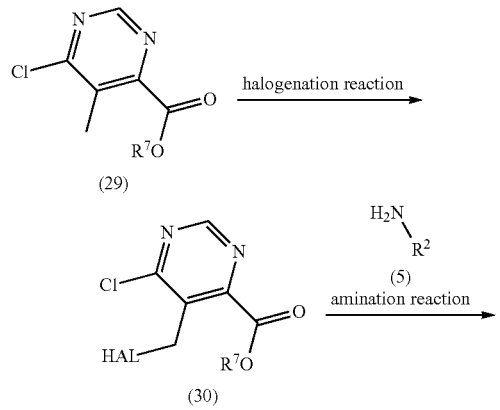

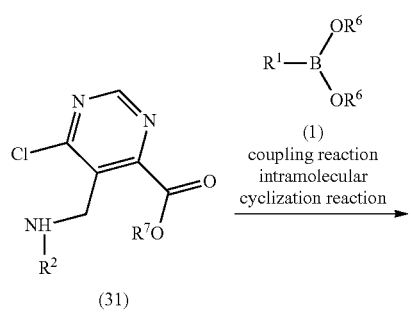

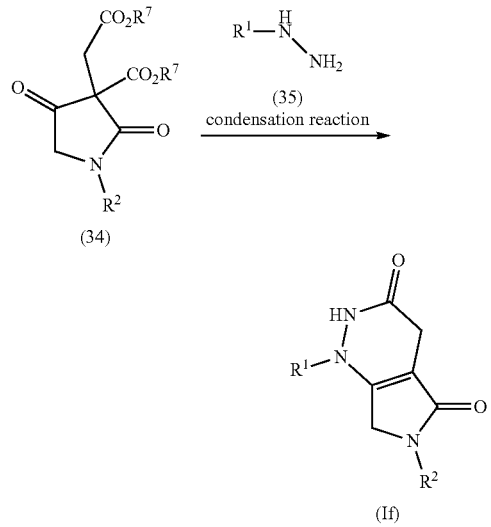

wherein each symbol is as defined above.

Compound (34) can be produced by subjecting compound (32) to an alkylation reaction with compound (33).

Compound (If) can be produced by subjecting compound (34) to a condensation reaction with compound (35).

Production Method G

Among compound (I), the following compound (Ig) can be produced according to the following method.

Production Method H

Among compound (I), the following compound (Ih) can be produced according to the following method.

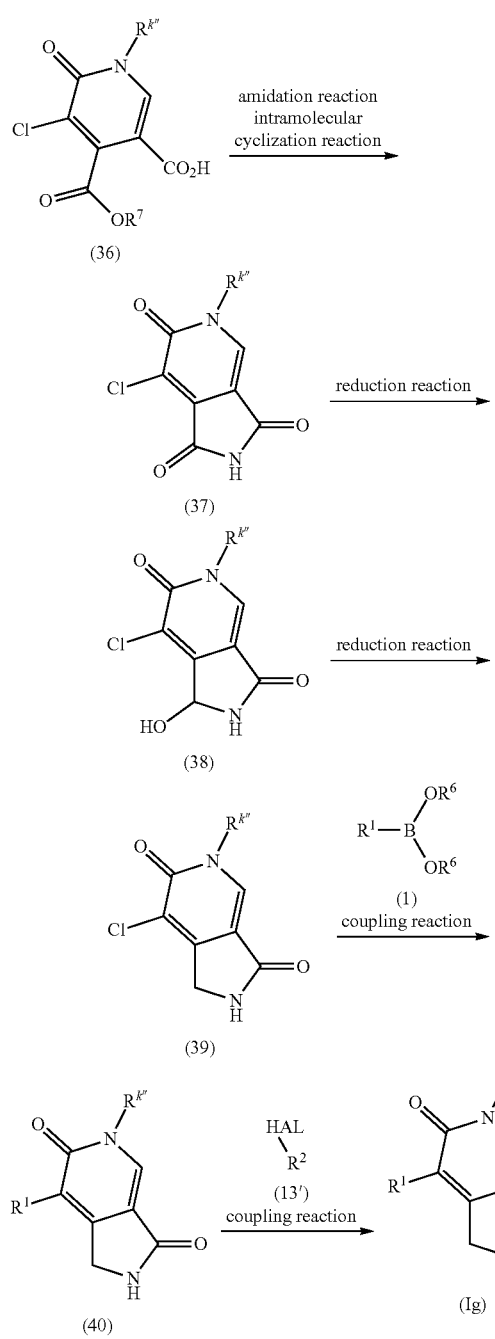

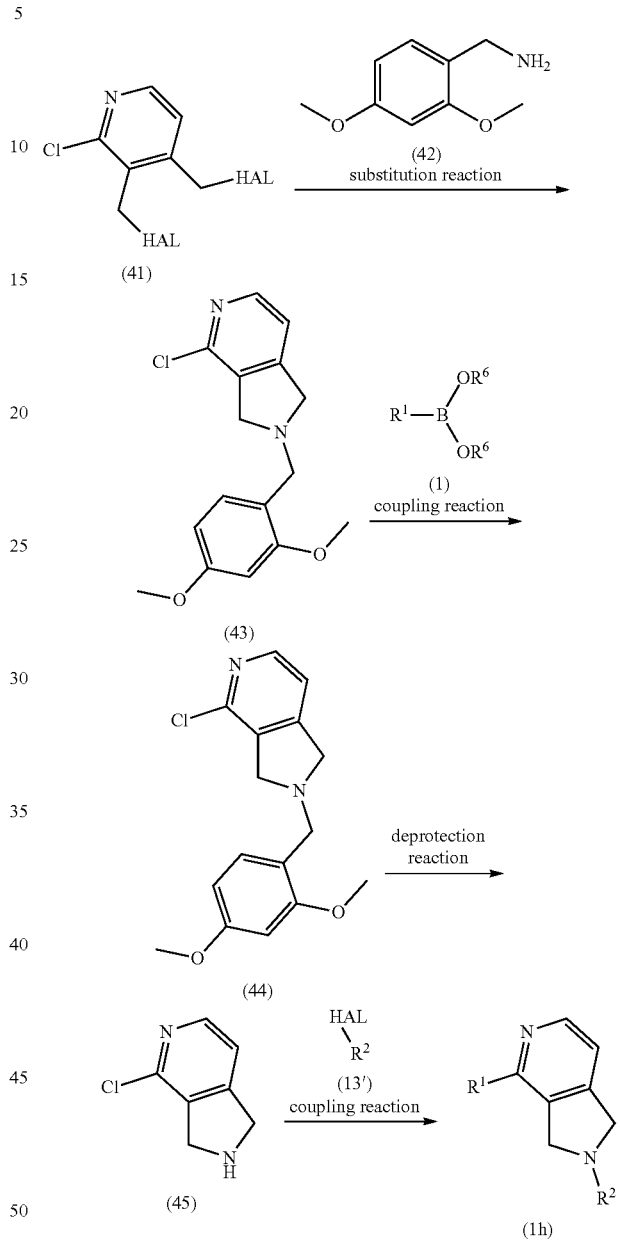

wherein each symbol is as defined above.

Compound (37) can be produced by subjecting compound (36) to an amidation reaction with ammonia or a salt thereof, followed by an intramolecular cyclization reaction.

Compound (38) can be produced by subjecting compound (37) to a reduction reaction.

Compound (39) can be produced by subjecting compound (38) to a reduction reaction.

Compound (40) can be produced by subjecting compound (39) to a coupling reaction with compound (1).

Compound (Ig) can be produced by subjecting compound (40) to a coupling reaction with compound (13').

wherein each symbol is as defined above.

Compound (43) can be produced by subjecting compound (41) to a substitution reaction with compound (42).

Compound (44) can be produced by subjecting compound (43) to a coupling reaction with compound (1).

Compound (45) can be produced by subjecting compound (44) to a deprotection reaction.

Compound (Ih) can be produced by subjecting compound (45) to a coupling reaction with compound (13').

Production Method I

Among compound (I), the following compound (Ii) can be produced according to the following method.

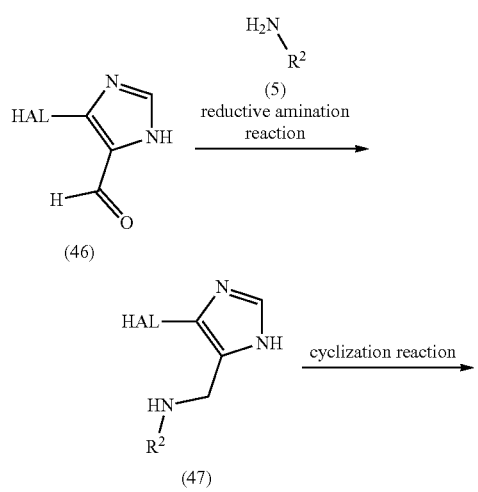

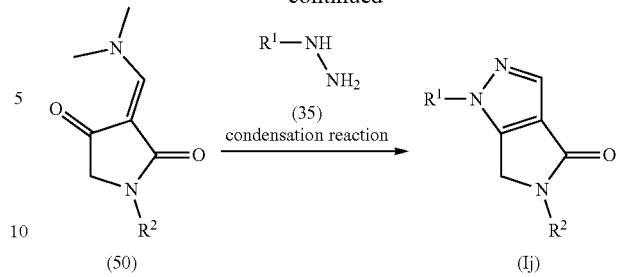

wherein each symbol is as defined above.

Compound (50) can be produced by subjecting compound (49) to a dimethylaminomethylidenation reaction. Examples of the reagent to be used include 1,1-dimethoxy-N,N-dimethylmethanamine and the like.

Compound (Ij) can be produced by subjecting compound (50) to a condensation reaction with compound (35).

Production Method K

Among compound (I), the following compound (Ik) can be produced according to the following method.

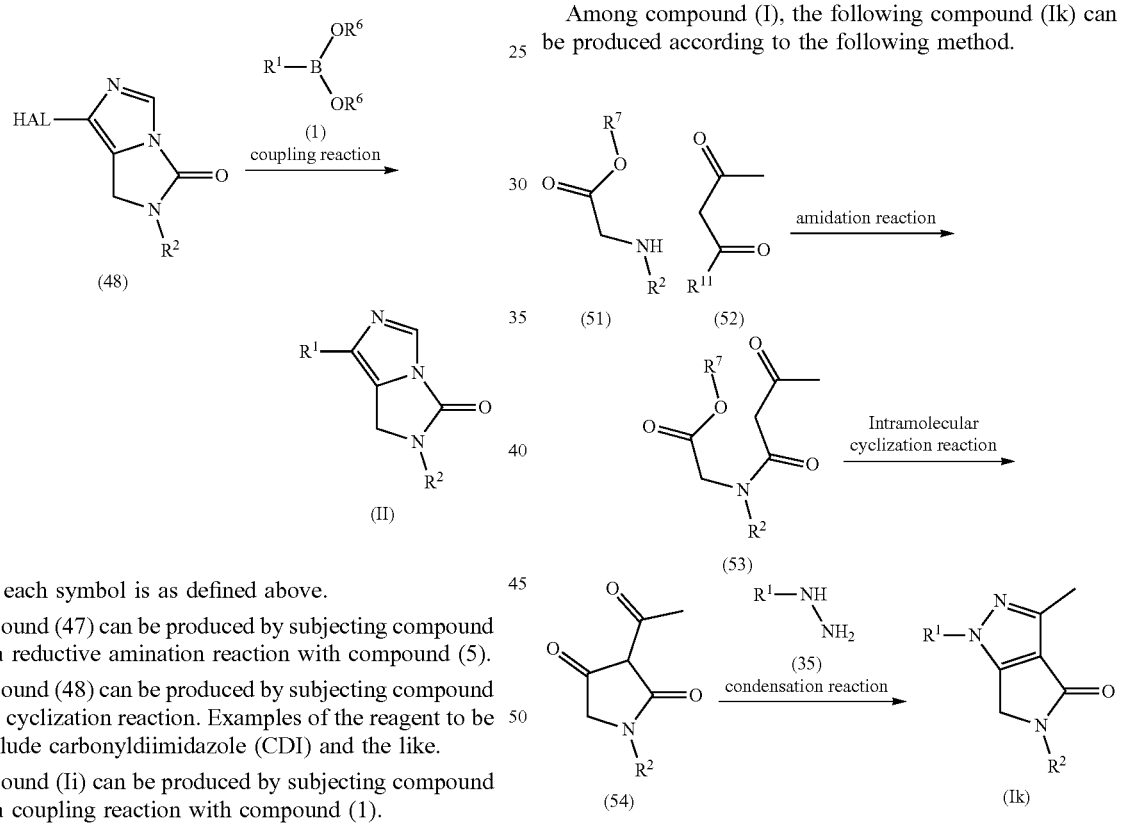

wherein each symbol is as defined above.

Compound (47) can be produced by subjecting compound (46) to a reductive amination reaction with compound (5).

Compound (48) can be produced by subjecting compound (47) to a cyclization reaction. Examples of the reagent to be used include carbonyldiimidazole (CDI) and the like.

Compound (Ii) can be produced by subjecting compound (48) to a coupling reaction with compound (1).

Production Method J

Among compound (I), the following compound (Ij) can be produced according to the following method.

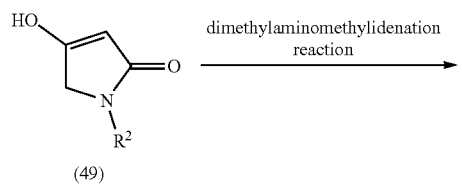

wherein each symbol is as defined above.

Compound (53) can be produced by subjecting compound (52) to an amidation reaction with compound (51).

Compound (54) can be produced by subjecting compound (53) to an intramolecular cyclization reaction.

Compound (Ik) can be produced by subjecting compound (54) to a condensation reaction with compound (35).

Production Method L

Among compound (I), the following compound (Il) can be produced according to the following method.

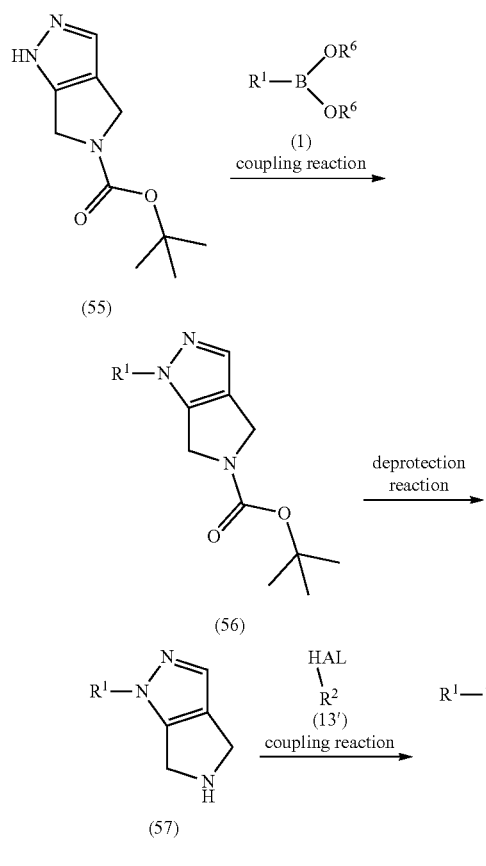

(55)

(56)

(57)

(II)

wherein each symbol is as defined above.

Compound (56) can be produced by subjecting compound (55) to a coupling reaction with compound (1).

Compound (57) can be produced by subjecting compound (56) to a deprotection reaction.

Compound (II) can be produced by subjecting compound (57) to a coupling reaction with compound (13').

Production Method M

Among compound (I), the following compound (Im) can be produced according to the following method.

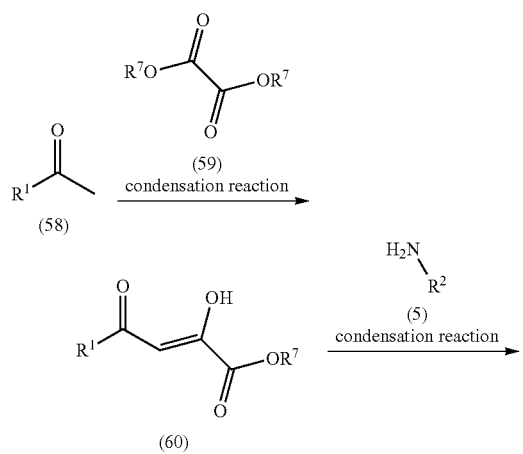

(58)

(60)

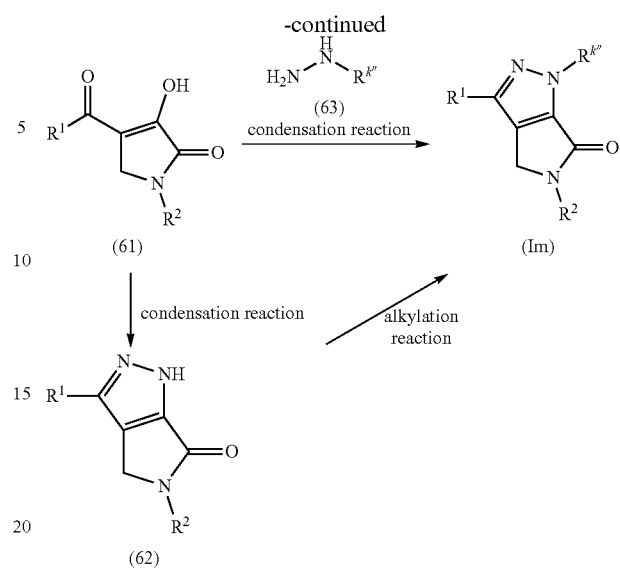

(61)

(62)

(Im)

wherein each symbol is as defined above.

Compound (60) can be produced by subjecting compound (58) to a condensation reaction with compound (59).

Compound (61) can be produced by subjecting compound (60) to a condensation reaction with compound (5) and formaldehyde or a formaldehyde equivalent and the like.

Compound (62) can be produced by subjecting compound (61) to a condensation reaction with hydrazine.

Compound (Im) can be produced by subjecting compound (61) to a condensation reaction with compound (63).

Compound (Im) can also be produced by subjecting compound (62) to an alkylation reaction.

Production Method N

Among compound (I), the following compound (In) can be produced according to the following method.

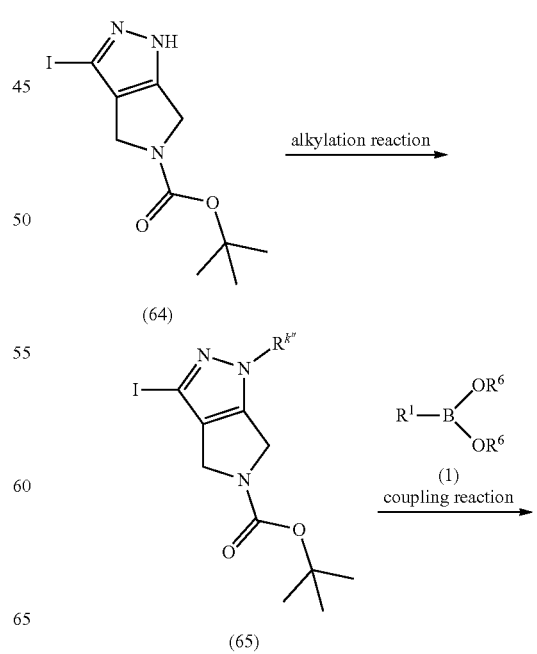

(64)

(65)

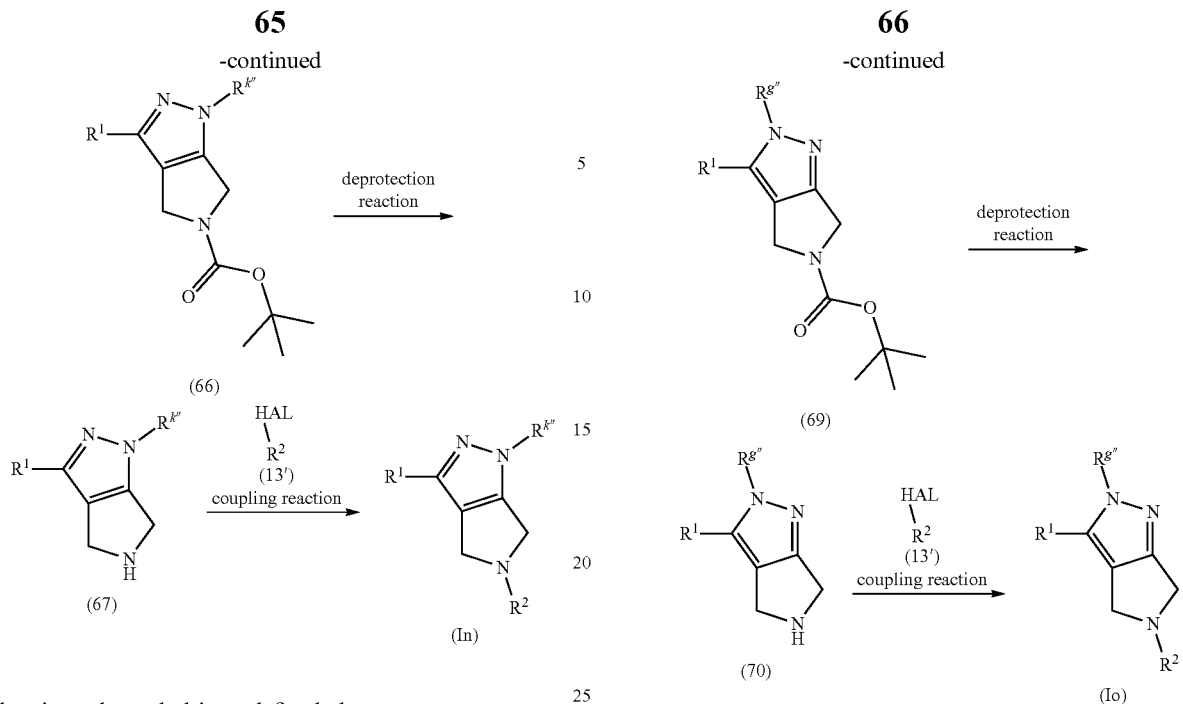

wherein each symbol is as defined above.

Compound (65) can be produced by subjecting compound (64) to an alkylation reaction.

Compound (66) can be produced by subjecting compound (65) to a coupling reaction with compound (1).

Compound (67) can be produced by subjecting compound (66) to a deprotection reaction.

Compound (In) can be produced by subjecting compound (67) to a coupling reaction with compound (13').

Production Method O

Among compound (I), the following compound (Io) can be produced according to the following method.

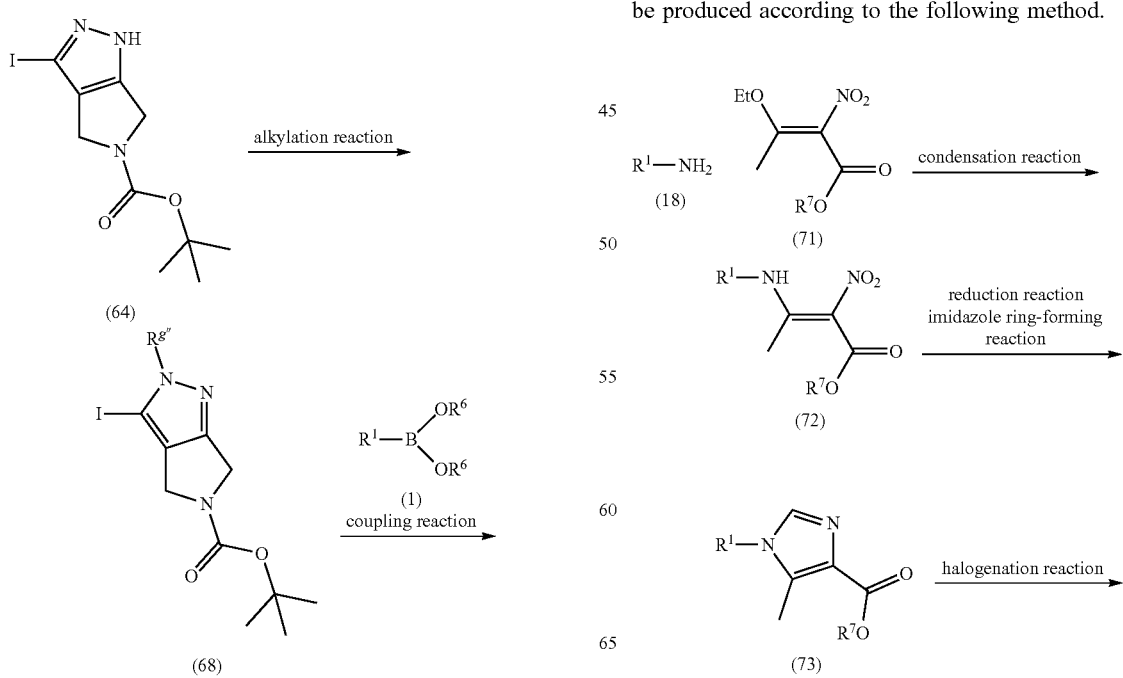

wherein each symbol is as defined above.

Compound (68) can be produced by subjecting compound (64) to an alkylation reaction.

Compound (69) can be produced by subjecting compound (68) to a coupling reaction with compound (1).

Compound (70) can be produced by subjecting compound (69) to a deprotection reaction.

Compound (Io) can be produced by subjecting compound (70) to a coupling reaction with compound (13').

Production Method P

Among compound (I), the following compound (Ip) can be produced according to the following method.

-continued

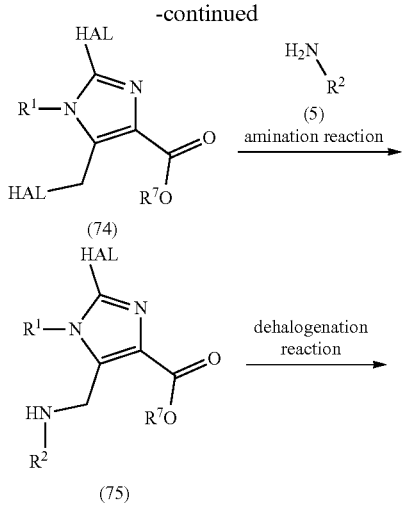

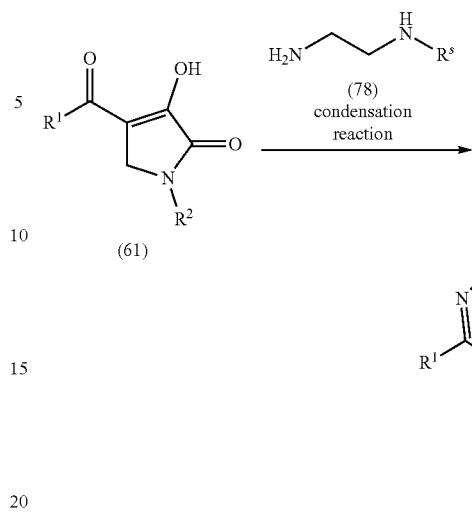

wherein each symbol is as defined above.

Compound (Iq) can be produced by subjecting compound (61) to a condensation reaction with compound (78).

Production Method R

Among compound (I), the following compound (Ir) can be produced according to the following method.

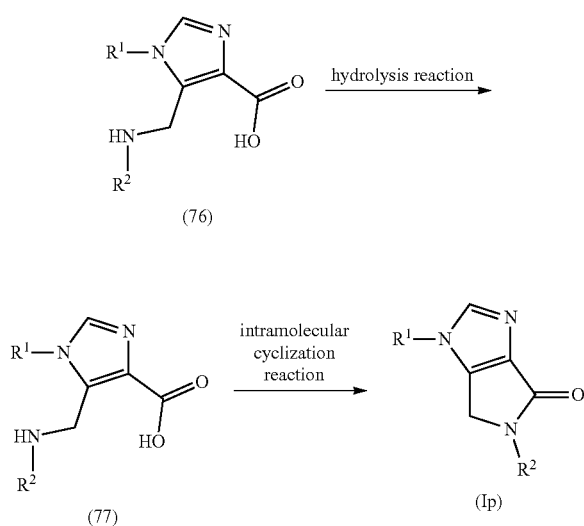

wherein each symbol is as defined above.

Compound (72) can be produced by subjecting compound (18) to a condensation reaction with compound (71).

Compound (73) can be produced by subjecting compound (72) to a reduction reaction, followed by an imidazole ring-forming reaction with an orthoformate.

Compound (74) can be produced by subjecting compound (73) to a halogenation reaction.

Compound (75) can be produced by subjecting compound (74) to an amination reaction with compound (5).

Compound (76) can be produced by subjecting compound (75) to a dehalogenation reaction.

Compound (77) can be produced by subjecting compound (76) to a hydrolysis reaction.

Compound (Ip) can be produced by subjecting compound (77) to an intramolecular cyclization reaction.

Production Method Q

Among compound (I), the following compound (Iq) can be produced according to the following method.

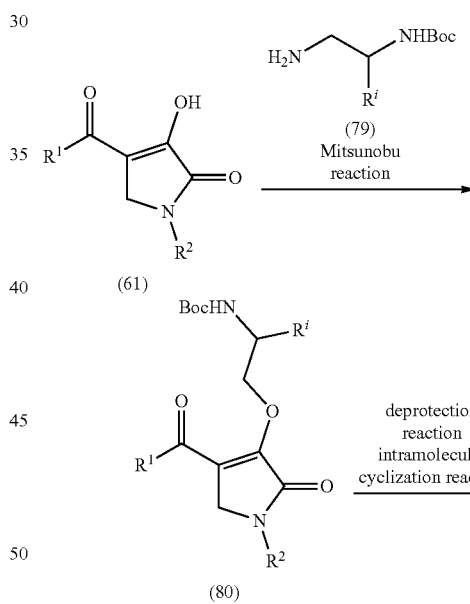

wherein each symbol is as defined above.

Compound (80) can be produced by subjecting compound (61) to Mitsunobu reaction with compound (79).

Compound (Ir) can be produced by subjecting compound (80) to a deprotection reaction, followed by an intramolecular cyclization reaction.

Production Method S

Among compound (I), the following compound (Is) can be produced according to the following method.

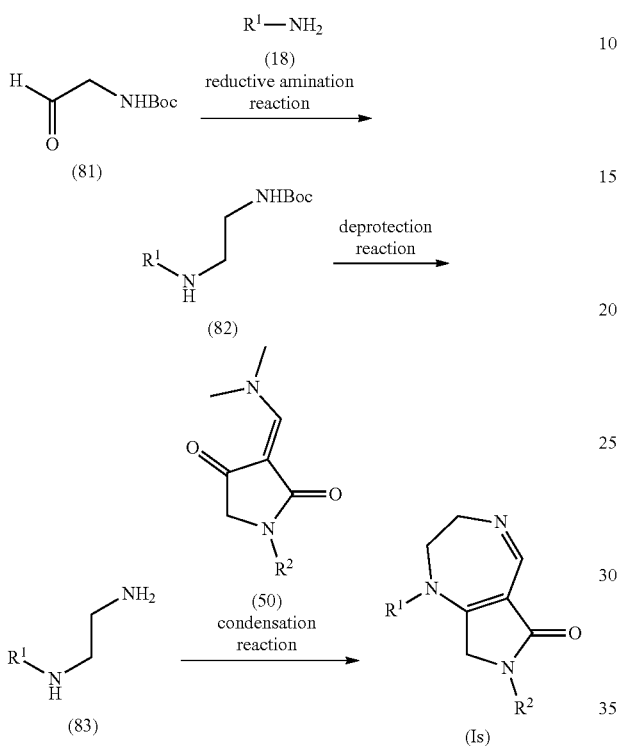

wherein each symbol is as defined above.

Compound (82) can be produced by subjecting compound (81) to a reductive amination reaction with compound (18).

Compound (83) can be produced by subjecting compound (82) to a deprotection reaction.

Compound (Is) can be produced by subjecting compound (83) to a condensation reaction with compound (50).

Production Method T

Among compound (I), the following compound (It) can be produced according to the following method.

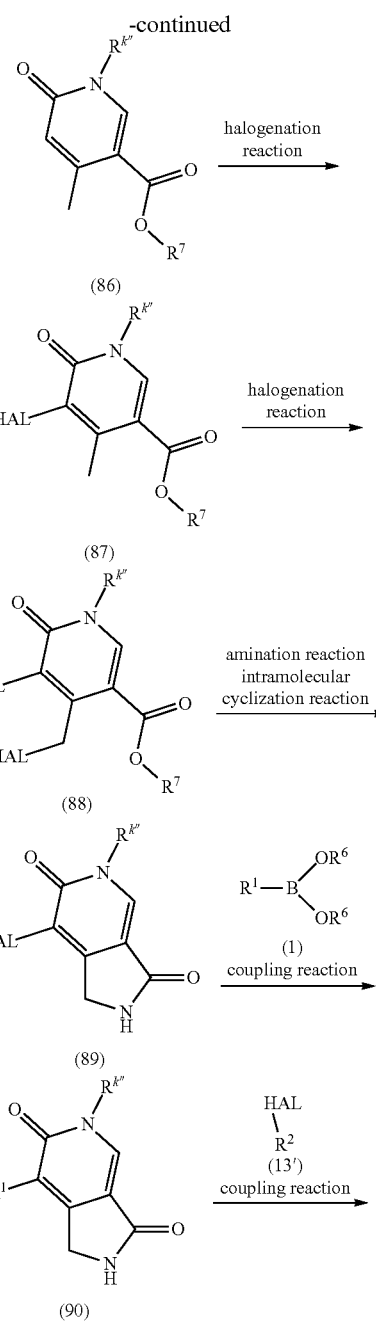

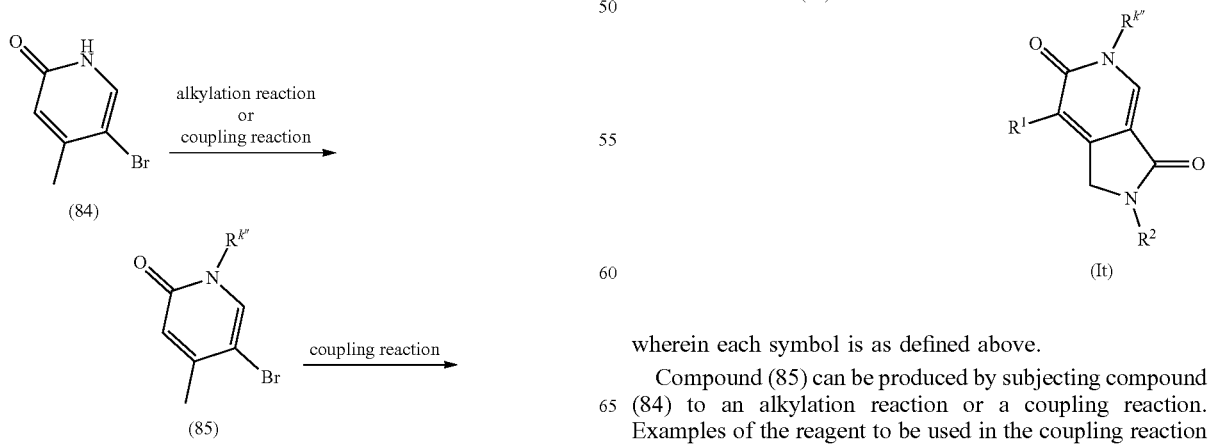

wherein each symbol is as defined above.

Compound (85) can be produced by subjecting compound (84) to an alkylation reaction or a coupling reaction. Examples of the reagent to be used in the coupling reaction include a combination of an aryl boronic acid, a metal reagent and a base. Examples of the metal reagent include copper acetate. Examples of the base include the above-mentioned organic bases (triethylamine, pyridine, diisopropylethylamine, etc.). Molecular sieve may be added depending on the conditions.

Compound (86) can be produced by subjecting compound (85) to a coupling reaction with carbon monoxide in the presence of an alcohol corresponding to $R^7$.

Compound (87) can be produced by subjecting compound (86) to a halogenation reaction.

Compound (88) can be produced by subjecting compound (87) to a halogenation reaction.

Compound (89) can be produced by subjecting compound (88) to an amination reaction with ammonia or a salt thereof, followed by an intramolecular cyclization reaction.

Compound (90) can be produced by subjecting compound (89) to a coupling reaction with compound (1).

Compound (It) can be produced by subjecting compound (90) to a coupling reaction with compound (13').

Production Method U

Among compound (I), the following compound (Iu) can be produced according to the following method.

Compound (94) can be produced by subjecting compound (91) to a coupling reaction with compound (13').

Compound (Iu) can be produced by subjecting compound (93) to a coupling reaction with compound (13').

Compound (Iu) can also be produced by subjecting compound (94) to a coupling reaction with compound (92) under visible light irradiation. Examples of the reagent to be used in the coupling reaction include a combination of a visible light redox catalyst and an oxidizing agent. Examples of the visible light redox catalyst include 3,6-di-tert-butyl-10-phenyl-9-(2,4,6-trimethylphenyl)acridin-10-ium tetrafluoroborate, 10-methyl-9-(2,4,6-trimethylphenyl)acridinium perchlorate and the like. Examples of the oxidizing agent include [bis(trifluoroacetoxy)iodo]benzene and (diacetoxyiodo)benzene.

Compounds (1), (1'), (2), (5), (6), (10), (13), (13'), (14), (14'), (18), (19), (21), (26), (29), (32), (33), (35), (36), (41), (42), (46), (49), (51), (52), (55), (58), (59), (63), (64), (71), (78), (79), (81), (84) and (92) used as a raw material in each production method may be a commercially available product, or can be produced according to a method known per se.

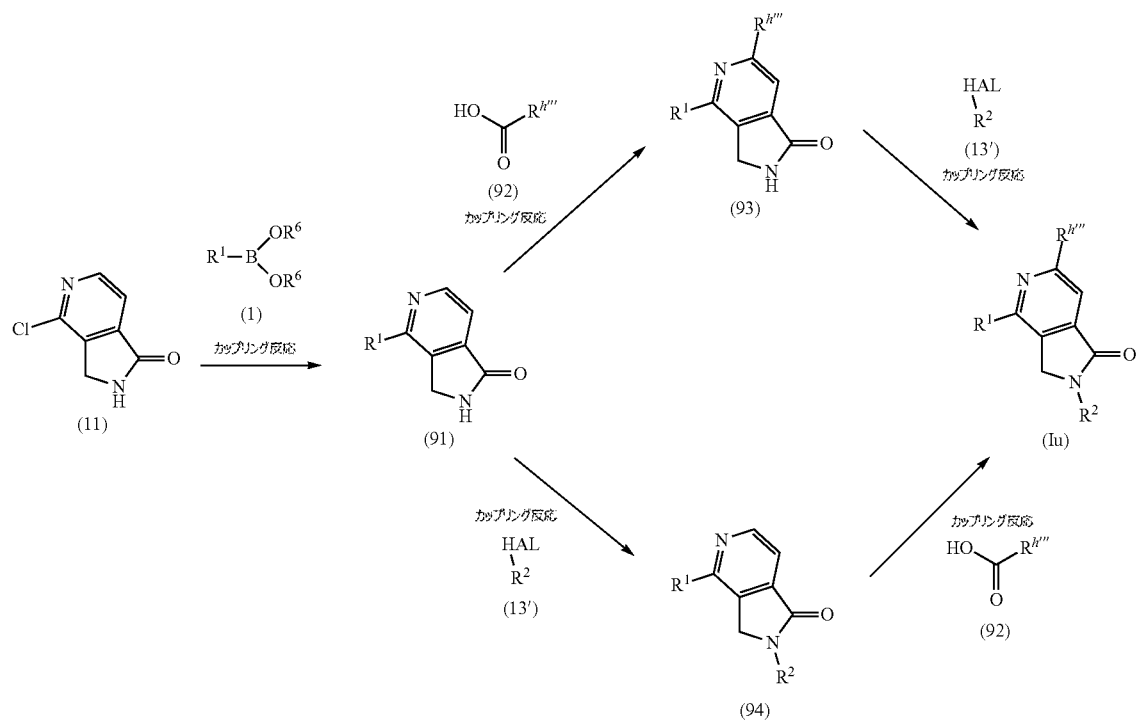

wherein each symbol is as defined above.

Compound (91) can be produced by subjecting compound (11) to a coupling reaction with compound (1).

Compound (93) can be produced by subjecting compound (91) to a coupling reaction with compound (92) under visible light irradiation. Examples of the reagent to be used in the coupling reaction include a combination of a visible light redox catalyst and an oxidizing agent. Examples of the visible light redox catalyst include 3,6-di-tert-butyl-10-phenyl-9-(2,4,6-trimethylphenyl)acridin-10-ium tetrafluoroborate, 10-methyl-9-(2,4,6-trimethylphenyl)acridinium perchlorate and the like. Examples of the oxidizing agent include [bis(trifluoroacetoxy)iodo]benzene and (diacetoxyiodo)benzene.

As for the configurational isomers (E, Z forms) of compound (I), they can be isolated and purified when isomerization occurs, for example, according to a conventional separation means such as extraction, recrystallization, distillation, chromatography and the like to obtain a pure compound. In addition, the corresponding pure isomer can also be obtained by isomerizing a double bond using heating, an acid catalyst, a transition metal complex, a metal catalyst, a radical catalyst, light irradiation, a strong base catalyst and the like, according to the method described in Shin Jikken Kagaku Kouza 14 (The Chemical Society of Japan ed.), pages 251 to 253, 4th Edition Jikken Kagaku Kouza 19 (The Chemical Society of Japan ed.), pages 273 to 274 or a method analogous thereto.

Compound (I) contains a stereoisomer depending on the kind of a substituent, and each stereoisomer and a mixture thereof are encompassed in the present invention.

When the objective product is obtained as a free form by the above-mentioned reaction, it can be converted to a salt according to a conventional method, or when the objective product is obtained as a salt, it can be converted to a free form or other salt according to a conventional method. The thus-obtained compound (I) can also be isolated and purified from a reaction mixture according to a known method such as transfer, concentration, solvent extraction, distillation, crystallization, recrystallization, chromatography and the like.

When compound (I) contains a configurational isomer, a diastereomer, a conformer and the like, each can be isolated according to the above-mentioned separation and purification methods, if desired. In addition, when compound (I) is so racemic, d-form and l-form or S-form and R-form can be isolated according to a conventional optical resolution.

The thus-obtained compound (I), other reaction intermediate therefor and starting compounds thereof can be isolated and purified from a reaction mixture according to a method known per se, for example, extraction, concentration, neutralization, filtration, distillation, recrystallization, column chromatography, thin layer chromatography, preparative high performance liquid chromatography (preparative HPLC), moderate-pressure preparative liquid chromatography (moderate-pressure preparative LC) and the like.

A salt of compound (I) can be produced according to a method known per se. For example, when compound (I) is a basic compound, it can be produced by adding an inorganic acid or organic acid, or when compound (I) is an acidic compound, by adding an organic base or inorganic base.

When compound (I) contains an optical isomer, each optical isomer and a mixture thereof are encompassed in the scope of the present invention, and these isomers can be subjected to optical resolution or can be produced respectively, according to a method known per se, if desired.

The compound of the present invention is expected to be useful for mammals (e.g., mouse, rat, hamster, rabbit, cat, dog, bovine, sheep, monkey, human etc.) as an agent for the prophylaxis or treatment of diseases, for example, (1) psychiatric diseases [e.g., depression, major depression, bipolar depression, dysthymic disorder, emotional disorder (seasonal affective disorder and the like), recurrent depression, postpartum depression, stress disorder, depression symptom, mania, anxiety, generalized anxiety disorder, anxiety syndrome, panic disorder, phobia, social phobia, social anxiety disorder, obsessive disorder, post-traumatic stress syndrome, post-traumatic stress disorder, Tourette syndrome, autism, fragile X syndrome, Rett syndrome, adjustment disorder, bipolar disorder, neurosis, schizophrenia (e.g., positive symptom, negative symptom, cognitive impairment), chronic fatigue syndrome, anxiety neurosis, compulsive neurosis, panic disorder, epilepsy, anxiety disorder, anxiety, anxious mental state, emotional abnormality, cyclothymia, nervous erethism, faint, addiction, low sex drive, attention deficit hyperactivity disorder (ADHD), psychotic major depression, refractory major depression, treatment-resistant depression, depressive disorder, catalepsy, hebephrenic schizophrenia, paranoid schizophrenia], (2) neurodegenerative diseases [e.g., Alzheimer's disease, Alzheimer-type senile dementia, Parkinson's disease, Huntington's disease, multi-infarct dementia, frontotemporal dementia, dementia Parkinson's type, progressive supranuclear palsy, Pick's syndrome, corticobasal degeneration, Down's disease, vascular dementia, postencephalitic parkinsonism, Lewy body dementia, multiple-system atrophy, HIV dementia, amyotrophic lateral sclerosis (ALS), motor neurogenesis disease (MND), Creutzfeldt-Jakob disease or prion disease, cerebral palsy, progressive supranuclear palsy, traumatic brain injury, glaucoma, multiple sclerosis, neuromyelitis optica (NMO), postoperative cognitive dysfunction (POCD), postoperative delirium (POD), delirium], (3) age-related cognition memory disorders [e.g., age-related memory disorders, senile dementia], (4) sleep disorders [e.g., intrinsic sleep disorders (e.g., psychophysiological insomnia and the like), extrinsic sleep disorder, circadian rhythm disorders (e.g., time zone change syndrome (jet lag), shift work sleep disorder, irregular sleep-wake pattern, delayed sleep phase syndrome, advanced sleep phase syndrome, non-24-hour sleep-wake and the like), parasomnia, sleep disorders associated with internal medical or psychiatric disorder (e.g., chronic obstructive pulmonary diseases, Alzheimer's disease, Parkinson's disease, cerebrovascular dementia, schizophrenia, depression, anxiety neurosis), stress insomnia, insomnia, insomniac neurosis, sleep apnea syndrome], (5) respiratory depression caused by anesthetics, traumatic disease, or neurodegenerative disease and the like, (6) traumatic brain injury, cerebral apoplexy, cerebral edema, cerebral ischemia, ischemia, neurotic anorexia, eating disorder, anorexia nervosa, hyperorexia, other eating disorder, alcohol dependence, alcohol abuse, alcoholic amnesia, alcohol paranoia, alcohol preference, alcohol withdrawal, alcoholic insanity, alcohol poisoning, alcoholic jealousy, alcoholic mania, alcohol-dependent psychiatric disorder, alcoholic insanity, pharmacophilia, pharmacophobia, pharmacomania, drug withdrawal, migraine, stress headache, catatonic headache, diabetic neuropathy, obesity, diabetes, muscular spasm, Meniere's disease, autonomic ataxia, alopecia, glaucoma, hypertension, cardiac disease, tachycardia, congestive cardiac failure, hyperventilation, bronchial asthma, apnea, sudden infant death syndrome, inflammatory disease, allergic disease, impotence, climacteric disorder, infertility, neoplasms (e.g., cancer, liver neoplasms, colonic neoplasms, breast neoplasms, prostatic neoplasms, neuroblastoma, bone neoplasms, mouth neoplasms, mastocytoma, cholangiocarcinoma, Lewis lung carcinoma etc.), immunodeficiency syndrome caused by HIV infection, immunodeficiency syndrome caused by stress, cerebrospinal meningitis, acromegaly, incontinence, metabolic syndrome, osteoporosis, peptic ulcer, irritable bowel syndrome, inflammatory bowel disease, ulcerative colitis, Crohn's disease, stress gastrointestinal disorder, stress vomiting, diarrhea, constipation, postoperative ileus, rheumatoid arthritis, osteoarthritis, functional dyspepsia, hyperalgesia, insulin resistance, dementia pugilistica, nausea, vomiting, neoplasm metastasis, brain injuries, seizure, body weight changes, weight gain, weight loss, colitis, alcoholism, hypothermia, fatty liver, atherosclerosis, infection, muscle spasticity, hypertension, stroke, malignant migrating partial seizures of infancy, diabetes mellitus, type 2 diabetes mellitus, dyslipidaemia, visceral obesity, ocular hypotension, anorexia, fibrosis, myocardial infarction, cachexia, induced psychotic disorder, ataxia, AIDS wasting syndrome, cirrhotic cardiomyopathy, uremic pruritus, neurobehavioral manifestations, Tubulointerstitial nephritis and uveitis syndrome, interstitial cystitis, retinitis pigmentosa, autoimmune diseases, coronary artery disease, aspirin-induced asthma, platelet storage pool deficiency, diabetic embryopathy, Arthus type urticaria, asthma, toxic oil syndrome, otitis and the like, (7) pain (e.g., inflammatory pain, cancerous pain, neuropathic pain, acute pain, pain associated with peripheral neuropathy, central pain, fibromyalgia, vassooclussive painful crises in sickle cell disease, multiple sclerosis-mediated spasticity or pain, functional chest pain, complex regional pain syndrome etc.), (8) lysosomal storage diseases [e.g., Gaucher's disease, Krabbe's disease, Niemann-Pick syndrome] and the like.

Since the compound of the present invention has an excellent glucosylceramide synthase inhibitory action, a superior prophylactic or therapeutic effect for the above-mentioned diseases may be expected.

Since the compound of the present invention has an excellent glucosylceramide synthase inhibitory action, a superior prophylactic or therapeutic effect for lysosomal storage diseases (e.g., Gaucher's disease), neurodegenerative diseases (e.g., Parkinson's disease, Lewy body dementia, multiple-system atrophy) and the like may be expected.

Compound (I) can be used as a prodrug.

A prodrug of compound (I) means a compound which is converted to compound (I) with a reaction due to an enzyme, a gastric acid, etc. under the physiological condition in the living body, that is, a compound which is converted to compound (I) with oxidation, reduction, hydrolysis, etc. according to an enzyme; a compound which is converted to compound (I) by hydrolysis etc. due to gastric acid, etc.

A prodrug for compound (I) may be a compound obtained by subjecting an amino group in compound (I) to an acylation, alkylation or phosphorylation (e.g., a compound obtained by subjecting an amino group in compound (I) to an eicosanoylation, alanylation, pentylaminocarbonylation, (5-methyl-2-oxo-1,3-dioxolen-4-yl)methoxycarbonylation, tetrahydrofuranylation, pyrrolidylmethylation, pivaloyloxymethylation or tert-butylation, etc.); a compound obtained by subjecting a hydroxy group in compound (I) to an acylation, alkylation, phosphorylation or boration (e.g., a compound obtained by subjecting an hydroxy group in compound (I) to an acetylation, palmitoylation, propanoylation, pivaloylation, succinylation, fumarylation, alanylation or dimethylaminomethylcarbonylation, etc.); a compound obtained by subjecting a carboxyl group in compound (I) to an esterification or amidation (e.g., a compound obtained by subjecting a carboxyl group in compound (I) to an ethyl esterification, phenyl esterification, carboxymethyl esterification, dimethylaminomethyl esterification, pivaloyloxymethyl esterification, ethoxycarbonyloxyethyl esterification, phthalidyl esterification, (5-methyl-2-oxo-1,3-dioxolen-4-yl)methyl esterification, cyclohexyloxycarbonylethyl esterification or methylamidation, etc.) and the like. Any of these compounds can be produced from compound (I) by a method known per se. The prodrug of compound (I) may be a compound that converts to compound (I) under physiological conditions as described in Development of Pharmaceutical Products, vol. 7, Molecule Design, 163-198, Hirokawa Shoten (1990).

The compound of the present invention is superior in vivo kinetics (e.g., plasma drug half-life, intracerebral transferability, metabolic stability), shows low toxicity (e.g., more superior as a medicament in terms of acute toxicity, chronic toxicity, genetic toxicity, reproductive toxicity, cardiotoxicity, drug interaction, carcinogenicity etc.). The compound of the present invention is directly used as a medicament or a pharmaceutical composition mixed with a pharmaceutically acceptable carrier or the like to be orally or parenterally administered to mammals (e.g., humans, monkeys, cows, horses, pigs, mice, rats, hamsters, rabbits, cats, dogs, sheep and goats) in safety. Examples of the "parenteral" include intravenous, intramuscular, subcutaneous, intra-organ, intranasal, intradermal, instillation, intracerebral, intrarectal, intravaginal, intraperitoneal and intratumor administrations, administration to the vicinity of tumor etc. and direct administration to the lesion.

While the dose of the compound of the present invention varies depending on the administration route, symptom and the like, when, for example, the compound is orally administered to a patient with Parkinson's disease (adult, body weight 40-80 kg, for example, 60 kg), it is, for example, 0.001-1000 mg/kg body weight/day, preferably 0.01-100 mg/kg body weight/day, more preferably 0.1-10 mg/kg body weight/day. This amount can be administered in 1 to 3 portions per day.

A medicament containing the compound of the present invention can be used alone or as a pharmaceutical composition containing the compound of the present invention and a pharmaceutically acceptable carrier according to a method known per se as a production method of a pharmaceutical preparation (e.g., the method described in the Japanese Pharmacopoeia etc.). A medicament containing the compound of the present invention can be safely administered in the form of, for example, tablet (including sugar-coated tablet, film-coated tablet, sublingual tablet, orally disintegrating tablet, buccal and the like), pill, powder, granule, capsule (including soft capsule, microcapsule), troche, syrup, liquid, emulsion, suspension, release control preparation (e.g., immediate-release preparation, sustained-release preparation, sustained-release microcapsule), aerosol, film (e.g., orally disintegrating film, oral mucosa-adhesive film), injection (e.g., subcutaneous injection, intravenous injection, intramuscular injection, intraperitoneal injection), drip infusion, transdermal absorption type preparation, ointment, lotion, adhesive preparation, suppository (e.g., rectal suppository, vaginal suppository), pellet, nasal preparation, pulmonary preparation (inhalant), eye drop and the like, orally or parenterally (e.g., intravenous, intramuscular, subcutaneous, intraorgan, intranasal, intradermal, instillation, intracerebral, intrarectal, intravaginal, intraperitoneal administrations, and administration to the lesion).

As the aforementioned "pharmaceutically acceptable carrier", various organic or inorganic carriers conventionally used as preparation materials (starting materials) can be used. For example, excipient, lubricant, binder, disintegrant and the like are used for solid preparations, and solvent, solubilizing agent, suspending agent, isotonicity agent, buffer, soothing agent and the like are used for liquid preparations. Where necessary, preparation additives such as preservative, antioxidant, colorant, sweetening agent and the like can also be used.

Examples of the excipient include lactose, sucrose, D-mannitol, starch, corn starch, crystalline cellulose, light anhydrous silicic acid and the like.

Examples of the lubricant include magnesium stearate, calcium stearate, talc, colloidal silica and the like.

Examples of the binder include crystalline cellulose, white sugar, D-mannitol, dextrin, hydroxypropylcellulose, hydroxypropylmethylcellulose, polyvinylpyrrolidone, starch, sucrose, gelatin, methylcellulose, carboxymethylcellulose sodium and the like.

Examples of the disintegrant include starch, carboxymethylcellulose, carboxymethylcellulose calcium, sodium carboxymethyl starch, L-hydroxypropylcellulose and the like.

Examples of the solvent include water for injection, alcohol, propylene glycol, Macrogol, sesame oil, corn oil, olive oil and the like.

Examples of the solubilizing agent include polyethylene glycol, propylene glycol, D-mannitol, benzyl benzoate, ethanol, trisaminomethane, cholesterol, triethanolamine, sodium carbonate, sodium citrate and the like.

Examples of the suspending agent include surfactants such as stearyl triethanolamine, sodium lauryl sulfate, laurylaminopropionic acid, lecithin, benzalkonium chloride, benzetonium chloride, glycerin monostearate and the like; hydrophilic polymers such as polyvinyl alcohol, polyvinylpyrrolidone, carboxymethylcellulose sodium, methylcellulose, hydroxymethylcellulose, hydroxyethylcellulose, hydroxypropylcellulose and the like; and the like.

Examples of the isotonicity agent include glucose, D-sorbitol, sodium chloride, glycerin, D-mannitol and the like.

Examples of the buffer include buffer solutions such as phosphates, acetates, carbonates, citrates and the like.

Examples of the soothing agent include benzyl alcohol and the like.

Examples of the preservative include p-oxybenzoates, chlorobutanol, benzyl alcohol, phenylethyl alcohol, dehydroacetic acid, sorbic acid and the like.

Examples of the antioxidant include sulfite, ascorbic acid, α-tocopherol and the like.

While the pharmaceutical composition varies according to the dosage form, administration method, carrier and the like, it can be produced according to a conventional method by adding the compound of the present invention in a proportion of generally 0.01-100% (w/w), preferably 0.1-95% (w/w), of the total amount of the preparation.

The compound of the present invention can be used in combination with other active ingredients (hereinafter to be abbreviated as concomitant drug).

Examples of the concomitant drug include the following. benzodiazepine (chlordiazepoxide, diazepam, potassium clorazepate, lorazepam, clonazepam, alprazolam etc.), L-type calcium channel inhibitor (pregabalin etc.), tricyclic or tetracyclic antidepressant (imipramine hydrochloride, amitriptyline hydrochloride, desipramine hydrochloride, clomipramine hydrochloride etc.), selective serotonin reuptake inhibitor (fluvoxamine maleate, fluoxetine hydrochloride, citalopram hydrobromide, sertraline hydrochloride, paroxetine hydrochloride, escitalopram oxalate etc.), serotonin-noradrenaline reuptake inhibitor (venlafaxine hydrochloride, duloxetine hydrochloride, desvenlafaxine hydrochloride etc.), noradrenaline reuptake inhibitor (reboxetine mesylate etc.), noradrenaline-dopamine reuptake inhibitor (bupropion hydrochloride etc.), mirtazapine, trazodone hydrochloride, nefazodone hydrochloride, bupropion hydrochloride, setiptiline maleate, $5\text{-HT}_{1A}$ agonist (buspirone hydrochloride, tandospirone citrate, osemozotan hydrochloride etc.), $5\text{-HT}_3$ antagonist (Cyamemazine etc.), heart non-selective β inhibitor (propranolol hydrochloride, oxprenolol hydrochloride etc.), histamine $H_1$ antagonist (hydroxyzine hydrochloride etc.), therapeutic drug for schizophrenia (chlorpromazine, haloperidol, sulpiride, clozapine, trifluoperazine hydrochloride, fluphenazine hydrochloride, olanzapine, quetiapine fumarate, risperidone, aripiprazole etc.), CRF antagonist, other antianxiety drug (meprobamate etc.), tachykinin antagonist (MK-869, saredutant etc.), medicament that acts on metabotropic glutamate receptor, CCK antagonist, β3 adrenaline antagonist (amibegron hydrochloride etc.), GAT-1 inhibitor (tiagabine hydrochloride etc.), N-type calcium channel inhibitor, carbonic anhydrase II inhibitor, NMDA glycine moiety agonist, NMDA antagonist (memantine etc.), peripheral benzodiazepine receptor agonist, vasopressin antagonist, vasopressin V1b antagonist, vasopressin V1a antagonist, phosphodiesterase inhibitor, opioid antagonist, opioid agonist, uridine, nicotinic acid receptor agonist, thyroid hormone (T3, T4), TSH, TRH, MAO inhibitor (phenelzine sulfate, tranylcypromine sulfate, moclobemide etc.), $5\text{-HT}_{2A}$ antagonist, $5\text{-HT}_{2A}$ inverse agonist, COMT inhibitor (entacapone etc.), therapeutic drug for bipolar disorder (lithium carbonate, sodium valproate, lamotrigine, riluzole, felbamate etc.), cannabinoid CB1 antagonist (rimonabant etc.), FAAH inhibitor, sodium channel inhibitor, anti-ADHD drug (methylphenidate hydrochloride, methamphetamine hydrochloride etc.), therapeutic drug for alcoholism, therapeutic drug for autism, therapeutic drug for chronic fatigue syndrome, therapeutic drug for spasm, therapeutic drug for fibromyalgia syndrome, therapeutic drug for headache, therapeutic drug for insomnia (etizolam, zopiclone, triazolam, zolpidem, ramelteon, indiplon etc.), therapeutic drug for quitting smoking, therapeutic drug for myasthenia gravis, therapeutic drug for cerebral infarction, therapeutic drug for mania, therapeutic drug for hypersomnia, therapeutic drug for pain, therapeutic drug for dysthymia, therapeutic drug for autonomic ataxia, therapeutic drug for male and female sexual dysfunction, therapeutic drug for migraine, therapeutic drug for pathological gambler, therapeutic drug for restless legs syndrome, therapeutic drug for substance addiction, therapeutic drug for alcohol-related syndrome, therapeutic drug for irritable bowel syndrome, therapeutic drug for Alzheimer's disease (donepezil, galanthamine, memantine, rivastigmine etc.), therapeutic drug for Parkinson's disease (levodopa, carbidopa, benserazide, selegiline, zonisamide, entacapone, amantadine, talipexole, pramipexole, apomorphine, cabergoline, bromocriptine, istradefylline, trihexyphenidyl, promethazine, pergolide, etc.), therapeutic drug for Huntington's disease (chlorpromazine hydrochloride, haloperidol, reserpine etc.), therapeutic drug for Gaucher's disease (imiglucerase, taliglucerase alfa, velaglucerase alfa, eliglustat, miglustat, etc.), therapeutic drug for ALS (riluzole etc., neurotrophic factor etc.), therapeutic drug for multiple sclerosis (molecular target drug such as fingolimod, interferon beta 1b, natalizumab and the like, etc.), antiepilepsy drug (phenytoin, carbamazepine, phenobarbital, primidone, zonisamide, sodium valproate, ethosuximide, diazepam, nitrazepam, clonazepam, clobazam, gabapentin, topiramate, lamotrigine, levetiracetam, stiripentol, rufinamide, etc.), therapeutic drug for lipid abnormality such as cholesterol-lowering drug (statin series (pravastatin sodium, atrovastatin, simvastatin, rosuvastatin etc.), fibrate (clofibrate etc.), squalene synthetase inhibitor), therapeutic drug for abnormal behavior or suppressant of dromomania due to dementia (sedatives, antianxiety drug etc.), apoptosis inhibitor, antiobesity drug, therapeutic drug for diabetes, therapeutic drug for hypertension, therapeutic drug for hypotension, therapeutic drug for rheumatism (DMARD), anti-cancer agent, therapeutic drug for parathyroid (PTH), calcium receptor antagonist, sex hormone or a derivative thereof (progesterone, estradiol, estradiol benzoate etc.), neuronal differentiation promoter, nerve regeneration promoter, non-steroidal anti-inflammatory drug (meloxicam, tenoxicam, indomethacin, ibuprofen, celecoxib, rofecoxib, aspirin etc.), steroid (dexamethasone, cortisone acetate etc.), anti-cytokine drug (TNF inhibitor, MAP kinase inhibitor etc.), antibody medicament, nucleic acid or nucleic acid derivative, aptamer drug and the like.

By combining the compound of the present invention and a concomitant drug, a superior effect such as
(1) the dose can be reduced as compared to single administration of the compound of the present invention or a concomitant drug,
(2) the drug to be combined with the compound of the present invention can be selected according to the condition of patients (mild case, severe case and the like),
(3) the period of treatment can be set longer by selecting a concomitant drug having different action and mechanism from the compound of the present invention,
(4) a sustained treatment effect can be designed by selecting a concomitant drug having different action and mechanism from the compound of the present invention,
(5) a synergistic effect can be afforded by a combined use of the compound of the present invention and a concomitant drug, and the like, can be achieved.

Hereinafter the compound of the present invention and a concomitant drug used in combination are referred to as the "combination agent of the present invention".

When using the combination agent of the present invention, the administration time of the compound of the present invention and the concomitant drug is not restricted, and the compound of the present invention or a pharmaceutical composition thereof and the concomitant drug or a pharmaceutical composition thereof can be administered to an administration subject simultaneously, or may be administered at different times. The dosage of the concomitant drug may be determined according to the dose clinically used, and can be appropriately selected depending on an administration subject, administration route, disease, combination and the like.

The administration mode of the concomitant drug of the present invention is not particularly restricted, and it is sufficient that the compound of the present invention and the concomitant drug are combined in administration. Examples of such administration mode include the following methods: (1) administration of a single preparation obtained by simultaneously processing the compound of the present invention and the concomitant drug, (2) simultaneous administration of two kinds of preparations of the compound of the present invention and the concomitant drug, which have been separately produced, by the same administration route, (3) administration of two kinds of preparations of the compound of the present invention and the concomitant drug, which have been separately produced, by the same administration route in a staggered manner, (4) simultaneous administration of two kinds of preparations of the compound of the present invention and the concomitant drug, which have been separately produced, by different administration routes, (5) administration of two kinds of preparations of the compound of the present invention and the concomitant drug, which have been separately produced, by different administration routes in a staggered manner (for example, administration in the order of the compound of the present invention and the concomitant drug, or in the reverse order) and the like.

The combination agent of the present invention exhibits low toxicity. For example, the compound of the present invention or(and) the aforementioned concomitant drug can be combined with a pharmacologically acceptable carrier according to the known method to prepare a pharmaceutical composition such as tablets (including sugar-coated tablet and film-coated tablet), powders, granules, capsules (including soft capsule), liquids, injections, suppositories, sustained-release agents, etc. These compositions can be administered safely orally or non-orally (e.g., topical, rectal, intravenous administration etc.). Injection can be administered intravenously, intramuscularly, subcutaneously, or by intraorgan administration or directly to the lesion.

Examples of the pharmacologically acceptable carriers usable for the production of the combination agent of the present invention include those similar to the above-mentioned carriers.

The mixing ratio of the compound of the present invention to the concomitant drug in the combination agent of the present invention can be appropriately selected depending on an administration subject, administration route, diseases and the like.

For example, the content of the compound of the present invention in the combination agent of the present invention differs depending on the form of a preparation, and usually from about 0.01 to about 100 wt %, preferably from about 0.1 to about 50 wt %, further preferably from about 0.5 to about 20 wt %, based on the preparation.

The content of the concomitant drug in the combination agent of the present invention differs depending on the form of a preparation, and usually from about 0.01 to about 100 wt %, preferably from about 0.1 to about 50 wt %, further preferably from about 0.5 to about 20 wt %, based on the preparation.

EXAMPLES

The present invention is explained in detail in the following by referring to Examples, Experimental Examples and Formulation Examples, which are not to be construed as limitative, and the invention may be changed within the scope of the present invention.

In the following Examples, the "room temperature" generally means about 10° C. to about 35° C. The ratios indicated for mixed solvents are volume mixing ratios, unless otherwise specified. % means wt %, unless otherwise specified.

The elution by column chromatography in the Examples was performed under the observation by TLC (Thin Layer Chromatography) unless otherwise specified. In the observation by TLC, 60 $F_{254}$ manufactured by Merck was used as a TLC plate, the solvent used as an elution solvent in column chromatography was used as a developing solvent, and UV detector was used for the detection. In silica gel column chromatography, the indication of NH means use of aminopropylsilane-bonded silica gel and the indication of Diol means use of 3-(2,3-dihydroxypropoxy)propylsilane-bonded silica gel. In preparative HPLC (high performance liquid chromatography), the indication of C18 means use of octadecyl-bonded silica gel. The ratio for elution solvent is, unless otherwise specified, a volume mixing ratio.

For the analysis of $^1$H NMR, ACD/SpecManager (trade name) software and the like were used. Peaks of a hydroxyl group, an amino group and the like, having very mild proton peak, are not sometimes described.

MS was measured by LC/MS. As the ionization method, ESI method, or APCI method was used. The data indicates actual measured value (found). While molecular ion peak is generally observed, a fragment ion is sometimes observed. In the case of a salt, a molecular ion peak or fragment ion peak of free form is generally observed.

In the following Examples, the following abbreviations are used.

mp: melting point
MS: mass spectrum
M: mol concentration
N: normality
CDCl$_3$: deuterochloroform
DMSO-d$_6$: deuterodimethyl sulfoxide
DMF-d$_7$: deuteron N,N-dimethylformamide
$^1$H NMR: proton nuclear magnetic resonance
LC/MS: liquid chromatograph mass spectrometer
ESI: electron spray ionization
APCI: atmospheric pressure chemical ionization
Pd2(dba)3: tris(dibenzylideneacetone)dipalladium(0)
DIAD: diisopropyl azodicarboxylate
XANTPHOS: (9,9-dimethyl-9H-xanthene-4,5-diyl)bis(diphenylphosphine)
HATU: O-(7-azabenzotriazol-1-yl)-N,N,N',N'-tetramethyluronium hexafluorophosphorate
TFA: trifluoroacetic acid
CPME: cyclopentyl methyl ether
IPE: diisopropyl ether
DIPEA: N,N-diisopropylethylamine
DMF: N,N-dimethylformamide
THF: tetrahydrofuran
DME: 1,2-dimethoxyethane
MeOH: methanol
AIBN: 2,2'-azobis(isobutyronitrile)
EtOH: ethanol
BINAP: 1,1'-binaphthalene-2,2'-diylbis(diphenylphosphine)
CDI: 1,1'-carbonyldiimidazole
DMSO: dimethyl sulfoxide
AcOH: acetic acid
DBU: 1,8-diazabicyclo[5.4.0]-7-undecene
TEA: triethylamine
NBS: N-bromosuccinimide Example 1

2-(4-fluorophenyl)-4-(2-methoxyphenyl)-2,3-dihydro-1H-pyrrolo[3,4-c]pyridin-1-one A) rac-3-hydroxy-4-(2-methoxyphenyl)-2-phenyl-2,3-dihydro-1H-pyrrolo[3,4-c]pyridin-1-one To a mixture of rac-4-chloro-3-hydroxy-2-phenyl-2,3-dihydro-1H-pyrrolo[3,4-c]pyridin-1-one (10.0 g), (2-methoxyphenyl)boronic acid (8.74 g), potassium carbonate (12.7 g), DME (100 mL) and water (1 mL) was added tetrakis(triphenylphosphine)palladium (2.22 g) at room temperature. The mixture was stirred overnight under nitrogen atmosphere at 85° C., cooled to room temperature, diluted with ethyl acetate and water, and filtered through Celite. The Celite was washed with ethyl acetate, and the filtrate and washing were combined, and extracted with ethyl acetate. The solid precipitated from the extract was collected by filtration, washed with water and ethyl acetate, and dried to give the title compound (6.24 g).
MS: [M+H]$^+$ 333.0.

B) rac-3-hydroxy-4-(2-methoxyphenyl)furo[3,4-c]pyridin-1(3H)-one

A mixture of rac-3-hydroxy-4-(2-methoxyphenyl)-2-phenyl-2,3-dihydro-1H-pyrrolo[3,4-c]pyridin-1-one (250 mg) and 6M hydrochloric acid (15 mL) was heated with reflux for one day, cooled to 0° C., diluted with ethyl acetate, neutralized with 2M aqueous sodium hydroxide solution, and extracted with ethyl acetate. The organic layer was extracted with 5% aqueous sodium hydrogencarbonate solution. The aqueous layer was adjusted to pH=4 with 5% aqueous citric acid solution, and extracted with ethyl acetate. The organic layer was washed with water and brine, dried over anhydrous sodium sulfate, and concentrated under reduced pressure to give the title compound (103 mg).
MS: [M+H]$^+$ 258.0.

C) 2-(4-fluorophenyl)-4-(2-methoxyphenyl)-2,3-dihydro-1H-pyrrolo[3,4-c]pyridin-1-one To a mixture of rac-3-hydroxy-4-(2-methoxyphenyl)furo[3,4-c]pyridin-1(3H)-one (95 mg), 4-fluoroaniline (0.039 mL), THF (10 mL) and AcOH (0.05 mL) was added sodium triacetoxyborohydride (117 mg) at room temperature. The mixture was heated with reflux for 1 hr, cooled to 0° C., diluted with ethyl acetate and 5% aqueous sodium hydrogencarbonate solution, and extracted with ethyl acetate. The organic layer was washed with water and saturated brine, dried over anhydrous sodium sulfate, and concentrated under reduced pressure, and the resulting solid was collected by filtration, and washed with ethyl acetate to give the title compound (20 mg).
$^1$H NMR (300 MHz, DMSO-d$_6$) δ 3.82 (3H, s), 4.95 (2H, s), 7.11 (1H, td, J=7.5, 0.9 Hz), 7.22 (1H, d, J=7.9 Hz), 7.28 (2H, t, J=9.0 Hz), 7.46 (1H, dd, J=7.6, 1.7 Hz), 7.48-7.55 (1H, m), 7.77 (1H, d, J=4.9 Hz), 7.94 (2H, dd, J=9.3, 4.9 Hz), 8.87 (1H, d, J=4.9 Hz).

Example 2

1-(4-fluoro-2-methoxyphenyl)-6-(4-fluorophenyl)-6,7-dihydro-1H-pyrrolo[3,4-b]pyridine-2,5-dione A) methyl 1-(4-fluoro-2-methoxyphenyl)-2-methyl-6-oxo-1,6-dihydropyridine-3-carboxylate To a mixture of 4-fluoro-2-methoxyaniline (1.0 g) and methyl acetoacetate (906 mg) was added indium tribromide (25 mg), and the mixture was stirred overnight at room temperature. To the reaction mixture was added water, and the mixture was extracted with ethyl acetate. The organic layer was separated, washed with saturated brine, dried over anhydrous sodium sulfate, and concentrated under reduced pressure. The residue was purified by silica gel column chromatography (ethyl acetate/petroleum ether) to give methyl (2E)-3-(4-fluoro-2-methoxyanilino)but-2-enoate (1.40 g) as a crude product. To a mixture of the obtained crude product (1.40 g) and THF (25 mL) was added sodium hydride (60% oil, 304 mg) at 0° C. The reaction mixture was stirred at the same temperature for 15 min, methyl propiolate (585 mg) was added thereto, and the mixture was stirred overnight at room temperature. To the mixture was added water, and the mixture was extracted with ethyl acetate. The organic layer was separated, washed with saturated brine, dried over anhydrous sodium sulfate, and concentrated under reduced pressure. The residue was purified by silica gel column chromatography (ethyl acetate/petroleum ether) to give the title compound (890 mg).
MS: [M+H]$^+$ 292.

B) 1-(4-fluoro-2-methoxyphenyl)-6-(4-fluorophenyl)-6,7-dihydro-1H-pyrrolo[3,4-b]pyridine-2,5-dione To a mixture of methyl 1-(4-fluoro-2-methoxyphenyl)-2-methyl-6-oxo-1,6-dihydropyridine-3-carboxylate (150 mg)

and carbon tetrachloride (20 mL) were added NBS (101 mg) and benzoyl peroxide (12 mg) at room temperature, and the mixture was stirred overnight at 77° C. The reaction mixture was cooled to room temperature, and concentrated under reduced pressure to give methyl 2-(bromomethyl)-1-(4-fluoro-2-methoxyphenyl)-6-oxo-1,6-dihydropyridine-3-carboxylate (213 mg) as a crude product. To a mixture of the obtained crude product and MeOH (15 mL) were added 4-fluoroaniline (70 mg) and DIPEA (149 mg) at room temperature, and the mixture was stirred overnight at the same temperature. To the mixture was added water, and the mixture was extracted with ethyl acetate. The organic layer was separated, washed with saturated brine, dried over anhydrous sodium sulfate, and concentrated under reduced pressure. The residue was purified by preparative liquid chromatography (0.05% aqueous ammonia-containing acetonitrile/0.1% aqueous ammonia) to give the title compound (43 mg).

$^1$H NMR (400 MHz, CDCl$_3$) δ 3.84 (3H, s), 4.16-4.37 (2H, m), 6.69 (1H, d, J=9.6 Hz), 6.83-6.88 (2H, m), 7.01-7.08 (2H, m), 7.26-7.30 (1H, m), 7.53-7.59 (2H, m), 7.79 (1H, d, J=9.2 Hz).

Example 7

4-(4-fluoro-2-methoxyphenyl)-2-(4-fluorophenyl)-2,3-dihydro-1H-pyrrolo[3,4-c]pyridin-1-one A)
2-chloro-N-(4-fluorophenyl)pyridine-4-carboxamide A mixture of 2-chloroisonicotinic acid (5.02 g) and thionyl dichloride (23 mL) was refluxed for 3 hr. The mixture was concentrated. To a mixture of the residue and acetonitrile (25 mL) was added a mixture of 4-fluoroaniline (4.25 g), TEA (10.89 g) and acetonitrile (50 mL) at 0° C., and the mixture was stirred at room temperature for 2 hr. To the mixture was added 1M aqueous sodium hydroxide solution at room temperature, and the mixture was stirred at room temperature for 1 hr. To the mixture was added water, and the mixture was extracted with ethyl acetate. The organic layer was separated, washed with water and saturated brine, dried over anhydrous sodium sulfate, and concentrated under reduced pressure. A mixture of the residue and IPE (100 mL) was stirred at room temperature for 30 min. The precipitated solid was collected, washed with IPE, and dried to give the title compound (5.54 g).
MS: [M+H]$^+$ 250.9.

B) rac-4-chloro-2-(4-fluorophenyl)-3-hydroxy-2,3-dihydro-1H-pyrrolo[3,4-c]pyridin-1-one To a mixture of 2-chloro-N-(4-fluorophenyl)pyridine-4-carboxamide (5.54 g) and THF (105 mL) was added 1.6 M normal butyllithium-toluene solution (34.5 mL) at −78° C. The mixture was stirred under nitrogen atmosphere at −78° C. for 1 hr. To the mixture was added DMF (5.13 mL) at −78° C., and the mixture was stirred at −78° C. for 1 hr. To the mixture was added THF (35 mL) at −78° C., and the mixture was warmed to room temperature over 2 hr or longer, and stirred at room temperature for 1 hr. The mixture was neutralized with 2M hydrochloric acid at 0° C., and extracted with ethyl acetate. The organic layer was separated, washed with water and saturated brine, dried over anhydrous sodium sulfate, and concentrated under reduced pressure. The precipitated solid was collected by filtration, and washed with ethyl acetate/IPE to give the title compound (3.34 g).
MS: [M+H]$^+$ 278.9.

C) 4-chloro-2-(4-fluorophenyl)-2,3-dihydro-1H-pyrrolo[3,4-c]pyridin-1-one

To a mixture of rac-4-chloro-2-(4-fluorophenyl)-3-hydroxy-2,3-dihydro-1H-pyrrolo[3,4-c]pyridin-1-one (5.36 g) and TFA (55 mL) was added triethylsilane (21.84 g) at 0° C. The mixture was stirred at room temperature for 48 hr. The mixture was concentrated under reduced pressure, and the residue was diluted with ethyl acetate and THF. The mixture was washed with saturated aqueous sodium hydrogencarbonate solution and saturated brine, dried over anhydrous sodium sulfate, and concentrated under reduced pressure. The precipitated solid was collected by filtration, and washed with IPE to give the title compound (4.74 g).
MS: [M+H]$^+$ 262.9.

D) 4-(4-fluoro-2-methoxyphenyl)-2-(4-fluorophenyl)-2,3-dihydro-1H-pyrrolo[3,4-c]pyridin-1-one To a mixture of 4-chloro-2-(4-fluorophenyl)-2,3-dihydro-1H-pyrrolo[3,4-c]pyridin-1-one (102.3 mg), 4-fluoro-2-methoxyphenyl)boronic acid (132 mg), potassium carbonate (135 mg), DME (2 mL) and water (0.050 mL) was added [1,1-bis(diphenylphosphino)ferrocene]dichloropalladium (II) (28.5 mg) at room temperature. The mixture was stirred overnight under nitrogen atmosphere at 85° C. To the mixture was added water at room temperature, and the mixture was extracted with ethyl acetate. The organic layer was separated, washed with water and saturated brine, dried over anhydrous sodium sulfate, and concentrated under reduced pressure. The residue was purified by silica gel column chromatography (ethyl acetate/hexane), and the obtained solid was washed with ethyl acetate/IPE to give the title compound (57.7 mg).

$^1$H NMR (300 MHz, DMSO-d$_6$) δ 3.84 (3H, s), 4.95 (2H, s), 6.94 (1H, td, J=8.5, 2.3 Hz), 7.13 (1H, dd, J=11.7, 2.3 Hz), 7.22-7.36 (2H, m), 7.50 (1H, dd, J=8.3, 7.2 Hz), 7.77 (1H, d, J=4.9 Hz), 7.87-8.02 (2H, m), 8.86 (1H, d, J=5.3 Hz).

Example 15

1-(5-fluoro-2-methoxyphenyl)-6-(4-fluorophenyl)-6,7-dihydro-1H-pyrrolo[3,4-b]pyridine-2,5-dione A) methyl 1-(5-fluoro-2-methoxyphenyl)-2-methyl-6-oxo-1,6-dihydropyridine-3-carboxylate To a mixture of 5-fluoro-2-methoxyaniline (1.0 g) and methyl acetoacetate (905 mg) was added indium tribromide (25 mg) at room temperature. The mixture was stirred at room temperature for 2 days, to the mixture was added water, and the mixture was extracted with ethyl acetate. The organic layer was separated, washed with saturated brine, dried over anhydrous sodium sulfate, and concentrated under reduced pressure. The residue was purified by silica gel column chromatography (ethyl acetate/petroleum ether) to give methyl (2E)-3-(5-fluoro-2-methoxyanilino)but-2-enoate (1.14 g) as a crude product. To a mixture of the obtained crude product (1.14 g) and THF (20 mL) was added sodium hydride (60% oil, 248 mg) at 0° C., and the mixture was stirred at the same temperature for 15 min. To the reaction mixture was added methyl propiolate (481 mg) at 0°

C., and the mixture was stirred overnight at room temperature. To the mixture was added water, and the mixture was extracted with ethyl acetate. The organic layer was separated, washed with saturated brine, dried over anhydrous sodium sulfate, and concentrated under reduced pressure. The residue was purified by silica gel column chromatography (ethyl acetate/petroleum ether) to give the title compound (270 mg).
MS: [M+H]$^+$ 292.1.

B) 1-(5-fluoro-2-methoxyphenyl)-6-(4-fluorophenyl)-6,7-dihydro-1H-pyrrolo[3,4-b]pyridine-2,5-dione To a mixture of methyl 1-(5-fluoro-2-methoxyphenyl)-2-methyl-6-oxo-1,6-dihydropyridine-3-carboxylate (270 mg) and carbon tetrachloride (15 mL) were added NBS (181 mg) and benzoyl peroxide (22 mg) at room temperature. The mixture was stirred overnight at 70° C. The reaction mixture was cooled to room temperature, and concentrated under reduced pressure to give methyl 2-(bromomethyl)-1-(5-fluoro-2-methoxyphenyl)-6-oxo-1,6-dihydropyridine-3-carboxylate as a crude product. To a mixture of the obtained crude product and MeOH (15 mL) were added 4-fluoroaniline (116 mg) and DIPEA (245 mg) at room temperature, and the mixture was stirred overnight at the same temperature. To the mixture was added water, and the mixture was extracted with ethyl acetate. The organic layer was separated, washed with saturated brine, dried over anhydrous sodium sulfate, and concentrated under reduced pressure. The residue was purified by preparative liquid chromatography (0.05% aqueous ammonia-containing acetonitrile/0.1% aqueous ammonia) to give the title compound (27 mg).
$^1$H NMR (400 MHz, CDCl$_3$) δ 3.83 (3H, s), 4.22-4.37 (2H, m), 6.70 (1H, d, J=9.2 Hz), 7.03-7.14 (4H, m), 7.25-7.28 (1H, m), 7.55-7.67 (2H, m), 7.81 (1H, d, J=9.2 Hz).

Example 21

7-(4-fluoro-2-methoxyphenyl)-2-(4-fluorophenyl)-1,2-dihydro-3H-imidazo[1,5-c]imidazol-3-one A) N-[(5-bromo-1H-imidazol-4-yl)methyl]-4-fluoroaniline To a mixture of 5-bromo-1H-imidazole-4-carbaldehyde (284 mg), 4-fluoroaniline (0.311 mL) and DMF (4.0 mL) was added AcOH (2.0 mL) at room temperature. The mixture was stirred at room temperature for 1 hr. To the mixture was added sodium triacetoxyborohydride (1032 mg) at room temperature. The mixture was stirred overnight at room temperature. To the mixture was added ethyl acetate, and the mixture was poured into water. The organic layer was separated, washed with water and saturated brine, dried over anhydrous sodium sulfate, and concentrated under reduced pressure. To the residue was added IPE, and the precipitate was collected by filtration, and dried under reduced pressure to give the title compound (393.8 mg).
MS: [M+H]$^+$ 269.9.

B) 7-bromo-2-(4-fluorophenyl)-1,2-dihydro-3H-imidazo[1,5-c]imidazol-3-one

To a mixture of N-[(5-bromo-1H-imidazol-4-yl)methyl]-4-fluoroaniline (393 mg), DBU (0.439 mL) and acetonitrile (10 mL) was added CDI (260 mg) at room temperature. The mixture was stirred at room temperature for 3 days. To the mixture was added ethyl acetate at room temperature, and the mixture was added to water. The organic layer was separated, washed with water and saturated brine, dried over anhydrous sodium sulfate, and concentrated under reduced pressure. The residue was purified by silica gel column chromatography (NH, ethyl acetate/hexane) to give the title compound (160.0 mg).
MS: [M+H]$^+$ 295.8.

C) 7-(4-fluoro-2-methoxyphenyl)-2-(4-fluorophenyl)-1,2-dihydro-3H-imidazo[1,5-c]imidazol-3-one To a mixture of 7-bromo-2-(4-fluorophenyl)-1,2-dihydro-3H-imidazo[1,5-c]imidazol-3-one (56.4 mg), (4-fluoro-2-methoxyphenyl)boronic acid (38.8 mg), potassium carbonate (52.7 mg), DME (3.0 mL) and water (1.0 mL) was added [1,1-bis(diphenylphosphino)ferrocene]dichloropalladium (II) (13.94 mg) at room temperature. The mixture was stirred under nitrogen atmosphere at 85° C. for 3 hr. To the mixture were added ethyl acetate and water at room temperature. The organic layer was separated, washed with water and saturated brine, dried over anhydrous sodium sulfate, and concentrated under reduced pressure. The residue was purified by silica gel column chromatography (ethyl acetate/hexane), and washed with IPE to give the title compound (40.9 mg).
$^1$H NMR (300 MHz, CDCl$_3$) δ3.94 (3H, s), 5.05 (2H, s), 6.68 (1H, dd, J=10.5, 2.3 Hz), 6.80 (1H, td, J=8.3, 2.6 Hz), 7.16 (2H, dd, J=9.0, 7.9 Hz), 7.59-7.70 (2H, m), 8.08 (1H, s), 8.13 (1H, dd, J=8.9, 7.0 Hz).

Example 34 methyl 3-(difluoromethoxy)-4-[2-(4-fluorophenyl)-1-oxo-2,3-dihydro-1H-pyrrolo[3,4-c]pyridin-4-yl]benzoate To a mixture of methyl 4-bromo-3-(difluoromethoxy)benzoate (1.03 g), 4,4,4',4',5,5,5',5'-octamethyl-2,2'-bi-1,3,2-dioxaborolane (1.853 g), potassium acetate (1.074 g) and DMF (20 mL) was added [1,1-bis(diphenylphosphino)ferrocene]dichloropalladium(II) (0.267 g) at room temperature. The mixture was stirred under nitrogen atmosphere at 80° C. for 7 hr. To the mixture was added ethyl acetate at room temperature, and the insoluble substance was removed by filtration. The filtrate was washed with water and saturated brine, dried over anhydrous sodium sulfate, and concentrated under reduced pressure. The residue was purified by silica gel column chromatography (ethyl acetate/hexane) to give methyl 3-(difluoromethoxy)-4-(4,4,5,5-tetramethyl-1,3,2-dioxaborolan-2-yl)benzoate as a crude product. To a mixture of the obtained crude product, 4-chloro-2-(4-fluorophenyl)-2,3-dihydro-1H-pyrrolo[3,4-c]pyridin-1-one (500.0 mg), sodium carbonate (504 mg), DME (10 mL) and water (0.250 mL) was added [1,1-bis(diphenylphosphino)ferrocene]dichloropalladium(II) (139 mg) at room temperature. The mixture was stirred under nitrogen atmosphere at 85° C. for 6 hr. To the mixture was added ethyl acetate at room temperature, and the insoluble substance was removed by filtration. The filtrate was washed with water and saturated brine, dried over anhydrous sodium sulfate, and concentrated under reduced pressure. The residue was purified by silica gel column chromatography (ethyl acetate/hexane), and the precipitated solid was washed with IPE/hexane to give the title compound (458.1 mg).
$^1$H NMR (300 MHz, DMSO-d$_6$) δ 3.94 (3H, s), 5.05 (2H, s), 7.02-7.61 (3H, m), 7.77-8.07 (6H, m), 8.93 (1H, d, J=4.9 Hz).

Example 35

3-(difluoromethoxy)-4-[2-(4-fluorophenyl)-1-oxo-2,3-dihydro-1H-pyrrolo[3,4-c]pyridin-4-yl]benzoic acid To a mixture of methyl 3-(difluoromethoxy)-4-[2-(4-fluorophenyl)-1-oxo-2,3-dihydro-1H-pyrrolo[3,4-c]pyridin-4-yl]benzoate (446.7 mg), THF (5 mL) and MeOH (5 mL) was added 2M aqueous sodium hydroxide solution (5 mL) at 0° C. The mixture was stirred at room temperature for 1 hr. The mixture was neutralized with 1M hydrochloric acid at 0° C., and extracted with ethyl acetate/THF. The organic layer was separated, washed with water and saturated brine, dried over anhydrous sodium sulfate, and concentrated under reduced pressure to give the title compound (411.0 mg).

$^1$H NMR (300 MHz, DMSO-d$_6$) δ 5.05 (2H, s), 6.99-7.58 (3H, m), 7.71 (1H, d, J=7.5 Hz), 7.80-7.88 (2H, m), 7.90-8.02 (3H, m), 8.91 (1H, d, J=4.9 Hz).

Example 36

2-(4-fluorophenyl)-4-[3-(morpholin-4-yl)pyridin-4-yl]-2,3-dihydro-1H-pyrrolo[3,4-c]pyridin-1-one

A) 4-(4-chloropyridin-3-yl)morpholine

A mixture of 3-bromo-4-chloropyridine (3.0 g), morpholine (1.358 g), Pd2(dba)3 (0.428 g), XANTPHOS (0.812 g), sodium tert-butoxide (2.247 g) and toluene (60 mL) was stirred under argon atmosphere at 110° C. for 3 hr. To the reaction mixture was added water at room temperature, and the mixture was extracted with ethyl acetate. The organic layer was washed with water and saturated brine, dried over anhydrous sodium sulfate, and concentrated under reduced pressure. The residue was purified by silica gel column chromatography (ethyl acetate/hexane) to give the title compound (2.64 g).

MS: [M+H]$^+$ 199.1.

B) 2-(4-fluorophenyl)-4-[3-(morpholin-4-yl)pyridin-4-yl]-2,3-dihydro-1H-pyrrolo[3,4-c]pyridin-1-one A mixture of 4-(4-chloropyridin-3-yl)morpholine (200 mg), 4,4,5,5-tetramethyl-1,3,2-dioxaborolane (0.291 mL), palladium acetate (17.18 mg), 2-(dicyclohexylphosphino)biphenyl (106 mg), TEA (0.842 mL) and toluene (6.0 mL) was stirred under argon atmosphere at 100° C. for 15 hr. The reaction mixture was cooled to room temperature, 4-chloro-2-(4-fluorophenyl)-2,3-dihydro-1H-pyrrolo[3,4-c]pyridin-1-one (39.7 mg), [1,1-bis(diphenylphosphino)ferrocene]dichloropalladium(II) (7.37 mg), sodium carbonate (32 mg), water (0.6 mL) and EtOH (0.6 mL) were added thereto, and the mixture was stirred under argon atmosphere at 100° C. for 5 hr. The reaction mixture was cooled to room temperature, water was added thereto, and the mixture was extracted with ethyl acetate. The organic layer was washed with water and saturated brine, dried over anhydrous sodium sulfate, and concentrated under reduced pressure. The residue was purified by silica gel column chromatography (NH, ethyl acetate/hexane) to give the title compound (14 mg).

$^1$H NMR (300 MHz, DMSO-d$_6$) δ 3.26-3.30 (4H, m), 3.76-3.82 (4H, m), 5.47 (2H, s), 7.29-7.37 (2H, m), 7.81-7.84 (2H, m), 7.98-8.04 (2H, m), 8.49 (1H, d, J=2.8 Hz), 8.61 (1H, d, J=1.9 Hz), 8.93 (1H, d, J=4.9 Hz).

Example 40

3-(difluoromethoxy)-4-[2-(4-fluorophenyl)-1-oxo-2,3-dihydro-1H-pyrrolo[3,4-c]pyridin-4-yl]benzamide To a mixture of 3-(difluoromethoxy)-4-[2-(4-fluorophenyl)-1-oxo-2,3-dihydro-1H-pyrrolo[3,4-c]pyridin-4-yl]benzoic acid (138.2 mg), DIPEA (216 mg) and DMF (3 mL) were added 1-hydroxybenzotriazole-ammonia salt (254 mg) and 1-ethyl-3-(3-dimethylaminopropyl)carbodiimide hydrochloride (192 mg) at room temperature. The mixture was stirred overnight at room temperature. To the mixture was added water at 0° C., and the mixture was extracted with ethyl acetate. The organic layer was separated, washed with saturated aqueous sodium hydrogencarbonate solution and saturated brine, dried over anhydrous sodium sulfate, and concentrated under reduced pressure. The residue was washed with ethyl acetate/IPE to give the title compound (95.6 mg).

$^1$H NMR (300 MHz, DMSO-d$_6$) δ 5.05 (2H, s), 6.98-7.53 (3H, m), 7.65 (1H, s), 7.77 (1H, d, J=7.9 Hz), 7.82-7.89 (2H, m), 7.90-8.02 (3H, m), 8.23 (1H, s), 8.92 (1H, d, J=4.9 Hz).

Example 41

3-(difluoromethoxy)-4-[2-(4-fluorophenyl)-1-oxo-2,3-dihydro-1H-pyrrolo[3,4-c]pyridin-4-yl]benzonitrile To a mixture of 3-(difluoromethoxy)-4-[2-(4-fluorophenyl)-1-oxo-2,3-dihydro-1H-pyrrolo[3,4-c]pyridin-4-yl]benzamide (70.3 mg), pyridine (53.8 mg) and THF (2 mL) was added trifluoroacetic acid anhydride (0.048 mL) at 0° C. The mixture was stirred at room temperature for 2 hr. To the mixture was added saturated aqueous ammonium chloride solution at 0° C., and the mixture was extracted with ethyl acetate. The organic layer was separated, washed with water and saturated brine, dried over anhydrous sodium sulfate, and concentrated under reduced pressure. The residue was washed with ethyl acetate/IPE to give the title compound (41.8 mg).

$^1$H NMR (300 MHz, DMSO-d$_6$) δ 5.04 (2H, s), 6.98-7.62 (3H, m), 7.83-8.05 (6H, m), 8.93 (1H, d, J=4.9 Hz).

Example 57

4-[2-(difluoromethoxy)-4-fluorophenyl]-2-[5-(trifluoromethoxy)pyridin-2-yl]-2,3-dihydro-1H-pyrrolo[3,4-c]pyridin-1-one

A) 2-[2-(difluoromethoxy)-4-fluorophenyl]-4,4,5,5-tetramethyl-1,3,2-dioxaborolane To a mixture of 1-bromo-2-(difluoromethoxy)-4-fluorobenzene (4.40 g), 4,4,4',4',5,5,5',5'-octamethyl-2,2'-bi-1,3,2-dioxaborolane (5.56 g), potassium acetate (2.69 g) and CPME (40 mL) was added chloro(2-dicyclohexylphosphino-2',4',6'-triisopropyl-1,1'-biphenyl) [2-(2'-amino-1,1'-biphenyl)]palladium(II) (1.436 g) at room temperature. The mixture was stirred under nitrogen atmosphere at 100° C. for 16 hr. To the mixture was added water, and the insoluble substance was removed by filtration. The filtrate was extracted with ethyl acetate. The organic layer was separated, washed with water and saturated brine, dried over anhydrous sodium sulfate, and concentrated under reduced pressure. The residue was purified by silica gel column chromatography (ethyl acetate/hexane) to give the title compound (3.02 g).

$^1$H NMR (300 MHz, DMSO-d$_6$) δ1.28 (12H, s), 6.86-7.40 (3H, m), 7.71 (1H, t, J=7.9 Hz).

B) 4-[2-(difluoromethoxy)-4-fluorophenyl]-2,3-dihydro-1H-pyrrolo[3,4-c]pyridin-1-one To a mixture of 4-chloro-2,3-dihydro-1H-pyrrolo[3,4-c]pyridin-1-one (600 mg), 2-[2-(difluoromethoxy)-4-fluorophenyl]-4,4,5,5-tetramethyl-1,3,2-dioxaborolane (1333 mg), potassium carbonate (1.23 g), DME (8 mL) and water (0.200 mL) was added [1,1-bis(diphenylphosphino)ferrocene]dichloropalladium(II) (260 mg) at room temperature. The mixture was stirred under nitrogen atmosphere at 85° C. for 1 hr. To the mixture was added water at room temperature, and the mixture was extracted with ethyl acetate. The organic layer was separated, washed with water so and saturated brine, dried over anhydrous sodium sulfate, and concentrated under reduced pressure. The residue was purified by silica gel column chromatography (NH, ethyl acetate/hexane) to give the title compound (580 mg).

MS: [M+H]$^+$ 294.9.

C) 4-[2-(difluoromethoxy)-4-fluorophenyl]-2-[5-(trifluoromethoxy)pyridin-2-yl]-2,3-dihydro-1H-pyrrolo[3,4-c]pyridin-1-one To a mixture of 2-chloro-5-(trifluoromethoxy)pyridine (81 mg), 4-[2-(difluoromethoxy)-4-fluorophenyl]-2,3-dihydro-1H-pyrrolo[3,4-c]pyridin-1-one (100.2 mg), sodium tert-butoxide (49.1 mg) and toluene (4 mL) was added chloro(2-dicyclohexylphosphino-2',4',6'-triisopropyl-1,1'-biphenyl) [2-(2'-amino-1,1'-biphenyl)]palladium(II) (26.8 mg) at room temperature. The mixture was stirred under nitrogen atmosphere at 110° C. for 1 hr. To the mixture were added ethyl acetate and water at room temperature, and the mixture was extracted with ethyl acetate. The organic layer was separated, washed with water and saturated brine, dried over anhydrous sodium sulfate, and concentrated under reduced pressure. The residue was washed with ethyl acetate/IPE to give the title compound (106.8 mg).

$^1$H NMR (300 MHz, DMSO-d$_6$) δ 5.10 (2H, s), 6.92-7.53 (3H, m), 7.74 (1H, dd, J=8.7, 6.4 Hz), 7.89 (1H, d, J=5.3 Hz), 8.08 (1H, dd, J=9.0, 2.3 Hz), 8.56 (1H, d, J=2.6 Hz), 8.66 (1H, d, J=9.0 Hz), 8.92 (1H, d, J=4.9 Hz).

Example 78

4-[4-(azetidine-1-carbonyl)-2-(difluoromethoxy)phenyl]-2-(4-fluorophenyl)-2,3-dihydro-1H-pyrrolo[3,4-c]pyridin-1-one To a mixture of 3-(difluoromethoxy)-4-[2-(4-fluorophenyl)-1-oxo-2,3-dihydro-1H-pyrrolo[3,4-c]pyridin-4-yl]benzoic acid (63.6 mg), azetidine (13.15 mg), DIPEA (59.5 mg) and DMF (1 mL) was added HATU (88 mg) at room temperature. The mixture was stirred overnight at room temperature. To the mixture was added water at room temperature, and the mixture was extracted with ethyl acetate. The organic layer was separated, washed with water and saturated brine, dried over anhydrous sodium sulfate, and concentrated under reduced pressure. The residue was purified by silica gel column chromatography (ethyl acetate/hexane), and washed with IPE to give the title compound (10.6 mg).

$^1$H NMR (300 MHz, DMSO-d$_6$) δ 2.21-2.40 (2H, m), 4.10 (2H, t, J=7.7 Hz), 4.39 (2H, t, J=7.5 Hz), 5.05 (2H, s), 6.98-7.68 (5H, m), 7.71-7.79 (1H, m), 7.86 (1H, d, J=4.9 Hz), 7.89-8.01 (2H, m), 8.91 (1H, d, J=4.9 Hz).

Example 79

5-(4-fluorophenyl)-1-[4-fluoro-2-(2,2,2-trifluoroethoxy)phenyl]-5,6-dihydropyrrolo[3,4-c]pyrazol-4(1H)-one A) (3E)-3-[(dimethylamino)methylidene]-1-(4-fluorophenyl)pyrrolidine-2,4-dione To a mixture of 1-(4-fluorophenyl)-4-hydroxy-1,5-dihydro-2H-pyrrol-2-one (4.70 g) and toluene (50 mL) was added 1,1-dimethoxy-N,N-dimethylmethanamine (3.88 mL) at room temperature. The mixture was stirred at 50° C. for 3 hr, and then stirred overnight at room temperature. The precipitated solid was collected by filtration, and washed with toluene and hexane to give the title compound (5.98 g).

MS: [M+H]$^+$ 249.0.

B) [4-fluoro-2-(2,2,2-trifluoroethoxy)phenyl]hydrazine hydrochloride

To a mixture of 4-fluoro-2-(2,2,2-trifluoroethoxy)aniline (3.00 g), conc. hydrochloric acid (10 mL) and water (10 mL) was added dropwise a mixture of sodium nitrite (1.09 g) and water (3 mL) at 0° C., and the mixture was stirred at 0° C. for 0.5 hr. To the reaction mixture was added dropwise a mixture of tin dichloride (6.80 g) and conc. hydrochloric acid (10 mL), and the mixture was stirred within from 0° C. to at room temperature for 1 hr. The precipitated solid was collected by filtration, and washed with 6M hydrochloric acid and IPE to give the title compound (2.43 g).

MS: [M+H]$^+$ 225.0.

C) 5-(4-fluorophenyl)-1-[4-fluoro-2-(2,2,2-trifluoroethoxy)phenyl]-5,6-dihydropyrrolo[3,4-c]pyrazol-4(1H)-one To a mixture of (3E)-3-[(dimethylamino)methylidene]-1-(4-fluorophenyl)pyrrolidine-2,4-dione (497 mg), [4-fluoro-2-(2,2,2-trifluoroethoxy)phenyl]hydrazine hydrochloride (573 mg) and EtOH (10 mL) was added TEA (0.307 mL) at room temperature, and the mixture was heated with reflux for 2 hr, and cooled to room temperature. The precipitated solid was collected by filtration, and washed with EtOH. To the obtained solid were added toluene (10 mL) and 4-methylbenzenesulfonic acid monohydrate (114 mg) at room temperature, and the mixture was heated with reflux for 2 hr. To the mixture was added ethyl acetate, and the mixture was adjusted to pH=9-10 with 5% aqueous sodium hydrogencarbonate solution, and extracted with ethyl acetate. The organic layer was washed with water and brine, dried over anhydrous sodium sulfate, and filtered through pad filled with basic silica gel, and the filtrate was concentrated under reduced pressure. To the residue was added ethyl acetate/hexane, and the solid was collected by filtration, and washed with ethyl acetate/hexane to give the title compound (435 mg).

$^1$H NMR (300 MHz, DMSO-d$_6$) δ 4.95 (2H, s), 5.02 (2H, q, J=8.7 Hz), 7.13 (1H, td, J=8.5, 2.6 Hz), 7.19-7.31 (2H, m), 7.48 (1H, dd, J=10.7, 2.4 Hz), 7.69-7.78 (3H, m), 8.08 (1H, s).

Example 83

4-[4-fluoro-2-(2,2,2-trifluoroethoxy)phenyl]-2-[1-(2,2,2-trifluoroethyl)-1H-pyrazol-4-yl]-2,3-dihydro-1H-pyrrolo[3,4-c]pyridin-1-one A) 4-chloro-2-[1-(2,2,2-trifluoroethyl)-1H-pyrazol-4-yl]-2,3-dihydro-1H-pyrrolo[3,4-c]pyridin-1-one To a mixture of 1-(2,2,2-trifluoroethyl)-1H-pyrazol-4-amine hydrochloride (377 mg), DIPEA (605 mg) and DMF (6 mL) was added a mixture of methyl 3-(bromomethyl)-2-chloropyridine-4-carboxylate (412.6 mg) and DMF (6 mL) at room temperature, and the mixture was stirred at room temperature for 2 hr, and then stirred overnight at 50° C. To the mixture were added ethyl acetate and water at room temperature, and the mixture was extracted with ethyl acetate. The organic layer was separated, washed with saturated brine, dried over anhydrous sodium sulfate, and concentrated under reduced pressure. The residue was washed with ethyl acetate/IPE to give the title compound (343.1 mg).

MS: [M+H]$^+$ 316.9.

B) 4-[4-fluoro-2-(2,2,2-trifluoroethoxy)phenyl]-2-[1-(2,2,2-trifluoroethyl)-1H-pyrazol-4-yl]-2,3-dihydro-1H-pyrrolo[3,4-c]pyridin-1-one To a mixture of 1-bromo-4-fluoro-2-(2,2,2-trifluoroethoxy)benzene (3.65 g), 4,4,4',4',5,5,5',5'-octamethyl-2,2'-bi-1,3,2-dioxaborolane (4.07 g), potassium acetate (1.968 g) and CPME (40 mL) was added chloro(2-dicyclohexylphosphino-2',4',6'-triisopropyl-1,1'-biphenyl) [2-(2'-amino-1,1'-biphenyl)]palladium(II) (1.052 g) at room temperature. The mixture was stirred under nitrogen atmosphere at 100° C. for 16 hr. To the mixture was added water, the insoluble substance was removed by filtration, and the filtrate was extracted with ethyl acetate. The organic layer was separated, washed with water and saturated brine, dried over anhydrous sodium sulfate, and concentrated under reduced pressure to give 2-[4-fluoro-2-(2,2,2-trifluoroethoxy)phenyl]-4,4,5,5-tetramethyl-1,3,2-dioxaborolane (4.16 g) as a crude product. To a mixture of the obtained crude product (150 mg), 4-chloro-2-[1-(2,2,2-trifluoroethyl)-1H-pyrazol-4-yl]-2,3-dihydro-1H-pyrrolo[3,4-c]pyridin-1-one (76.4 mg), potassium carbonate (83 mg), DME (4 mL) and water (0.100 mL) was added [1,1-bis(diphenylphosphino)ferrocene]dichloropalladium(II) (17.65 mg) at room temperature. The mixture was stirred overnight under nitrogen atmosphere at 85° C. To the mixture was added ethyl acetate at room temperature, and the insoluble substance was removed by filtration. The filtrate was washed with water and saturated brine, dried over anhydrous sodium sulfate, and concentrated under reduced pressure. The residue was purified by silica gel column chromatography (NH, ethyl acetate/hexane), and washed with IPE to give the title compound (20.1 mg).

$^1$H NMR (300 MHz, DMSO-d$_6$) δ 4.77-4.98 (4H, m), 5.19 (2H, q, J=9.3 Hz), 7.09 (1H, td, J=8.5, 2.3 Hz), 7.34 (1H, dd, J=11.1, 2.4 Hz), 7.56 (1H, dd, J=8.5, 7.0 Hz), 7.78 (1H, d, J=5.3 Hz), 7.94 (1H, s), 8.43 (1H, s), 8.86 (1H, d, J=4.9 Hz).

Example 85

2-(4-fluorophenyl)-4-(3-methoxy-2-methylpyridin-4-yl)-2,3-dihydro-1H-pyrrolo[3,4-c]pyridin-1-one A) 3-methoxy-2-methyl-4H-pyran-4-one To a mixture of potassium hydroxide (4.89 g) and water (50 mL) was added 3-hydroxy-2-methyl-4H-pyran-4-one (10.00 g) at room temperature, and dimethyl sulfate (7.52 mL) was added dropwise thereto at room temperature. The mixture was stirred at 70° C. for 5 hr. To the reaction mixture was added dimethyl sulfate (1 mL) at room temperature, and the mixture was stirred at 70° C. for 5 hr. The mixture was neutralized with 1M hydrochloric acid at 0° C., and extracted with ethyl acetate and diethyl ether. The organic layer was separated, washed with water and saturated brine, dried over anhydrous magnesium sulfate, and concentrated under reduced pressure. The residue was purified by silica gel column chromatography (NH, ethyl acetate/hexane) to give the title compound (7.586 g).

MS: [M+H]$^+$ 141.0.

B) 4-bromo-3-methoxy-2-methylpyridine

To a mixture of 3-methoxy-2-methyl-4H-pyran-4-one (7.586 g) and EtOH (80 mL) was added 28% aqueous ammonia (80 mL) at room temperature. The mixture was stirred overnight at 70° C. The mixture was concentrated under reduced pressure to give 3-methoxy-2-methylpyridin-4(1H)-one (7.46 g) as a crude product. To a mixture of the obtained crude product (1.00 g) and DMF (25 mL) was added phosphorus tribromide (4.32 g) at 0° C. The mixture was stirred at room temperature for 3 hr. The mixture was added to saturated aqueous sodium hydrogencarbonate solution at room temperature, and the mixture was extracted with ethyl acetate. The organic layer was separated, washed with saturated aqueous sodium hydrogencarbonate solution and saturated brine, dried over anhydrous sodium sulfate, and concentrated under reduced pressure. The residue was purified by silica gel column chromatography (ethyl acetate/hexane) to give the title compound (1.1685 g).

MS: [M+H]$^+$ 201.9.

C) 2-(4-fluorophenyl)-4-(3-methoxy-2-methylpyridin-4-yl)-2,3-dihydro-1H-pyrrolo[3,4-c]pyridin-1-one To a mixture of 4-bromo-3-methoxy-2-methylpyridine (101 mg), 4,4,4',4',5,5,5',5'-octamethyl-2,2'-bi-1,3,2-dioxaborolane (152 mg), potassium acetate (73.6 mg) and CPME (3.0 mL) was added chloro(2-dicyclohexylphosphino-2',4',6'-triisopropyl-1,1'-biphenyl) [2-(2'-amino-1,1'-biphenyl)]palladium(II) (39.3 mg) at room temperature. The mixture was stirred under argon atmosphere at 100° C. for 16 hr. The insoluble substance was removed by filtration, and the filtrate was concentrated under reduced pressure. To a mixture of the obtained residue, 4-chloro-2-(4-fluorophenyl)-2,3-dihydro-1H-pyrrolo[3,4-c]pyridin-1-one (92 mg), potassium carbonate (138 mg), DME (3.0 mL) and water (1.0 mL) was added [1,1-bis(diphenylphosphino)ferrocene]dichloropalladium(II) (36.6 mg) at room temperature. The mixture was stirred under argon atmosphere at 100° C. for 4 hr. To the mixture were added ethyl acetate and water, and the organic layer was separated, washed with water and saturated brine, dried over anhydrous sodium sulfate, and concentrated under reduced pressure. The residue was purified by silica gel column chromatography (NH, ethyl acetate/hexane) and silica gel column chromatography (MeOH/ethyl acetate), and washed with IPE to give the title compound (13.2 mg).

$^1$H NMR (300 MHz, CDCl$_3$) δ 1.10 (3H, s), 1.90 (3H, s), 3.35 (2H, s), 5.58 (2H, t, J=8.9 Hz), 5.77 (1H, d, J=4.9 Hz), 6.27 (2H, dd, J=9.2, 4.7 Hz), 6.34 (1H, d, J=4.9 Hz), 6.89 (1H, d, J=4.9 Hz), 7.40 (1H, d, J=4.9 Hz).

Example 87

2-(4-fluorophenyl)-7-[2-(2,2,2-trifluoroethoxy)phenyl]-1,2-dihydro-3H-pyrrolo[3,4-c]pyridin-3-one A) 7-bromo-2-(4-fluorophenyl)-1,2-dihydro-3H-pyrrolo[3,4-c]pyridin-3-one A mixture of methyl 5-bromo-4-methylpyridine-3-carboxylate (6.45 g), NBS (5.49 g), AIBN (460 mg) and carbon tetrachloride (100 mL) was heated with reflux for 15 hr. The mixture was filtered, and the filtrate was concentrated under reduced pressure to give methyl 5-bromo-4-(bromomethyl)pyridine-3-carboxylate (9.90 g) as a crude product. A mixture of the obtained crude product (9.90 g), 4-fluoroaniline (5.34 g), DIPEA (12.4 g) and MeOH (100 mL) was stirred at room temperature for 15 hr. The mixture was added to water at room temperature, and the mixture was extracted with ethyl acetate. The organic layer was separated, washed with saturated brine, dried over anhydrous sodium sulfate, and concentrated under reduced pressure. The residue was purified by silica gel column chromatography (ethyl acetate/petroleum ether) to give the title compound (5.10 g).

$^1$H NMR (400 MHz, DMSO-d$_6$) δ 5.08 (2H, s), 7.32 (2H, t, J=8.8 Hz), 7.94 (2H, dd, J=9.2, 4.8 Hz), 8.95-9.05 (2H, m).

B) 2-(4-fluorophenyl)-7-[2-(2,2,2-trifluoroethoxy)phenyl]-1,2-dihydro-3H-pyrrolo[3,4-c]pyridin-3-one To a mixture of 1-bromo-2-(2,2,2-trifluoroethoxy)benzene (0.084 g), 4,4,4',4',5,5,5',5'-octamethyl-2,2'-bi-1,3,2-dioxaborolane (0.101 g), potassium acetate (0.049 g) and CPME (3.0 mL) was added chloro(2-dicyclohexylphosphino-2',4',6'-triisopropyl-1,1'-biphenyl) [2-(2'-amino-1,1'-biphenyl)]palladium(II) (0.026 g) at room temperature. The mixture was stirred under nitrogen atmosphere at 100° C. for 16 hr. To the mixture were added ethyl acetate and water, the mixture was filtered, and the filtrate was extracted with ethyl acetate. The organic layer was separated, washed with water and saturated brine, dried over anhydrous sodium sulfate, and concentrated under reduced pressure to give 4,4,5,5-tetramethyl-2-[2-(2,2,2-trifluoroethoxy)phenyl]-1,3,2-dioxaborolane as a crude product. To a mixture of the obtained crude product, 7-bromo-2-(4-fluorophenyl)-1,2-dihydro-3H-pyrrolo[3,4-c]pyridin-3-one (67.6 mg), potassium carbonate (60.8 mg), DME (3.0 mL) and water (1.0 mL) was added [1,1-bis(diphenylphosphino)ferrocene]dichloropalladium(II) (16.1 mg) at room temperature. The mixture was stirred under nitrogen atmosphere at 85° C. for 2 hr. To the mixture were added water and ethyl acetate at room temperature. The organic layer was separated, washed with water and saturated brine, dried over anhydrous sodium sulfate, and concentrated under reduced pressure. The residue was purified by silica gel column chromatography (ethyl acetate/hexane), and washed with IPE to give the title compound (49.1 mg).

$^1$H NMR (300 MHz, CDCl$_3$) δ 4.37 (2H, q, J=8.2 Hz), 4.81 (2H, s), 7.04-7.16 (3H, m), 7.17-7.30 (1H, m), 7.35-7.41 (1H, m), 7.48-7.56 (1H, m), 7.74 (2H, dd, J=9.2, 4.7 Hz), 8.74 (1H, s), 9.18 (1H, s).

Example 90

2-[6-(difluoromethoxy)pyridazin-3-yl]-4-[4-fluoro-2-(2,2,2-trifluoroethoxy)phenyl]-2,3-dihydro-1H-pyrrolo[3,4-c]pyridin-1-one A) 3-chloro-6-(difluoromethoxy)pyridazine To a mixture of sodium hydride (60% oil, 0.827 g) and acetonitrile (50 mL) was added 6-chloropyridazin-3-ol (1.00 g) at room temperature. The reaction mixture was stirred at room temperature for 3 hr, and difluoro(fluorosulfonyl)acetic acid (1.346 mL) was added dropwise thereto. The mixture was stirred at room temperature for 16 hr. To the mixture was added ethyl acetate at room temperature, and the mixture was poured into water. The organic layer was separated, washed with water and saturated brine, dried over anhydrous sodium sulfate, and concentrated under reduced pressure. The residue was purified by silica gel column chromatography (ethyl acetate/hexane) to give the title compound (462.4 mg).

MS: [M+H]$^+$ 180.9.

B) 2-[6-(difluoromethoxy)pyridazin-3-yl]-4-[4-fluoro-2-(2,2,2-trifluoroethoxy)phenyl]-2,3-dihydro-1H-pyrrolo[3,4-c]pyridin-1-one To a mixture of 3-chloro-6-(difluoromethoxy)pyridazine (81.4 mg), 4-[4-fluoro-2-(2,2,2-trifluoroethoxy)phenyl]-2,3-dihydro-1H-pyrrolo[3,4-c]pyridin-1-one (73.5 mg), sodium tert-butoxide (23.83 mg) and toluene (2 mL) was added chloro(2-dicyclohexylphosphino-2',4',6'-triisopropyl-1,1'-biphenyl) [2-(2'-amino-1,1'-biphenyl)]palladium(II) (17.74 mg) at room temperature. The mixture was stirred under argon atmosphere at 60° C. for 1 hr, and then stirred at 80° C. for 3 hr. The mixture was purified by silica gel column chromatography (NH, ethyl acetate/hexane), followed by HPLC (L-Column 2 ODS, mobile phase: water/acetonitrile (containing 0.1% TFA)), and the obtained fraction was concentrated under reduced pressure to give the title compound (16.0 mg).

$^1$H NMR (300 MHz, CDCl$_3$) δ 4.36 (2H, q, J=7.9 Hz), 5.20 (2H, s), 6.77 (1H, dd, J=9.8, 2.3 Hz), 6.97 (1H, td, J=8.1, 2.3 Hz), 7.27-7.33 (1H, m), 7.34-7.88 (3H, m), 8.93 (1H, d, J=4.9 Hz), 9.07 (1H, d, J=9.8 Hz).

Example 91

2-[5-(difluoromethoxy)pyridin-2-yl]-4-[3-(2,2,2-trifluoroethoxy)pyridin-4-yl]-2,3-dihydro-1H-pyrrolo[3,4-c]pyridin-1-one A) 4-[3-(2,2,2-trifluoroethoxy)pyridin-4-yl]-2,3-dihydro-1H-pyrrolo[3,4-c]pyridin-1-one A mixture of 4-bromo-3-(2,2,2-trifluoroethoxy)pyridine (2.30 g), 4,4,4',4',5,5,5',5'-octamethyl-2,2'-bi-1,3,2-dioxaborolane (2.60 g), chloro(2-dicyclohexylphosphino-2',4',6'-triisopropyl-1,1'-biphenyl) [2-(2'-amino-1,1'-biphenyl)]palladium(II) (0.671 g), potassium acetate (1.256 g) and CPME (25 mL) was stirred under argon atmosphere at 100° C. for 21 hr. The mixture was filtered, and the filtrate was washed with water and saturated brine, dried over anhydrous sodium sulfate, and concentrated under reduced pressure to give 4-(4,4,5,5-tetramethyl-1,3,2-dioxaborolan-2-yl)-3-(2,2,2-trifluoroethoxy)pyridine as a crude product. A mixture of the obtained crude product, 4-chloro-2,3-dihydro-1H-pyrrolo[3,4-c]pyridin-1-one (700 mg), potassium carbonate (1435 mg), [1,1-bis(diphenylphosphino)ferrocene]dichloropalladium(II) (304 mg), DME (50 mL) and water (5 mL) was stirred under nitrogen atmosphere at 85° C. for 4 hr. To the mixture was added water at room temperature, and the mixture was extracted with ethyl acetate. The organic layer was separated, washed with water and saturated brine, dried over anhydrous sodium sulfate, and concentrated under reduced pressure. The residue was purified by silica gel column chromatography (ethyl acetate/hexane and MeOH/ethyl acetate), and purified by silica gel column chromatography (NH, MeOH/ethyl acetate) to give the title compound (247 mg).

MS: [M+H]$^+$ 309.9.

B) 2-[5-(difluoromethoxy)pyridin-2-yl]-4-[3-(2,2,2-trifluoroethoxy)pyridin-4-yl]-2,3-dihydro-1H-pyrrolo[3,4-c]pyridin-1-one To a mixture of 2-chloro-5-(difluoromethoxy)pyridine (18.25 mg), 4-[3-(2,2,2-trifluoroethoxy)pyridin-4-yl]-2,3-dihydro-1H-pyrrolo[3,4-c]pyridin-1-one (26.2 mg), sodium tert-butoxide (12.21 mg) and toluene (2 mL) was added chloro(2-dicyclohexylphosphino-2',4',6'-triisopropyl-1,1'-biphenyl) [2-(2'-amino-1,1'-biphenyl)]palladium(II) (6.67 mg) at room temperature. The mixture was stirred under argon atmosphere at 110° C. for 90 min. The residue was purified by silica gel column chromatography (NH, ethyl acetate/hexane), and washed with IPE to give the title compound (27.1 mg).

$^1$H NMR (300 MHz, CDCl$_3$) δ 4.47 (2H, q, J=7.8 Hz), 5.12 (2H, s), 6.27-6.81 (1H, m), 7.51 (1H, d, J=4.9 Hz), 7.58-7.66 (1H, m), 7.91 (1H, d, J=4.9 Hz), 8.24 (1H, d, J=2.6 Hz), 8.54 (1H, s), 8.57 (1H, d, J=4.5 Hz), 8.71 (1H, d, J=9.0 Hz), 8.95 (1H, d, J=4.9 Hz).

Example 92

5-(4-fluorophenyl)-1-[4-fluoro-2-(2,2,2-trifluoroethoxy)phenyl]-3-methyl-5,6-dihydropyrrolo[3,4-c]pyrazol-4(1H)-one A) methyl N-(4-fluorophenyl)-N-(3-oxobutanoyl)glycinate A mixture of methyl N-(4-fluorophenyl)glycinate (1.83 g), 2,2,6-trimethyl-4H-1,3-dioxin-4-one (1.46 mL) and toluene (20 mL) was heated with reflux for 6 hr, and concentrated under reduced pressure. The residue was purified by silica gel column chromatography (ethyl acetate/hexane) to give the title compound (2.51 g).

MS: [M+H]$^+$ 268.0.

B) 3-acetyl-1-(4-fluorophenyl)-4-hydroxy-1,5-dihydro-2H-pyrrol-2-one

To a solution of methyl N-(4-fluorophenyl)-N-(3-oxobutanoyl)glycinate (2.50 g) in EtOH (25 mL) was added 20% sodium ethoxide-EtOH solution (8.14 mL) at room temperature, and the mixture was heated with reflux for 6 hr. The mixture was concentrated under reduced pressure so as to become a half volume, and the residue was diluted with water, and the mixture was washed with IPE, cooled to 0° C., and adjusted to pH=5 with 2M hydrochloric acid. The precipitated solid was collected by filtration, and washed with water to give the title compound (1.68 g).

MS: [M+H]$^+$ 235.9.

C) 5-(4-fluorophenyl)-1-[4-fluoro-2-(2,2,2-trifluoroethoxy)phenyl]-3-methyl-5,6-dihydropyrrolo[3,4-c]pyrazol-4(1H)-one To a mixed solution of 3-acetyl-1-(4-fluorophenyl)-4-hydroxy-1,5-dihydro-2H-pyrrol-2-one (235 mg), [4-fluoro-2-(2,2,2-trifluoroethoxy)phenyl]hydrazine hydrochloride (261 mg), THF (10 mL) and AcOH (1 mL) was added TEA (0.139 mL) at room temperature. The mixture was heated with reflux for 6 hr, stirred at room temperature for 3 days, and concentrated under reduced pressure. To the residue was added toluene, and the mixture was concentrated under reduced pressure. To a mixture of the residue and toluene (30 mL) was added 4-methylbenzenesulfonic acid monohydrate (38 mg) at room temperature, and the mixture was heated with reflux for 2 hr, and concentrated under reduced pressure. To the residue were added ethyl acetate and water, and the mixture was extracted with ethyl acetate. The organic layer was washed with water and brine, dried over anhydrous sodium sulfate, and concentrated. The residue was purified by silica gel column chromatography (ethyl acetate/hexane), and the obtained solid was washed with ethyl acetate/hexane to give the title compound (51 mg).

$^1$H NMR (300 MHz, DMSO-d$_6$) δ 2.38 (3H, s), 4.88 (2H, s), 5.02 (2H, q, J=9.0 Hz), 7.10 (1H, td, J=8.4, 2.4 Hz), 7.20-7.29 (2H, m), 7.46 (1H, dd, J=10.5, 2.6 Hz), 7.66-7.76 (3H, m).

Example 98

4-[4-fluoro-2-(2,2,2-trifluoroethoxy)phenyl]-2-{4-[(oxan-4-yl)oxy]phenyl}-2,3-dihydro-1H-pyrrolo[3,4-c]pyridin-1-one A) 4-(4-iodophenoxy)oxane To a mixture of 4-iodophenol (1.0 g), tetrahydro-2H-pyran-4-ol (0.696 g), triphenylphosphine (1.788 g) and THF (10 mL) was added 1M DIAD-toluene solution (3.59 mL) at 0° C. The mixture was stirred overnight under nitrogen atmosphere at room temperature. The reaction mixture was concentrated under reduced pressure, and the residue was purified by silica gel column chromatography (NH, ethyl acetate/hexane) to give the title compound (1.26 g).

$^1$H NMR (300 MHz, DMSO-d$_6$) δ 1.47-1.63 (2H, m), 1.89-2.00 (2H, m), 3.41-3.51 (2H, m), 3.78-3.87 (2H, m), 4.49-4.60 (1H, m), 6.83 (2H, d, J=8.7 Hz), 7.57 (2H, d, J=8.7 Hz).

B) 4-[4-fluoro-2-(2,2,2-trifluoroethoxy)phenyl]-2-{4-[(oxan-4-yl)oxy]phenyl}-2,3-dihydro-1H-pyrrolo[3,4-c]pyridin-1-one A mixture of 4-[4-fluoro-2-(2,2,2-trifluoroethoxy)phenyl]-2,3-dihydro-1H-pyrrolo[3,4-c]pyridin-1-one (50 mg), 4-(4-iodophenoxy)oxane (60 mg), chloro(2-dicyclohexylphosphino-2',4',6'-triisopropyl-1,1'-biphenyl) [2-(2'-amino-1,1'-biphenyl)]palladium(II) (12.06 mg), sodium tert-butoxide (22.09 mg) and toluene (2.0 mL) was stirred overnight under argon atmosphere at 110° C. To the reaction mixture were added chloro(2-dicyclohexylphosphino-2',4',6'-triisopropyl-1,1'-biphenyl) [2-(2'-amino-1,1'-biphenyl)]palladium(II) (12.06 mg) and sodium tert-butoxide (22.09 mg) at room temperature, and the mixture was stirred under argon atmosphere at 110° C. for 4 hr. The reaction mixture was purified by silica gel column chromatography (NH, ethyl acetate/hexane) to give the title compound (5.5 mg).

¹H NMR (300 MHz, DMSO-$d_6$) δ 1.51-1.65 (2H, m), 1.91-2.02 (2H, m), 3.43-3.53 (2H, m), 3.81-3.90 (2H, m), 4.52-4.64 (1H, m), 4.84-4.97 (4H, m), 7.02-7.11 (3H, m), 7.31 (1H, dd, J=11.3, 2.3 Hz), 7.56 (1H, dd, J=8.5, 7.0 Hz), 7.73-7.82 (3H, m), 8.86 (1H, d, J=4.8 Hz).

Example 101

4-[2-(benzyloxy)-4-fluorophenyl]-2-[6-(difluoromethoxy)pyridin-3-yl]-2,3-dihydro-1H-pyrrolo[3,4-c]pyridin-1-one A) 4-chloro-2-[6-(difluoromethoxy)pyridin-3-yl]-2,3-dihydro-1H-pyrrolo[3,4-c]pyridin-1-one To a mixture of 6-(difluoromethoxy)pyridin-3-amine (3.00 g), DIPEA (5.92 g) and DMF (65 mL) was added a mixture of methyl 3-(bromomethyl)-2-chloropyridine-4-carboxylate (4.50 g) and DMF (25 mL) at room temperature. The mixture was stirred at room temperature for 1 hr, and then stirred overnight at 80° C. The mixture was concentrated under reduced pressure. To the residue were added ethyl acetate and water, and the mixture was extracted with ethyl acetate. The organic layer was separated, washed with saturated brine, dried over anhydrous sodium sulfate, and concentrated under reduced pressure. The residue was purified by silica gel column chromatography (NH, ethyl acetate/hexane) to give the title compound (3.34 g).

MS: [M+H]⁺ 311.9.

B) 4-[2-(benzyloxy)-4-fluorophenyl]-2-[6-(difluoromethoxy)pyridin-3-yl]-2,3-dihydro-1H-pyrrolo[3,4-c]pyridin-1-one To a mixture of 2-(benzyloxy)-1-bromo-4-fluorobenzene (1.80 g), 4,4,4',4',5,5,5',5'-octamethyl-2,2'-bi-1,3,2-dioxaborolane (3.25 g), potassium acetate (1.90 g) and DMF (36 mL) was added [1,1-bis(diphenylphosphino)ferrocene]dichloropalladium(II) (0.469 g) at room temperature. The mixture was stirred overnight under nitrogen atmosphere at 80° C. To the mixture was added ethyl acetate at room temperature, and the insoluble substance was removed by filtration. The filtrate was washed with water and saturated brine, dried over anhydrous sodium sulfate, and concentrated under reduced pressure to give 2-[2-(benzyloxy)-4-fluorophenyl]-4,4,5,5-tetramethyl-1,3,2-dioxaborolane as a crude product. To a mixture of the obtained crude product, 4-chloro-2-[6-(difluoromethoxy)pyridin-3-yl]-2,3-dihydro-1H-pyrrolo[3,4-c]pyridin-1-one (1.00 g), potassium carbonate (1.12 g), DME (30 mL) and water (0.750 mL) was added [1,1-bis(diphenylphosphino)ferrocene]dichloropalladium (II) (0.235 g) at room temperature. The mixture was stirred under nitrogen atmosphere at 85° C. for 4 hr. To the mixture was added ethyl acetate at room temperature, and the insoluble substance was removed by filtration. The filtrate was washed with water and saturated brine, dried over anhydrous sodium sulfate, and concentrated under reduced pressure. The residue was purified by silica gel column chromatography (ethyl acetate/hexane), and washed with IPE to give the title compound (749.6 mg).

¹H NMR (300 MHz, DMSO-$d_6$) δ 4.97 (2H, s), 5.23 (2H, s), 6.98 (1H, td, J=8.3, 2.3 Hz), 7.12-7.35 (7H, m), 7.44-8.00 (3H, m), 8.35 (1H, dd, J=9.0, 3.0 Hz), 8.69 (1H, d, J=2.6 Hz), 8.88 (1H, d, J=4.9 Hz).

Example 106

4-[4-fluoro-2-(2,2,2-trifluoroethoxy)phenyl]-2-{4-[(oxetan-3-yl)oxy]phenyl}-2,3-dihydro-1H-pyrrolo[3,4-c]pyridin-1-one A) 3-(4-iodophenoxy)oxetane A mixture of 4-iodophenol (0.50 g), oxetan-3-yl 4-methylbenzenesulfonate (0.623 g), cesium carbonate (1.111 g) and DMF (8.0 mL) was stirred at 70° C. for 22 hr. To the reaction mixture was added water at room temperature, and the mixture was extracted with ethyl acetate. The organic layer was washed with water and saturated brine, dried over anhydrous sodium sulfate, and concentrated under reduced pressure. The residue was purified by silica gel column chromatography (NH, ethyl acetate/hexane) to give the title compound (531.8 mg).

¹H NMR (300 MHz, DMSO-$d_6$) δ 4.49-4.55 (2H, m), 4.90 (2H, t, J=6.8 Hz), 5.21-5.29 (1H, m), 6.61-6.68 (2H, m), 7.57-7.63 (2H, m).

B) 4-[4-fluoro-2-(2,2,2-trifluoroethoxy)phenyl]-2-{4-[(oxetan-3-yl)oxy]phenyl}-2,3-dihydro-1H-pyrrolo[3,4-c]pyridin-1-one A mixture of 4-[4-fluoro-2-(2,2,2-trifluoroethoxy)phenyl]-2,3-dihydro-1H-pyrrolo[3,4-c]pyridin-1-one (50 mg), 3-(4-iodophenoxy)oxetane (60 mg), chloro(2-dicyclohexylphosphino-2',4',6'-triisopropyl-1,1'-biphenyl) [2-(2'-amino-1,1'-biphenyl)]palladium(II) (12.06 mg), sodium tert-butoxide (22.09 mg) and toluene (2.0 mL) was stirred under argon atmosphere at 95° C. for 44 hr. The reaction mixture was purified by silica gel column chromatography (NH, ethyl acetate/hexane) to give the title compound (6 mg).

¹H NMR (300 MHz, DMSO-$d_6$) δ 4.54 (2H, dd, J=7.2, 4.9 Hz), 4.84-4.96 (6H, m), 5.25-5.35 (1H, m), 6.87 (2H, d, J=9.0 Hz), 7.08 (1H, td, J=8.5, 2.3 Hz), 7.30 (1H, dd, J=11.3, 2.3 Hz), 7.56 (1H, dd, J=8.3, 6.8 Hz), 7.75-7.82 (3H, m), 8.86 (1H, d, J=4.9 Hz).

Example 107

2-[6-(difluoromethoxy)pyridin-3-yl]-4-(4-fluoro-2-hydroxyphenyl)-2,3-dihydro-1H-pyrrolo[3,4-c]pyridin-1-one A mixture of 4-[2-(benzyloxy)-4-fluorophenyl]-2-[6-(difluoromethoxy)pyridin-3-yl]-2,3-dihydro-1H-pyrrolo[3,4-c]pyridin-1-one (748.6 mg), 10% palladium on carbon (55% wet, 75 mg) and THF (15 mL) was stirred overnight under normal pressure of hydrogen atmosphere at room temperature. The catalyst was removed by filtration, and the filtrate was concentrated under reduced pressure. The residue was washed with IPE to give the title compound (573.1 mg).

¹H NMR (300 MHz, DMSO-$d_6$) δ 5.42 (2H, s), 6.75-6.91 (2H, m), 7.26 (1H, d, J=9.0 Hz), 7.45-8.02 (3H, m), 8.55 (1H, dd, J=9.0, 3.0 Hz), 8.83-8.94 (2H, m), 13.62 (1H, brs).

Example 111

2-(4-fluorophenyl)-4-[4-fluoro-2-(2,2,2-trifluoroethoxy)phenyl]-2,3-dihydro-1H-pyrrolo[3,4-c]pyridine

A) 4-chloro-2-[(2,4-dimethoxyphenyl)methyl]-2,3-dihydro-1H-pyrrolo[3,4-c]pyridine To a mixture of 2-chloro-3,4-bis(chloromethyl)pyridine (2.00 g) and THF (15 mL) were added TEA (6.62 mL) and (2,4-dimethoxyphenyl)methanamine (4.77 g), and the mixture was stirred overnight at room temperature. The obtained mixture was diluted with water, and extracted with ethyl acetate. The organic layer was separated, washed with water and saturated brine, dried over anhydrous sodium sulfate, and concentrated under reduced pressure. The residue was purified by silica gel column chromatography (NH, ethyl acetate/hexane) to give the title compound (1.31 g).

MS: [M+H]+ 305.0.

B) 2-[(2,4-dimethoxyphenyl)methyl]-4-[4-fluoro-2-(2,2,2-trifluoroethoxy)phenyl]-2,3-dihydro-1H-pyrrolo[3,4-c]pyridine To a mixture of 1-bromo-4-fluoro-2-(2,2,2-trifluoroethoxy)benzene (1.00 g), 4,4,4',4',5,5,5',5'-octamethyl-2,2'-bi-1,3,2-dioxaborolane (1.1 g), potassium acetate (0.539 g) and CPME (10 mL) was added chloro(2-dicyclohexylphosphino-2',4',6'-triisopropyl-1,1'-biphenyl) [2-(2'-amino-1,1'-biphenyl)]palladium(II) (0.288 g) at room temperature. The mixture was stirred overnight under nitrogen atmosphere at 100° C. To the mixture was added water, the insoluble substance was removed by filtration, and the filtrate was extracted with ethyl acetate. The organic layer was separated, washed with water and saturated brine, dried over anhydrous sodium sulfate, and concentrated under reduced pressure to give 2-[4-fluoro-2-(2,2,2-trifluoroethoxy)phenyl]-4,4,5,5-tetramethyl-1,3,2-dioxaborolane (1.36 g) as a crude product. To a mixture of the obtained crude product (1103 mg), 4-chloro-2-[(2,4-dimethoxyphenyl)methyl]-2,3-dihydro-1H-pyrrolo[3,4-c]pyridine (700 mg), potassium carbonate (794 mg), DME (15 mL) and water (1.5 mL) was added [1,1-bis(diphenylphosphino)ferrocene]dichloropalladium(II) (168 mg) at room temperature, and the mixture was stirred under nitrogen atmosphere at 90° C. for 1 hr. To the mixture was added water at room temperature, and the mixture was extracted with ethyl acetate. The organic layer was washed with water and saturated brine, dried over anhydrous sodium sulfate, and concentrated under reduced pressure. The residue was purified by silica gel column chromatography (NH, ethyl acetate/hexane) to give the title compound (612 mg).

$^1$H NMR (300 MHz, DMSO-$d_6$) δ3.62-3.78 (10H, m), 3.88 (2H, s), 4.80 (2H, q, J=9.0 Hz), 6.46 (1H, dd, J=8.3, 2.6 Hz), 6.52 (1H, d, J=2.3 Hz), 6.97 (1H, td, J=8.4, 2.4 Hz), 7.14-7.23 (2H, m), 7.29 (1H, d, J=4.9 Hz), 7.37 (1H, dd, J=8.5, 7.0 Hz), 8.45 (1H, d, J=4.9 Hz).

C) 4-[4-fluoro-2-(2,2,2-trifluoroethoxy)phenyl]-2,3-dihydro-1H-pyrrolo[3,4-c]pyridine A mixture of 2-[(2,4-dimethoxyphenyl)methyl]-4-[4-fluoro-2-(2,2,2-trifluoroethoxy)phenyl]-2,3-dihydro-1H-pyrrolo[3,4-c]pyridine (610 mg) and TFA (5 mL) was stirred at 70° C. for 3 hr, and concentrated under reduced pressure. The residue was purified by silica gel column chromatography (NH, ethyl acetate/hexane) to give the title compound (376 mg).

MS: [M+H]+ 313.3.

D) 2-(4-fluorophenyl)-4-[4-fluoro-2-(2,2,2-trifluoroethoxy)phenyl]-2,3-dihydro-1H-pyrrolo[3,4-c]pyridine To a mixture of 1-bromo-4-fluorobenzene (0.013 mL), 4-[4-fluoro-2-(2,2,2-trifluoroethoxy)phenyl]-2,3-dihydro-1H-pyrrolo[3,4-c]pyridine (30.0 mg), sodium tert-butoxide (13.85 mg) and toluene (1.5 mL) was added chloro(2-dicyclohexylphosphino-2',4',6'-triisopropyl-1,1'-biphenyl) [2-(2'-amino-1,1'-biphenyl)]palladium(II) (7.56 mg) at room temperature, and the mixture was stirred under nitrogen atmosphere at 110° C. for 1 hr. Ethyl acetate and water were added thereto, and the mixture was filtered through Celite. The filtrate was extracted with ethyl acetate, and the organic layer was washed with saturated brine, dried over anhydrous sodium sulfate, and concentrated under reduced pressure. The residue was purified by silica gel column chromatography (NH, ethyl acetate/hexane) to give the title compound (28.0 mg).

$^1$H NMR (300 MHz, DMSO-$d_6$) δ4.43 (2H, s), 4.66 (2H, s), 4.87 (2H, q, J=8.8 Hz), 6.59-6.69 (2H, m), 6.97-7.12 (3H, m), 7.27 (1H, dd, J=10.9, 2.3 Hz), 7.40-7.50 (2H, m), 8.58 (1H, d, J=4.9 Hz).

Example 112

(2-{2-[6-(difluoromethoxy)pyridin-3-yl]-1-oxo-2,3-dihydro-1H-pyrrolo[3,4-c]pyridin-4-yl}-5-fluorophenoxy)acetonitrile To a mixture of 2-[6-(difluoromethoxy)pyridin-3-yl]-4-(4-fluoro-2-hydroxyphenyl)-2,3-dihydro-1H-pyrrolo[3,4-c]pyridin-1-one (60.2 mg), potassium carbonate (32.2 mg) and DMF (1.5 mL) was added bromoacetonitrile (0.013 mL) at room temperature. The mixture was stirred at room temperature for 2 hr. To the mixture was added water at 0° C., and the mixture was extracted with ethyl acetate. The organic layer was separated, washed with water and saturated brine, dried over anhydrous sodium sulfate, and concentrated under reduced pressure. The residue was purified by silica gel column chromatography (ethyl acetate/hexane) to give the title compound (63.5 mg).

$^1$H NMR (300 MHz, DMSO-$d_6$) δ 5.04 (2H, s), 5.29 (2H, s), 7.11 (1H, td, J=8.4, 2.4 Hz), 7.22 (1H, d, J=9.0 Hz), 7.38 (1H, dd, J=11.3, 2.3 Hz), 7.45-7.98 (3H, m), 8.50 (1H, dd, J=9.0, 3.0 Hz), 8.74 (1H, d, J=3.0 Hz), 8.90 (1H, d, J=4.9 Hz).

Example 115

6-(4-fluorophenyl)-1-[4-fluoro-2-(2,2,2-trifluoroethoxy)phenyl]-6,7-dihydro-1H-pyrrolo[3,4-c]pyridazine-3,5(2H,4H)-dione

A) rac-ethyl 1-(4-fluorophenyl)-3-(2-methoxy-2-oxoethyl)-2,4-dioxopyrrolidine-3-carboxylate To a solution of rac-ethyl 1-(4-fluorophenyl)-2,4-dioxopyrrolidine-3-carboxylate (3.00 g), bromoacetic acid methyl (1.25 mL) and potassium iodide (188 mg) in THF (100 mL) was added 1M tetrabutylammonium fluoride-THF solution (13.6 mL) at room temperature. The mixture was stirred at room temperature for 4 hr, heated with reflux overnight, cooled to room temperature, and filtered through pad filled with silica gel, and the filtrate was concentrated under reduced pressure. The residue was purified by silica gel column chromatography (ethyl acetate/hexane) to give the title compound (1.24 g).

MS: [M+H]+ 338.0.

B) [1-(4-fluorophenyl)-4-hydroxy-2-oxo-2,5-dihydro-1H-pyrrol-3-yl]acetic acid

A mixture of rac-ethyl 1-(4-fluorophenyl)-3-(2-methoxy-2-oxoethyl)-2,4-dioxopyrrolidine-3-carboxylate (340 mg), THF (5 mL) and 6M hydrochloric acid (10 mL) was heated with reflux for 24 hr, cooled to room temperature, diluted with water, and extracted with ethyl acetate. The organic layer was washed with water and brine, dried over anhydrous sodium sulfate, and concentrated under reduced pressure. To the residue was added ethyl acetate/hexane, and the solid was collected by filtration, and washed with ethyl acetate/hexane to give the title compound (186 mg).

MS: [M+H]+ 251.9.

C) 6-(4-fluorophenyl)-1-[4-fluoro-2-(2,2,2-trifluoroethoxy)phenyl]-6,7-dihydro-1H-pyrrolo[3,4-c]pyridazine-3,5(2H,4H)-dione To a solution of [1-(4-fluorophenyl)-4-hydroxy-2-oxo-2,5-dihydro-1H-pyrrol-3-yl]acetic acid (100 mg), [4-fluoro-2-(2,2,2-trifluoroethoxy)phenyl]hydrazine hydrochloride (124 mg) and HATU (227 mg) in DMF (5 mL) was added TEA (0.111 mL) at room temperature. The mixture was stirred overnight at room temperature, water was added thereto, and the mixture was extracted with ethyl acetate. The extract was washed with water and brine, dried over anhydrous sodium sulfate, and concentrated under reduced pressure. To the residue were added toluene (20 mL) and 4-methylbenzenesulfonic acid monohydrate (15 mg), and the mixture was heated with reflux for 2 hr. To the mixture were added ethyl acetate, 5% aqueous sodium hydrogencarbonate solution and water, and the mixture was extracted with ethyl acetate. The organic layer was washed with water and brine, dried over anhydrous sodium sulfate, and concentrated under reduced pressure. The residue was purified by silica gel column chromatography (ethyl acetate/hexane). To the residue were added ethyl acetate/hexane, and the solid was collected by filtration, and washed with hexane to give the title compound (45 mg).

$^1$H NMR (300 MHz, DMSO-$d_6$) δ 3.05 (2H, s), 4.19 (2H, s), 4.87 (2H, q, J=8.7 Hz), 7.01 (1H, td, J=8.5, 2.6 Hz), 7.06-7.16 (2H, m), 7.28 (1H, dd, J=10.6, 2.6 Hz), 7.53 (1H, dd, J=8.9, 6.2 Hz), 7.58-7.67 (2H, m), 10.75 (1H, brs).

Example 116 methyl (2-{2-[6-(difluoromethoxy)pyridin-3-yl]-1-oxo-2,3-dihydro-1H-pyrrolo[3,4-c]pyridin-4-yl}-5-fluorophenoxy)acetate To a mixture of 2-[6-(difluoromethoxy)pyridin-3-yl]-4-(4-fluoro-2-hydroxyphenyl)-2,3-dihydro-1H-pyrrolo[3,4-c]pyridin-1-one (235.6 mg), potassium carbonate (126 mg) and DMF (5 mL) was added methyl bromoacetate (112 mg) at room temperature. The mixture was stirred at room temperature for 30 min. To the mixture was added DMF (3 mL) at room temperature. The mixture was stirred at room temperature for 6 hr. To the mixture were added water, ethyl acetate and THF at 0° C. The insoluble substance was collected by filtration, and washed with water and ethyl acetate to give the title compound (170.9 mg).

$^1$H NMR (300 MHz, DMSO-$d_6$) δ 3.66 (3H, s), 4.96 (2H, s), 5.16 (2H, s), 7.00 (1H, td, J=8.3, 2.3 Hz), 7.11 (1H, dd, J=11.3, 2.3 Hz), 7.23 (1H, d, J=9.0 Hz), 7.40-8.03 (3H, m), 8.48 (1H, dd, J=8.9, 2.8 Hz), 8.73 (1H, d, J=2.6 Hz), 8.89 (1H, d, J=4.9 Hz).

Example 119

4-[4-fluoro-2-(2,2,2-trifluoroethoxy)phenyl]-2-[4-(2-hydroxypropan-2-yl)phenyl]-2,3-dihydro-1H-pyrrolo[3,4-c]pyridin-1-one A) 4-chloro-2,3-dihydro-1H-pyrrolo[3,4-c]pyridin-1-one To a solution of methyl 3-(bromomethyl)-2-chloropyridine-4-carboxylate (7.2 g) in acetonitrile (35 mL) was added 28% aqueous ammonia (70 mL) at 0° C. The mixture was stirred at 0° C. for 2 hr. The solid was collected by filtration, and washed with a small amount of acetonitrile to give the title compound (3.3 g).

$^1$H NMR (300 MHz, DMSO-$d_6$) δ 4.47 (2H, s), 7.72 (1H, d, J=4.9 Hz), 8.57 (1H, d, J=4.9 Hz), 9.17 (1H, brs).

B) 4-[4-fluoro-2-(2,2,2-trifluoroethoxy)phenyl]-2,3-dihydro-1H-pyrrolo[3,4-c]pyridin-1-one A mixture of 1-bromo-4-fluoro-2-(2,2,2-trifluoroethoxy)benzene (7.70 g), 4,4,4',4',5,5,5',5'-octamethyl-2,2'-bi-1,3,2-dioxaborolane (8.59 g), potassium acetate (4.15 g), chloro(2-dicyclohexylphosphino-2',4',6'-triisopropyl-1,1'-biphenyl) [2-(2'-amino-1,1'-biphenyl)]palladium(II) (2.219 g) and CPME (77 mL) was stirred under argon atmosphere at 100° C. for 18 hr. The solid was removed by filtration, and to the filtrate was added water. The mixture was extracted with ethyl acetate. The organic layer was washed with water and saturated brine, dried over anhydrous sodium sulfate, and concentrated under reduced pressure to give 2-[4-fluoro-2-(2,2,2-trifluoroethoxy)phenyl]-4,4,5,5-tetramethyl-1,3,2-dioxaborolane (15.12 g) as a crude product. A mixture of the obtained crude product, 4-chloro-2,3-dihydro-1H-pyrrolo[3,4-c]pyridin-1-one (2.4 g), potassium carbonate (4.92 g), [1,1-bis(diphenylphosphino)ferrocene]dichloropalladium (II) (1.04 g), DME (85 mL) and water (17 mL) was stirred under argon atmosphere at 85° C. for 2 hr. To the reaction mixture was added water at room temperature, and the mixture was extracted with ethyl acetate. The organic layer was washed with water and saturated brine, dried over anhydrous sodium sulfate, and concentrated under reduced pressure. The residue was purified by silica gel column chromatography (ethyl acetate/hexane) to give the title compound (2.54 g).

MS: [M+H]+ 326.9.

C) 4-[4-fluoro-2-(2,2,2-trifluoroethoxy)phenyl]-2-[4-(2-hydroxypropan-2-yl)phenyl]-2,3-dihydro-1H-pyrrolo[3,4-c]pyridin-1-one To a suspension of 4-[4-fluoro-2-(2,2,2-trifluoroethoxy)phenyl]-2,3-dihydro-1H-pyrrolo[3,4-c]pyridin-1-one (7.50 g) in toluene (300 mL) were added 2-(4-bromophenyl)-2-propanol (7.42 g), sodium tert-butoxide (4.42 g) and chloro(2-dicyclohexylphosphino-2',4',6'-triisopropyl-1,1'-biphenyl) [2-(2'-amino-1,1'-biphenyl)]palladium(II) (3.62 g) at room temperature. The mixture was stirred under argon atmosphere at 120° C. for 3 hr. The mixture was passed through pad filled with silica gel and basic silica gel using ethyl acetate. The filtrate was concentrated under reduced pressure. The residue was purified by silica gel column chromatography (NH, followed by SI, ethyl acetate/hexane). The fraction was subjected to dust removal filtration, and the solid was recrystallized from ethyl acetate/hexane to give the title compound (6.98 g).

$^1$H NMR (300 MHz, DMSO-$d_6$) δ 1.43 (6H, s), 4.83-4.99 (4H, m), 5.02 (1H, s), 7.04-7.13 (1H, m), 7.32 (1H, dd, J=11.1, 2.4 Hz), 7.48-7.62 (3H, m), 7.76-7.88 (3H, m), 8.87 (1H, d, J=4.9 Hz).

Example 130

(2-{2-[6-(difluoromethoxy)pyridin-3-yl]-1-oxo-2,3-dihydro-1H-pyrrolo[3,4-c]pyridin-4-yl}-5-fluorophenoxy)acetic acid To a mixture of methyl (2-{2-[6-(difluoromethoxy)pyridin-3-yl]-1-oxo-2,3-dihydro-1H-pyrrolo[3,4-c]pyridin-4-yl}-5-fluorophenoxy)acetate (244.3 mg), THF (3 mL) and MeOH (3 mL) was added 2M aqueous sodium hydroxide solution (3 mL) at 0° C. The mixture was stirred at room temperature for 2 hr. To the mixture was added 1M hydrochloric acid (6 mL) at 0° C., and the mixture was extracted with ethyl acetate. The organic layer was separated, washed with saturated brine, dried over anhydrous sodium sulfate, and concentrated under reduced pressure to give the title compound (236.3 mg).

$^1$H NMR (300 MHz, DMSO-$d_6$) δ 4.85 (2H, s), 5.23 (2H, s), 6.86-7.12 (2H, m), 7.20 (1H, d, J=9.0 Hz), 7.39-8.02 (3H, m), 8.53 (1H, dd, J=9.0, 3.0 Hz), 8.68 (1H, d, J=2.6 Hz), 8.89 (1H, d, J=4.9 Hz), 13.33 (1H, brs).

Example 134

4-{2-[2-(azetidin-1-yl)-2-oxoethoxy]-4-fluorophenyl}-2-[6-(difluoromethoxy)pyridin-3-yl]-2,3-dihydro-1H-pyrrolo[3,4-c]pyridin-1-one To a mixture of (2-{2-[6-(difluoromethoxy)pyridin-3-yl]-1-oxo-2,3-dihydro-1H-pyrrolo[3,4-c]pyridin-4-yl}-5-fluorophenoxy)acetic acid (66.4 mg), azetidine hydrochloride (34.9 mg), DIPEA (96 mg) and DMF (2 mL) was added HATU (113 mg) at room temperature. The mixture was stirred overnight at room temperature. To the mixture was added water at room temperature, and the mixture was extracted with ethyl acetate. The organic layer was separated, washed with water and saturated brine, dried over anhydrous sodium sulfate, and concentrated under reduced pressure. The residue was purified by silica gel column chromatography (NH, ethyl acetate/hexane) to give the title compound (13.3 mg).

$^1$H NMR (300 MHz, DMSO-$d_6$) δ 2.10-2.33 (2H, m), 3.89 (2H, t, J=7.7 Hz), 4.12 (2H, t, J=7.7 Hz), 4.76 (2H, s), 5.27 (2H, s), 6.87-7.12 (2H, m), 7.22 (1H, d, J=9.0 Hz), 7.38-8.02 (3H, m), 8.50 (1H, dd, J=9.0, 3.0 Hz), 8.73 (1H, d, J=3.0 Hz), 8.88 (1H, d, J=5.3 Hz).

Example 137 tert-butyl 4-{2-[2-(4-fluorophenyl)-1-oxo-2,3-dihydro-1H-pyrrolo[3,4-c]pyridin-4-yl]phenyl}piperazine-1-carboxylate To a mixture of 4-chloro-2-(4-fluorophenyl)-2,3-dihydro-1H-pyrrolo[3,4-c]pyridin-1-one (100 mg), {2-[4-(tert-butoxycarbonyl)piperazin-1-yl]phenyl}boronic acid (175 mg), potassium carbonate (132 mg), DME (5 mL) and water (0.5 mL) was added [1,1-bis(diphenylphosphino)ferrocene]dichloropalladium(II) (27.9 mg) at room temperature. The mixture was stirred under nitrogen atmosphere at 90° C. for 2 hr, to the mixture were added water and ethyl acetate at room temperature, and the mixture was extracted with ethyl acetate. The organic layer was separated, washed with saturated brine, dried over anhydrous sodium sulfate, and concentrated under reduced pressure. The residue was purified by silica gel column chromatography (NH, ethyl acetate/hexane) to give the title compound (165 mg).

$^1$H NMR (300 MHz, DMSO-$d_6$) δ1.32 (9H, s), 2.66-2.79 (4H, m), 2.98-3.09 (4H, m), 4.99 (2H, s), 7.17-7.40 (5H, m), 7.43-7.52 (1H, m), 7.77 (1H, d, J=4.9 Hz), 7.90-7.99 (2H, m), 8.89 (1H, d, J=4.9 Hz).

Example 138

2-(4-fluorophenyl)-4-[2-(piperazin-1-yl)phenyl]-2,3-dihydro-1H-pyrrolo[3,4-c]pyridin-1-one hydrochloride To a mixture of tert-butyl 4-{2-[2-(4-fluorophenyl)-1-oxo-2,3-dihydro-1H-pyrrolo[3,4-c]pyridin-4-yl]phenyl}piperazine-1-carboxylate (150 mg) and ethyl acetate (2 mL) was added dropwise 4N hydrogen chloride-ethyl acetate (0.768 mL). The mixture was stirred at room temperature for 1 hr, and concentrated under reduced pressure to give the title compound (129 mg).

$^1$H NMR (300 MHz, DMSO-$d_6$) δ2.77-3.07 (8H, m), 4.96 (2H, s), 7.21-7.33 (4H, m), 7.42 (1H, dd, J=7.3, 1.3 Hz), 7.49-7.59 (1H, m), 7.86 (1H, d, J=5.3 Hz), 7.94-8.03 (2H, m), 8.85-8.93 (2H, m).

Example 144

4-[2-(4-acetylpiperazin-1-yl)phenyl]-2-(4-fluorophenyl)-2,3-dihydro-1H-pyrrolo[3,4-c]pyridin-1-one To a mixture of 2-(4-fluorophenyl)-4-[2-(piperazin-1-yl)phenyl]-2,3-dihydro-1H-pyrrolo[3,4-c]pyridin-1-one hydrochloride (40.0 mg) and DMF (1 mL) were added acetyl chloride (14.78 mg) and TEA (0.066 mL), and the mixture was stirred at room temperature for 1 hr. To the mixture was added water, and the mixture was extracted with ethyl acetate. The organic layer was separated, washed with water and saturated brine, dried over anhydrous sodium sulfate, and concentrated under reduced pressure. The residue was purified by silica gel column chromatography (NH, ethyl acetate/hexane) to give the title compound (35.0 mg).

$^1$H NMR (300 MHz, DMSO-$d_6$) δ1.88 (3H, s), 2.68-2.81 (4H, m), 3.09-3.24 (4H, m), 5.01 (2H, s), 7.16-7.32 (4H, m), 7.38 (1H, dd, J=7.9, 1.5 Hz), 7.44-7.53 (1H, m), 7.78 (1H, d, J=4.9 Hz), 7.91-8.01 (2H, m), 8.90 (1H, d, J=4.9 Hz).

Example 145

7-(4-fluorophenyl)-5-[4-fluoro-2-(2,2,2-trifluoroethoxy)phenyl]-2,3,6,7-tetrahydropyrrolo[3,4-e][1,4]diazepin-8(1H)-one A) ethyl (2Z)-4-[4-fluoro-2-(2,2,2-trifluoroethoxy)phenyl]-2-hydroxy-4-oxobut-2-enoate To a mixture of 1-[4-fluoro-2-(2,2,2-trifluoroethoxy)phenyl]ethan-1-one (9.16 g), diethyl oxalate (6.80 g) and EtOH (100 mL) was added 20% sodium ethoxide-EtOH solution (18.4 mL) at room temperature, and the mixture was stirred overnight at room temperature. The mixture was concentrated under reduced pressure so as to become an about half volume, cooled to 0° C., and adjusted to pH=3 with 2M hydrochloric acid. The precipitated solid was collected by filtration, and washed with water to give the title compound (12.2 g).

MS: [M+H]$^+$ 336.9.

B) 1-(4-fluorophenyl)-4-[4-fluoro-2-(2,2,2-trifluoroethoxy)benzoyl]-3-hydroxy-1,5-dihydro-2H-pyrrol-2-one To a mixture of ethyl (2Z)-4-[4-fluoro-2-(2,2,2-trifluoroethoxy)phenyl]-2-hydroxy-4-oxobut-2-enoate (1.01 g), 4-fluoroaniline (0.345 mL) and EtOH (10 mL) was added paraformaldehyde (270 mg) at room temperature, and the mixture was stirred at room temperature for 1 hr. To the mixture was added AcOH (40 mL), and the mixture was stirred at room temperature for 4 hr, diluted with water, and extracted with ethyl acetate. The organic layer was washed with water and brine, dried over sodium sulfate, and concentrated under reduced pressure. To the residue was added toluene, and the mixture was concentrated under reduced pressure. To the residue was added IPE, and the resulting solid was collected by filtration, and washed with IPE to give the title compound (520 mg).

MS: [M+H]$^+$ 414.0.

C) 7-(4-fluorophenyl)-5-[4-fluoro-2-(2,2,2-trifluoroethoxy)phenyl]-2,3,6,7-tetrahydropyrrolo[3,4-e][1,4]diazepin-8 (1H)-one To a mixture of 1-(4-fluorophenyl)-4-[4-fluoro-2-(2,2,2-trifluoroethoxy)benzoyl]-3-hydroxy-1,5-dihydro-2H-pyrrol-2-one (60 mg) and EtOH (10 mL) was added ethane-1,2-diamine (0.012 mL) at room temperature, and the mixture was stirred overnight at room temperature, and heated with reflux for 4 hr. To the mixture was added ethane-1,2-diamine (0.048 mL), and the mixture was heated with reflux for 4 hr, and the mixture was stirred at room temperature for 3 days, and heated with reflux for 4 hr. The mixture was cooled to room temperature, water was added thereto, and the precipitated solid was collected by filtration, and washed with water and ethyl acetate/hexane to give the title compound (25 mg).

$^1$H NMR (300 MHz, DMSO-d$_6$) δ 2.85-3.37 (2H, m), 3.61 (2H, brs), 4.09 (2H, s), 4.37 (1H, brs), 4.72-4.91 (2H, m), 6.92 (1H, t, J=8.3 Hz), 7.08-7.32 (4H, m), 7.71 (2H, dd, J=9.0, 4.9 Hz).

Example 146

5-(4-fluorophenyl)-3-[4-fluoro-2-(2,2,2-trifluoroethoxy)phenyl]-4,5-dihydropyrrolo[3,4-c]pyrazol-6(1H)-one To a mixture of 1-(4-fluorophenyl)-4-[4-fluoro-2-(2,2,2-trifluoroethoxy)benzoyl]-3-hydroxy-1,5-dihydro-2H-pyrrol-2-one (120 mg) and EtOH (10 mL) was added hydrazine monohydrate (0.021 mL) at room temperature, and the mixture was stirred at room temperature for 2 hr, and heated with reflux for 3 hr. To the mixture was added AcOH (1 mL), and the mixture was heated with reflux overnight. To the mixture was added water, and the precipitated solid was collected by filtration, and washed with water to give the title compound (115 mg).

$^1$H NMR (300 MHz, DMSO-d$_6$) δ 4.90 (2H, s), 5.09 (2H, q, J=9.0 Hz), 7.00-7.18 (1H, m), 7.23-7.42 (3H, m), 7.77-7.89 (3H, m), 13.93 (1H, brs).

Example 148

5-(4-fluorophenyl)-3-[4-fluoro-2-(2,2,2-trifluoroethoxy)phenyl]-1-(2,2,2-trifluoroethyl)-4,5-dihydropyrrolo[3,4-c]pyrazol-6(1H)-one To 5-(4-fluorophenyl)-3-[4-fluoro-2-(2,2,2-trifluoroethoxy)phenyl]-4,5-dihydropyrrolo[3,4-c]pyrazol-6(1H)-one (80 mg) in DMF (10 mL) was added sodium hydride (60% oil, 10 mg) at 0° C. The mixture was stirred at 0° C. for 10 min, and 2,2,2-trifluoroethyl trifluoromethanesulfonate (0.042 mL) was added thereto at 0° C. The mixture was stirred at room temperature for 1 hr, and cooled to 0° C., and water was added thereto. The precipitated solid was collected by filtration, washed with water, and dried to give the title compound (76 mg).

$^1$H NMR (300 MHz, DMSO-d$_6$) δ 4.91 (2H, s), 5.10 (2H, q, J=8.9 Hz), 5.30 (2H, q, J=8.9 Hz), 7.04 (1H, td, J=8.5, 2.3 Hz), 7.27-7.39 (3H, m), 7.75-7.84 (2H, m), 7.93 (1H, dd, J=8.7, 7.2 Hz).

Example 149

1-[2-(2,2,2-trifluoroethoxy)phenyl]-6-[4-(trifluoromethoxy)phenyl]-6,7-dihydro-1H-pyrrolo[3,4-b]pyridine-2,5-dione A) methyl (2E)-3-[2-(2,2,2-trifluoroethoxy)anilino]but-2-enoate To a mixture of 2-(2,2,2-trifluoroethoxy)aniline (9.0 g) and methyl acetoacetate (6.01 g) was added indium tribromide (167 mg) at room temperature, and the mixture was stirred overnight at 50° C. The reaction mixture was purified by silica gel column chromatography (ethyl acetate/petroleum ether) to give the title compound (3.30 g).

$^1$H NMR (400 MHz, CDCl$_3$) δ 1.96 (3H, s), 3.69 (3H, s), 4.32-4.47 (2H, m), 4.75 (1H, s), 6.95 (1H, d, J=8.0 Hz), 7.00-7.08 (1H, m), 7.10-7.20 (2H, m), 10.20 (1H, brs).

B) methyl 2-methyl-6-oxo-1-[2-(2,2,2-trifluoroethoxy)phenyl]-1,6-dihydropyridine-3-carboxylate To a mixture of methyl (2E)-3-[2-(2,2,2-trifluoroethoxy)anilino]but-2-enoate (1.00 g) and THF (15 mL) was added sodium hydride (60% oil, 180 mg) at 0° C. The reaction mixture was stirred at 0° C. for 15 min, methyl propiolate (349 mg) was added thereto, and the mixture was stirred at room temperature for 2 hr. To the mixture was added water, and the mixture was extracted with ethyl acetate. The organic layer was separated, washed with saturated brine, dried over anhydrous sodium sulfate, and concentrated under reduced pressure. The residue was purified by silica gel column chromatography (ethyl acetate/petroleum ether) to give the title compound (300 mg).

MS: [M+H]$^+$ 342.1.

C) 1-[2-(2,2,2-trifluoroethoxy)phenyl]-6-[4-(trifluoromethoxy)phenyl]-6,7-dihydro-1H-pyrrolo[3,4-b]pyridine-2,5-dione To a mixture of methyl 2-methyl-6-oxo-1-[2-(2,2,2-trifluoroethoxy)phenyl]-1,6-dihydropyridine-3-carboxylate (100 mg) and carbon tetrachloride (5 mL) were added NBS (52 mg) and AIBN (5 mg) at room temperature, and the mixture was stirred at 77° C. for 2 hr. To the mixture was added water at room temperature, and the mixture was extracted with ethyl acetate. The organic layer was separated, washed with saturated brine, dried over anhydrous sodium sulfate, and concentrated under reduced pressure to give methyl 2-(bromomethyl)-6-oxo-1-[2-(2,2,2-trifluoroethoxy)phenyl]-1,6-dihydropyridine-3-carboxylate (160 mg) as a crude product. To a mixture of the obtained crude product and MeOH (5 mL) were added 4-(trifluoromethoxy)aniline (60 mg) and DIPEA (80 mg) at room temperature, and the mixture was stirred overnight at 50° C. To the mixture was added water, and the mixture was extracted with ethyl acetate. The organic layer was separated, washed with saturated brine, dried over anhydrous sodium sulfate, and concentrated under reduced pressure. The residue was purified by preparative liquid chromatography (0.05% aqueous ammonia-containing acetonitrile/0.1% aqueous ammonia) to give the title compound (35 mg).

$^1$H NMR (400 MHz, CDCl$_3$) δ 4.25-4.36 (2H, m), 4.40-4.51 (2H, m), 6.71 (1H, d, J=9.2 Hz), 7.13-7.23 (3H, m), 7.28-7.40 (2H, m), 7.55-7.67 (3H, m), 7.82 (1H, d, J=9.6 Hz).

Example 150

7-(4-fluorophenyl)-1-[4-fluoro-2-(2,2,2-trifluoroethoxy)phenyl]-2,3,7,8-tetrahydropyrrolo[3,4-e][1,4]diazepin-6(1H)-one A) tert-butyl {2-[4-fluoro-2-(2,2,2-trifluoroethoxy)anilino]ethyl}carbamate To a mixture of 4-fluoro-2-(2,2,2-trifluoroethoxy)aniline (1.05 g), tert-butyl(2-oxoethyl)carbamate (955 mg) and THF (10 mL) were added AcOH (0.5 mL) and sodium triacetoxyborohydride (1.59 g), and the mixture was stirred overnight at room temperature. To the reaction mixture were added ethyl acetate and 5% aqueous sodium hydrogencarbonate solution, and the mixture was extracted with ethyl acetate. The organic layer was washed with water and brine, dried over anhydrous sodium sulfate, and concentrated under reduced pressure. The residue was purified by silica gel column chromatography (SI and NH, ethyl acetate/hexane) to give the title compound (246 mg).

MS: [M+H]$^+$ 353.0.

B) N1-[4-fluoro-2-(2,2,2-trifluoroethoxy)phenyl]ethane-1,2-diamine dihydrochloride To a mixture of tert-butyl{2-[4-fluoro-2-(2,2,2-trifluoroethoxy)anilino]ethyl}carbamate (241 mg) and AcOH (2 mL) was added 4M hydrogen chloride-CPME solution (4 mL) at room temperature, and the mixture was stirred at room temperature for one day. To the reaction mixture was added IPE, and the solid was collected by filtration, and washed with IPE to give the title compound (185 mg).

MS: [M+H]$^+$ 252.9.

C) 7-(4-fluorophenyl)-1-[4-fluoro-2-(2,2,2-trifluoroethoxy)phenyl]-2,3,7,8-tetrahydropyrrolo[3,4-e][1,4]diazepin-6(1H)-one To a mixture of N1-[4-fluoro-2-(2,2,2-trifluoroethoxy)phenyl]ethane-1,2-diamine dihydrochloride (150 mg) and EtOH (10 mL) was added (3Z)-3-[(dimethylamino)methylidene]-1-(4-fluorophenyl)pyrrolidine-2,4-dione (115 mg) at room temperature, and the mixture was stirred at room temperature for 4 hr, and heated with reflux for 4 days. To the reaction mixture was added water, and the insoluble substance was removed by filtration. To the filtrate was added salt, and the mixture was extracted with ethyl acetate. The organic layer was washed with saturated brine, dried over anhydrous sodium sulfate, and concentrated under reduced pressure. The residue was purified by silica gel column chromatography (NH, ethyl acetate/hexane) to give the title compound (35 mg).

$^1$H NMR (300 MHz, DMSO-d$_6$) δ 3.52-3.70 (2H, m), 3.86 (1H, d, J=12.1 Hz), 3.98-4.11 (1H, m), 4.18 (1H, d, J=13.9 Hz), 4.24-4.36 (1H, m), 4.80-5.00 (2H, m), 7.01 (1H, td, J=8.5, 2.6 Hz), 7.13 (2H, t, J=8.9 Hz), 7.35 (1H, dd, J=10.5, 2.6 Hz), 7.53-7.68 (3H, m), 8.06 (1H, s).

Example 151

2-[2-(difluoromethoxy)pyrimidin-5-yl]-4-[4-fluoro-2-(2,2,2-trifluoroethoxy)phenyl]-2,3-dihydro-1H-pyrrolo[3,4-c]pyridin-1-one A) 4-chloro-2-[2-(difluoromethoxy)pyrimidin-5-yl]-2,3-dihydro-1H-pyrrolo[3,4-c]pyridin-1-one A mixture of methyl 3-(bromomethyl)-2-chloropyridine-4-carboxylate (200 mg), 2-(difluoromethoxy)pyrimidin-5-amine (146 mg), DIPEA (293 mg) and DMF (3.0 mL) was stirred at room temperature 5 hr, and then at 60° C. for 14 hr, and then at 80° C. for 7 hr. To the reaction mixture was added water, and the mixture was extracted with ethyl acetate. The organic layer was washed with water and saturated brine, dried over anhydrous sodium sulfate, and concentrated under reduced pressure. The residue was purified by silica gel column chromatography (ethyl acetate/hexane), and the obtained solid was washed with IPE and hexane to give the title compound (97 mg).

MS: [M+H]$^+$ 312.9.

B) 2-[2-(difluoromethoxy)pyrimidin-5-yl]-4-[4-fluoro-2-(2,2,2-trifluoroethoxy)phenyl]-2,3-dihydro-1H-pyrrolo[3,4-c]pyridin-1-one To a mixture of 1-bromo-4-fluoro-2-(2,2,2-trifluoroethoxy)benzene (165 mg), 4,4,4',4',5,5,5',5'-octamethyl-2,2'-bi-1,3,2-dioxaborolane (184 mg), potassium acetate (89 mg) and CPME (1.6 mL) was added chloro(2-dicyclohexylphosphino-2',4',6'-triisopropyl-1,1'-biphenyl) [2-(2'-amino-1,1'-biphenyl)]palladium(II) (47.6 mg). The mixture was stirred overnight under argon atmosphere at 80° C. To the mixture was added water, the insoluble substance was removed by filtration, and the filtrate was extracted with ethyl acetate. The organic layer was separated, washed with water and saturated brine, dried over anhydrous sodium sulfate, and concentrated under reduced pressure to give 2-[4-fluoro-2-(2,2,2-trifluoroethoxy)phenyl]-4,4,5,5-tetramethyl-1,3,2-dioxaborolane (300 mg) as a crude product. A mixture of the obtained crude product (300 mg), 4-chloro-2-[2-(difluoromethoxy)pyrimidin-5-yl]-2,3-dihydro-1H-pyrrolo[3,4-c]pyridin-1-one (95 mg), [1,1-bis(diphenylphosphino)ferrocene]dichloropalladium(II) (22 mg), potassium carbonate (126 mg), DME (4.5 mL) and water (0.45 mL) was stirred at 85° C. for 3 hr. To the reaction mixture was added water at room temperature, and the mixture was extracted with ethyl acetate. The organic layer was washed with water and saturated brine, dried over anhydrous sodium sulfate, and concentrated under reduced pressure. The residue was purified by silica gel column chromatography (ethyl acetate/hexane), and crystallized from ethyl acetate/heptane to give the title compound (70 mg).
¹H NMR (300 MHz, DMSO-d₆) δ 4.91 (2H, q, J=8.7 Hz), 5.03 (2H, s), 7.09 (1H, td, J=8.4, 2.3 Hz), 7.36 (1H, dd, J=11.3, 2.3 Hz), 7.56 (1H, dd, J=8.4, 6.8 Hz), 7.73 (1H, t, J=71.9 Hz), 7.85 (1H, d, J=4.9 Hz), 8.91 (1H, d, J=4.9 Hz), 9.29 (2H, s).

Example 164

4-[4-fluoro-2-(2,2,2-trifluoroethoxy)phenyl]-2-(4-{[(3R)-oxolan-3-yl]oxy}phenyl)-2,3-dihydro-1H-pyrrolo[3,4-c]pyridin-1-one A) (3R)-3-(4-iodophenoxy)oxolane To a mixture of 4-iodophenol (1274 mg), (3S)-oxolan-3-ol (510 mg), triphenylphosphine (1822 mg) and toluene (10 mL) was added DIAD (1756 mg) at 0° C. The mixture was stirred at room temperature for 3 days. The mixture was purified by silica gel column chromatography (ethyl acetate/hexane) to give the title compound (1.3647 g). ¹H NMR (300 MHz, CDCl₃) δ 2.06-2.29 (2H, m), 3.81-4.05 (4H, m), 4.88 (1H, ddt, J=6.1, 4.1, 2.2, 2.2 Hz), 6.64 (2H, d, J=9.0 Hz), 7.56 (2H, d, J=9.0 Hz).

B) 4-[4-fluoro-2-(2,2,2-trifluoroethoxy)phenyl]-2-(4-{[(3R)-oxolan-3-yl]oxy}phenyl)-2,3-dihydro-1H-pyrrolo[3,4-c]pyridin-1-one To a mixture of (3R)-3-(4-iodophenoxy)oxolane (52.1 mg), 4-[4-fluoro-2-(2,2,2-trifluoroethoxy)phenyl]-2,3-dihydro-1H-pyrrolo[3,4-c]pyridin-1-one (48.8 mg), sodium tert-butoxide (21.56 mg) and toluene (2.0 mL) was added chloro(2-dicyclohexylphosphino-2',4',6'-triisopropyl-1,1'-biphenyl) [2-(2'-amino-1,1'-biphenyl)]palladium(II) (23.54 mg) at room temperature, and the mixture was stirred under argon atmosphere at 110° C. for 2 hr. To the reaction mixture was added again chloro(2-dicyclohexylphosphino-2',4',6'-triisopropyl-1,1'-biphenyl) [2-(2'-amino-1,1'-biphenyl)]palladium(II) (23.54 mg), and the mixture was stirred under argon atmosphere at 110° C. for 2 hr. The residue was purified by silica gel column chromatography (NH, ethyl acetate/hexane), and washed with IPE to give the title compound (30.9 mg).
¹H NMR (300 MHz, CDCl₃) δ 2.10-2.31 (2H, m), 3.85-4.06 (4H, m), 4.35 (2H, q, J=8.2 Hz), 4.83 (2H, s), 4.93 (1H, br. s.), 6.81 (1H, dd, J=9.8, 2.3 Hz), 6.88-7.05 (3H, m), 7.55 (1H, dd, J=8.3, 6.4 Hz), 7.68 (2H, d, J=9.0 Hz), 7.83 (1H, d, J=4.9 Hz), 8.89 (1H, d, J=4.9 Hz).

Example 167

4-[4-fluoro-2-(2,2,2-trifluoroethoxy)phenyl]-2-{6-[(oxan-4-yl)oxy]pyridin-3-yl}-2,3-dihydro-1H-pyrrolo[3,4-c]pyridin-1-one A) 6-[(oxan-4-yl)oxy]pyridin-3-amine A mixture of 5-nitro-2-[(oxan-4-yl)oxy]pyridine (501 mg), 10% palladium-carbon (50% wet, 50 mg) and EtOH (10 mL) was stirred under normal pressure of hydrogen atmosphere at room temperature for 12 hr. The catalyst was removed by filtration, and the filtrate was concentrated under reduced pressure. The residue was purified by silica gel column chromatography (NH, ethyl acetate/hexane) to give the title compound (358 mg).
MS: [M+H]⁺ 195.0.

B) 4-chloro-2-{6-[(oxan-4-yl)oxy]pyridin-3-yl}-2,3-dihydro-1H-pyrrolo[3,4-c]pyridin-1-one A mixture of methyl 3-(bromomethyl)-2-chloropyridine-4-carboxylate (200 mg), 6-[(oxan-4-yl)oxy]pyridin-3-amine (176 mg), DIPEA (235 mg) and DMF (2 mL) was stirred at room temperature for 2 hr, and then at 80° C. for 13 hr. To the reaction mixture was added water at room temperature, and the mixture was extracted with ethyl acetate. The organic layer was washed with water and saturated brine, dried over anhydrous sodium sulfate, and concentrated under reduced pressure. The residue was purified by silica gel column chromatography (ethyl acetate/hexane) to give the title compound (205 mg).
MS: [M+H]⁺ 346.0.

C) 4-[4-fluoro-2-(2,2,2-trifluoroethoxy)phenyl]-2-{6-[(oxan-4-yl)oxy]pyridin-3-yl}-2,3-dihydro-1H-pyrrolo[3,4-c]pyridin-1-one To a mixture of 1-bromo-4-fluoro-2-(2,2,2-trifluoroethoxy)benzene (0.16 g), 4,4,4',4',5,5,5',5'-octamethyl-2,2'-bi-1,3,2-dioxaborolane (0.179 g), potassium acetate (0.086 g) and CPME (1.6 mL) was added chloro(2-dicyclohexylphosphino-2',4',6'-triisopropyl-1,1'-biphenyl) [2-(2'-amino-1,1'-biphenyl)]palladium(II) (0.046 g). The mixture was stirred under argon atmosphere at 100° C. for 18 hr. The insoluble substance was removed by filtration, to the filtrate was added water, and the mixture was extracted with ethyl acetate. The organic layer was separated, washed with water and saturated brine, dried over anhydrous sodium sulfate, and concentrated under reduced pressure to give 2-[4-fluoro-2-(2,2,2-trifluoroethoxy)phenyl]-4,4,5,5-tetramethyl-1,3,2-dioxaborolane (323.2 mg) as a crude product. A mixture of the obtained crude product (323 mg), 4-chloro-2-{6-[(oxan-4-yl)oxy]pyridin-3-yl}-2,3-dihydro-1H-pyrrolo[3,4-c]pyridin-1-one (100 mg), [1,1-bis(diphenylphosphino)ferrocene]dichloropalladium(II) (21.16 mg), potassium carbonate (120 mg), DME (3.0 mL) and water (0.45 mL) was stirred under argon atmosphere at 85° C. for 30 min. To the reaction mixture was added water at room temperature, and the mixture was extracted with ethyl acetate. The organic layer was washed with water and saturated brine, dried over anhydrous sodium sulfate, and concentrated under reduced pressure. The residue was purified by silica gel column chromatography (ethyl acetate/hexane), and crystallized from ethyl acetate/hexane to give the title compound (74.5 mg).
¹H NMR (300 MHz, DMSO-d₆) δ 1.56-1.70 (2H, m), 1.95-2.06 (2H, m), 3.44-3.55 (2H, m), 3.82-3.92 (2H, m), 4.85-4.98 (4H, m), 5.11-5.24 (1H, m), 6.91 (1H, d, J=9.0 Hz), 7.04-7.12 (1H, m), 7.28-7.35 (1H, m), 7.52-7.60 (1H, m), 7.80 (1H, d, J=4.5 Hz), 8.24 (1H, dd, J=8.9, 2.8 Hz), 8.59 (1H, d, J=2.6 Hz), 8.88 (1H, d, J=4.9 Hz).

Example 174

2-[6-(difluoromethoxy)pyridin-3-yl]-4-{4-fluoro-2-[2-(trifluoromethoxy)ethoxy]phenyl}-2,3-dihydro-1H-pyrrolo[3,4-c]pyridin-1-one To a mixture of 2-(trifluoromethoxy)ethan-1-ol (50.0 mg), tributylphosphine (0.095 mL), 2-[6-(difluoromethoxy)pyridin-3-yl]-4-(4-fluoro-2-hydroxyphenyl)-2,3-dihydro-1H-pyrrolo[3,4-c]pyridin-1-one (74.4 mg), toluene (1.0 mL) and THF (1.0 mL) was added DIAD (0.078 mL) at 0° C., and the mixture was stirred at room temperature for 4 hr, and then stirred overnight at 65° C. To the reaction mixture were added 2-(trifluoromethoxy)ethan-1-ol (50.0 mg), tributylphosphine (0.095 mL) and DIAD (0.078 mL) at room temperature, and the mixture was stirred at room temperature for 3 hr. The mixture was concentrated under reduced pressure, and the residue was purified by silica gel column chromatography (ethyl acetate/hexane), followed by HPLC (L-Column 2 ODS, mobile phase: water/acetonitrile (containing 0.1% TFA)). To the obtained fraction was added saturated aqueous sodium hydrogencarbonate solution, and the mixture was extracted with ethyl acetate. The extract was dried over anhydrous sodium sulfate, and the solvent was evaporated under reduced pressure to give the title compound (52.8 mg).

$^1$H NMR (300 MHz, DMSO-$d_6$) δ 4.22-4.31 (2H, m), 4.32-4.43 (2H, m), 5.01 (2H, s), 7.01 (1H, td, J=8.4, 2.1 Hz), 7.19 (2H, d, J=9.0 Hz), 7.40-8.00 (3H, m), 8.47 (1H, dd, J=9.0, 2.6 Hz), 8.75 (1H, d, J=2.6 Hz), 8.87 (1H, d, J=4.9 Hz).

Example 176

5-[4-fluoro-2-(2,2,2-trifluoroethoxy)phenyl]-7-[4-(2,2,2-trifluoroethoxy)phenyl]-2,3,6,7-tetrahydropyrrolo[3,4-e][1,4]diazepin-8(1H)-one A) 4-[4-fluoro-2-(2,2,2-trifluoroethoxy)benzoyl]-3-hydroxy-1-[4-(2,2,2-trifluoroethoxy)phenyl]-1,5-dihydro-2H-pyrrol-2-one To a mixture of 4-(2,2,2-trifluoroethoxy)aniline (0.593 mL), EtOH (10 mL) and AcOH (30 mL) was added paraformaldehyde (216 mg), and the mixture was stirred at room temperature for 0.5 hr. To the reaction mixture was added ethyl (2Z)-4-[4-fluoro-2-(2,2,2-trifluoroethoxy)phenyl]-2-hydroxy-4-oxobut-2-enoate (1.01 g), and the mixture was stirred overnight at room temperature, and concentrated under reduced pressure. The residue was diluted with ethyl acetate and water, and the mixture was extracted with ethyl acetate. The organic layer was washed with water and brine, dried over anhydrous sodium sulfate, and concentrated under reduced pressure. To the residue was added IPE, and the solid was collected by filtration, and washed with IPE to give the title compound (838 mg).

B) 5-[4-fluoro-2-(2,2,2-trifluoroethoxy)phenyl]-7-[4-(2,2,2-trifluoroethoxy)phenyl]-2,3,6,7-tetrahydropyrrolo[3,4-e][1,4]diazepin-8(1H)-one To a mixture of 4-[4-fluoro-2-(2,2,2-trifluoroethoxy)benzoyl]-3-hydroxy-1-[4-(2,2,2-trifluoroethoxy)phenyl]-1,5-dihydro-2H-pyrrol-2-one (100 mg) and EtOH (10 mL) was added ethane-1,2-diamine (0.068 mL), and the mixture was heated with reflux overnight, and cooled to room temperature, and the insoluble substance was removed by filtration. To the filtrate was added water, and the precipitated solid was collected by filtration, and washed with water and ethyl acetate/hexane to give the title compound (45 mg).

$^1$H NMR (300 MHz, DMSO-$d_6$) δ 3.16 (1H, brs), 3.60 (2H, brs), 4.07 (2H, s), 4.34 (1H, brs), 4.67-4.78 (2H, m, J=8.9, 8.9, 8.9 Hz), 4.76-4.87 (2H, m), 6.92 (1H, td, J=8.5, 2.4 Hz), 7.05 (2H, d, J=9.3 Hz), 7.11 (1H, dd, J=11.1, 2.3 Hz), 7.19 (1H, t, J=4.2 Hz), 7.26 (1H, dd, J=8.3, 7.0 Hz), 7.63 (2H, d, J=9.1 Hz).

Example 178

4-[4-fluoro-2-(2,2,2-trifluoroethoxy)phenyl]-2-[4-(3-methoxyoxetan-3-yl)phenyl]-2,3-dihydro-1H-pyrrolo[3,4-c]pyridin-1-one A) 3-(4-bromophenyl)-3-methoxyoxetane To a mixture of sodium hydride (60% oil, 38.4 mg) and DMF (4.0 mL) was added 3-(4-bromophenyl)oxetan-3-ol (200 mg) at 0° C. The mixture was stirred at 0° C. for 10 min. Iodomethane (0.109 mL) was added thereto at 0° C. The mixture was stirred overnight at room temperature. To the mixture was added ethyl acetate, and the mixture was poured into water. The organic layer was separated, washed with water and saturated brine, dried over anhydrous sodium sulfate, and concentrated under reduced pressure. The residue was purified by silica gel column chromatography (ethyl acetate/hexane) to give the title compound (180 mg).

$^1$H NMR (300 MHz, CDCl$_3$) δ 3.13 (3H, s), 4.77 (2H, d, J=6.8 Hz), 4.92 (2H, d, J=6.8 Hz), 7.34 (2H, d, J=8.3 Hz), 7.56 (2H, d, J=8.3 Hz).

B) 4-[4-fluoro-2-(2,2,2-trifluoroethoxy)phenyl]-2-[4-(3-methoxyoxetan-3-yl)phenyl]-2,3-dihydro-1H-pyrrolo[3,4-c]pyridin-1-one To a mixture of 3-(4-bromophenyl)-3-methoxyoxetane (45.0 mg), 4-[4-fluoro-2-(2,2,2-trifluoroethoxy)phenyl]-2,3-dihydro-1H-pyrrolo[3,4-c]pyridin-1-one (50.4 mg), sodium tert-butoxide (22.27 mg) and toluene (3.0 mL) was added chloro(2-dicyclohexylphosphino-2',4',6'-triisopropyl-1,1'-biphenyl) [2-(2'-amino-1,1'-biphenyl)]palladium(II) (12.15 mg) at room temperature. The mixture was stirred under argon atmosphere at 110° C. for 2 hr. The residue was purified by silica gel column chromatography (NH, ethyl acetate/hexane), and washed with IPE to give the title compound (68.4 mg).

$^1$H NMR (300 MHz, CDCl$_3$) δ 3.15 (3H, s), 4.37 (2H, q, J=8.0 Hz), 4.83 (2H, d, J=7.2 Hz), 4.90 (2H, s), 4.94 (2H, d, J=7.2 Hz), 6.83 (1H, dd, J=10.0, 2.4 Hz), 7.00 (1H, td, J=8.3, 2.3 Hz), 7.46-7.63 (3H, m), 7.81-7.94 (3H, m), 8.91 (1H, d, J=4.9 Hz).

Example 183

5-(4-fluorophenyl)-1-(2-methoxyphenyl)-1,4,5,6-tetrahydropyrrolo[3,4-c]pyrazole

A) tert-butyl 1-(2-methoxyphenyl)-4,6-dihydropyrrolo[3,4-c]pyrazole-5(1H)-carboxylate To a mixture of tert-butyl 2,6-dihydropyrrolo[3,4-c]pyrazole-5(4H)-carboxylate (100 mg), (2-methoxyphenyl)boronic acid (145 mg), pyridine (0.154 mL) and acetonitrile (10 mL) was added copper(II) acetate (174 mg), and the mixture was stirred overnight at room temperature. The mixture was filtered, and the filtrate was concentrated under reduced pressure. The residue was purified by silica gel column chromatography (ethyl acetate/hexane) to give the title compound (68.4 mg).

MS: [M+H]$^+$ 316.4.

B) 1-(2-methoxyphenyl)-1,4,5,6-tetrahydropyrrolo[3,4-c]pyrazole

To a mixture of tert-butyl 1-(2-methoxyphenyl)-4,6-dihydropyrrolo[3,4-c]pyrazole-5(1H)-carboxylate (125 mg) and toluene (1 mL) was added TFA (1 mL), and the mixture was stirred at room temperature for 1 hr. The mixture was concentrated under reduced pressure, and the residue was purified by silica gel column chromatography (NH, ethyl acetate/hexane and MeOH/ethyl acetate) to give the title compound (82.4 mg).

MS: [M+H]$^+$ 216.4.

C) 5-(4-fluorophenyl)-1-(2-methoxyphenyl)-1,4,5,6-tetrahydropyrrolo[3,4-c]pyrazole To a mixture of 1-bromo-4-fluorobenzene (0.018 mL), 1-(2-methoxyphenyl)-1,4,5,6-tetrahydropyrrolo[3,4-c]pyrazole (30.0 mg), sodium tert-butoxide (20.09 mg) and toluene (1.5 mL) was added chloro(2-dicyclohexylphosphino-2',4',6'-triisopropyl-1,1'-biphenyl) [2-(2'-amino-1,1'-biphenyl)]palladium(II) (10.97 mg), and the mixture was stirred under nitrogen atmosphere at 110° C. for 1 hr. To the mixture were added water and ethyl acetate, the insoluble substance was removed by filtration, and the filtrate was extracted with ethyl acetate. The organic layer was separated, washed with saturated brine, dried over anhydrous sodium sulfate, and concentrated under reduced pressure. The residue was purified by silica gel column chromatography (NH, ethyl acetate/hexane) to give the title compound (32.6 mg).

$^1$H NMR (300 MHz, DMSO-d$_6$) δ3.89 (3H, s), 4.35-4.46 (4H, m), 6.55-6.65 (2H, m), 7.01-7.14 (3H, m), 7.26 (1H, d, J=7.5 Hz), 7.37-7.47 (1H, m), 7.53 (1H, dd, J=7.9, 1.5 Hz), 7.59 (1H, s).

Example 184

2-[6-(2-hydroxypropan-2-yl)pyridin-3-yl]-4-[2-(2,2,2-trifluoroethoxy)phenyl]-2,3-dihydro-1H-pyrrolo[3,4-c]pyridin-1-one

A) 4-chloro-2-[6-(2-hydroxypropan-2-yl)pyridin-3-yl]-2,3-dihydro-1H-pyrrolo[3,4-c]pyridin-1-one A mixture of methyl 3-(bromomethyl)-2-chloropyridine-4-carboxylate (150 mg), 2-(5-aminopyridin-2-yl)propan-2-ol (86 mg), TEA (0.158 mL) and THF (2.84 mL) was stirred at room temperature for 1 hr, and then at 50° C. for 22 hr. The reaction mixture was cooled to room temperature, and purified by silica gel column chromatography (NH, ethyl acetate/hexane) to give the title compound (106 mg).

MS: [M+H]$^+$ 303.9.

B) 2-[6-(2-hydroxypropan-2-yl)pyridin-3-yl]-4-[2-(2,2,2-trifluoroethoxy)phenyl]-2,3-dihydro-1H-pyrrolo[3,4-c]pyridin-1-one To a mixture of [2-(2,2,2-trifluoroethoxy)phenyl]boronic acid (77 mg), 4-chloro-2-[6-(2-hydroxypropan-2-yl)pyridin-3-yl]-2,3-dihydro-1H-pyrrolo[3,4-c]pyridin-1-one (53.0 mg), 2M aqueous potassium carbonate solution (0.262 mL) and DME (1.745 mL) was added [1,1-bis(diphenylphosphino)ferrocene]dichloropalladium(II) dichloromethane adduct (14.25 mg). The mixture was stirred under argon atmosphere at 85° C. for 16 hr. The reaction mixture was purified by silica gel column chromatography (NH, ethyl acetate/hexane) to give the title compound (42.1 mg).

$^1$H NMR (300 MHz, DMSO-d$_6$) δ 1.44 (6H, s), 4.87 (2H, q, J=9.0 Hz), 5.02 (2H, s), 5.24 (1H, s), 7.19-7.28 (1H, m), 7.33 (1H, d, J=8.3 Hz), 7.49-7.61 (2H, m), 7.71 (1H, d, J=9.0 Hz), 7.81 (1H, d, J=4.9 Hz), 8.27 (1H, dd, J=8.7, 2.6 Hz), 8.90 (1H, d, J=4.9 Hz), 9.00 (1H, d, J=2.6 Hz).

Example 186

1-(4,5-difluoro-2-methoxyphenyl)-5-(4-fluorophenyl)-5,6-dihydropyrrolo[3,4-d]imidazol-4(1H)-one

A) ethyl (2Z)-3-(4,5-difluoro-2-methoxyanilino)-2-nitrobut-2-enoate

A mixture of ethyl (2Z)-3-ethoxy-2-nitrobut-2-enoate (2.74 g), 4,5-difluoro-2-methoxyaniline (1.65 g) and EtOH (5 mL) was stirred at room temperature for 16 hr. The mixture was concentrated under reduced pressure, and the residue was purified by silica gel column chromatography (ethyl acetate/petroleum ether) to give the title compound (2.23 mg).

MS: [M+H]$^+$ 317 0.1.

B) ethyl 1-(4,5-difluoro-2-methoxyphenyl)-5-methyl-1H-imidazole-4-carboxylate To a mixture of ethyl (2Z)-3-(4,5-difluoro-2-methoxyanilino)-2-nitrobut-2-enoate (2.33 g), triethyl orthoformate (25 mL) and AcOH (25 mL) was added iron (2.06 g), and the mixture was heated with reflux for 2 hr. The reaction mixture was concentrated under reduced pressure, and the residue was purified by silica gel column chromatography (ethyl acetate/petroleum ether) to give the title compound (822 mg).

MS: [M+H]$^+$ 296.9.

C) ethyl 2-bromo-5-(bromomethyl)-1-(4,5-difluoro-2-methoxyphenyl)-1H-imidazole-4-carboxylate A mixture of ethyl 1-(4,5-difluoro-2-methoxyphenyl)-5-methyl-1H-imidazole-4-carboxylate (578 mg), NBS (868 mg), benzoyl peroxide (47 mg) and carbon tetrachloride (15 mL) was heated with reflux for 4 hr. The mixture was concentrated under reduced pressure, and the residue was purified by silica gel column chromatography (ethyl acetate/petroleum ether) to give the title compound (551 mg).

$^1$H NMR (400 MHz, CDCl$_3$) δ 1.43 (3H, t, J=7.2 Hz), 3.79 (3H, s), 4.30 (1H, d, J=11.2 Hz), 4.39-4.49 (2H, m), 4.87 (1H, d, J=11.2 Hz), 6.94 (1H, dd, J=11.2, 6.8 Hz), 7.23-7.29 (1H, m).

D) ethyl 2-bromo-1-(4,5-difluoro-2-methoxyphenyl)-5-[(4-fluoroanilino)methyl]-1H-imidazole-4-carboxylate To a mixture of ethyl 2-bromo-5-(bromomethyl)-1-(4,5-difluoro-2-methoxyphenyl)-1H-imidazole-4-carboxylate (767 mg), 4-fluoroaniline (244 mg) and DMF (8 mL) was added potassium carbonate (467 mg), and the mixture was stirred under nitrogen atmosphere at room temperature for 16 hr. The mixture was poured into water, and extracted with ethyl acetate. The organic layer was washed with brine, dried over anhydrous sodium sulfate, and concentrated under reduced pressure. The residue was purified by silica gel column chromatography (ethyl acetate/petroleum ether) to give the title compound (665 mg).

MS: [M+H]$^+$ 485.8.

E) ethyl 1-(4,5-difluoro-2-methoxyphenyl)-5-[(4-fluoroanilino)methyl]-1H-imidazole-4-carboxylate To a solution of ethyl 2-bromo-1-(4,5-difluoro-2-methoxyphenyl)-5-[(4-fluoroanilino)methyl]-1H-imidazole-4-carboxylate (265 mg) in EtOH (3 mL) was added 10% palladium-carbon (55% wet, 20 mg), and the mixture was stirred under normal pressure of hydrogen atmosphere at room temperature for 2 hr. The catalyst was removed by filtration, and the filtrate was concentrated under reduced pressure to give the title compound (173 mg).

MS: [M+H]$^+$ 405.9.

F) 1-(4,5-difluoro-2-methoxyphenyl)-5-[(4-fluoroanilino)methyl]-1H-imidazole-4-carboxylic acid To a mixture of ethyl 1-(4,5-difluoro-2-methoxyphenyl)-5-[(4-fluoroanilino)methyl]-1H-imidazole-4-carboxylate (173 mg), MeOH (2 mL), THF (2 mL) and water (1 mL) was added lithium hydroxide monohydrate (90 mg), and the mixture was stirred at room temperature for 16 hr. The mixture was concentrated under reduced pressure, the mixture was poured into water, and adjusted to pH=4 with 1M hydrochloric acid. The precipitated solid was collected by filtration, and washed with water to give the title compound (121 mg).

MS: [M+H]$^+$ 378.1.

G) 1-(4,5-difluoro-2-methoxyphenyl)-5-(4-fluorophenyl)-5,6-dihydropyrrolo[3,4-d]imidazol-4(1H)-one To a mixture of 1-(4,5-difluoro-2-methoxyphenyl)-5-[(4-fluoroanilino)methyl]-1H-imidazole-4-carboxylic acid (50 mg), TEA (54 mg) and methylene chloride (5 mL) was added phosphorus oxychloride (41 mg) at 0° C., and the mixture was stirred at room temperature for 1 hr. The reaction mixture was poured into water/methylene chloride, and the organic layer was separated, and concentrated under reduced pressure. The residue was diluted with ethyl acetate, and the mixture was washed with water and saturated brine, dried over anhydrous sodium sulfate, and concentrated under reduced pressure. The residue was purified by preparative thin layer chromatography (ethyl acetate) to give the title compound (3.5 mg).

$^1$H NMR (400 MHz, DMSO-d$_6$) δ 3.91 (3H, s), 4.97 (2H, s), 7.18-7.30 (2H, m), 7.52-7.62 (1H, m), 7.73-7.82 (2H, m), 7.93 (1H, dd, J=10.8, 8.4 Hz), 8.18 (1H, s).

Example 195

2-[4-(2-hydroxy-2-methylpropoxy)phenyl]-4-[2-(2,2,2-trifluoroethoxy)phenyl]-2,3-dihydro-1H-pyrrolo[3,4-c]pyridin-1-one A) 2-methyl-1-(4-nitrophenoxy)propan-2-ol A suspension of 4-nitrophenol (0.696 g), sodium dihydrogen phosphate (0.600 g) and potassium carbonate (0.691 g) in acetonitrile (5 mL) and water (2 mL) was stirred at room temperature for 5 min, and 2,2-dimethyloxirane (0.668 mL) was added thereto. The mixture was subjected to microwave irradiation at 150° C. for 3 hr. The reaction mixture was diluted with ethyl acetate, and washed with saturated aqueous ammonium chloride solution and saturated brine. The organic layer was dried over anhydrous sodium sulfate, and concentrated under reduced pressure. The residue was purified by silica gel column chromatography (ethyl acetate/hexane) to give the title compound (1.023 g).

MS: [M+H]$^+$ 212.0.

B) 1-(4-aminophenoxy)-2-methylpropan-2-ol

To a solution of 2-methyl-1-(4-nitrophenoxy)propan-2-ol (1.023 g) in MeOH (10 mL) was added 10% palladium on carbon (55% wet, 102 mg), and the mixture was stirred under hydrogen atmosphere at room temperature for 2 hr. The mixture was filtered through Celite, and the filtrate was concentrated under reduced pressure to give the title compound (0.845 g).

MS: [M+H]$^+$ 182.0.

C) 4-chloro-2-[4-(2-hydroxy-2-methylpropoxy)phenyl]-2,3-dihydro-1H-pyrrolo[3,4-c]pyridin-1-one A mixture of methyl 3-(bromomethyl)-2-chloropyridine-4-carboxylate (200 mg), 1-(4-aminophenoxy)-2-methylpropan-2-ol (151 mg), DIPEA (0.317 mL) and DMF (3.0 mL) was stirred at room temperature for 2 hr, and then at 60° C. for 18 hr. To the reaction mixture was added water at room temperature, and the mixture was extracted with ethyl acetate. The organic layer was washed three times with water, washed with saturated brine, dried over anhydrous sodium sulfate, and concentrated under reduced pressure. The residue was collected by filtration, and washed with IPE/hexane to give the title compound (212 mg).

MS: [M+H]$^+$ 333.0.

D) 2-[4-(2-hydroxy-2-methylpropoxy)phenyl]-4-[2-(2,2,2-trifluoroethoxy)phenyl]-2,3-dihydro-1H-pyrrolo[3,4-c]pyridin-1-one A mixture of 4-chloro-2-[4-(2-hydroxy-2-methylpropoxy)phenyl]-2,3-dihydro-1H-pyrrolo[3,4-c]pyridin-1-one (100 mg), [2-(2,2,2-trifluoroethoxy)phenyl]boronic acid (86 mg), potassium carbonate (83 mg), [1,1-bis(diphenylphosphino)ferrocene]dichloropalladium(II) (21.99 mg), DME (2.4 mL) and water (0.3 mL) was stirred under argon atmosphere at 90° C. for 2 hr. To the reaction mixture was added water at room temperature, and the mixture was extracted with ethyl acetate. The organic layer was washed with water and saturated brine, dried over anhydrous sodium sulfate, and concentrated under reduced pressure. The residue was purified by silica gel column chromatography (NH, followed by SI, ethyl acetate/hexane). The obtained solid was recrystallized from ethyl acetate/heptane to give the title compound (81 mg).

$^1$H NMR (300 MHz, DMSO-d$_6$) δ 1.20 (6H, s), 3.72 (2H, s), 4.63 (1H, s), 4.84 (2H, q, J=9.0 Hz), 4.94 (2H, s), 7.00 (2H, d, J=9.4 Hz), 7.20-7.27 (1H, m), 7.32 (1H, d, J=8.3 Hz), 7.49-7.59 (2H, m), 7.74-7.83 (3H, m), 8.87 (1H, d, J=5.1 Hz).

Example 200

6-[4-(2-hydroxypropan-2-yl)phenyl]-4-[2-(2,2,2-trifluoroethoxy)phenyl]-5,6-dihydro-7H-pyrrolo[3,4-d]pyrimidin-7-one A) ethyl 5-(bromomethyl)-6-chloropyrimidine-4-carboxylate To a mixture of ethyl 6-chloro-5-methylpyrimidine-4-carboxylate (156.5 mg) and trifluoromethylbenzene (3 mL)

were added NBS (167 mg) and AIBN (15.37 mg) at 0° C. The mixture was stirred overnight at 80° C. To the mixture was added water at room temperature, and the mixture was extracted with ethyl acetate. The organic layer was separated, washed with saturated brine, dried over anhydrous sodium sulfate, and concentrated under reduced pressure. The residue was purified by silica gel column chromatography (ethyl acetate/hexane) to give the title compound (151.5 mg).

$^1$H NMR (300 MHz, DMSO-$d_6$) δ 1.36 (3H, t, J=7.2 Hz), 4.45 (2H, q, J=6.9 Hz), 4.82 (2H, s), 9.13 (1H, s).

B) 6-[4-(2-hydroxypropan-2-yl)phenyl]-4-[2-(2,2,2-trifluoroethoxy)phenyl]-5,6-dihydro-7H-pyrrolo[3,4-d]pyrimidin-7-one To a mixture of 2-(4-aminophenyl)propan-2-ol (53.7 mg) and DIPEA (0.160 mL) and DMF (2 mL) was added a mixture of ethyl 5-(bromomethyl)-6-chloropyrimidine-4-carboxylate (85.1 mg) and DMF (2 mL) at room temperature. The mixture was stirred at room temperature for 2 hr, and then at 40° C. for 2 hr. To the mixture was added water at 0° C., and the mixture was extracted with ethyl acetate. The organic layer was separated, washed with saturated brine, dried over anhydrous sodium sulfate, and concentrated under reduced pressure to give ethyl 6-chloro-5-{[4-(2-hydroxypropan-2-yl)anilino]methyl}pyrimidine-4-carboxylate as a crude product. To a mixture of the obtained crude product, [2-(2,2,2-trifluoroethoxy)phenyl]boronic acid (134 mg), cesium carbonate (248 mg), DME (4 mL) and water (0.100 mL) was added [1,1-bis(diphenylphosphino)ferrocene]dichloropalladium(II) (22.3 mg) at room temperature. The mixture was stirred overnight under nitrogen atmosphere at 85° C. To the mixture was added ethyl acetate at room temperature, and the insoluble substance was removed by filtration. The filtrate was washed with water and saturated brine, dried over anhydrous sodium sulfate, and concentrated under reduced pressure. The residue was purified by silica gel column chromatography (NH, ethyl acetate/hexane), followed by preparative HPLC (L-Column 2 ODS, mobile phase: water/acetonitrile (containing 0.1% TFA)). To the obtained fraction was added saturated aqueous sodium hydrogencarbonate solution, and the mixture was extracted with ethyl acetate. The extract was dried over anhydrous magnesium sulfate, and the solvent was evaporated under reduced pressure to give the title compound (23.4 mg).

$^1$H NMR (300 MHz, DMSO-$d_6$) δ 1.44 (6H, s), 4.92 (2H, q, J=8.7 Hz), 5.04 (3H, d, J=3.8 Hz), 7.23-7.34 (1H, m), 7.35-7.44 (1H, m), 7.54 (2H, d, J=8.7 Hz), 7.60-7.69 (2H, m), 7.85 (2H, d, J=8.7 Hz), 9.50 (1H, s).

Example 201

2-[4-(difluoromethanesulfonyl)phenyl]-4-[2-methyl-6-(2,2,2-trifluoroethoxy)phenyl]-2,3-dihydro-1H-pyrrolo[3,4-c]pyridin-1-one A) 2-bromo-1-methyl-3-(2,2,2-trifluoroethoxy)benzene To a mixture of 2-bromo-3-methylphenol (5.00 g), potassium carbonate (7.39 g) and DMF (50 mL) was added 2,2,2-trifluoroethyl trifluoromethanesulfonate (7.70 mL) at room temperature. The mixture was stirred overnight at 90° C. To the mixture was added water at room temperature, and the mixture was extracted with ethyl acetate. The organic layer was separated, washed with water and saturated brine, dried over anhydrous magnesium sulfate, and concentrated under reduced pressure. The residue was purified by silica gel column chromatography (ethyl acetate/hexane) to give the title compound (7.18 g).

$^1$H NMR (300 MHz, CDCl$_3$) δ2.43 (3H, s), 4.39 (2H, q, J=8.3 Hz), 6.77 (1H, d, J=7.9 Hz), 6.98 (1H, d, J=7.9 Hz), 7.11-7.23 (1H, m).

B) 4-[2-methyl-6-(2,2,2-trifluoroethoxy)phenyl]-2,3-dihydro-1H-pyrrolo[3,4-c]pyridin-1-one To a mixture of 2-bromo-1-methyl-3-(2,2,2-trifluoroethoxy)benzene (149 mg), 4,4,4',4',5,5,5',5'-octamethyl-2,2'-bi-1,3,2-dioxaborolane (169 mg), potassium carbonate (82 mg) and CPME (5.0 mL) was added [1,1-bis(diphenylphosphino)ferrocene]dichloropalladium(II) (81 mg) at room temperature. The mixture was stirred under nitrogen atmosphere at 100° C. for 5 hr. The mixture was filtered, and the filtrate was concentrated under reduced pressure to give 4,4,5,5-tetramethyl-2-[2-methyl-6-(2,2,2-trifluoroethoxy)phenyl]-1,3,2-dioxaborolane as a crude product. To a mixture of the obtained crude product, 4-chloro-2,3-dihydro-1H-pyrrolo[3,4-c]pyridin-1-one (61.8 mg), potassium carbonate (101 mg) and DME (3.0 mL)/water (1.0 mL) was added 4-(di-tert-butylphosphino)-N,N-dimethylaniline-dichloropalladium (49.3 mg) at room temperature. The mixture was stirred under microwave irradiation at 120° C. for 4 hr. To the mixture was added ethyl acetate, and the mixture was poured into water. The organic layer was separated, washed with water and saturated brine, dried over anhydrous sodium sulfate, and concentrated under reduced pressure. The residue was purified by silica gel column chromatography (SI and NH, ethyl acetate/hexane and MeOH/ethyl acetate) to give the title compound (36.8 mg).

MS: [M+H]$^+$ 323.0.

C) 2-[4-(difluoromethanesulfonyl)phenyl]-4-[2-methyl-6-(2,2,2-trifluoroethoxy)phenyl]-2,3-dihydro-1H-pyrrolo[3,4-c]pyridin-1-one To a mixture of 1-bromo-4-(difluoromethanesulfonyl)benzene (51.3 mg), 4-[2-methyl-6-(2,2,2-trifluoroethoxy)phenyl]-2,3-dihydro-1H-pyrrolo[3,4-c]pyridin-1-one (36.8 mg), sodium tert-butoxide (16.46 mg) and toluene (2.0 mL) was added chloro(2-dicyclohexylphosphino-2',4',6'-triisopropyl-1,1'-biphenyl) [2-(2'-amino-1,1'-biphenyl)]palladium(II) (13.48 mg) at room temperature. The mixture was stirred under argon atmosphere at 110° C. for 1 hr. The reaction mixture was purified by silica gel column chromatography (NH, ethyl acetate/hexane), and the solid was washed with IPE to give the title compound (10.2 mg).

$^1$H NMR (300 MHz, CDCl$_3$) δ 2.13 (3H, s), 4.07-4.25 (1H, m), 4.37 (1H, dd, J=12.1, 7.9 Hz), 4.56-4.69 (1H, m), 4.83-4.96 (1H, m), 5.97-6.41 (1H, m), 6.88-6.98 (1H, m), 7.12 (1H, d, J=7.5 Hz), 7.35-7.47 (1H, m), 7.85 (1H, d, J=5.3 Hz), 8.01 (2H, d, J=9.0 Hz), 8.13-8.22 (2H, m), 8.96 (1H, d, J=4.9 Hz).

Example 202

2-{1-[(3-fluorooxetan-3-yl)methyl]-1H-pyrazol-4-yl}-4-[4-fluoro-2-(2,2,2-trifluoroethoxy)phenyl]-2,3-dihydro-1H-pyrrolo[3,4-c]pyridin-1-one A) 1-[(3-fluorooxetan-3-yl)methyl]-4-nitro-1H-pyrazole To a mixture of 4-nitro-1H-pyrazole (270.6 mg), potassium carbonate (364 mg) and DMF (5 mL) was added a mixture of (3-fluorooxetan-3-yl)methyl 4-methylbenzene-1-sulfonate (631.0 mg) and DMF (5 mL) at 0° C. The mixture was stirred overnight at room temperature, and then stirred at 40° C. for 1 hr. To the mixture was added water at 0° C., and the mixture was extracted with ethyl acetate. The aqueous layer was extracted with ethyl acetate, and the organic layers were combined, washed with saturated brine, dried over anhydrous sodium sulfate, and concentrated under reduced pressure. The residue was purified by silica gel column chromatography (NH, ethyl acetate/hexane) to give the title compound (483.3 mg).

MS: [M+H]$^+$ 201.9.

B) 1-[(3-fluorooxetan-3-yl)methyl]-1H-pyrazol-4-amine

A mixture of 1-[(3-fluorooxetan-3-yl)methyl]-4-nitro-1H-pyrazole (481.4 mg), 10% palladium-carbon (55% wet, 50.4 mg) and THF (10 mL) was stirred under normal pressure of hydrogen atmosphere at room temperature for 4 hr. The catalyst was removed by filtration, and the filtrate was concentrated under reduced pressure to give the title compound (411.8 mg).

$^1$H NMR (300 MHz, DMSO-d$_6$) δ 3.84 (2H, brs), 4.37-4.80 (6H, m), 6.95 (1H, s), 7.03 (1H, s).

C) 4-chloro-2-{1-[(3-fluorooxetan-3-yl)methyl]-1H-pyrazol-4-yl}-2,3-dihydro-1H-pyrrolo[3,4-c]pyridin-1-one To a mixture of 1-[(3-fluorooxetan-3-yl)methyl]-1H-pyrazol-4-amine (311.8 mg), DIPEA (586 mg) and DMF (3 mL) was added a mixture of methyl 3-(bromomethyl)-2-chloropyridine-4-carboxylate (400.0 mg) and DMF (3 mL). The mixture was stirred overnight at room temperature. To the mixture was added water at room temperature, and the mixture was extracted with ethyl acetate. The organic layer was separated, washed with saturated brine, dried over anhydrous sodium sulfate, and concentrated under reduced pressure. The residue was washed with ethyl acetate/IPE to give the title compound (424.0 mg).

MS: [M+H]$^+$ 323.0.

D) 2-{1-[(3-fluorooxetan-3-yl)methyl]-1H-pyrazol-4-yl}-4-[4-fluoro-2-(2,2,2-trifluoroethoxy)phenyl]-2,3-dihydro-1H-pyrrolo[3,4-c]pyridin-1-one To a mixture of 1-bromo-4-fluoro-2-(2,2,2-trifluoroethoxy)benzene (290.8 mg), 4,4,4',4',5,5,5',5'-octamethyl-2,2'-bi-1,3,2-dioxaborolane (541 mg), potassium acetate (314 mg) and DMF (3 mL) was added [1,1-bis(diphenylphosphino)ferrocene]dichloropalladium(II) (78 mg) at room temperature. The mixture was stirred overnight under nitrogen atmosphere at 80° C. To the mixture was added ethyl acetate at room temperature, and the insoluble substance was removed by filtration. The filtrate was washed with water and saturated brine, dried over anhydrous sodium sulfate, and concentrated under reduced pressure to give 2-[4-fluoro-2-(2,2,2-trifluoroethoxy)phenyl]-4,4,5,5-tetramethyl-1,3,2-dioxaborolane as a crude product. To a mixture of the obtained crude product, 4-chloro-2-{1-[(3-fluorooxetan-3-yl)methyl]-1H-pyrazol-4-yl}-2,3-dihydro-1H-pyrrolo[3,4-c]pyridin-1-one (81.7 mg), potassium carbonate (87 mg), DME (4 mL) and water (0.100 mL) was added [1,1-bis(diphenylphosphino)ferrocene]dichloropalladium(II) (18.52 mg) at room temperature. The mixture was stirred overnight under nitrogen atmosphere at 85° C. To the mixture was added ethyl acetate at room temperature, and the insoluble substance was removed by filtration. The filtrate was washed with water and saturated brine, dried over anhydrous sodium sulfate, and concentrated under reduced pressure. The residue was purified by silica gel column chromatography (NH, ethyl acetate/hexane), and washed with ethyl acetate/IPE to give the title compound (16.1 mg).

$^1$H NMR (300 MHz, DMSO-d$_6$) δ 4.50-4.99 (10H, m), 7.08 (1H, td, J=8.3, 2.3 Hz), 7.34 (1H, dd, J=10.9, 2.3 Hz), 7.56 (1H, dd, J=8.5, 7.0 Hz), 7.76 (1H, d, J=4.9 Hz), 7.87 (1H, s), 8.29 (1H, s), 8.85 (1H, d, J=4.9 Hz).

Example 204

2-{6-[(3-methyloxetan-3-yl)oxy]pyridin-3-yl}-4-[2-(2,2,2-trifluoroethoxy)phenyl]-2,3-dihydro-1H-pyrrolo[3,4-c]pyridin-1-one

A) 2-[(3-methyloxetan-3-yl)oxy]-5-nitropyridine

To a mixture of 2-chloro-5-nitropyridine (500 mg), 3-methyloxetan-3-ol (306 mg) and THF (10 mL) was added sodium hydride (60% oil, 164 mg) at 0° C. The mixture was stirred under argon atmosphere at room temperature for 13 hr. To the reaction mixture was added water at room temperature, and the mixture was extracted with ethyl acetate. The organic layer was separated, washed with water and saturated brine, dried over anhydrous sodium sulfate, and concentrated under reduced pressure. The residue was purified by silica gel column chromatography (ethyl acetate/hexane) to give the title compound (454.8 mg).

MS: [M+H]$^+$ 211.0.

B) 6-[(3-methyloxetan-3-yl)oxy]pyridin-3-amine

A mixture of 2-[(3-methyloxetan-3-yl)oxy]-5-nitropyridine (454 mg), 10% palladium-carbon (50% wet, 45 mg) and EtOH (10 mL) was stirred overnight under normal pressure of hydrogen atmosphere at room temperature. The catalyst was removed by filtration, the filtrate was concentrated under reduced pressure, and the residue was purified by silica gel column chromatography (NH, ethyl acetate/hexane) to give the title compound (230 mg).

MS: [M+H]$^+$ 181.0.

C) 4-chloro-2-{6-[(3-methyloxetan-3-yl)oxy]pyridin-3-yl}-2,3-dihydro-1H-pyrrolo[3,4-c]pyridin-1-one A mixture of methyl 3-(bromomethyl)-2-chloropyridine-4-carboxylate (200 mg), 6-[(3-methyloxetan-3-yl)oxy]pyridin-3-amine (164 mg), DIPEA (235 mg) and DMF (2.0 mL) was stirred under nitrogen atmosphere at room temperature for 2 hr, and then at 65° C. for 2.5 hr, and then at 80° C. for 20 hr. To the reaction mixture was added water at room temperature, and the mixture was extracted with ethyl acetate. The organic layer was washed with water and saturated brine, dried over anhydrous sodium sulfate, and concentrated under reduced pressure. The residue was purified by silica gel column chromatography (NH, ethyl acetate/hexane) to give the title compound (157 mg).

MS: [M+H]$^+$ 331.9.

D) 2-{6-[(3-methyloxetan-3-yl)oxy]pyridin-3-yl}-4-[2-(2,2,2-trifluoroethoxy)phenyl]-2,3-dihydro-1H-pyrrolo[3,4-c]pyridin-1-one A mixture of [2-(2,2,2-trifluoroethoxy)phenyl]boronic acid (69.6 mg), 4-chloro-2-{6-[(3-methyloxetan-3-yl)oxy]

pyridin-3-yl}-2,3-dihydro-1H-pyrrolo[3,4-c]pyridin-1-one (70 mg), [1,1-bis(diphenylphosphino)ferrocene]dichloropalladium(II) (15.44 mg), potassium carbonate (58.3 mg), DME (2.1 mL) and water (0.21 mL) was stirred under argon atmosphere at 85° C. for 12 hr. To the reaction mixture was added water at room temperature, and the mixture was extracted with ethyl acetate. The organic layer was washed with water and saturated brine, dried over anhydrous sodium sulfate, and concentrated under reduced pressure. The residue was purified by silica gel column chromatography (SI and NH, ethyl acetate/hexane), and crystallized from ethyl acetate/hexane to give the title compound (60.7 mg).

$^1$H NMR (300 MHz, DMSO-d$_6$) δ 1.75 (3H, s), 4.53 (2H, d, J=7.5 Hz), 4.74 (2H, d, J=6.8 Hz), 4.86 (2H, q, J=8.7 Hz), 4.96 (2H, s), 6.94 (1H, d, J=9.0 Hz), 7.19-7.26 (1H, m), 7.29-7.34 (1H, m), 7.49-7.59 (2H, m), 7.80 (1H, d, J=4.9 Hz), 8.28 (1H, dd, J=9.2, 2.8 Hz), 8.55 (1H, d, J=3.0 Hz), 8.88 (1H, d, J=4.9 Hz).

Example 205

5-(4-fluorophenyl)-1-methyl-3-[2-(2,2,2-trifluoroethoxy)phenyl]-1,4,5,6-tetrahydropyrrolo[3,4-c]pyrazole A) tert-butyl 3-iodo-1-methyl-4,6-dihydropyrrolo[3,4-c]pyrazole-5(1H)-carboxylate To a mixture of tert-butyl 3-iodo-4,6-dihydropyrrolo[3,4-c]pyrazole-5(1H)-carboxylate (180 mg) and THF (2 mL) was added potassium tert-butoxide (84 mg). The mixture was stirred at room temperature for 30 min, iodomethane (0.044 mL) was added thereto, and the mixture was stirred overnight. The mixture was concentrated under reduced pressure, the residue was diluted with water, and the mixture was extracted with ethyl acetate. The organic layer was washed with saturated brine, dried over anhydrous sodium sulfate, and concentrated under reduced pressure. The residue was purified by silica gel column chromatography (ethyl acetate/hexane) to give the title compound (62.3 mg).

MS: [M+H]$^+$ 350.2.

B) tert-butyl 1-methyl-3-[2-(2,2,2-trifluoroethoxy)phenyl]-4,6-dihydropyrrolo[3,4-c]pyrazole-5(1H)-carboxylate To a mixture of tert-butyl 3-iodo-1-methyl-4,6-dihydropyrrolo[3,4-c]pyrazole-5(1H)-carboxylate (60.0 mg), [2-(2,2,2-trifluoroethoxy)phenyl]boronic acid (45.4 mg), potassium carbonate (56.4 mg), DME (3 mL) and water (0.3 mL) was added [1,1-bis(diphenylphosphino)ferrocene]dichloropalladium(II) (12.57 mg) at room temperature. The mixture was stirred under nitrogen atmosphere at 90° C. for 1 hr. To the mixture was added water at room temperature, and the mixture was extracted with ethyl acetate. The organic layer was separated, washed with water and saturated brine, dried over anhydrous sodium sulfate, and concentrated under reduced pressure. The residue was purified by silica gel column chromatography (NH, ethyl acetate/hexane) to give the title compound (65.2 mg).

MS: [M+H]$^+$ 398.4.

C) 1-methyl-3-[2-(2,2,2-trifluoroethoxy)phenyl]-1,4,5,6-tetrahydropyrrolo[3,4-c]pyrazole To a mixture of tert-butyl 1-methyl-3-[2-(2,2,2-trifluoroethoxy)phenyl]-4,6-dihydropyrrolo[3,4-c]pyrazole-5(1H)-carboxylate (65.2 mg) and toluene (1 mL) was added TFA (18.71 mg), and the mixture was stirred at room temperature for 30 min. The mixture was concentrated under reduced pressure, and the residue was purified by silica gel column chromatography (NH, MeOH/ethyl acetate) to give the title compound (45.6 mg)

MS: [M+H]$^+$ 298.4.

D) 5-(4-fluorophenyl)-1-methyl-3-[2-(2,2,2-trifluoroethoxy)phenyl]-1,4,5,6-tetrahydropyrrolo[3,4-c]pyrazole To a mixture of 1-bromo-4-fluorobenzene (10.60 mg), 1-methyl-3-[2-(2,2,2-trifluoroethoxy)phenyl]-1,4,5,6-tetrahydropyrrolo[3,4-c]pyrazole (15.0 mg), sodium tert-butoxide (7.27 mg) and toluene (1.5 mL) was added chloro(2-dicyclohexylphosphino-2',4',6'-triisopropyl-1,1'-biphenyl)[2-(2'-amino-1,1'-biphenyl)]palladium(II) (3.97 mg) under nitrogen atmosphere at room temperature. The mixture was stirred under nitrogen atmosphere at 110° C. for 1 hr, and diluted with water and ethyl acetate, and the insoluble substance was removed by filtration. The filtrate was extracted with ethyl acetate, and the organic layer was washed with saturated brine, dried over anhydrous sodium sulfate, and concentrated under reduced pressure. The residue was purified by silica gel column chromatography (NH, ethyl acetate/hexane) to give the title compound (18.2 mg).

$^1$H NMR (300 MHz, DMSO-d$_6$) δ3.69 (3H, s), 4.24-4.42 (4H, m), 4.86 (2H, q, J=8.9 Hz), 6.60 (2H, dd, J=9.2, 4.3 Hz), 7.05 (2H, t, J=9.0 Hz), 7.14-7.24 (1H, m), 7.32 (1H, d, J=8.3 Hz), 7.45-7.54 (2H, m).

Example 206

5-(4-fluorophenyl)-2-methyl-3-[2-(2,2,2-trifluoroethoxy)phenyl]-2,4,5,6-tetrahydropyrrolo[3,4-c]pyrazole A) tert-butyl 3-iodo-2-methyl-2,6-dihydropyrrolo[3,4-c]pyrazole-5(4H)-carboxylate To a mixture of tert-butyl 3-iodo-4,6-dihydropyrrolo[3,4-c]pyrazole-5(1H)-carboxylate (180 mg) and THE (2 mL) was added potassium tert-butoxide (84 mg), and the mixture was stirred at room temperature for 30 min. Iodomethane (99 mg) was added thereto, and the mixture was stirred overnight at room temperature. The mixture was concentrated under reduced pressure, the residue was diluted with water, and the mixture was extracted with ethyl acetate. The organic layer was washed with saturated brine, dried over anhydrous sodium sulfate, and concentrated under reduced pressure. The residue was purified by silica gel column chromatography (ethyl acetate/hexane) to give the title compound (41.6 mg).

MS: [M+H]$^+$ 350.2.

B) tert-butyl 2-methyl-3-[2-(2,2,2-trifluoroethoxy)phenyl]-2,6-dihydropyrrolo[3,4-c]pyrazole-5(4H)-carboxylate To a mixture of tert-butyl 3-iodo-2-methyl-2,6-dihydropyrrolo[3,4-c]pyrazole-5(4H)-carboxylate (40.0 mg), [2-(2,2,2-trifluoroethoxy)phenyl]boronic acid (30.2 mg), potassium carbonate (39.6 mg), DME (2 mL) and water (0.2 mL) was added [1,1-bis(diphenylphosphino)ferrocene]dichloropalladium(II) (8.38 mg) at room temperature, and the mixture was stirred under nitrogen atmosphere at 90° C. for 1 hr. To the mixture was added water at room temperature, and the mixture was extracted with ethyl acetate. The organic layer was separated, washed with ethyl water and saturated brine, dried over anhydrous sodium sulfate, and concentrated under reduced pressure. The residue was purified by silica gel column chromatography (NH, ethyl acetate/hexane) to give the title compound (38.5 mg).
MS: [M+H]$^+$ 398.4.

C) 2-methyl-3-[2-(2,2,2-trifluoroethoxy)phenyl]-2,4,5,6-tetrahydropyrrolo[3,4-c]pyrazole To a mixture of tert-butyl 2-methyl-3-[2-(2,2,2-trifluoroethoxy)phenyl]-2,6-dihydropyrrolo[3,4-c]pyrazole-5(4H)-carboxylate (38.5 mg) and toluene (1 mL) was added TFA (1 mL), and the mixture was stirred at room temperature for 30 min. The mixture was concentrated under reduced pressure, and the residue was purified by silica gel column chromatography (NH, ethyl acetate/hexane) to give the title compound (26.0 mg).
MS: [M+H]$^+$ 298.4.

D) 5-(4-fluorophenyl)-2-methyl-3-[2-(2,2,2-trifluoroethoxy)phenyl]-2,4,5,6-tetrahydropyrrolo[3,4-c]pyrazole To a mixture of 1-bromo-4-fluorobenzene (18.37 mg), 2-methyl-3-[2-(2,2,2-trifluoroethoxy)phenyl]-2,4,5,6-tetrahydropyrrolo[3,4-c]pyrazole (26.0 mg), sodium tert-butoxide (12.61 mg) and toluene (1.5 mL) was added chloro(2-dicyclohexylphosphino-2',4',6'-triisopropyl-1,1'-biphenyl)[2-(2'-amino-1,1'-biphenyl)]palladium(II) (6.88 mg) at room temperature. The mixture was stirred under nitrogen atmosphere at 110° C. for 1 hr. To the mixture were added water and ethyl acetate, the insoluble substance was removed by filtration, and the filtrate was extracted with ethyl acetate. The organic layer was washed with saturated brine, dried over anhydrous sodium sulfate, and concentrated under reduced pressure. The residue was purified by silica gel column chromatography (NH, ethyl acetate/hexane) to give the title compound (27.7 mg).
$^1$H NMR (300 MHz, DMSO-d$_6$) δ3.87 (3H, s), 4.36-4.53 (4H, m), 4.94 (2H, q, J=9.2 Hz), 6.50-6.61 (2H, m), 7.03-7.15 (3H, m), 7.21-7.28 (1H, m), 7.31-7.41 (1H, m), 7.83 (1H, dd, J=7.7, 1.7 Hz).

Example 209

5-[4-fluoro-2-(2,2,2-trifluoroethoxy)phenyl]-7-[4-(2,2,2-trifluoroethoxy)phenyl]-2,3,6,7-tetrahydro-8H-pyrrolo[3,4-f][1,4]oxazepin-8-one A) tert-butyl [2-({4-[4-fluoro-2-(2,2,2-trifluoroethoxy)benzoyl]-2-oxo-1-[4-(2,2,2-trifluoroethoxy)phenyl]-2,5-dihydro-1H-pyrrol-3-yl}oxy)ethyl]carbamate To a mixture of 4-[4-fluoro-2-(2,2,2-trifluoroethoxy)benzoyl]-3-hydroxy-1-[4-(2,2,2-trifluoroethoxy)phenyl]-1,5-dihydro-2H-pyrrol-2-one (110 mg), tert-butyl (2-hydroxyethyl)carbamate (0.051 mL), triphenylphosphine (88 mg) and THF (10 mL) was added diethyl azodicarboxylate (0.053 mL) at 0° C., and the mixture was stirred at room temperature for 1 hr. The reaction mixture was concentrated under reduced pressure, and the residue was purified by silica gel column chromatography (ethyl acetate/hexane) to give the title compound (136 mg).
MS: [M+H-Boc]+537.0.

B) 5-[4-fluoro-2-(2,2,2-trifluoroethoxy)phenyl]-7-[4-(2,2,2-trifluoroethoxy)phenyl]-2,3,6,7-tetrahydro-8H-pyrrolo[3,4-f][1,4]oxazepin-8-one To a mixture of tert-butyl [2-({4-[4-fluoro-2-(2,2,2-trifluoroethoxy)benzoyl]-2-oxo-1-[4-(2,2,2-trifluoroethoxy)phenyl]-2,5-dihydro-1H-pyrrol-3-yl}oxy)ethyl]carbamate (130 mg) and acetonitrile (4 mL) was added TFA (1 mL), and the mixture was stirred overnight at room temperature. The reaction mixture was concentrated under reduced pressure, and the residue was washed with IPE to give the title compound (98 mg).
$^1$H NMR (300 MHz, DMSO-d$_6$) δ 3.79-5.07 (4H, m), 4.20 (2H, s), 4.75 (2H, q, J=8.7 Hz), 4.88 (2H, q, J=8.5 Hz), 7.00-7.12 (3H, m), 7.15-7.27 (1H, m), 7.43 (1H, t, J=7.5 Hz), 7.65 (2H, d, J=9.0 Hz).

Example 213

2-{1-[(1-fluorocyclopropyl)methyl]-1H-pyrazol-4-yl}-4-[4-fluoro-2-(2,2,2-trifluoroethoxy)phenyl]-2,3-dihydro-1H-pyrrolo[3,4-c]pyridin-1-one A) (1-fluorocyclopropyl)methyl 4-methylbenzene-1-sulfonate To a mixture of (1-fluorocyclopropyl)methanol (400.6 mg) and acetonitrile (10 mL) were added N,N,N',N'-tetramethylpropane-1,3-diamine (1755 mg) and 4-methylbenzenesulfonyl chloride (1.10 g) at 0° C. The mixture was stirred overnight at room temperature. To the mixture were added water and saturated brine at 0° C., and the mixture was extracted with ethyl acetate. The organic layer was separated, washed with saturated brine, dried over anhydrous sodium sulfate, and concentrated under reduced pressure. The residue was purified by silica gel column chromatography (ethyl acetate/hexane) to give the title compound (605.3 mg).
$^1$H NMR (300 MHz, DMSO-d$_6$) δ 0.69-0.86 (2H, m), 1.06 (2H, dt, J=18.5, 7.2 Hz), 2.43 (3H, s), 4.29-4.48 (2H, m), 7.49 (2H, d, J=8.7 Hz), 7.81 (2H, d, J=8.3 Hz).

B) 1-[(1-fluorocyclopropyl)methyl]-4-nitro-1H-pyrazole

To a mixture of 4-nitro-1H-pyrazole (271.6 mg), potassium carbonate (365 mg) and DMF (5 mL) was added a mixture of (1-fluorocyclopropyl)methyl 4-methylbenzene-1-sulfonate (602.1 mg) and DMF (5 mL) at 0° C. The mixture was stirred overnight at room temperature, and then at 40° C. for 1 hr. To the mixture was added water at 0° C., and the mixture was extracted with ethyl acetate. The organic layer was washed with saturated brine, dried over anhydrous sodium sulfate, and concentrated under reduced pressure. The residue was purified by silica gel column chromatography (NH, ethyl acetate/hexane) to give the title compound (446.7 mg)
MS: [M+H]$^+$ 186.0.

C) 2-{1-[(1-fluorocyclopropyl)methyl]-1H-pyrazol-4-yl}-4-[4-fluoro-2-(2,2,2-trifluoroethoxy)phenyl]-2,3-dihydro-1H-pyrrolo[3,4-c]pyridin-1-one A mixture of 1-[(1-fluorocyclopropyl)methyl]-4-nitro-1H-pyrazole (443.6 mg), 10% palladium-carbon (55% wet, 48.6 mg) and THF (10 mL) was stirred overnight under normal pressure of hydrogen atmosphere at room temperature. The catalyst was removed by filtration, and the filtrate was concentrated under reduced pressure to give 1-[(1-fluorocyclopropyl)methyl]-1H-pyrazol-4-amine as a crude product. To a mixture of the obtained crude product, DIPEA (0.794 mL) and DMF (3 mL) was added a mixture of methyl 3-(bromomethyl)-2-chloropyridine-4-carboxylate (400.7 mg) and DMF (3 mL), and the mixture was stirred overnight at room temperature. To the mixture was added water, and the mixture was extracted with ethyl acetate. The organic layer was separated, washed with saturated brine, dried over anhydrous sodium sulfate, and concentrated under reduced pressure. The residue was washed with ethyl acetate to give 4-chloro-2-{1-[(1-fluorocyclopropyl)methyl]-1H-pyrazol-4-yl}-2,3-dihydro-1H-pyrrolo[3,4-c]pyridin-1-one as a crude product. To a mixture of 1-bromo-4-fluoro-2-(2,2,2-trifluoroethoxy)benzene (290.8 mg), 4,4,4',4',5,5,5',5'-octamethyl-2,2'-bi-1,3,2-dioxaborolane (541 mg), potassium acetate (314 mg) and DMF (3 mL) was added [1,1-bis(diphenylphosphino)ferrocene]dichloropalladium(II) (78 mg) at room temperature. The mixture was stirred overnight under nitrogen atmosphere at 80° C. To the mixture was added ethyl acetate at room temperature, and the insoluble substance was removed by filtration. The filtrate was washed with water and saturated brine, dried over anhydrous sodium sulfate, and concentrated under reduced pressure to give 2-[4-fluoro-2-(2,2,2-trifluoroethoxy)phenyl]-4,4,5,5-tetramethyl-1,3,2-dioxaborolane as a crude product. To a mixture of the crude product of 2-[4-fluoro-2-(2,2,2-trifluoroethoxy)phenyl]-4,4,5,5-tetramethyl-1,3,2-dioxaborolane, the crude product of 4-chloro-2-{1-[(1-fluorocyclopropyl)methyl]-1H-pyrazol-4-yl}-2,3-dihydro-1H-pyrrolo[3,4-c]pyridin-1-one, potassium carbonate (135 mg), DME (4 mL) and water (0.100 mL) was added [1,1-bis(diphenylphosphino)ferrocene]bis(diphenylphosphino)ferrocene]dichloropalladium(II) (28.6 mg) at room temperature. The mixture was stirred overnight under nitrogen atmosphere at 85° C. To the mixture was added ethyl acetate at room temperature, and the insoluble substance was removed by filtration. The filtrate was washed with water and saturated brine, dried over anhydrous sodium sulfate, and concentrated under reduced pressure. The residue was purified by silica gel column chromatography (NH, ethyl acetate/hexane), followed by preparative HPLC (L-Column 2 ODS, mobile phase: water/acetonitrile (containing 0.1% TFA)). To the obtained fraction was added saturated aqueous sodium hydrogencarbonate solution, and the mixture was extracted with ethyl acetate. The extract was dried over anhydrous sodium sulfate, the solvent was evaporated under reduced pressure, and the residue was washed with IPE/ethyl acetate to give the title compound (22.3 mg).

$^1$H NMR (300 MHz, DMSO-$d_6$) δ 0.83-1.21 (4H, m), 4.46-4.63 (2H, m), 4.79-4.98 (4H, m), 7.09 (1H, td, J=8.5, 2.3 Hz), 7.34 (1H, dd, J=11.3, 2.3 Hz), 7.57 (1H, dd, J=8.5, 7.0 Hz), 7.76 (1H, d, J=4.9 Hz), 7.85 (1H, s), 8.32 (1H, s), 8.85 (1H, d, J=4.9 Hz).

Example 219

2-[3-fluoro-4-(4-hydroxyoxan-4-yl)phenyl]-4-[4-fluoro-2-(2,2,2-trifluoroethoxy)phenyl]-2,3-dihydro-1H-pyrrolo[3,4-c]pyridin-1-one A) 4-(4-bromo-2-fluorophenyl)oxan-4-ol To 1.6M n-BuLi-hexane solution (4.36 mL) was added dropwise a mixture of 4-bromo-2-fluoro-1-iodobenzene (2.00 g) and THF (20 mL) under nitrogen atmosphere at −78° C., and the mixture was stirred at −78° C. for 10 min. To the reaction mixture was added dihydro-2H-pyran-4(3H)-one (0.675 mL), and the mixture was stirred at −78° C. for 10 min, and stirred overnight at room temperature. To the reaction mixture were added ethyl acetate and saturated aqueous ammonium chloride solution, and the mixture was extracted with ethyl acetate. The organic layer was separated, washed with water and saturated brine solution, dried over anhydrous magnesium sulfate, and concentrated under reduced pressure. The residue was purified by silica gel column chromatography (ethyl acetate/hexane) to give the title compound (0.461 g).

$^1$H NMR (300 MHz, DMSO-$d_6$) δ 1.49 (2H, d, J=12.8 Hz), 2.16 (2H, td, J=12.6, 5.3 Hz), 3.65-3.83 (4H, m), 5.39 (1H, s), 7.40-7.49 (2H, m), 7.58 (1H, t, J=8.7 Hz).

B) 2-[3-fluoro-4-(4-hydroxyoxan-4-yl)phenyl]-4-[4-fluoro-2-(2,2,2-trifluoroethoxy)phenyl]-2,3-dihydro-1H-pyrrolo[3,4-c]pyridin-1-one To a mixture of 4-(4-bromo-2-fluorophenyl)oxan-4-ol (50.6 mg), 4-(4-fluoro-2-(2,2,2-trifluoroethoxy)phenyl)-2,3-dihydro-1H-pyrrolo[3,4-c]pyridin-1-one (50 mg), sodium tert-butoxide (22.09 mg) and toluene (2 mL) was added chloro(2-dicyclohexylphosphino-2',4',6'-triisopropyl-1,1'-biphenyl) [2-(2'-amino-1,1'-biphenyl)]palladium(II) (12.06 mg), and the mixture was stirred under argon atmosphere at 110° C. for 2 hr. To the reaction mixture were added ethyl acetate and water, and the insoluble substance was removed by filtration. The aqueous layer of the filtrate was separated, and extracted with ethyl acetate. The organic layer was washed with water and saturated brine solution, dried over anhydrous magnesium sulfate, and concentrated under reduced pressure. The residue was purified by silica gel column chromatography (ethyl acetate/hexane), and crystallized from ethyl acetate/hexane to give the title compound (56.9 mg).

$^1$H NMR (300 MHz, DMSO-$d_6$) δ 1.52 (2H, d, J=12.8 Hz), 2.20 (2H, td, J=12.5, 5.1 Hz), 3.66-3.85 (4H, m), 4.85-5.01 (4H, m), 5.32 (1H, s), 7.09 (1H, td, J=8.5, 2.3 Hz), 7.33 (1H, dd, J=11.3, 2.3 Hz), 7.57 (1H, dd, J=8.3, 6.8 Hz), 7.62-7.75 (2H, m), 7.78-7.91 (2H, m), 8.88 (1H, d, J=4.9 Hz).

Example 221

2-[4-(1-{[tert-butyl(dimethyl)silyl]oxy}cyclopropyl)phenyl]-4-[2-(2,2,2-trifluoroethoxy)phenyl]-2,3-dihydro-1H-pyrrolo[3,4-c]pyridin-1-one A) {[1-(4-bromophenyl)cyclopropyl]oxy}(tert-butyl)dimethylsilane To a mixture of 1-(4-bromophenyl)cyclopropan-1-ol (490 mg), tert-butyl(chloro)dimethylsilane (381 mg) and DMF (5.0 mL) was added 1H-imidazole (188 mg) at room temperature. The mixture was stirred at room temperature for 3 days. To the mixture was added ethyl acetate, and the mixture was poured into water. The organic layer was separated, washed with water and saturated brine, dried over anhydrous sodium sulfate, and concentrated under reduced pressure. The residue was purified by silica gel column chromatography (ethyl acetate/hexane) to give the title compound (678.1 mg).

¹H NMR (300 MHz, CDCl₃) δ -0.01 (6H, s), 0.87 (9H, s), 0.91-0.99 (2H, m), 1.14-1.22 (2H, m), 7.18 (2H, d, J=8.7 Hz), 7.41 (2H, d, J=8.7 Hz).

B) N-[4-(1-{[tert-butyl(dimethyl)silyl]oxy}cyclopropyl)phenyl]-1,1-diphenylmethanimine To a mixture of {[1-(4-bromophenyl)cyclopropyl]oxy}(tert-butyl)dimethylsilane (619 mg), 1,1-diphenylmethanimine (411 mg), sodium tert-butoxide (273 mg) and BINAP (353 mg) was added Pd₂(dba)₃ (173 mg) at room temperature. The mixture was stirred under nitrogen atmosphere at 100° C. for 4 hr. To the mixture was added ethyl acetate, and the mixture was poured into water. The organic layer was separated, washed with saturated brine, dried over anhydrous sodium sulfate, and concentrated under reduced pressure. The residue was purified by silica gel column chromatography (NH, ethyl acetate/hexane) to give the title compound (826 mg).
¹H NMR (300 MHz, CDCl₃) δ -0.12 (6H, s), 0.81 (9H, s), 0.85-0.92 (3H, m), 1.00-1.10 (2H, m), 6.64 (2H, d, J=8.7 Hz), 7.06-7.16 (4H, m), 7.24 (2H, br. s.), 7.34-7.53 (3H, m), 7.70-7.77 (2H, m).

C) 4-(1-{[tert-butyl(dimethyl)silyl]oxy}cyclopropyl)aniline

To a mixture of N-[4-(1-{[tert-butyl(dimethyl)silyl]oxy}cyclopropyl)phenyl]-1,1-diphenylmethanimine (826 mg) and THF (15 mL) was added 1M hydrochloric acid (2.0 mL) at room temperature. The mixture was stirred at room temperature for 20 min. To the mixture was added ethyl acetate, and the mixture was poured into saturated aqueous sodium hydrogencarbonate solution. The organic layer was separated, washed with saturated brine, dried over anhydrous sodium sulfate, and concentrated under reduced pressure. The residue was purified by silica gel column chromatography (ethyl acetate/hexane), and washed with IPE to give the title compound (436.2 mg).
¹H NMR (300 MHz, CDCl₃) δ -0.05 (6H, s), 0.83 (9H, s), 0.85-0.92 (2H, m), 1.01-1.09 (2H, m), 3.60 (2H, br. s.), 6.62 (2H, d, J=8.3 Hz), 7.15 (2H, d, J=8.3 Hz).

D) 2-[4-(1-{[tert-butyl(dimethyl)silyl]oxy}cyclopropyl)phenyl]-4-chloro-2,3-dihydro-1H-pyrrolo[3,4-c]pyridin-1-one To a mixture of 4-(1-{[tert-butyl(dimethyl)silyl]oxy}cyclopropyl)aniline (436 mg), methyl 3-(bromomethyl)-2-chloropyridine-4-carboxylate (417 mg) and DMF (4.0 mL) was added DIPEA (611 mg) at room temperature. The mixture was stirred at room temperature for 2 hr, and then stirred overnight at 60° C. To the mixture was added ethyl acetate at room temperature, and the mixture was poured into water. The organic layer was separated, washed with water and saturated brine, dried over anhydrous sodium sulfate, and concentrated under reduced pressure. To the residue was added IPE, and the precipitate was collected by filtration, and washed with IPE to give the title compound (477.7 mg).
¹H NMR (300 MHz, CDCl₃) δ 0.02 (6H, s), 0.89 (9H, s), 0.97-1.06 (2H, m), 1.18-1.25 (2H, m), 4.91 (2H, s), 7.40 (2H, d, J=8.7 Hz), 7.73-7.84 (3H, m), 8.61 (1H, d, J=4.9 Hz).

E) 2-[4-(1-{[tert-butyl(dimethyl)silyl]oxy}cyclopropyl)phenyl]-4-[2-(2,2,2-trifluoroethoxy)phenyl]-2,3-dihydro-1H-pyrrolo[3,4-c]pyridin-1-one To a mixture of [2-(2,2,2-trifluoroethoxy)phenyl]boronic acid (56.4 mg), 2-[4-(1-{[tert-butyl(dimethyl)silyl]oxy}cyclopropyl)phenyl]-4-chloro-2,3-dihydro-1H-pyrrolo[3,4-c]pyridin-1-one (71.0 mg), DME (3.0 mL) and water (1.0 mL) were added potassium carbonate (47.3 mg) and [1,1-bis(diphenylphosphino)ferrocene]dichloropalladium (II) (12.52 mg) at room temperature. The mixture was stirred under nitrogen atmosphere at 60° C. for 30 min. To the mixture was added ethyl acetate at room temperature, and the mixture was poured into water. The organic layer was separated, washed with water and saturated brine, dried over anhydrous sodium sulfate, and concentrated under reduced pressure. The residue was purified by silica gel column chromatography (NH, ethyl acetate/hexane) to give the title compound (95.3 mg).
¹H NMR (300 MHz, CDCl₃) δ 0.00 (6H, s), 0.87 (9H, s), 0.95-1.05 (2H, m), 1.12-1.23 (2H, m), 4.35 (2H, q, J=7.9 Hz), 4.88 (2H, s), 7.09 (1H, d, J=7.9 Hz), 7.23-7.31 (1H, m), 7.36 (2H, d, J=8.7 Hz), 7.46-7.59 (2H, m), 7.75 (2H, d, J=8.7 Hz), 7.83 (1H, d, J=4.9 Hz), 8.90 (1H, d, J=4.9 Hz).

Example 222

2-[4-(1-hydroxycyclopropyl)phenyl]-4-[2-(2,2,2-trifluoroethoxy)phenyl]-2,3-dihydro-1H-pyrrolo[3,4-c]pyridin-1-one To a mixture of 2-[4-(1-{[tert-butyl(dimethyl)silyl]oxy}cyclopropyl)phenyl]-4-[2-(2,2,2-trifluoroethoxy)phenyl]-2,3-dihydro-1H-pyrrolo[3,4-c]pyridin-1-one (94 mg) and THF (2.0 mL) was added 1 M tetrabutylammonium fluoride-THF solution (0.254 mL) at room temperature. The mixture was stirred at room temperature for 30 min. To the mixture was added ethyl acetate at room temperature, and the mixture was poured into water. The organic layer was separated, washed with water and saturated brine, dried over anhydrous sodium sulfate, and concentrated under reduced pressure. The residue was purified by silica gel column chromatography (NH, ethyl acetate/hexane), and washed with IPE to give the title compound (32.9 mg).
¹H NMR (300 MHz, CDCl₃) δ 1.02-1.11 (2H, m), 1.26-1.32 (2H, m), 2.31 (1H, s), 4.35 (2H, q, J=8.3 Hz), 4.89 (2H, s), 7.09 (1H, d, J=7.9 Hz), 7.31 (1H, d, J=8.7 Hz), 7.36 (2H, d, J=9.0 Hz), 7.47-7.60 (2H, m), 7.78 (2H, d, J=8.7 Hz), 7.83 (1H, d, J=4.9 Hz), 8.91 (1H, d, J=4.9 Hz).

Example 227

(cis or trans)-2-{4-[3-(benzyloxy)-1-hydroxycyclobutyl]phenyl}-4-[2-(2,2,2-trifluoroethoxy)phenyl]-2,3-dihydro-1H-pyrrolo[3,4-c]pyridin-1-one A) (cis or trans)-3-(benzyloxy)-1-(4-bromophenyl)cyclobutan-1-ol To a mixture of 1-bromo-4-iodobenzene (6.21 g) and THF (60 mL) was added 1.6 M n-BuLi-hexane solution (14.27 mL) at -78° C. The mixture was stirred under nitrogen atmosphere at -78° C. for 1 hr. A mixture of rac-3-(benzyloxy)cyclobutanone (4.25 mL) and THF (5.0 mL) was added dropwise thereto at -78° C. The mixture was stirred under nitrogen atmosphere at -78° C. for 10 min, and then at room temperature for 2 hr. To the mixture was added ethyl acetate at room temperature, and the mixture was poured into water. The organic layer was separated, washed with water and saturated brine, dried over anhydrous sodium sulfate, and concentrated under reduced pressure. The residue was purified by silica gel column chromatography (ethyl acetate/hexane) to give the title compound (6.11 g).

¹H NMR (300 MHz, CDCl₃) δ 2.28 (1H, s), 2.39-2.53 (2H, m), 2.81-2.97 (2H, m), 3.86 (1H, quin, J=6.5 Hz), 4.47 (2H, s), 7.28-7.41 (7H, m), 7.49 (2H, d, J=8.7 Hz).

B) (cis or trans)-2-{4-[3-(benzyloxy)-1-hydroxycyclobutyl]phenyl}-4-[2-(2,2,2-trifluoroethoxy)phenyl]-2,3-dihydro-1H-pyrrolo[3,4-c]pyridin-1-one To a mixture of (cis or trans)-3-(benzyloxy)-1-(4-bromophenyl)cyclobutan-1-ol (93.6 mg), 4-[2-(2,2,2-trifluoroethoxy)phenyl]-2,3-dihydro-1H-pyrrolo[3,4-c]pyridin-1-one (78.3 mg), sodium tert-butoxide (36.6 mg) and toluene (2.0 mL) was added chloro(2-dicyclohexylphosphino-2',4',6'-triisopropyl-1,1'-biphenyl) [2-(2'-amino-1,1'-biphenyl)]palladium(II) (19.99 mg) at room temperature. The mixture was stirred under argon atmosphere at 110° C. for 2 hr. The mixture was purified by silica gel column chromatography (NH, ethyl acetate/hexane and MeOH/ethyl acetate) and silica gel column chromatography (ethyl acetate/hexane) to give the title compound (57.9 mg).
¹H NMR (300 MHz, CDCl₃) δ 2.26 (1H, s), 2.41-2.55 (2H, m), 2.95 (2H, dd, J=13.2, 6.8 Hz), 3.82-3.92 (1H, m), 4.36 (2H, q, J=8.3 Hz), 4.47 (2H, s), 4.89 (2H, s), 7.09 (1H, d, J=7.9 Hz), 7.27-7.39 (6H, m), 7.46-7.63 (4H, m), 7.75-7.88 (3H, m), 8.91 (1H, d, J=4.9 Hz).

Example 228

(cis or trans)-2-[4-(1,3-dihydroxycyclobutyl)phenyl]-4-[2-(2,2,2-trifluoroethoxy)phenyl]-2,3-dihydro-1H-pyrrolo[3,4-c]pyridin-1-one To a mixture of (cis or trans)-2-{4-[3-(benzyloxy)-1-hydroxycyclobutyl]phenyl}-4-[2-(2,2,2-trifluoroethoxy) phenyl]-2,3-dihydro-1H-pyrrolo[3,4-c]pyridin-1-one (56 mg), THF (2.0 mL) and MeOH (2.0 mL) was added 10% palladium-carbon (50% wet, 10 mg), and the mixture was stirred under normal pressure of hydrogen atmosphere at room temperature for 2 days. The catalyst was removed by filtration, and the filtrate was concentrated under reduced pressure. The residue was purified by silica gel column chromatography (ethyl acetate/hexane and MeOH/ethyl acetate) to give the title compound (39.3 mg).
¹H NMR (300 MHz, CDCl₃) δ 1.99 (1H, br. s.), 2.27 (1H, br. s.), 2.33-2.46 (2H, m), 2.94-3.07 (2H, m), 4.08-4.24 (1H, m), 4.36 (2H, q, J=8.3 Hz), 4.90 (2H, s), 7.09 (1H, d, J=8.3 Hz), 7.27-7.33 (1H, m), 7.45-7.60 (4H, m), 7.77-7.87 (3H, m), 8.91 (1H, d, J=4.9 Hz).

Example 246

2-[4-(1,1,3,3-tetrafluoro-2-hydroxypropan-2-yl)phenyl]-4-[2-(2,2,2-trifluoroethoxy)phenyl]-2,3-dihydro-1H-pyrrolo[3,4-c]pyridin-1-one A) 2-(4-aminophenyl)-1,1,3,3-tetrafluoropropan-2-ol To a mixture of 1,1,3,3-tetrafluoro-2-(4-nitrophenyl)propan-2-ol (604.5 mg), EtOH (6.00 mL) and water (6 mL) were added ammonium chloride (639 mg) and iron (667 mg) at room temperature. The mixture was refluxed for 2 hr. The insoluble substance was removed by filtration, to the filtrate was added saturated aqueous sodium hydrogencarbonate solution, and the mixture was extracted with ethyl acetate. The organic layer was separated, washed with saturated brine, dried over anhydrous sodium sulfate, and concentrated under reduced pressure to give the title compound (532.0 mg).
MS: [M+H]⁺ 224.0.

B) 4-chloro-2-[4-(1,1,3,3-tetrafluoro-2-hydroxypropan-2-yl)phenyl]-2,3-dihydro-1H-pyrrolo[3,4-c]pyridin-1-one To a mixture of 2-(4-aminophenyl)-1,1,3,3-tetrafluoropropan-2-ol (402.1 mg), DIPEA (0.792 mL) and DMF (4 mL) was added a mixture of methyl 3-(bromomethyl)-2-chloropyridine-4-carboxylate (400 mg) and DMF (4 mL), and the mixture was stirred overnight at room temperature, and then at 80° C. for 6 hr. To the mixture was added water at room temperature, and the mixture was extracted with ethyl acetate. The organic layer was separated, washed with saturated brine, dried over anhydrous sodium sulfate, and concentrated under reduced pressure. The residue was washed with ethyl acetate/IPE to give the title compound (447.9 mg).
MS: [M+H]⁺ 374.9.

C) 2-[4-(1,1,3,3-tetrafluoro-2-hydroxypropan-2-yl)phenyl]-4-[2-(2,2,2-trifluoroethoxy)phenyl]-2,3-dihydro-1H-pyrrolo[3,4-c]pyridin-1-one To a mixture of 4-chloro-2-[4-(1,1,3,3-tetrafluoro-2-hydroxypropan-2-yl)phenyl]-2,3-dihydro-1H-pyrrolo[3,4-c]pyridin-1-one (100.2 mg), [2-(2,2,2-trifluoroethoxy)phenyl]boronic acid (118 mg), potassium carbonate (92 mg), DME (4 mL) and water (0.100 mL) was added [1,1-bis(diphenylphosphino)ferrocene]dichloropalladium(II) (19.6 mg) at room temperature. The mixture was stirred overnight under nitrogen atmosphere at 85° C. To the mixture was added ethyl acetate at room temperature, and the insoluble substance was removed by filtration. The filtrate was washed with water and saturated brine, dried over anhydrous sodium sulfate, and concentrated under reduced pressure. The residue was purified by silica gel column chromatography (ethyl acetate/hexane), and washed with ethyl acetate/IPE to give the title compound (62.6 mg).
¹H NMR (300 MHz, DMSO-d₆) δ 4.86 (2H, q, J=8.9 Hz), 5.01 (2H, s), 6.18-6.70 (2H, m), 7.01 (1H, s), 7.16-7.29 (1H, m), 7.34 (1H, d, J=8.3 Hz), 7.47-7.72 (4H, m), 7.81 (1H, d, J=4.9 Hz), 7.98 (2H, d, J=8.7 Hz), 8.89 (1H, d, J=5.3 Hz).

Example 249 rac-4-[2-(2,2,2-trifluoroethoxy)phenyl]-2-[6-(2,2,2-trifluoro-1-hydroxyethyl)pyridin-3-yl]-2,3-dihydro-1H-pyrrolo[3,4-c]pyridin-1-one A) rac-1-(5-aminopyridin-2-yl)-2,2,2-trifluoroethan-1-ol A mixture of rac-2,2,2-trifluoro-1-(5-nitropyridin-2-yl)ethan-1-ol (218 mg), 10% palladium-carbon (50% wet, 209 mg) and MeOH (4.91 mL) was stirred under normal pressure of hydrogen atmosphere at room temperature for 2 hr. The catalyst was removed by filtration, and the filtrate was concentrated under reduced pressure. The residue was purified by silica gel column chromatography (NH, MeOH/ethyl acetate) to give the title compound (176 mg).
MS: [M+H]⁺ 192.9.

B) rac-4-chloro-2-[6-(2,2,2-trifluoro-1-hydroxyethyl)pyridin-3-yl]-2,3-dihydro-1H-pyrrolo[3,4-c]pyridin-1-one A mixture of rac-methyl 3-(bromomethyl)-2-chloropyridine-4-carboxylate (242 mg), 1-(5-aminopyridin-2-yl)-2,2,2-trifluoroethan-1-ol (176 mg), TEA (0.255 mL) and THF (9.15 mL) was stirred at 50° C. for 3 days. The reaction mixture was cooled to room temperature, and the residue was purified by silica gel column chromatography (NH, ethyl acetate/hexane) to give the title compound (72.7 mg).
MS: [M+H]$^+$ 343.9.

C) rac-4-[2-(2,2,2-trifluoroethoxy)phenyl]-2-[6-(2,2,2-trifluoro-1-hydroxyethyl)pyridin-3-yl]-2,3-dihydro-1H-pyrrolo[3,4-c]pyridin-1-one To a mixture of [2-(2,2,2-trifluoroethoxy)phenyl]boronic acid (93 mg), rac-4-chloro-2-[6-(2,2,2-trifluoro-1-hydroxyethyl)pyridin-3-yl]-2,3-dihydro-1H-pyrrolo[3,4-c]pyridin-1-one (72.7 mg), 2 M aqueous potassium carbonate solution (0.317 mL) and DME (0.212 mL) was added [1,1-bis(diphenylphosphino)ferrocene]dichloropalladium(II) dichloromethane adduct (17.3 mg). The mixture was stirred under argon atmosphere at 85° C. for 16 hr. The reaction mixture was purified by silica gel column chromatography (NH, ethyl acetate/hexane) and preparative HPLC (L-Column 2 ODS, mobile phase: water/acetonitrile (containing 0.1% TFA)) to give the title compound (41.1 mg).
$^1$H NMR (300 MHz, DMSO-d$_6$) δ 4.87 (2H, q, J=8.9 Hz), 5.06 (2H, s), 5.09-5.20 (1H, m), 7.04 (1H, d, J=6.0 Hz), 7.20-7.28 (1H, m), 7.34 (1H, d, J=8.3 Hz), 7.50-7.61 (2H, m), 7.69 (1H, d, J=8.7 Hz), 7.83 (1H, d, J=4.9 Hz), 8.44 (1H, dd, J=8.9, 2.8 Hz), 8.91 (1H, d, J=4.9 Hz), 9.14 (1H, d, J=2.6 Hz).

Example 250 rac-2-[4-(2,2-difluoro-1-hydroxyethyl)phenyl]-4-[4-fluoro-2-(2,2,2-trifluoroethoxy)phenyl]-2,3-dihydro-1H-pyrrolo[3,4-c]pyridin-1-one To a mixture of 4-[4-fluoro-2-(2,2,2-trifluoroethoxy)phenyl]-2,3-dihydro-1H-pyrrolo[3,4-c]pyridin-1-one (100 mg), rac-1-(4-bromophenyl)-2,2-difluoroethan-1-ol (109 mg), sodium tert-butoxide (58.9 mg) and toluene (3.07 mL) was added chloro(2-dicyclohexylphosphino-2',4',6'-triisopropyl-1,1'-biphenyl) [2-(2'-amino-1,1'-biphenyl)]palladium(II) (48.2 mg). The mixture was stirred under argon atmosphere at 110° C. for 16 hr. The reaction mixture was cooled to room temperature, and purified by silica gel column chromatography (NH, ethyl acetate/hexane) to give the title compound (120 mg).
$^1$H NMR (300 MHz, DMSO-d$_6$) δ 4.66-4.82 (1H, m), 4.82-5.04 (4H, m), 5.79-6.26 (2H, m), 7.05-7.14 (1H, m), 7.28-7.37 (1H, m), 7.48 (2H, d, J=8.7 Hz), 7.57 (1H, dd, J=8.5, 6.6 Hz), 7.80 (1H, d, J=4.9 Hz), 7.92 (2H, d, J=8.7 Hz), 8.87 (1H, d, J=4.9 Hz).

Example 259

2-[4-(3-hydroxyazetidin-3-yl)phenyl]-4-[2-(2,2,2-trifluoroethoxy)phenyl]-2,3-dihydro-1H-pyrrolo[3,4-c]pyridin-1-one A) tert-butyl 3-hydroxy-3-(4-{1-oxo-4-[2-(2,2,2-trifluoroethoxy)phenyl]-1,3-dihydro-2H-pyrrolo[3,4-c]pyridin-2-yl}phenyl)azetidine-1-carboxylate To a mixture of tert-butyl 3-(4-bromophenyl)-3-hydroxyazetidine-1-carboxylate (212 mg), 4-[2-(2,2,2-trifluoroethoxy)phenyl]-2,3-dihydro-1H-pyrrolo[3,4-c]pyridin-1-one (180.8 mg), sodium tert-butoxide (85 mg) and toluene (10 mL) was added chloro(2-dicyclohexylphosphino-2',4',6'-triisopropyl-1,1'-biphenyl) [2-(2'-amino-1,1'-biphenyl)] palladium(II) (92 mg) at room temperature. The mixture was stirred under argon atmosphere at 100° C. for 1 hr. The mixture was purified by silica gel column chromatography (NH, ethyl acetate/hexane and MeOH/ethyl acetate) to give the title compound (214 mg).
MS: [M+H]$^+$ 556.2.

B) 2-[4-(3-hydroxyazetidin-3-yl)phenyl]-4-[2-(2,2,2-trifluoroethoxy)phenyl]-2,3-dihydro-1H-pyrrolo[3,4-c]pyridin-1-one To a mixture of tert-butyl 3-hydroxy-3-(4-{1-oxo-4-[2-(2,2,2-trifluoroethoxy)phenyl]-1,3-dihydro-2H-pyrrolo[3,4-c]pyridin-2-yl}phenyl)azetidine-1-carboxylate (214 mg) and acetonitrile (5.0 mL) was added methanesulfonic acid (0.075 mL) at room temperature. The mixture was stirred overnight at room temperature. To the mixture was added ethyl acetate, and the mixture was neutralized with saturated aqueous sodium hydrogencarbonate solution at room temperature, and concentrated under reduced pressure. The residue was purified by silica gel column chromatography (NH, MeOH/ethyl acetate) to give the title compound (52.2 mg).
$^1$H NMR (300 MHz, CDCl$_3$) δ 3.89-3.96 (2H, m), 3.96-4.04 (2H, m), 4.36 (2H, q, J=8.3 Hz), 4.91 (2H, s), 7.10 (1H, d, J=8.3 Hz), 7.27-7.32 (1H, m), 7.47-7.61 (2H, m), 7.65 (2H, d, J=8.7 Hz), 7.79-7.91 (3H, m), 8.91 (1H, d, J=5.3 Hz).

Example 261

2-{4-[1-(cyclopropanecarbonyl)-3-hydroxyazetidin-3-yl]phenyl}-4-[2-(2,2,2-trifluoroethoxy)phenyl]-2,3-dihydro-1H-pyrrolo[3,4-c]pyridin-1-one To a mixture of 2-[4-(3-hydroxyazetidin-3-yl)phenyl]-4-[2-(2,2,2-trifluoroethoxy)phenyl]-2,3-dihydro-1H-pyrrolo[3,4-c]pyridin-1-one (30 mg), MeOH (1.0 mL) and cyclopropanecarboxylic acid (0.01 mL) was added 4-(4,6-dimethoxy-1,3,5-triazin-2-yl)-4-methylmorpholin-4-ium chloride (42.1 mg) at room temperature. The mixture was stirred at room temperature for 1 hr. To the mixture was added ethyl acetate at room temperature, and the mixture was poured into water. The organic layer was separated, washed with water and saturated brine, dried over anhydrous sodium sulfate, and concentrated under reduced pressure. The residue was purified by silica gel column chromatography (SI and NH, MeOH/ethyl acetate), and washed with IPE to give the title compound (22.2 mg).
$^1$H NMR (300 MHz, CDCl$_3$) δ 0.78 (2H, br. s.), 0.98-1.07 (2H, m), 1.41-1.51 (1H, m), 2.47 (1H, s), 4.18-4.29 (1H, m), 4.30-4.46 (3H, m), 4.53 (2H, d, J=7.9 Hz), 4.91 (2H, s), 7.10 (1H, d, J=7.9 Hz), 7.30 (1H, d, J=7.5 Hz), 7.47-7.60 (4H, m), 7.84 (1H, d, J=4.9 Hz), 7.89 (2H, d, J=9.0 Hz), 8.92 (1H, d, J=4.9 Hz).

Example 265

2-[5-(1-hydroxycyclopropyl)pyridin-2-yl]-4-[2-(2,2,2-trifluoroethoxy)phenyl]-2,3-dihydro-1H-pyrrolo[3,4-c]pyridin-1-one To a mixture of 2-[5-(1-{[tert-butyl(dimethyl)silyl]oxy}cyclopropyl)pyridin-2-yl]-4-[2-(2,2,2-trifluoroethoxy)

phenyl]-2,3-dihydro-1H-pyrrolo[3,4-c]pyridin-1-one (94 mg) and THF (2.0 mL) was added 1M hydrochloric acid (1.0 mL) at room temperature. The mixture was stirred at room temperature for 4 hr. To the mixture was added ethyl acetate at room temperature, and the mixture was poured into saturated aqueous sodium hydrogencarbonate solution. The organic layer was separated, washed with water and saturated brine, dried over anhydrous sodium sulfate, and concentrated under reduced pressure. The residue was purified by silica gel column chromatography (NH, ethyl acetate/hexane), and washed with IPE to give the title compound (69.1 mg).

$^1$H NMR (300 MHz, CDCl$_3$) δ 1.02-1.11 (2H, m), 1.27-1.36 (2H, m), 2.34 (1H, s), 4.34 (2H, q, J=8.3 Hz), 5.11 (2H, s), 7.06 (1H, d, J=8.7 Hz), 7.21-7.30 (1H, m), 7.44-7.57 (2H, m), 7.67 (1H, dd, J=8.7, 2.6 Hz), 7.82 (1H, d, J=4.9 Hz), 8.36 (1H, d, J=1.9 Hz), 8.62 (1H, d, J=8.7 Hz), 8.90 (1H, d, J=4.9 Hz).

Example 266

2-[5-(1-{[tert-butyl(dimethyl)silyl]oxy}cyclopropyl)pyridin-2-yl]-4-[2-(2,2,2-trifluoroethoxy)phenyl]-2,3-dihydro-1H-pyrrolo[3,4-c]pyridin-1-one A) 5-(1-{[tert-butyl(dimethyl)silyl]oxy}cyclopropyl)pyridin-2-amine To a mixture of 5-(1-{[tert-butyl(dimethyl)silyl]oxy}cyclopropyl)-2-chloropyridine (943.9 mg), 1,1-diphenylmethanimine (723 mg), sodium 2-methylpropan-2-olate (479 mg), BINAP (621 mg) and toluene (15 mL) was added Pd2(dba)3 (304 mg) at room temperature. The mixture was stirred overnight under nitrogen atmosphere at 100° C. The mixture was purified by silica gel column chromatography (NH, ethyl acetate/hexane) to give the title compound (794.7 mg).
MS: [M+H]$^+$ 265.0.

B) 2-[5-(1-{[tert-butyl(dimethyl)silyl]oxy}cyclopropyl)pyridin-2-yl]-4-chloro-2,3-dihydro-1H-pyrrolo[3,4-c]pyridin-1-one To a mixture of 5-(1-{[tert-butyl(dimethyl)silyl]oxy}cyclopropyl)pyridin-2-amine (794 mg), methyl 3-(bromomethyl)-2-chloropyridine-4-carboxylate (756 mg) and DMF (8.0 mL) was added DIPEA (1.498 mL) at room temperature. The mixture was stirred at room temperature for 3 hr, and then stirred overnight at 60° C. To the mixture was added ethyl acetate at room temperature, and the mixture was poured into water. The organic layer was separated, washed with water and saturated brine, dried over anhydrous sodium sulfate, and concentrated under reduced pressure. The residue was purified by silica gel column chromatography (NH, ethyl acetate/hexane) to give the title compound (182.5 mg).
MS: [M+H]$^+$ 416.1.

C) 2-[5-(1-{[tert-butyl(dimethyl)silyl]oxy}cyclopropyl)pyridin-2-yl]-4-[2-(2,2,2-trifluoroethoxy)phenyl]-2,3-dihydro-1H-pyrrolo[3,4-c]pyridin-1-one To a mixture of [2-(2,2,2-trifluoroethoxy)phenyl]boronic acid (73.0 mg), 2-[5-(1-{[tert-butyl(dimethyl)silyl]oxy}cyclopropyl)pyridin-2-yl]-4-chloro-2,3-dihydro-1H-pyrrolo[3,4-c]pyridin-1-one (92.0 mg), DME (3.0 mL) and water (1.0 mL) were added potassium carbonate (61.1 mg) and [1,1-bis(diphenylphosphino)ferrocene]dichloropalladium(II) (16.18 mg) at room temperature. The mixture was stirred under nitrogen atmosphere at 60° C. for 30 min. To the mixture was added ethyl acetate at room temperature, and the mixture was poured into water. The organic layer was separated, washed with water and saturated brine, dried over anhydrous sodium sulfate, and concentrated under reduced pressure. The residue was purified by silica gel column chromatography (NH, ethyl acetate/hexane) to give the title compound (97.9 mg).

$^1$H NMR (300 MHz, CDCl$_3$) δ 0.00 (6H, s), 0.87 (9H, s), 0.95-1.04 (2H, m), 1.18-1.25 (2H, m), 4.34 (2H, q, J=7.9 Hz), 5.10 (2H, s), 7.06 (1H, d, J=8.7 Hz), 7.26 (1H, s), 7.44-7.56 (2H, m), 7.69 (1H, dd, J=8.9, 2.4 Hz), 7.82 (1H, d, J=4.9 Hz), 8.34 (1H, d, J=1.5 Hz), 8.60 (1H, d, J=9.4 Hz), 8.90 (1H, d, J=5.3 Hz)

Example 267

4-[2-(2,2-difluoroethoxy)-4-fluorophenyl]-2-[4-(1-hydroxycyclobutyl)phenyl]-2,3-dihydro-1H-pyrrolo[3,4-c]pyridin-1-one A) 1-bromo-2-(2,2-difluoroethoxy)-4-fluorobenzene To a mixture of 2-bromo-5-fluorophenol (0.582 mL), potassium carbonate (1.447 g) and DMF (6 mL) was added 2,2-difluoroethyl trifluoromethanesulfonate (1.457 g) at room temperature. The mixture was stirred at 90° C. for 16 hr. To the mixture were added water and ethyl acetate at room temperature. The organic layer was separated, washed with water and saturated brine, dried over anhydrous magnesium sulfate, and concentrated under reduced pressure. The residue was purified by silica gel column chromatography (ethyl acetate/hexane) to give the title compound (1.18 g).

$^1$H NMR (300 MHz, DMSO-d$_6$) δ 4.44 (2H, td, J=14.5, 3.4 Hz), 6.21-6.63 (1H, m), 6.85 (1H, td, J=8.5, 2.6 Hz), 7.20 (1H, dd, J=10.7, 2.8 Hz), 7.64 (1H, dd, J=8.7, 6.4 Hz).

B) 2-[2-(2,2-difluoroethoxy)-4-fluorophenyl]-4,4,5,5-tetramethyl-1,3,2-dioxaborolane To a mixture of 1-bromo-2-(2,2-difluoroethoxy)-4-fluorobenzene (12.3 g), 4,4,4',4',5,5,5',5'-octamethyl-2,2'-bi-1,3,2-dioxaborolane (14.7 g), potassium acetate (7.10 g) and CPME (120 mL) was added chloro(2-dicyclohexylphosphino-2',4',6'-triisopropyl-1,1'-biphenyl) [2-(2'-amino-1,1'-biphenyl)]palladium(II) (1.90 g) at room temperature. The mixture was stirred under nitrogen atmosphere at 100° C. for 12 hr. The mixture was added to water at room temperature, and the mixture was extracted with ethyl acetate. The organic layer was separated, washed with saturated brine, dried over anhydrous sodium sulfate, and concentrated under reduced pressure. The residue was purified by silica gel column chromatography (ethyl acetate/petroleum ether) to give the title compound (8.65 g).

$^1$H NMR (400 MHz, CDCl$_3$) δ 1.33 (12H, s), 4.09-4.21 (2H, m), 6.11 (1H, tt, J=55.2, 4.4 Hz), 6.56 (1H, dd, J=10.8, 2.4 Hz), 6.73 (1H, td, J=8.0, 2.0 Hz), 7.58-7.69 (1H, m).

C) 4-[2-(2,2-difluoroethoxy)-4-fluorophenyl]-2,3-dihydro-1H-pyrrolo[3,4-c]pyridin-1-one To a mixture of 4-chloro-2,3-dihydro-1H-pyrrolo[3,4-c]pyridin-1-one (1.65 g), 2-[2-(2,2-difluoroethoxy)-4-fluorophenyl]-4,4,5,5-tetramethyl-1,3,2-dioxaborolane (3.55 g), potassium carbonate (3.38 g), DME (40 mL) and water (1 mL) was added [1,1-bis(diphenylphosphino)ferrocene]dichloropalladium(II) (716 mg) at room temperature. The mixture was stirred under nitrogen atmosphere at 90° C. for 12 hr. The mixture was added to water at room temperature, and the mixture was extracted with ethyl acetate. The organic layer was separated, washed with saturated brine, dried over anhydrous sodium sulfate, and concentrated under reduced pressure. The residue was purified by silica gel column chromatography (ethyl acetate/petroleum ether) to give the title compound (1.60 g).
MS: [M+H]$^+$ 308.9.

D) 4-[2-(2,2-difluoroethoxy)-4-fluorophenyl]-2-[4-(1-hydroxycyclobutyl)phenyl]-2,3-dihydro-1H-pyrrolo[3,4-c]pyridin-1-one To a mixture of 1-(4-bromophenyl)cyclobutan-1-ol (48.5 mg), 4-[2-(2,2-difluoroethoxy)-4-fluorophenyl]-2,3-dihydro-1H-pyrrolo[3,4-c]pyridin-1-one (61.7 mg), sodium tert-butoxide (28.9 mg) and toluene (2.0 mL) was added chloro(2-dicyclohexylphosphino-2',4',6'-triisopropyl-1,1'-biphenyl) [2-(2'-amino-1,1'-biphenyl)]palladium(II) (23.62 mg) at room temperature. The mixture was stirred under argon atmosphere at 110° C. for 2 hr. The mixture was purified by silica gel column chromatography (SI and NH, ethyl acetate/hexane), and the solid was washed with IPE to give the title compound (34.2 mg).
$^1$H NMR (300 MHz, CDCl$_3$) δ 1.63-1.81 (1H, m), 1.93-2.14 (2H, m), 2.31-2.46 (2H, m), 2.50-2.67 (2H, m), 4.22 (2H, td, J=13.2, 3.8 Hz), 4.89 (2H, s), 5.72-6.17 (1H, m), 6.79 (1H, dd, J=10.0, 2.4 Hz), 6.89-7.02 (1H, m), 7.48-7.62 (3H, m), 7.76-7.88 (3H, m), 8.89 (1H, d, J=4.9 Hz).

Example 276

(R or S)-4-[2-(2,2,2-trifluoroethoxy)phenyl]-2-[6-(2,2,2-trifluoro-1-hydroxyethyl)pyridin-3-yl]-2,3-dihydro-1H-pyrrolo[3,4-c]pyridin-1-one rac-4-[2-(2,2,2-Trifluoroethoxy)phenyl]-2-[6-(2,2,2-trifluoro-1-hydroxyethyl)pyridin-3-yl]-2,3-dihydro-1H-pyrrolo[3,4-c]pyridin-1-one (41 mg) was resolved by HPLC (column: CHIRALCEL OD, 50 mmID×500 mmL, mobile phase: hexane/EtOH/diethylamine=550/450/1), and the fraction with a shorter retention time was concentrated to give the title compound (10.4 mg).
$^1$H NMR (300 MHz, DMSO-d$_6$) δ 4.87 (2H, q, J=9.0 Hz), 5.06 (2H, s), 5.14 (1H, d, J=7.5 Hz), 7.06 (1H, s), 7.19-7.29 (1H, m), 7.34 (1H, d, J=7.9 Hz), 7.49-7.62 (2H, m), 7.69 (1H, d, J=8.7 Hz), 7.83 (1H, d, J=4.9 Hz), 8.39-8.48 (1H, m), 8.91 (1H, d, J=4.9 Hz), 9.13 (1H, d, J=2.6 Hz).

Example 277

(R or S)-4-[2-(2,2,2-trifluoroethoxy)phenyl]-2-[6-(2,2,2-trifluoro-1-hydroxyethyl)pyridin-3-yl]-2,3-dihydro-1H-pyrrolo[3,4-c]pyridin-1-one rac-4-[2-(2,2,2-Trifluoroethoxy)phenyl]-2-[6-(2,2,2-trifluoro-1-hydroxyethyl)pyridin-3-yl]-2,3-dihydro-1H-pyrrolo[3,4-c]pyridin-1-one (41 mg) was resolved by HPLC (column: CHIRALCEL OD, 50 mmID×500 mmL, mobile phase: hexane/EtOH/diethylamine=550/450/1), and the fraction with a longer retention time was concentrated to give the title compound (9.5 mg).
$^1$H NMR (300 MHz, DMSO-d$_6$) δ 4.87 (2H, q, J=8.8 Hz), 5.06 (2H, s), 5.09-5.21 (1H, m), 7.05 (1H, d, J=4.9 Hz), 7.18-7.29 (1H, m), 7.34 (1H, d, J=8.3 Hz), 7.49-7.61 (2H, m), 7.69 (1H, d, J=8.7 Hz), 7.83 (1H, d, J=4.9 Hz), 8.44 (1H, dd, J=8.7, 2.6 Hz), 8.91 (1H, d, J=4.9 Hz), 9.14 (1H, d, J=2.6 Hz).

Example 278

(R or S)-2-[4-(2,2-difluoro-1-hydroxyethyl)phenyl]-4-[4-fluoro-2-(2,2,2-trifluoroethoxy)phenyl]-2,3-dihydro-1H-pyrrolo[3,4-c]pyridin-1-one rac-2-[4-(2,2-Difluoro-1-hydroxyethyl)phenyl]-4-[4-fluoro-2-(2,2,2-trifluoroethoxy)phenyl]-2,3-dihydro-1H-pyrrolo[3,4-c]pyridin-1-one (120 mg) was resolved by HPLC (column: CHIRALCEL OJH, 20 mmID×500 mmL, mobile phase: carbon dioxide/(MeOH/diethylamine=1000/3)=600/400), and the fraction with a shorter retention time was concentrated to give the title compound (34.6 mg).
$^1$H NMR (300 MHz, DMSO-d$_6$) δ 4.76 (1H, t, J=13.0 Hz), 4.84-5.04 (4H, m), 5.79-6.29 (2H, m), 7.08 (1H, td, J=8.4, 2.1 Hz), 7.32 (1H, dd, J=11.1, 2.4 Hz), 7.48 (2H, d, J=8.7 Hz), 7.57 (1H, dd, J=8.5, 7.0 Hz), 7.80 (1H, d, J=5.3 Hz), 7.92 (2H, d, J=8.7 Hz), 8.87 (1H, d, J=5.3 Hz).

Example 279

(R or S)-2-[4-(2,2-difluoro-1-hydroxyethyl)phenyl]-4-[4-fluoro-2-(2,2,2-trifluoroethoxy)phenyl]-2,3-dihydro-1H-pyrrolo[3,4-c]pyridin-1-one rac-2-[4-(2,2-Difluoro-1-hydroxyethyl)phenyl]-4-[4-fluoro-2-(2,2,2-trifluoroethoxy)phenyl]-2,3-dihydro-1H-pyrrolo[3,4-c]pyridin-1-one (120 mg) was resolved by HPLC (column: CHIRALCEL OJH, 20 mmID×500 mmL, mobile phase: carbon dioxide/(MeOH/diethylamine=1000/3)=600/400), and the fraction with a longer retention time was concentrated to give the title compound (41.9 mg).
$^1$H NMR (300 MHz, DMSO-d$_6$) δ 4.68-4.82 (1H, m), 4.83-5.05 (4H, m), 5.78-6.29 (2H, m), 7.08 (1H, td, J=8.5, 2.3 Hz), 7.32 (1H, dd, J=10.9, 2.3 Hz), 7.48 (2H, d, J=8.7 Hz), 7.57 (1H, dd, J=8.5, 7.0 Hz), 7.80 (1H, d, J=4.9 Hz), 7.92 (2H, d, J=8.7 Hz), 8.87 (1H, d, J=4.9 Hz).

Example 291

2-[6-(1,1-difluoro-2-hydroxy-2-methylpropyl)pyridin-3-yl]-4-[4-fluoro-2-(2,2,2-trifluoroethoxy)phenyl]-2,3-dihydro-1H-pyrrolo[3,4-c]pyridin-1-one A) 1-(5-bromopyridin-2-yl)-1,1-difluoro-2-methylpropan-2-ol To a mixture of ethyl (5-bromopyridin-2-yl) (difluoro)acetate (1.20 g) and THF (12 mL) was added 3M bromo(methyl)magnesium-diethyl ether solution (7.1 mL) at 0° C., and the mixture was stirred at room temperature for 1 hr. The reaction mixture was neutralized with 5% aqueous citric acid solution, and extracted with ethyl acetate. The organic layer was washed with water and brine, dried over anhydrous sodium sulfate, and concentrated under reduced pressure. The residue was purified by silica gel column chromatography (ethyl acetate/hexane) to give the title compound (1.04 g).
MS: [M+H]$^+$ 265.8.

B) 2-[6-(1,1-difluoro-2-hydroxy-2-methylpropyl) pyridin-3-yl]-4-[4-fluoro-2-(2,2,2-trifluoroethoxy) phenyl]-2,3-dihydro-1H-pyrrolo[3,4-c]pyridin-1-one To a solution of 4-[4-fluoro-2-(2,2,2-trifluoroethoxy)phenyl]-2,3-dihydro-1H-pyrrolo[3,4-c]pyridin-1-one (82 mg), 1-(5-bromopyridin-2-yl)-1,1-difluoro-2-methylpropan-2-ol (100 mg) and sodium tert-butoxide (36 mg) in toluene (10 mL) was added chloro(2-dicyclohexylphosphino-2',4',6'-triisopropyl-1,1'-biphenyl) [2-(2'-amino-1,1'-biphenyl)]palladium(II) (39 mg) at room temperature, and the mixture was stirred under argon atmosphere at 100° C. for 5 hr. To the reaction mixture were added water and ethyl acetate, and the insoluble substance was removed by filtration. The filtrate was extracted with ethyl acetate, and the organic layer was washed with water and brine, dried over anhydrous sodium sulfate, and concentrated under reduced pressure. The residue was purified by silica gel column chromatography (NH, ethyl acetate/hexane), and washed with ethyl acetate/hexane to give the title compound (71 mg).

$^1$H NMR (300 MHz, DMSO-$d_6$) δ 1.23 (6H, s), 4.92 (2H, q, J=8.7 Hz), 5.06 (2H, s), 5.32 (1H, s), 7.09 (1H, td, J=8.4, 2.4 Hz), 7.35 (1H, dd, J=11.1, 2.4 Hz), 7.58 (1H, dd, J=8.7, 6.8 Hz), 7.68 (1H, d, J=8.7 Hz), 7.84 (1H, d, J=5.3 Hz), 8.49 (1H, dd, J=8.7, 2.6 Hz), 8.90 (1H, d, J=4.9 Hz), 9.20 (1H, d, J=2.6 Hz).

Example 297

2-[5-(2-hydroxy-2-methylpropoxy)pyridin-2-yl]-4-[2-(2,2,2-trifluoroethoxy)phenyl]-2,3-dihydro-1H-pyrrolo[3,4-c]pyridin-1-one A) 4-[2-(2,2,2-trifluoroethoxy)phenyl]-2,3-dihydro-1H-pyrrolo[3,4-c]pyridin-1-one To a mixture of 4-chloro-2,3-dihydro-1H-pyrrolo[3,4-c]pyridin-1-one (800 mg), [2-(2,2,2-trifluoroethoxy)phenyl]boronic acid (1253 mg), 1 M aqueous tripotassium phosphate solution (7.12 mL) and DME (16 mL) was added chloro(2-dicyclohexylphosphino-2',4',6'-triisopropyl-1,1'-biphenyl) [2-(2'-amino-1,1'-biphenyl)]palladium(II) (373 mg) at room temperature. The mixture was stirred under argon atmosphere at 80° C. for 16 hr. To the mixture were added ethyl acetate and water, and the insoluble substance was removed by filtration. The filtrate was adjusted to pH=2-3 with 1M hydrochloric acid, and extracted with ethyl acetate. The organic layer was washed with saturated brine, dried over anhydrous magnesium sulfate, and concentrated under reduced pressure, and the residue was crystallized from ethyl acetate/hexane to give the title compound (0.810 g).

MS: [M+H]$^+$ 309.3.

B) 1-[(6-bromopyridin-3-yl)oxy]-2-methylpropan-2-ol

A mixture of bromopyridin-3-ol (15.54 g), isobutylene oxide (24 mL), cesium carbonate (34.9 g) and DMF (200 mL) was stirred overnight at 90° C. To the reaction mixture were added cesium carbonate (5.82 g) and isobutylene oxide (1.7 mL), and the mixture was stirred at 90° C. for 3 hr. To the reaction mixture was added water, and the mixture was extracted with ethyl acetate. The organic layer was separated, washed with water and saturated brine, dried over anhydrous sodium sulfate, and concentrated under reduced pressure. The residue was purified by silica gel column chromatography (ethyl acetate/hexane) to give the title compound (12.40 g).

MS: [M+H]$^+$ 246.0.

C) 2-[5-(2-hydroxy-2-methylpropoxy)pyridin-2-yl]-4-[2-(2,2,2-trifluoroethoxy)phenyl]-2,3-dihydro-1H-pyrrolo[3,4-c]pyridin-1-one A mixture of 4-[2-(2,2,2-trifluoroethoxy)phenyl]-2,3-dihydro-1H-pyrrolo[3,4-c]pyridin-1-one (2.0 g), 1-[(6-bromopyridin-3-yl)oxy]-2-methylpropan-2-ol (2.076 g), chloro(2-dicyclohexylphosphino-2',4',6'-triisopropyl-1,1'-biphenyl) [2-(2'-amino-1,1'-biphenyl)]palladium(II) (1.021 g), sodium tert-butoxide (0.935 g) and toluene (50 mL) was stirred under argon atmosphere at 110° C. for 3 hr. To the reaction mixture was added chloro(2-dicyclohexylphosphino-2',4',6'-triisopropyl-1,1'-biphenyl) [2-(2'-amino-1,1'-biphenyl)]palladium(II) (1.0 g), and the mixture was stirred under argon atmosphere at 110° C. for 2 hr. To the reaction mixture was added NH silica gel, and the mixture was concentrated under reduced pressure. The residue was purified by silica gel column chromatography (SI and NH, ethyl acetate/hexane). To the obtained crude product were added ethyl acetate and hexane, and the precipitate was collected by filtration, and washed with hexane to give the title compound (0.652 g).

$^1$H NMR (300 MHz, DMSO-$d_6$) δ 1.21 (6H, s), 3.80 (2H, s), 4.68 (1H, s), 4.81 (2H, q, J=8.9 Hz), 5.01 (2H, s), 7.20-7.29 (1H, m), 7.34 (1H, d, J=8.3 Hz), 7.48-7.63 (3H, m), 7.81 (1H, d, J=5.3 Hz), 8.12 (1H, d, J=2.6 Hz), 8.46 (1H, d, J=8.7 Hz), 8.88 (1H, d, J=4.9 Hz).

Example 310

6-[5-(difluoromethoxy)pyridin-2-yl]-1-[4-fluoro-2-(2,2,2-trifluoroethoxy)phenyl]-6,7-dihydro-1H-pyrrolo[3,4-b]pyridine-2,5-dione A) methyl (2E)-3-[4-fluoro-2-(2,2,2-trifluoroethoxy)anilino]but-2-enoate To a mixture of 4-fluoro-2-(2,2,2-trifluoroethoxy)aniline (5.0 g) and methyl acetoacetate (3.05 g) was added indium tribromide (85 mg) at room temperature, and the mixture was stirred overnight at 50° C. The reaction mixture was purified by silica gel column chromatography (ethyl acetate/petroleum ether) to give the title compound (2.39 g).

$^1$H NMR (400 MHz, CDCl$_3$) δ 1.86 (3H, s), 3.68 (3H, s), 4.30-4.40 (2H, m), 4.74 (1H, s), 6.70 (1H, dd, J=9.2, 2.4 Hz), 6.73-6.79 (1H, m), 7.11 (1H, dd, J=8.8, 6.0 Hz), 9.98 (1H, brs).

B) methyl 1-[4-fluoro-2-(2,2,2-trifluoroethoxy)phenyl]-2-methyl-6-oxo-1,6-dihydropyridine-3-carboxylate To a mixture of methyl (2E)-3-[4-fluoro-2-(2,2,2-trifluoroethoxy)anilino]but-2-enoate (2.39 g) and THF (20 mL) was added sodium hydride (60% oil, 311 mg) at 0° C. The reaction mixture was stirred at 0° C. for 30 min, methyl propiolate (654 mg) was added thereto, and the mixture was stirred at 0° C. for 1 hr. To the mixture was added water, and the mixture was extracted with ethyl acetate. The organic layer was separated, washed with saturated brine, dried over anhydrous sodium sulfate, and concentrated under reduced pressure. The residue was purified by silica gel column chromatography (ethyl acetate/petroleum ether) to give the title compound (1.08 g).

MS: [M+H]$^+$ 359.8.

C) methyl 2-(bromomethyl)-1-[4-fluoro-2-(2,2,2-trifluoroethoxy)phenyl]-6-oxo-1,6-dihydropyridine-3-carboxylate To a mixture of methyl 1-[4-fluoro-2-(2,2,2-trifluoroethoxy)phenyl]-2-methyl-6-oxo-1,6-dihydropyridine-3-carboxylate (200 mg) and carbon tetrachloride (10 mL) were added NBS (109 mg) and AIBN (18 mg) at room temperature, and the mixture was stirred overnight at 77° C. The reaction mixture was concentrated under reduced pressure, and the residue was purified by thin layer silica gel chromatography (ethyl acetate/petroleum ether) to give the title compound (203 mg).

MS: [M+H]$^+$ 437.5.

D) 1-[4-fluoro-2-(2,2,2-trifluoroethoxy)phenyl]-6,7-dihydro-1H-pyrrolo[3,4-b]pyridine-2,5-dione To a mixture of methyl 2-(bromomethyl)-1-[4-fluoro-2-(2,2,2-trifluoroethoxy)phenyl]-6-oxo-1,6-dihydropyridine-3-carboxylate (203 mg) and MeOH (2 mL) was added 7M ammonia-MeOH solution (0.132 mL), and the mixture was stirred overnight at 80° C. The reaction mixture was concentrated under reduced pressure, and the precipitate was collected by filtration, and washed with ethyl acetate/petroleum ether to give the title compound (49 mg).

MS: [M+H]$^+$ 342.8.

E) 6-[5-(difluoromethoxy)pyridin-2-yl]-1-[4-fluoro-2-(2,2,2-trifluoroethoxy)phenyl]-6,7-dihydro-1H-pyrrolo[3,4-b]pyridine-2,5-dione To a mixture of 1-[4-fluoro-2-(2,2,2-trifluoroethoxy)phenyl]-6,7-dihydro-1H-pyrrolo[3,4-b]pyridine-2,5-dione (49 mg) and toluene (5 mL) were added 2-bromo-5-(difluoromethoxy)pyridine (71 mg), sodium tert-butoxide (14 mg) and chloro(2-dicyclohexylphosphino-2',4',6'-triisopropyl-1,1'-biphenyl) [2-(2'-amino-1,1'-biphenyl)]palladium(II) (6 mg) at room temperature. The mixture was stirred under nitrogen atmosphere at 110° C. for 2 hr. To the reaction mixture was added water at room temperature, and the mixture was extracted with ethyl acetate. The organic layer was separated, washed with saturated brine, dried over anhydrous sodium sulfate, and concentrated under reduced pressure. The residue was purified by preparative liquid chromatography (0.05% aqueous ammonia-containing acetonitrile/0.1% aqueous ammonia) to give the title compound (5 mg).

$^1$H NMR (400 MHz, CDCl$_3$) δ 4.33-4.44 (2H, m), 4.45-4.70 (2H, m), 6.30-6.73 (2H, m), 6.91 (1H, dd, J=9.6, 2.8 Hz), 6.99-7.05 (1H, m), 7.35 (1H, dd, J=8.8, 5.6 Hz), 7.55 (1H, dd, J=9.2, 2.8 Hz), 7.81 (1H, d, J=9.6 Hz), 8.10 (1H, d, J=2.4 Hz), 8.52 (1H, d, J=9.2 Hz).

Example 311

(R or S)-2-[4-(1,1-difluoro-2-hydroxypropan-2-yl)phenyl]-4-[4-fluoro-2-(2,2,2-trifluoroethoxy)phenyl]-2,3-dihydro-1H-pyrrolo[3,4-c]pyridin-1-one A) rac-2-[4-(1,1-difluoro-2-hydroxypropan-2-yl)phenyl]-4-[4-fluoro-2-(2,2,2-trifluoroethoxy)phenyl]-2,3-dihydro-1H-pyrrolo[3,4-c]pyridin-1-one To a mixture of 4-[4-fluoro-2-(2,2,2-trifluoroethoxy)phenyl]-2,3-dihydro-1H-pyrrolo[3,4-c]pyridin-1-one (50 mg), rac-4-bromo-(1,1-difluoro-2-hydroxypropan-2-yl)benzene (58 mg), sodium tert-butoxide (29 mg) and toluene (2 mL) was added chloro(2-dicyclohexylphosphino-2',4',6'-triisopropyl-1,1'-biphenyl) [2-(2'-amino-1,1'-biphenyl)]palladium(II) (6 mg). The mixture was stirred under nitrogen atmosphere at 110° C. for 16 hr. Separately, to a mixture of 4-[4-fluoro-2-(2,2,2-trifluoroethoxy)phenyl]-2,3-dihydro-1H-pyrrolo[3,4-c]pyridin-1-one (35 mg), rac-4-bromo-(1,1-difluoro-2-hydroxypropan-2-yl)benzene (40 mg), sodium tert-butoxide (21 mg) and toluene (2 mL) was added chloro(2-dicyclohexylphosphino-2',4',6'-triisopropyl-1,1'-biphenyl) [2-(2'-amino-1,1'-biphenyl)]palladium(II) (4.22 mg). The mixture was heated with reflux under nitrogen atmosphere for 16 hr. These two reaction mixtures were combined, and poured into water, and extracted with ethyl acetate. The organic layer was washed with saturated brine, dried over anhydrous sodium sulfate, and concentrated under reduced pressure. The residue was purified by preparative liquid chromatography (L-Column 2 ODS, mobile phase: water/acetonitrile (0.04% aqueous ammonia-containing 10 mM ammonium bicarbonate)) to give the title compound (55 mg).

$^1$H NMR (400 MHz, CDCl$_3$) δ 1.67 (3H, s), 2.36 (1H, brs), 4.37 (2H, q, J=8.0 Hz), 4.88 (2H, s), 5.71 (1H, t, J=56.4 Hz), 6.82 (1H, dd, J=7.6, 2.4 Hz), 6.99 (1H, td, J=8.4, 2.4 Hz), 7.50-7.63 (3H, m), 7.73-7.95 (3H, m), 8.90 (1H, d, J=4.8 Hz).

B) (R or S)-2-[4-(1,1-difluoro-2-hydroxypropan-2-yl)phenyl]-4-[4-fluoro-2-(2,2,2-trifluoroethoxy)phenyl]-2,3-dihydro-1H-pyrrolo[3,4-c]pyridin-1-one rac-2-[4-(1,1-Difluoro-2-hydroxypropan-2-yl)phenyl]-4-[4-fluoro-2-(2,2,2-trifluoroethoxy)phenyl]-2,3-dihydro-1H-pyrrolo[3,4-c]pyridin-1-one (50 mg) was resolved by HPLC (column: CHREALCEL OD-H, 30 mmID×250 mmL, mobile phase: 0.1% NH3H2O, EtOH), and the fraction with a shorter retention time was concentrated to give the title compound (12 mg).

$^1$H NMR (400 MHz, CDCl$_3$) δ 1.67 (3H, s), 2.31 (1H, brs), 4.36 (2H, q, J=8.0 Hz), 4.88 (2H, s), 5.71 (1H, t, J=56.4 Hz), 6.82 (1H, dd, J=7.6, 2.0 Hz), 6.99 (1H, td, J=8.4, 2.4 Hz), 7.50-7.63 (3H, m), 7.73-7.95 (3H, m), 8.90 (1H, d, J=4.8 Hz).

Example 313

(R or S)-2-[4-(1,1-difluoro-2-hydroxypropan-2-yl)phenyl]-4-[4-fluoro-2-(2,2,2-trifluoroethoxy)phenyl]-2,3-dihydro-1H-pyrrolo[3,4-c]pyridin-1-one rac-2-[4-(1,1-Difluoro-2-hydroxypropan-2-yl)phenyl]-4-[4-fluoro-2-(2,2,2-trifluoroethoxy)phenyl]-2,3-dihydro-1H-pyrrolo[3,4-c]pyridin-1-one (50 mg) was resolved by HPLC (column: CHREALCEL OD-H, 30 mmID×250 mmL, mobile phase: 0.1% NH3H2O, EtOH), and the fraction with a longer retention time was concentrated to give the title compound (9 mg).

$^1$H NMR (400 MHz, CDCl$_3$) δ 1.67 (3H, s), 2.28 (1H, brs), 4.36 (2H, q, J=8.0 Hz), 4.88 (2H, s), 5.71 (1H, t, J=56.0 Hz), 6.82 (1H, dd, J=7.6, 2.4 Hz), 6.99 (1H, td, J=8.4, 2.4 Hz), 7.50-7.63 (3H, m), 7.73-7.95 (3H, m), 8.90 (1H, d, J=5.2 Hz).

141

Example 314 (R or S)-2-[4-(1,1-difluoro-2-hydroxypropan-2-yl)phenyl]-4-[2-(2,2,2-trifluoroethoxy)phenyl]-2,3-dihydro-1H-pyrrolo[3,4-c]pyridin-1-one

A) rac-2-[4-(1,1-difluoro-2-hydroxypropan-2-yl)phenyl]-4-[2-(2,2,2-trifluoroethoxy)phenyl]-2,3-dihydro-1H-pyrrolo[3,4-c]pyridin-1-one To a mixture of 4-[2-(2,2,2-trifluoroethoxy)phenyl]-2,3-dihydro-1H-pyrrolo[3,4-c]pyridin-1-one (100 mg), rac-4-bromo-(1,1-difluoro-2-hydroxypropan-2-yl)benzene (122 mg), sodium tert-butoxide (62 mg) and toluene (3 mL) was added chloro(2-dicyclohexylphosphino-2',4',6'-triisopropyl-1,1'-biphenyl) [2-(2'-amino-1,1'-biphenyl)]palladium(II) (13 mg). The mixture was stirred under nitrogen atmosphere at 110° C. for 12 hr. The reaction mixture was cooled to room temperature. The mixture was poured into water, and extracted with ethyl acetate. The organic layer was washed with saturated brine, dried over anhydrous sodium sulfate, and concentrated under reduced pressure. The residue was purified by silica gel column chromatography (ethyl acetate/petroleum ether), and crystallized from water/acetonitrile to give the title compound (96 mg).

$^1$H NMR (400 MHz, DMSO-$d_6$) δ 1.52 (3H, s), 4.86 (2H, q, J=8.8 Hz), 4.99 (2H, s), 5.79-6.10 (2H, m), 7.24 (1H, t, J=8.0 Hz), 7.33 (1H, d, J=8.0 Hz), 7.46-7.62 (4H, m), 7.79 (1H, d, J=5.2 Hz), 7.90 (2H, d, J=8.8 Hz), 8.88 (1H, d, J=4.8 Hz).

B) (R or S)-2-[4-(1,1-difluoro-2-hydroxypropan-2-yl)phenyl]-4-[2-(2,2,2-trifluoroethoxy)phenyl]-2,3-dihydro-1H-pyrrolo[3,4-c]pyridin-1-one rac-2-[4-(1,1-Difluoro-2-hydroxypropan-2-yl)phenyl]-4-[2-(2,2,2-trifluoroethoxy)phenyl]-2,3-dihydro-1H-pyrrolo[3,4-c]pyridin-1-one (91 mg) was resolved by HPLC (column: CHREALCEL OD-H, 30 mmID×250 mmL, mobile phase: 0.1% NH3H2O, EtOH), and the fraction with a shorter retention time was concentrated to give the title compound (48 mg).

$^1$H NMR (400 MHz, DMSO-$d_6$) δ 1.52 (3H, s), 4.86 (2H, q, J=8.8 Hz), 4.99 (2H, s), 5.79-6.10 (2H, m), 7.24 (1H, t, J=8.0 Hz), 7.33 (1H, d, J=8.0 Hz), 7.46-7.62 (4H, m), 7.79 (1H, d, J=5.2 Hz), 7.90 (2H, d, J=8.8 Hz), 8.88 (1H, d, J=4.8 Hz).

Example 315

(R or S)-2-[4-(1,1-difluoro-2-hydroxypropan-2-yl)phenyl]-4-[2-(2,2,2-trifluoroethoxy)phenyl]-2,3-dihydro-1H-pyrrolo[3,4-c]pyridin-1-one rac-2-[4-(1,1-Difluoro-2-hydroxypropan-2-yl)phenyl]-4-[2-(2,2,2-trifluoroethoxy)phenyl]-2,3-dihydro-1H-pyrrolo[3,4-c]pyridin-1-one (91 mg) was resolved by HPLC (column: CHREALCEL OD-H, 30 mmID×250 mmL, mobile phase: 0.1% NH3H2O, EtOH), and the fraction with a longer retention time was concentrated to give the title compound (35 mg).

$^1$H NMR (400 MHz, DMSO-$d_6$) δ 1.52 (3H, s), 4.86 (2H, q, J=8.8 Hz), 4.99 (2H, s), 5.79-6.10 (2H, m), 7.24 (1H, t, J=8.0 Hz), 7.33 (1H, d, J=8.0 Hz), 7.46-7.62 (4H, m), 7.79 (1H, d, J=5.2 Hz), 7.90 (2H, d, J=8.8 Hz), 8.88 (1H, d, J=4.8 Hz).

142

Example 316

2-[6-(3,3-difluoro-1-hydroxycyclobutyl)pyridin-3-yl]-4-[2-(2,2,2-trifluoroethoxy)phenyl]-2,3-dihydro-1H-pyrrolo[3,4-c]pyridin-1-one

A) 5-bromo-2-(1-{[tert-butyl(dimethyl)silyl]oxy}-3,3-difluorocyclobutyl)pyridine To a mixture of 1-(5-bromopyridin-2-yl)-3,3-difluorocyclobutan-1-ol (509 mg) and DMF (6.43 mL) were added tert-butyl(chloro)dimethylsilane (581 mg) and 1H-imidazole (394 mg). The mixture was stirred at room temperature for 48 hr, and then at 60° C. for 24 hr. To the reaction mixture was added tert-butyl(chloro)dimethylsilane (581 mg), and the mixture was stirred at 60° C. for 16 hr. The mixture was cooled to room temperature, water was added thereto, and the mixture was extracted with ethyl acetate. The organic layer was washed with saturated brine, dried over anhydrous magnesium sulfate, and concentrated under reduced pressure. The residue was purified by silica gel column chromatography (NH, ethyl acetate/hexane) to give the title compound (479 mg).

$^1$H NMR (300 MHz, DMSO-$d_6$) δ −0.14 (6H, s), 0.85 (9H, s), 2.83-3.01 (2H, m), 3.42 (2H, dt, J=14.7, 11.7 Hz), 7.57 (1H, d, J=8.7 Hz), 8.15 (1H, dd, J=8.5, 2.4 Hz), 8.73 (1H, d, J=2.3 Hz).

B) 6-(1-{[tert-butyl(dimethyl)silyl]oxy}-3,3-difluorocyclobutyl)pyridin-3-amine To a mixture of 5-bromo-2-(1-{[tert-butyl(dimethyl)silyl]oxy}-3,3-difluorocyclobutyl)pyridine (300 mg), 1,1-diphenylmethanimine (172 mg), cesium carbonate (517 mg) and DME (3.97 mL) were added Pd2(dba)3 (43.6 mg) and XANTPHOS (36.7 mg). The mixture was stirred under argon atmosphere at 100° C. for 16 hr. The reaction mixture was purified by silica gel column chromatography (NH, ethyl acetate/hexane) to give N-[6-(1-{[tert-butyl(dimethyl)silyl]oxy}-3,3-difluorocyclobutyl)pyridin-3-yl]-1,1-diphenylmethanimine as a crude product. To a mixture of the obtained crude product and MeOH (15.9 mL) were added sodium acetate (156 mg) and hydroxylamine hydrochloride (99 mg). The mixture was stirred at room temperature for 1 hr, and concentrated under reduced pressure. Water was added thereto, and the mixture was extracted with ethyl acetate. The organic layer was washed with saturated brine, dried over anhydrous magnesium sulfate, and concentrated under reduced pressure. The residue was purified by silica gel column chromatography (NH, ethyl acetate/hexane) to give the title compound (201 mg).

MS: [M+H]$^+$ 315.0.

C) 2-[6-(1-{[tert-butyl(dimethyl)silyl]oxy}-3,3-difluorocyclobutyl)pyridin-3-yl]-4-chloro-2,3-dihydro-1H-pyrrolo[3,4-c]pyridin-1-one A mixture of 6-(1-{[tert-butyl(dimethyl)silyl]oxy}-3,3-difluorocyclobutyl)pyridin-3-amine (130 mg), methyl 3-(bromomethyl)-2-chloropyridine-4-carboxylate (328 mg), TEA (0.173 mL) and THF (4.13 mL) was stirred at 50° C. for 40 hr. The reaction mixture was cooled to room temperature, and the residue was purified by silica gel column chromatography (NH, ethyl acetate/hexane) to give the title compound (106 mg).

MS: [M+H]$^+$ 466.1.

D) 2-[6-(1-{[tert-butyl(dimethyl)silyl]oxy}-3,3-difluorocyclobutyl)pyridin-3-yl]-4-[2-(2,2,2-trifluoroethoxy)phenyl]-2,3-dihydro-1H-pyrrolo[3,4-c]pyridin-1-one To a mixture of [2-(2,2,2-trifluoroethoxy)phenyl]boronic acid (100 mg), 2-[6-(1-{[tert-butyl(dimethyl)silyl]oxy}-3,3-difluorocyclobutyl)pyridin-3-yl]-4-chloro-2,3-dihydro-1H-pyrrolo[3,4-c]pyridin-1-one (106 mg), 2 M aqueous potassium carbonate solution (0.341 mL) and DME (2.28 mL) was added [1,1-bis(diphenylphosphino)ferrocene]dichloropalladium(II) dichloromethane adduct (18.6 mg). The mixture was stirred under argon atmosphere at 85° C. for 16 hr. The reaction mixture was cooled to room temperature, and the residue was purified by silica gel column chromatography (NH, ethyl acetate/hexane) to give the title compound (87.4 mg).
MS: [M+H]$^+$ 606.1.

E) 2-[6-(3,3-difluoro-1-hydroxycyclobutyl)pyridin-3-yl]-4-[2-(2,2,2-trifluoroethoxy)phenyl]-2,3-dihydro-1H-pyrrolo[3,4-c]pyridin-1-one To a mixture of 2-[6-(1-{[tert-butyl(dimethyl)silyl]oxy}-3,3-difluorocyclobutyl)pyridin-3-yl]-4-[2-(2,2,2-trifluoroethoxy)phenyl]-2,3-dihydro-1H-pyrrolo[3,4-c]pyridin-1-one (87.4 mg) and THF (1.44 mL) was added 1M hydrochloric acid (1.04 mL). The mixture was stirred at room temperature for 10 days. The residue was purified by silica gel column chromatography (NH, ethyl acetate/hexane) to give the title compound (51.2 mg).
$^1$H NMR (300 MHz, DMSO-d$_6$) δ 2.68-2.88 (2H, m), 3.15-3.30 (2H, m), 4.87 (2H, q, J=9.0 Hz), 5.04 (2H, s), 6.31 (1H, s), 7.18-7.28 (1H, m), 7.34 (1H, d, J=8.3 Hz), 7.49-7.61 (2H, m), 7.71 (1H, d, J=8.7 Hz), 7.82 (1H, d, J=5.3 Hz), 8.36 (1H, dd, J=8.9, 2.4 Hz), 8.90 (1H, d, J=4.9 Hz), 9.12 (1H, d, J=2.6 Hz).

Example 317 rac-2-{6-[cyclopropyl(hydroxy)methyl]pyridin-3-yl}-4-[2-(2,2,2-trifluoroethoxy)phenyl]-2,3-dihydro-1H-pyrrolo[3,4-c]pyridin-1-one A) rac-4-chloro-2-{6-[cyclopropyl(hydroxy)methyl]pyridin-3-yl}-2,3-dihydro-1H-pyrrolo[3,4-c]pyridin-1-one A mixture of methyl 3-(bromomethyl)-2-chloropyridine-4-carboxylate (193 mg), rac-(5-aminopyridin-2-yl)(cyclopropyl)methanol (120 mg), TEA (0.406 mL) and THF (7.28 mL) was stirred at 50° C. for 48 hr. To the reaction mixture was added methyl 3-(bromomethyl)-2-chloropyridine-4-carboxylate (96 mg), and the mixture was stirred at 50° C. for 48 hr. The reaction mixture was cooled to room temperature, and purified by silica gel column chromatography (NH, ethyl acetate/hexane) to give the title compound (134 mg).
MS: [M+H]$^+$ 315.9.

B) rac-2-{6-[cyclopropyl(hydroxy)methyl]pyridin-3-yl}-4-[2-(2,2,2-trifluoroethoxy)phenyl]-2,3-dihydro-1H-pyrrolo[3,4-c]pyridin-1-one To a mixture of [2-(2,2,2-trifluoroethoxy)phenyl]boronic acid (187 mg), rac-4-chloro-2-{6-[cyclopropyl(hydroxy) methyl]pyridin-3-yl}-2,3-dihydro-1H-pyrrolo[3,4-c]pyridin-1-one (134 mg), 2 M aqueous potassium carbonate solution (0.637 mL) and DME (4.24 mL) was added [1,1-bis(diphenylphosphino)ferrocene]dichloropalladium(II) dichloromethane adduct (34.7 mg). The mixture was stirred under argon atmosphere at 85° C. for 16 hr. The mixture was cooled to room temperature, and purified by silica gel column chromatography (NH, ethyl acetate/hexane) and preparative HPLC (L-Column 2 ODS, mobile phase: water/acetonitrile (containing 0.1% TFA)) to give the title compound (50.8 mg).
$^1$H NMR (300 MHz, DMSO-d$_6$) δ 0.28-0.46 (4H, m), 1.04-1.22 (1H, m), 4.08-4.19 (1H, m), 4.87 (2H, q, J=8.8 Hz), 5.03 (2H, s), 5.32 (1H, d, J=4.9 Hz), 7.18-7.28 (1H, m), 7.33 (1H, d, J=7.9 Hz), 7.48-7.63 (3H, m), 7.82 (1H, d, J=4.9 Hz), 8.29 (1H, dd, J=8.5, 2.8 Hz), 8.90 (1H, d, J=4.9 Hz), 9.01 (1H, d, J=2.6 Hz).

Example 320

4-[2,4-difluoro-6-(2,2,2-trifluoroethoxy)phenyl]-2-[4-(2-hydroxypropan-2-yl)phenyl]-2,3-dihydro-1H-pyrrolo[3,4-c]pyridin-1-one A) 2-bromo-1,5-difluoro-3-(2,2,2-trifluoroethoxy) benzene To a mixture of 2-bromo-3,5-difluorophenol (3.46 g) and DMF (30 mL) were added potassium carbonate (4.58 g) and 2,2,2-trifluoroethyl trifluoromethanesulfonate (4.61 g) at room temperature. The mixture was stirred at room temperature for 16 hr. The mixture was poured into water, and extracted with ethyl acetate. The organic layer was washed with saturated brine, dried over anhydrous sodium sulfate, and concentrated under reduced pressure. The residue was purified by silica gel column chromatography (petroleum ether) to give the title compound (4.08 g).
$^1$H NMR (400 MHz, CDCl$_3$) δ 4.40 (2H, q, J=8.0 Hz), 6.51 (1H, dt, J=9.6, 2.4 Hz), 6.68 (1H, td, J=8.4, 2.4 Hz).

B) 2-(2,4-difluoro-6-(2,2,2-trifluoroethoxy)phenyl)-4,4,5,5-tetramethyl-1,3,2-dioxaborolane To a mixture of 2-bromo-1,5-difluoro-3-(2,2,2-trifluoroethoxy)benzene (3.00 g) and CPME (20 mL) were added potassium acetate (1.52 g), 4,4,4',4',5,5,5',5'-octamethyl-2,2'-bi-1,3,2-dioxaborolane (3.14 g) and chloro(2-dicyclohexylphosphino-2',4',6'-triisopropyl-1,1'-biphenyl)   [2-(2'-amino-1,1'-biphenyl)]palladium(II) (406 mg) at room temperature, and the mixture was stirred under nitrogen atmosphere at 100° C. for 16 hr. To the reaction mixture was added ethyl acetate at room temperature, the mixture was filtered, and the filtrate was concentrated under reduced pressure. The residue was purified by silica gel column chromatography (ethyl acetate/petroleum ether) to give the title compound (783 mg).
$^1$H NMR (400 MHz, CDCl$_3$) δ 1.38 (12H, s), 4.31 (2H, q, J=8.0 Hz), 6.34 (1H, d, J=10.0 Hz), 6.51 (1H, td, J=8.8, 2.4 Hz).

C) 2-(4-acetylphenyl)-4-chloro-2,3-dihydro-1H-pyrrolo[3,4-c]pyridin-1-one

To a mixture of methyl 3-(bromomethyl)-2-chloropyridine-4-carboxylate (500 mg), 4'-aminoacetophenone (307 mg) and DMF (5 mL) was added DIPEA (733 mg). The mixture was stirred under nitrogen atmosphere at room temperature for 16 hr, and then at 45° C. for 16 hr. The reaction mixture was poured into water, and extracted with ethyl acetate. The organic layer was washed with saturated brine, and dried over anhydrous sodium sulfate. The residue was purified by silica gel column chromatography (ethyl acetate/hexane) to give the title compound (220 mg).
MS: [M+H]$^+$ 286.9.

D) 2-(4-acetylphenyl)-4-(2,4-difluoro-6-(2,2,2-trifluoroethoxy)phenyl)-2,3-dihydro-1H-pyrrolo[3,4-c]pyridin-1-one To a mixture of 2-(4-acetylphenyl)-4-chloro-2,3-dihydro-1H-pyrrolo[3,4-c]pyridin-1-one (120 mg), 2-(2,4-difluoro-6-(2,2,2-trifluoroethoxy)phenyl)-4,4,5,5-tetramethyl-1,3,2-dioxaborolane (212 mg), 1M aqueous potassium phosphate solution (0.837 mL) and THF (3 mL) was added chloro(2-dicyclohexylphosphino-2',4',6'-triisopropyl-1,1'-biphenyl)[2-(2'-amino-1,1'-biphenyl)]palladium(II) (16 mg) at room temperature. The reaction mixture was stirred at 60° C. for 16 hr. The reaction mixture was poured into water, and extracted with ethyl acetate. The organic layer was washed with saturated brine, and dried over anhydrous sodium sulfate. The residue was purified by silica gel column chromatography (ethyl acetate/petroleum ether) to give the title compound (190 mg).
MS: [M+H]$^+$ 462.8.

E) 4-[2,4-difluoro-6-(2,2,2-trifluoroethoxy)phenyl]-2-[4-(2-hydroxypropan-2-yl)phenyl]-2,3-dihydro-1H-pyrrolo[3,4-c]pyridin-1-one To a mixture of 2-(4-acetylphenyl)-4-(2,4-difluoro-6-(2,2,2-trifluoroethoxy)phenyl)-2,3-dihydro-1H-pyrrolo[3,4-c]pyridin-1-one (100 mg) and THF (2 mL) was added 3M methylmagnesium bromide-diethyl ether solution (0.22 mL) at 0° C., and the mixture was stirred under nitrogen atmosphere at 15° C. for 2 hr. To the reaction mixture was added again 3M methylmagnesium bromide-diethyl ether solution (0.22 mL) at 0° C., and the mixture was stirred under nitrogen atmosphere for 16 hr. Separately, to a mixture of 2-(4-acetylphenyl)-4-(2,4-difluoro-6-(2,2,2-trifluoroethoxy)phenyl)-2,3-dihydro-1H-pyrrolo[3,4-c]pyridin-1-one (90 mg) and THF (5 mL) was added 3M methylmagnesium bromide-diethyl ether solution (0.20 mL) at 0° C., and the mixture was stirred under nitrogen atmosphere at room temperature for 2 hr. The above two reaction mixtures were poured into water. The two mixtures were combined, and extracted with ethyl acetate. The organic layer was dried over anhydrous sodium sulfate, and concentrated under reduced pressure. The residue was purified by preparative HPLC (L-Column 2 ODS, mobile phase: water/acetonitrile (0.04% aqueous ammonia-containing 10 mM ammonium bicarbonate)) to give the title compound (12 mg).
$^1$H NMR (400 MHz, CDCl$_3$) δ1.60 (6H, s), 1.77 (1H, brs), 4.35 (2H, q, J=8.0 Hz), 4.78 (2H, s), 6.65 (1H, d, J=10.0 Hz), 6.77 (1H, td, J=9.2, 2.4 Hz), 7.53-7.58 (2H, m), 7.73-7.79 (2H, m), 7.87 (1H, d, J=5.2 Hz), 8.92 (1H, d, J=5.2 Hz).

Example 321

2-[4-(2-hydroxypropan-2-yl)phenyl]-5-methyl-7-[2-(2,2,2-trifluoroethoxy)phenyl]-1H-pyrrolo[3,4-c]pyridine-3,6(2H,5H)-dione

A) 7-chloro-5-methyl-1H-pyrrolo[3,4-c]pyridine-1,3,6(2H,5H)-trione

To a mixture of 5-chloro-4-(methoxycarbonyl)-1-methyl-6-oxo-1,6-dihydropyridine-3-carboxylic acid (2.50 g) and DMF (10 mL) were added 1-ethyl-3-(3-dimethylaminopropyl)carbodiimide hydrochloride (2.93 g), 1-hydroxybenzotriazole ammonium salt (2.32 g) and TEA (3.09 g) at room temperature, and the mixture was stirred overnight at 60° C. To the reaction mixture was added water at room temperature, and the mixture was extracted with ethyl acetate. The organic layer was separated, washed with saturated brine, dried over anhydrous sodium sulfate, and concentrated under reduced pressure. The residue was purified by silica gel column chromatography (ethyl acetate/hexane) to give the title compound (410 mg).
MS: [M–H]$^-$ 210.8.

B) 7-chloro-5-methyl-1H-pyrrolo[3,4-c]pyridine-3,6 (2H,5H)-dione

To a mixture of 7-chloro-5-methyl-1H-pyrrolo[3,4-c]pyridine-1,3,6(2H,5H)-trione (410 mg) and AcOH (5.0 mL) was added zinc (252 mg) at room temperature, and the mixture was stirred at 70° C. for 1 hr. The insoluble substance was removed by filtration, and the filtrate was concentrated under reduced pressure to give 7-chloro-1-hydroxy-5-methyl-1H-pyrrolo[3,4-c]pyridine-3,6(2H,5H)-dione (414 mg) as a crude product. To a mixture of the obtained crude product (414 mg) and TFA (3.0 mL) was added triethylsilane (1.12 g) at 0° C., and the mixture was stirred at 0° C. for 2 hr. The reaction mixture was concentrated under reduced pressure, and the precipitate was collected by filtration, and washed with ethyl acetate to give the title compound (70.5 mg).
MS: [M+H]$^+$ 198.9.

C) 5-methyl-7-[2-(2,2,2-trifluoroethoxy)phenyl]-1H-pyrrolo[3,4-c]pyridine-3,6(2H,5H)-dione To a mixture of 7-chloro-5-methyl-1H-pyrrolo[3,4-c]pyridine-3,6(2H,5H)-dione (70.3 mg), THF (45 mL), EtOH (3.0 mL) and water (6.0 mL) were added [2-(2,2,2-trifluoroethoxy)phenyl]boronic acid (117 mg), cesium carbonate (231 mg) and bis(tri-tert-butylphosphine)palladium(0) (36.2 mg) at room temperature. The mixture was stirred overnight under argon atmosphere at 70° C. To the reaction mixture was added water, and the mixture was extracted with ethyl acetate. The organic layer was separated, washed with saturated brine, dried over anhydrous sodium sulfate, and concentrated under reduced pressure. The residue was purified by silica gel column chromatography (MeOH/ethyl acetate) to give the title compound (14.1 mg).
MS: [M+H]$^+$ 338.9.

D) 2-[4-(2-hydroxypropan-2-yl)phenyl]-5-methyl-7-[2-(2,2,2-trifluoroethoxy)phenyl]-1H-pyrrolo[3,4-c]pyridine-3,6(2H,5H)-dione To a mixture of 5-methyl-7-[2-(2,2,2-trifluoroethoxy)phenyl]-1H-pyrrolo[3,4-c]pyridine-3,6(2H,5H)-dione (14.1 mg) and toluene (5 mL) were added 2-(4-bromophenyl)-2-propanol (17.9 mg), sodium tert-butoxide (8.0 mg) and chloro(2-dicyclohexylphosphino-2',4',6'-triisopropyl-1,1'-biphenyl)[2-(2'-amino-1,1'-biphenyl)]palladium(II) (6.7 mg) at room temperature. The mixture was stirred under argon atmosphere at 110° C. for 3 hr, and cooled to room temperature. The reaction solution was purified by silica gel column chromatography (ethyl acetate/hexane) to give the title compound (10 mg).

$^1$H NMR (300 MHz, DMSO-$d_6$) δ 1.41 (6H, s), 3.58 (3H, s), 4.57-4.88 (4H, m), 4.97 (1H, s), 7.10-7.19 (1H, m), 7.23-7.29 (1H, m), 7.34-7.48 (4H, m), 7.64-7.73 (2H, m), 8.54 (1H, s).

Example 324

2-[4-(2-hydroxypropan-2-yl)phenyl]-6-methyl-4-[2-(2,2,2-trifluoroethoxy)phenyl]-2,3-dihydro-1H-pyrrolo[3,4-c]pyridin-1-one

A) ethyl 3-cyano-6-methyl-2-oxo-1,2-dihydropyridine-4-carboxylate

To a solution of 20% sodium ethoxide-EtOH solution (101 mL) in EtOH (200 mL) was added dropwise a mixture of diethyl oxalate (31.8 mL) and acetone (17.25 mL). The highly viscous suspension was stirred overnight at room temperature. 2-Cyanoacetamide (19.68 g) was added thereto, and the suspension was stirred at 80° C. for 5 hr. The mixture was concentrated under reduced pressure. To the residue water was added. The mixture was adjusted to pH=3 with 1M hydrochloric acid. The mixture was extracted with ethyl acetate and THF. The combined organic layers were washed with saturated brine, dried over anhydrous sodium sulfate, and concentrated under reduced pressure. The residue was washed with ethyl acetate to give the title compound (32.5 g).

MS: [M+H]$^+$ 207.1.

B) ethyl 2-chloro-3-cyano-6-methylisonicotinate

A mixture of ethyl 3-cyano-6-methyl-2-oxo-1,2-dihydropyridine-4-carboxylate (97.65 g) and phosphorus oxychloride (303 mL) was refluxed for 8 hr. The reaction mixture was cooled to room temperature, and added dropwise to warm water. The mixture was neutralized with 8M aqueous sodium hydroxide solution. The mixture was extracted with ethyl acetate. The organic layer was washed with saturated brine, dried over anhydrous sodium sulfate, and concentrated under reduced pressure. The residue was passed through pad filled with silica gel using ethyl acetate, and concentrated under reduced pressure. The residue was passed through pad filled with NH silica gel using ethyl acetate, and concentrated under reduced pressure. The residue was recrystallized from ethyl acetate/hexane to give the title compound (47.67 g).

MS: [M+H]$^+$ 225.0.

C) 1-bromo-2-(2,2,2-trifluoroethoxy)benzene

To a mixture of 2-bromophenol (4.28 mL), potassium carbonate (10.21 g) and DMF (40 mL) was added 2,2,2-trifluoroethyl trifluoromethanesulfonate (6.92 mL) under ice-cooling. The mixture was stirred overnight at room temperature, and to the mixture was added water. The mixture was extracted with ethyl acetate, and the organic layer was washed with water and saturated brine, dried over anhydrous sodium sulfate, and concentrated under reduced pressure. The residue was purified by silica gel column chromatography (ethyl acetate/hexane) to give the title compound (9.69 g).

$^1$H NMR (300 MHz, DMSO-$d_6$) δ 4.86 (2H, q, J=8.8 Hz), 7.00 (1H, td, J=7.7, 1.5 Hz), 7.24 (1H, dd, J=8.3, 1.1 Hz), 7.35-7.45 (1H, m), 7.63 (1H, dd, J=7.9, 1.5 Hz).

D) ethyl 3-cyano-6-methyl-2-[2-(2,2,2-trifluoroethoxy)phenyl]pyridine-4-carboxylate To a mixture of 1-bromo-2-(2,2,2-trifluoroethoxy)benzene (28.6 g), 4,4,4',4',5,5,5',5'-octamethyl-2,2'-bi-1,3,2-dioxaborolane (34.1 g), potassium acetate (16.49 g) and CPME (250 mL) was added [1,1-bis(diphenylphosphino)ferrocene]dichloropalladium(II) (7.5 g) under argon atmosphere. The mixture was stirred overnight under argon atmosphere at 100° C. The mixture was cooled to room temperature, and filtered through Celite. To the filtrate was added water, and the mixture was extracted with ethyl acetate. The organic layer was washed with water and saturated brine, dried over anhydrous sodium sulfate, and concentrated under reduced pressure to give 4,4,5,5-tetramethyl-2-[2-(2,2,2-trifluoroethoxy)phenyl]-1,3,2-dioxaborolane as a crude product. To a mixture of the obtained crude product, ethyl 2-chloro-3-cyano-6-methylisonicotinate (25 g), potassium carbonate (38.5 g), DME (250 mL) and water (6.25 mL) was added [1,1-bis(diphenylphosphino)ferrocene]dichloropalladium(II) (7.5 g) at room temperature. The mixture was stirred overnight under argon atmosphere at 85° C. The mixture was filtered, and the filtrate was concentrated under reduced pressure. The residue was purified by silica gel column chromatography (NH, followed by SI, ethyl acetate/hexane). To the residue were added ethyl acetate and hexane, and the solid was collected by filtration to give the title compound (20.45 g).

MS: [M+H]$^+$ 365.1.

E) 6-methyl-4-[2-(2,2,2-trifluoroethoxy)phenyl]-2,3-dihydro-1H-pyrrolo[3,4-c]pyridin-1-one To a solution of ethyl 3-cyano-6-methyl-2-[2-(2,2,2-trifluoroethoxy)phenyl]pyridine-4-carboxylate (20.45 g) in EtOH (300 mL) was added a suspension (50 g) of Raney nickel in water, and the mixture was stirred overnight under normal pressure of hydrogen atmosphere at 60° C. The reaction mixture was cooled to room temperature, and filtered through Celite with hot THF. The filtrate was concentrated, and the obtained solid was washed with ethyl acetate/hexane to give the title compound (15.56 g).

MS: [M+H]$^+$ 323.1.

F) 2-[4-(2-hydroxypropan-2-yl)phenyl]-6-methyl-4-[2-(2,2,2-trifluoroethoxy)phenyl]-2,3-dihydro-1H-pyrrolo[3,4-c]pyridin-1-one To a mixture of 2-(4-bromophenyl)propan-2-ol (7.34 g), 6-methyl-4-[2-(2,2,2-trifluoroethoxy)phenyl]-2,3-dihydro-1H-pyrrolo[3,4-c]pyridin-1-one (8.06 g), sodium tert-butoxide (3.60 g) and toluene (125 mL) was added chloro(2-dicyclohexylphosphino-2',4',6'-triisopropyl-1,1'-biphenyl)[2-(2'-amino-1,1'-biphenyl)]palladium(II) (3.93 g) under argon atmosphere at room temperature. The mixture was stirred under argon atmosphere at 110° C. for 3 hr. To the mixture was added water, and the mixture was extracted twice with ethyl acetate. The combined organic layers were washed with saturated brine, dried over anhydrous sodium sulfate, and concentrated under reduced pressure. The residue was purified by silica gel column chromatography (NH, followed by SI, ethyl acetate/hexane), and the solid was recrystallized from ethyl acetate/hexane to give the title compound (6.02 g).

$^1$H NMR (300 MHz, DMSO-$d_6$) δ 1.43 (6H, s), 2.66 (3H, s), 4.79-4.96 (4H, m), 5.02 (1H, s), 7.17-7.26 (1H, m), 7.31 (1H, d, J=7.9 Hz), 7.47-7.58 (4H, m), 7.64 (1H, s), 7.76-7.85 (2H, m).

Example 325

4-[2-(2,2-difluoroethoxy)phenyl]-2-[4-(2-hydroxypropan-2-yl)phenyl]-6-methyl-2,3-dihydro-1H-pyrrolo[3,4-c]pyridin-1-one

A) ethyl 3-cyano-2-[2-(2,2-difluoroethoxy)phenyl]-6-methylpyridine-4-carboxylate To a mixture of 2-bromophenol (12.94 mL), potassium carbonate (30.9 g) and DMF (150 mL) was added trifluoromethanesulfonic acid 2,2-difluoroethyl (30 g) under ice-cooling. The mixture was stirred at room temperature for 3 days, and to the mixture was added water. The mixture was extracted with ethyl acetate, and the organic layer was washed with water and saturated brine, dried over anhydrous sodium sulfate, and concentrated under reduced pressure. The residue was purified by silica gel column chromatography (ethyl acetate/hexane) to give 1-bromo-2-(2,2-difluoroethoxy)benzene as a crude product. To a mixture of the obtained crude product, 4,4,4',4',5,5,5',5'-octamethyl-2,2'-bi-1,3,2-dioxaborolane (34.7 g), potassium acetate (16.78 g) and CPME (250 mL) was added [1,1-bis(diphenylphosphino)ferrocene]dichloropalladium(II) (7.5 g) under argon atmosphere at room temperature. The mixture was stirred overnight under argon atmosphere at 100° C. The mixture was cooled to room temperature, and filtered through Celite. To the filtrate was added water, and the mixture was extracted with ethyl acetate. The organic layer was washed with water and saturated brine, dried over anhydrous sodium sulfate, concentrated under reduced pressure to give 2-[2-(2,2-difluoroethoxy)phenyl]-4,4,5,5-tetramethyl-1,3,2-dioxaborolane as a crude product. To a mixture of the obtained crude product, ethyl 2-chloro-3-cyano-6-methylisonicotinate (25 g), potassium carbonate (38.5 g), DME (250 mL) and water (6.25 mL) was added [1,1-bis(diphenylphosphino)ferrocene]dichloropalladium(II) (7.5 g) at room temperature. The mixture was stirred overnight at 85° C. The mixture was filtered, and the filtrate was concentrated under reduced pressure. The residue was purified by silica gel column chromatography (NH, ethyl acetate/hexane). To the residue were added ethyl acetate and hexane, and the solid was collected by filtration to give the title compound (15.02 g).
MS: [M+H]$^+$ 347.1.

B) 4-[2-(2,2-difluoroethoxy)phenyl]-6-methyl-2,3-dihydro-1H-pyrrolo[3,4-c]pyridin-1-one To a solution of ethyl 3-cyano-2-[2-(2,2-difluoroethoxy)phenyl]-6-methylpyridine-4-carboxylate (21.0 g) in EtOH (300 mL) was added a suspension (50 g) of Raney nickel in water, and the mixture was stirred overnight under normal pressure of hydrogen atmosphere at 60° C. The reaction mixture was cooled to room temperature, and filtered through Celite with hot THF. The filtrate was concentrated under reduced pressure, and the solid was washed with ethyl acetate/hexane to give the title compound (14.44 g).
MS: [M+H]$^+$ 305.0.

C) 4-[2-(2,2-difluoroethoxy)phenyl]-2-[4-(2-hydroxypropan-2-yl)phenyl]-6-methyl-2,3-dihydro-1H-pyrrolo[3,4-c]pyridin-1-one To a mixture of 4-[2-(2,2-difluoroethoxy)phenyl]-6-methyl-2,3-dihydro-1H-pyrrolo[3,4-c]pyridin-1-one (7.61 g), 2-(4-bromophenyl)propan-2-ol (7.34 g), sodium tert-butoxide (3.60 g) and toluene (125 mL) was added chloro(2-dicyclohexylphosphino-2',4',6'-triisopropyl-1,1'-biphenyl) [2-(2'-amino-1,1'-biphenyl)]palladium(II) (3.93 g) under argon atmosphere at room temperature. The mixture was stirred under argon atmosphere at 110° C. for 3 hr. To the mixture was added water, and the mixture was extracted twice with ethyl acetate. The combined organic layers were washed with saturated brine, dried over anhydrous sodium sulfate, and concentrated under reduced pressure. The residue was purified by silica gel column chromatography (NH, followed by SI, ethyl acetate/hexane), and the solid was recrystallized from ethyl acetate/hexane to give the title compound (7.37 g).
$^1$H NMR (300 MHz, DMSO-d$_6$) δ 1.43 (6H, s), 2.66 (3H, s), 4.42 (2H, td, J=15.0, 3.2 Hz), 4.93 (2H, s), 5.02 (1H, s), 6.06-6.48 (1H, m), 7.13-7.21 (1H, m), 7.27 (1H, d, J=7.9 Hz), 7.46-7.55 (4H, m), 7.63 (1H, s), 7.77-7.84 (2H, m).

Example 327

6-(difluoromethyl)-2-[4-(2-hydroxypropan-2-yl)phenyl]-4-[2-(2,2,2-trifluoroethoxy)phenyl]-2,3-dihydro-1H-pyrrolo[3,4-c]pyridin-1-one

A) 3-cyano-4-(ethoxycarbonyl)-6-methyl-2-[2-(2,2,2-trifluoroethoxy)phenyl]pyridine 1-oxide To a solution of ethyl 3-cyano-6-methyl-2-[2-(2,2,2-trifluoroethoxy)phenyl]pyridine-4-carboxylate (2.55 g) in ethyl acetate (30 mL) was added metachloroperbenzoic acid (3.45 g), and the mixture was stirred at room temperature for 2 days. To the reaction mixture was added saturated aqueous sodium thiosulfate solution under ice-cooling, and the mixture was extracted with ethyl acetate. The organic layer was washed with saturated aqueous sodium hydrogencarbonate solution and saturated brine, dried over anhydrous sodium sulfate, and concentrated under reduced pressure. The residue was purified by silica gel column chromatography (ethyl acetate/hexane) to give the title compound (1.77 g).
MS: [M+H]$^+$ 381.1.

B) ethyl 6-[(acetyloxy)methyl]-3-cyano-2-[2-(2,2,2-trifluoroethoxy)phenyl]pyridine-4-carboxylate A mixture of 3-cyano-4-(ethoxycarbonyl)-6-methyl-2-[2-so (2,2,2-trifluoroethoxy)phenyl]pyridine 1-oxide (3.01 g) and acetic anhydride (40 mL) was stirred overnight at 100° C. The reaction mixture was concentrated under reduced pressure, and the residue was purified by silica gel column chromatography (ethyl acetate/hexane) to give the title compound (2.030 g).
MS: [M+H]$^+$ 423.1.

C) methyl 3-cyano-6-(hydroxymethyl)-2-[2-(2,2,2-trifluoroethoxy)phenyl]pyridine-4-carboxylate To a solution of ethyl 6-[(acetyloxy)methyl]-3-cyano-2-[2-(2,2,2-trifluoroethoxy)phenyl]pyridine-4-carboxylate (2.03 g) in MeOH (20 mL) was added 4M aqueous lithium hydroxide solution (4 mL), and the mixture was stirred at room temperature for 2 hr. The reaction mixture was acidified with 1M hydrochloric acid, and concentrated under reduced pressure. To the residue were added DMF (20 mL), potassium carbonate (3.32 g) and methyl iodide (1.202 mL), and the mixture was stirred at room temperature for 2 hr. To the reaction mixture was added water, and the mixture was extracted with ethyl acetate. The organic layer was washed with saturated brine, dried over anhydrous sodium sulfate, and concentrated under reduced pressure. The residue was purified by silica gel column chromatography (ethyl acetate/hexane), and the obtained solid was washed with diethyl ether/hexane to give the title compound (782 mg).

MS: [M+H]$^+$ 367.1.

D) methyl 3-cyano-6-formyl-2-[2-(2,2,2-trifluoroethoxy)phenyl]pyridine-4-carboxylate To a solution of methyl 3-cyano-6-(hydroxymethyl)-2-[2-(2,2,2-trifluoroethoxy)phenyl]pyridine-4-carboxylate (400 mg) in acetonitrile (4 mL) was added Dess-Martin periodinane (556 mg) under ice-cooling, and the mixture was stirred at room temperature for 2 hr. To the reaction mixture was added saturated aqueous sodium thiosulfate solution under ice-cooling, and the mixture was extracted with ethyl acetate. The organic layer was washed with aqueous potassium carbonate solution and saturated brine, dried over anhydrous sodium sulfate, and concentrated under reduced pressure. The residue was purified by silica gel column chromatography (ethyl acetate/hexane) to give the title compound (393 mg).

MS: [M+H]$^+$ 365.1.

E) methyl 3-cyano-6-(difluoromethyl)-2-[2-(2,2,2-trifluoroethoxy)phenyl]pyridine-4-carboxylate To a solution of methyl 3-cyano-6-formyl-2-[2-(2,2,2-trifluoroethoxy)phenyl]pyridine-4-carboxylate (539 mg) in toluene (5 mL) was added bis(2-methoxyethyl)aminosulfur trifluoride (0.60 mL) under ice-cooling, and the mixture was stirred at room temperature for 3 hr. The reaction mixture was poured into saturated aqueous sodium hydrogencarbonate solution, and extracted with ethyl acetate. The organic layer was washed with saturated brine, dried over anhydrous sodium sulfate, and concentrated under reduced pressure. The residue was purified by silica gel column chromatography (ethyl acetate/hexane) to give the title compound (518 mg).

MS: [M+H]$^+$ 387.1.

F) 6-(difluoromethyl)-4-[2-(2,2,2-trifluoroethoxy)phenyl]-2,3-dihydro-1H-pyrrolo[3,4-c]pyridin-1-one To a solution of methyl 3-cyano-6-(difluoromethyl)-2-[2-(2,2,2-trifluoroethoxy)phenyl]pyridine-4-carboxylate (471 mg) in EtOH (20 mL) was added a suspension (2 mL) of Raney nickel in water, and the mixture was stirred overnight under normal pressure of hydrogen atmosphere at 60° C. The insoluble substance was removed by filtration, and the filtrate was concentrated under reduced pressure. The residue was washed with ethyl acetate/hexane to give the title compound (357 mg).

MS: [M+H]$^+$ 359.1.

G) 6-(difluoromethyl)-2-[4-(2-hydroxypropan-2-yl)phenyl]-4-[2-(2,2,2-trifluoroethoxy)phenyl]-2,3-dihydro-1H-pyrrolo[3,4-c]pyridin-1-one To a mixture of 6-(difluoromethyl)-4-[2-(2,2,2-trifluoroethoxy)phenyl]-2,3-dihydro-1H-pyrrolo[3,4-c]pyridin-1-one (100 mg), 2-(4-bromophenyl)propan-2-ol (90 mg), sodium tert-butoxide (40.2 mg) and toluene (2.0 mL) was added chloro(2-dicyclohexylphosphino-2',4',6'-triisopropyl-1,1'-biphenyl) [2-(2'-amino-1,1'-biphenyl)]palladium(II) (32.9 mg), and the mixture was stirred under argon atmosphere at 110° C. for 3 hr. The reaction mixture was purified by silica gel column chromatography (SI and NH, ethyl acetate/hexane), and the solid was recrystallized from ethyl acetate/hexane to give the title compound (17.00 mg).

$^1$H NMR (300 MHz, DMSO-d$_6$) δ 1.35-1.49 (6H, m), 4.87 (2H, q, J=9.0 Hz), 5.04 (3H, d, J=6.0 Hz), 6.94-7.41 (3H, m), 7.47-7.65 (4H, m), 7.77-7.88 (2H, m), 8.01 (1H, s).

Example 328

6-(difluoromethyl)-2-[6-(2-hydroxypropan-2-yl)pyridin-3-yl]-4-[2-(2,2,2-trifluoroethoxy)phenyl]-2,3-dihydro-1H-pyrrolo[3,4-c]pyridin-1-one

A) 5-bromo-2-(2-{[tert-butyl(dimethyl)silyl]oxy}propan-2-yl)pyridine

To a mixture of 2-(5-bromopyridin-2-yl)propan-2-ol (1 g), TEA (2.58 mL) and THF (20 mL) was added tert-butyldimethylsilyl trifluoromethanesulfonate (2.126 mL) under ice-cooling, and the mixture was stirred at room temperature for 3 hr. To the reaction mixture was added water, and the mixture was extracted with ethyl acetate. The organic layer was washed with saturated brine, dried over anhydrous sodium sulfate, and concentrated under reduced pressure. The residue was purified by silica gel column chromatography (ethyl acetate/hexane) to give the title compound (1.280 g).

$^1$H NMR (300 MHz, DMSO-d$_6$) δ 0.07-0.11 (6H, m), 0.89-0.97 (9H, m), 1.53 (6H, s), 7.52-7.64 (1H, m), 7.99-8.09 (1H, m), 8.61 (1H, dd, J=2.6, 0.8 Hz).

B) 2-[6-(2-{[tert-butyl(dimethyl)silyl]oxy}propan-2-yl)pyridin-3-yl]-6-(difluoromethyl)-4-[2-(2,2,2-trifluoroethoxy)phenyl]-2,3-dihydro-1H-pyrrolo[3,4-c]pyridin-1-one To a mixture of 6-(difluoromethyl)-4-[2-(2,2,2-trifluoroethoxy)phenyl]-2,3-dihydro-1H-pyrrolo[3,4-c]pyridin-1-one (150 mg), 5-bromo-2-(2-{[tert-butyl(dimethyl)silyl]oxy}propan-2-yl)pyridine (207 mg), sodium tert-butoxide (60.4 mg) and toluene (2.0 mL) was added chloro(2-dicyclohexylphosphino-2',4',6'-triisopropyl-1,1'-biphenyl) [2-(2'-amino-1,1'-biphenyl)]palladium(II) (49.4 mg), and the mixture was stirred under argon atmosphere at 110° C. for 3 hr. The reaction mixture was purified by silica gel column chromatography (NH, ethyl acetate/hexane) to give the title compound (123 mg).

MS: [M+H]$^+$ 608.3.

C) 6-(difluoromethyl)-2-[6-(2-hydroxypropan-2-yl)pyridin-3-yl]-4-[2-(2,2,2-trifluoroethoxy)phenyl]-2,3-dihydro-1H-pyrrolo[3,4-c]pyridin-1-one To a solution of 2-[6-(2-{[tert-butyl(dimethyl)silyl]oxy}propan-2-yl)pyridin-3-yl]-6-(difluoromethyl)-4-[2-(2,2,2-trifluoroethoxy)phenyl]-2,3-dihydro-1H-pyrrolo[3,4-c]pyridin-1-one (98 mg) in THF (3 mL) was added 2M hydrochloric acid (2 mL), and the mixture was stirred at room temperature for 3 days. The reaction mixture was neutralized with 2M aqueous sodium hydroxide solution and saturated aqueous sodium hydrogencarbonate solution, and extracted with ethyl acetate. The organic layer was washed with saturated brine, dried over anhydrous sodium sulfate, and concentrated under reduced pressure. The residue was purified by silica gel column chromatography (NH, ethyl acetate/hexane), and the solid was recrystallized from ethyl acetate/hexane to give the title compound (36.0 mg).

$^1$H NMR (300 MHz, DMSO-d$_6$) δ 1.45 (6H, s), 4.88 (2H, q, J=8.9 Hz), 5.10 (2H, s), 5.24 (1H, s), 6.92-7.42 (3H, m), 7.50-7.65 (2H, m), 7.72 (1H, d, J=8.3 Hz), 8.04 (1H, s), 8.28 (1H, dd, J=8.7, 2.6 Hz), 9.01 (1H, d, J=2.3 Hz).

Example 329 rac-2-{4-[cyclopropyl(hydroxy)methyl]phenyl}-4-[2-(2,2,2-trifluoroethoxy)phenyl]-2,3-dihydro-1H-pyrrolo[3,4-c]pyridin-1-one A) 2-[4-(cyclopropanecarbonyl)phenyl]-4-[2-(2,2,2-trifluoroethoxy)phenyl]-2,3-dihydro-1H-pyrrolo[3,4-c]pyridin-1-one To a mixture of 4-[2-(2,2,2-trifluoroethoxy)phenyl]-2,3-dihydro-1H-pyrrolo[3,4-c]pyridin-1-one (200 mg), (4-bromophenyl)(cyclopropyl)methanone (219 mg), sodium tert-butoxide (94 mg) and toluene (2.0 mL) was added chloro(2-dicyclohexylphosphino-2',4',6'-triisopropyl-1,1'-biphenyl) [2-(2'-amino-1,1'-biphenyl)]palladium(II) (77 mg), and the mixture was stirred under argon atmosphere at 110° C. for 5 hr. The reaction mixture was purified by silica gel column chromatography (NH, ethyl acetate/hexane), and the solid was recrystallized from ethyl acetate/hexane to give the title compound (124 mg).

MS: [M+H]$^+$ 453.1.

B) rac-2-{4-[cyclopropyl(hydroxy)methyl]phenyl}-4-[2-(2,2,2-trifluoroethoxy)phenyl]-2,3-dihydro-1H-pyrrolo[3,4-c]pyridin-1-one To a mixture of 2-[4-(cyclopropanecarbonyl)phenyl]-4-[2-(2,2,2-trifluoroethoxy)phenyl]-2,3-dihydro-1H-pyrrolo[3,4-c]pyridin-1-one (124 mg) and MeOH (5.0 mL) was added sodium borohydride (20.74 mg) under ice-cooling, and the mixture was stirred at room temperature for 3 hr. To the reaction mixture was added water, and the mixture was extracted with ethyl acetate. The organic layer was separated, washed with saturated brine, dried over anhydrous sodium sulfate, and concentrated under reduced pressure. The residue was purified by silica gel column chromatography (ethyl acetate/hexane), and the solid was recrystallized from ethyl acetate/hexane to give the title compound (70.0 mg).

$^1$H NMR (300 MHz, DMSO-d$_6$) δ 0.25-0.52 (4H, m), 0.95-1.10 (1H, m), 3.97 (1H, dd, J=7.3, 4.0 Hz), 4.85 (2H, q, J=9.0 Hz), 4.98 (2H, s), 5.18 (1H, d, J=4.1 Hz), 7.19-7.28 (1H, m), 7.33 (1H, d, J=7.9 Hz), 7.43 (2H, d, J=8.3 Hz), 7.49-7.62 (2H, m), 7.75-7.89 (3H, m), 8.88 (1H, d, J=4.9 Hz).

Example 330

2-[4-(2-hydroxypropan-2-yl)phenyl]-6-(methoxymethyl)-4-[2-(2,2,2-trifluoroethoxy)phenyl]-2,3-dihydro-1H-pyrrolo[3,4-c]pyridin-1-one A) 6-(methoxymethyl)-4-[2-(2,2,2-trifluoroethoxy)phenyl]-2,3-dihydro-1H-pyrrolo[3,4-c]pyridin-1-one To a mixture of methyl 3-cyano-6-(hydroxymethyl)-2-[2-(2,2,2-trifluoroethoxy)phenyl]pyridine-4-carboxylate (153 mg), toluene (1 mL) and acetone (1.000 mL) were added methyl iodide (0.261 mL) and silver(I) oxide (290 mg), and the mixture was stirred at 50° C. for 6 hr. The reaction mixture was filtered, and the filtrate was concentrated under reduced pressure. The residue was purified by silica gel column chromatography (ethyl acetate/hexane) to give methyl 3-cyano-6-(methoxymethyl)-2-[2-(2,2,2-trifluoroethoxy)phenyl]pyridine-4-carboxylate (161 mg) as a crude product. To a solution of the obtained crude product (161 mg) in EtOH (10 mL) was added a suspension (1 mL) of Raney nickel in water, and the mixture was stirred overnight under normal pressure of hydrogen atmosphere at 60° C. The insoluble substance was removed by filtration, and the filtrate was concentrated under reduced pressure to give the title compound (151 mg).

MS: [M+H]$^+$ 353.1.

B) 2-[4-(2-hydroxypropan-2-yl)phenyl]-6-(methoxymethyl)-4-[2-(2,2,2-trifluoroethoxy)phenyl]-2,3-dihydro-1H-pyrrolo[3,4-c]pyridin-1-one To a mixture of 6-(methoxymethyl)-4-[2-(2,2,2-trifluoroethoxy)phenyl]-2,3-dihydro-1H-pyrrolo[3,4-c]pyridin-1-one (151 mg), 2-(4-bromophenyl)propan-2-ol (138 mg), sodium tert-butoxide (62 mg) and toluene (3 mL) was added chloro(2-dicyclohexylphosphino-2',4',6'-triisopropyl-1,1'-biphenyl) [2-(2'-amino-1,1'-biphenyl)]palladium(II) (51 mg), and the mixture was stirred under argon atmosphere at 110° C. for 3 hr. The reaction mixture was purified by silica gel column chromatography (NH, ethyl acetate/hexane), and the solid was recrystallized from ethyl acetate/hexane to give the title compound (106 mg).

$^1$H NMR (300 MHz, DMSO-d$_6$) δ 1.43 (6H, s), 3.44 (3H, s), 4.67 (2H, s), 4.85 (2H, q, J=9.0 Hz), 4.97 (2H, s), 5.02 (1H, s), 7.18-7.27 (1H, m), 7.32 (1H, d, J=8.3 Hz), 7.45-7.61 (4H, m), 7.73 (1H, s), 7.77-7.86 (2H, m).

Example 336

3-bromo-6-[4-(2-hydroxypropan-2-yl)phenyl]-1-[2-(2,2,2-trifluoroethoxy)phenyl]-6,7-dihydro-1H-pyrrolo[3,4-b]pyridine-2,5-dione A) methyl 5-bromo-2-methyl-6-oxo-1-[2-(2,2,2-trifluoroethoxy)phenyl]-1,6-dihydropyridine-3-carboxylate A mixture of methyl 2-methyl-6-oxo-1-[2-(2,2,2-trifluoroethoxy)phenyl]-1,6-dihydropyridine-3-carboxylate (670 mg), NBS (367 mg) and acetonitrile (7 mL) was stirred at 60° C. for 1.5 hr. To the reaction mixture was added water, and the mixture was extracted with ethyl acetate. The organic layer was washed with water and saturated brine, dried over anhydrous magnesium sulfate, and concentrated under reduced pressure. The residue was purified by silica gel column chromatography (ethyl acetate/hexane) to give the title compound (707 mg).

MS: [M+H]$^+$ 420.0.

B) methyl 5-bromo-2-(bromomethyl)-6-oxo-1-[2-(2,2,2-trifluoroethoxy)phenyl]-1,6-dihydropyridine-3-carboxylate To a mixture of methyl 5-bromo-2-methyl-6-oxo-1-[2-(2,2,2-trifluoroethoxy)phenyl]-1,6-dihydropyridine-3-carboxylate (44 mg) and benzotrifluoride (1 mL) were added NBS (19.57 mg) and AIBN (1.720 mg) at room temperature, and the mixture was stirred at 80° C. for 2 hr. To the reaction mixture was added saturated aqueous sodium thiosulfate solution, and the mixture was extracted with ethyl acetate. The organic layer was washed with water and saturated brine, dried over anhydrous magnesium sulfate, and concentrated under reduced pressure. The residue was purified by silica gel column chromatography (ethyl acetate/hexane) to give the title compound (44.6 mg).

MS: [M+H]+ 497.9.

C) 3-bromo-6-[4-(2-hydroxypropan-2-yl)phenyl]-1-[2-(2,2,2-trifluoroethoxy)phenyl]-6,7-dihydro-1H-pyrrolo[3,4-b]pyridine-2,5-dione A mixture of methyl 5-bromo-2-(bromomethyl)-6-oxo-1-[2-(2,2,2-trifluoroethoxy)phenyl]-1,6-dihydropyridine-3-carboxylate (35 mg), 2-(4-aminophenyl)propan-2-ol (12.72 mg), DIPEA (0.024 mL) and MeOH (3 mL) was stirred at 50° C. for 20 hr. To the reaction mixture was added water, and the mixture was extracted with ethyl acetate. The organic layer was washed with water and saturated brine, dried over anhydrous magnesium sulfate, and concentrated under reduced pressure. The residue was purified by silica gel column chromatography (ethyl acetate/hexane) to give the title compound (11.6 mg).

$^1$H NMR (300 MHz, DMSO-$d_6$) δ 1.37-1.40 (6H, m), 4.33-4.71 (2H, m), 4.79-4.90 (2H, m), 4.96 (1H, s), 7.28 (1H, td, J=7.7, 1.1 Hz), 7.40-7.48 (3H, m), 7.54-7.67 (4H, m), 8.29 (1H, s).

Example 337

6-[4-(2-hydroxypropan-2-yl)phenyl]-3-methyl-1-[2-(2,2,2-trifluoroethoxy)phenyl]-6,7-dihydro-1H-pyrrolo[3,4-b]pyridine-2,5-dione To a mixture of 3-bromo-6-[4-(2-hydroxypropan-2-yl)phenyl]-1-[2-(2,2,2-trifluoroethoxy)phenyl]-6,7-dihydro-1H-pyrrolo[3,4-b]pyridine-2,5-dione (20 mg) and toluene (1 mL) were added 1M dimethylzinc-heptane solution (0.080 mL) and [1,1'-bis(diphenylphosphino)ferrocene]palladium(II) dichloride dichloromethane adduct (3.04 mg) at room temperature, and the mixture was stirred at 80° C. for 4 hr. To the reaction mixture were added 1M dimethylzinc-heptane solution (0.080 mL) and [1,1'-bis(diphenylphosphino)ferrocene]palladium(II) dichloride dichloromethane adduct (3.04 mg) at room temperature, and the mixture was stirred at 80° C. for 1 day. The insoluble substance was removed by filtration, the filtrate was concentrated under reduced pressure, and the residue was purified by silica gel column chromatography (ethyl acetate/hexane) to give the title compound (5.7 mg).

$^1$H NMR (300 MHz, DMSO-$d_6$) δ 1.38-1.40 (6H, m), 2.10 (3H, s), 4.35 (1H, d, J=18.1 Hz), 4.62 (1H, d, J=18.1 Hz), 4.74-4.88 (2H, m), 4.94 (1H, s), 7.23-7.30 (1H, m), 7.38-7.47 (4H, m), 7.52 (1H, dd, J=7.9, 1.5 Hz), 7.55-7.61 (2H, m), 7.71 (1H, d, J=1.1 Hz).

Example 341 rac-6-(1-hydroxyethyl)-4-[2-(2,2,2-trifluoroethoxy)phenyl]-2-[4-(2,2,2-trifluoroethoxy)phenyl]-2,3-dihydro-1H-pyrrolo[3,4-c]pyridin-1-one A) 1-oxo-4-[2-(2,2,2-trifluoroethoxy)phenyl]-2,3-dihydro-1H-pyrrolo[3,4-c]pyridine-6-carbaldehyde To a solution of methyl 3-cyano-6-(hydroxymethyl)-2-[2-(2,2,2-trifluoroethoxy)phenyl]pyridine-4-carboxylate (775.7 mg) in EtOH (30 mL) was added a suspension (5 mL) of Raney nickel in water, and the mixture was stirred overnight under normal pressure of hydrogen atmosphere at 60° C. The catalyst was removed by filtration, and the filtrate was concentrated to give 6-(hydroxymethyl)-4-[2-(2,2,2-trifluoroethoxy)phenyl]-2,3-dihydro-1H-pyrrolo[3,4-c]pyridin-1-one (863 mg) as a crude product. To a solution of the obtained crude product in acetonitrile (15 mL) was added Dess-Martin periodinane (1.47 g), and the mixture was stirred at room temperature for 30 min. To the reaction mixture were added aqueous sodium thiosulfate solution and aqueous sodium hydrogencarbonate solution, and the mixture was extracted with ethyl acetate. The organic layer was separated, washed with saturated brine, dried over anhydrous magnesium sulfate, and concentrated under reduced pressure. The residue was purified by silica gel column chromatography (ethyl acetate/hexane) to give the title compound (365.4 mg).

MS: [M+H]+ 337.1.

B) rac-6-(1-hydroxyethyl)-4-[2-(2,2,2-trifluoroethoxy)phenyl]-2,3-dihydro-1H-pyrrolo[3,4-c]pyridin-1-one To a solution of 1-oxo-4-[2-(2,2,2-trifluoroethoxy)phenyl]-2,3-dihydro-1H-pyrrolo[3,4-c]pyridine-6-carbaldehyde (101.1 mg) in THF (1.5 mL) was added 3M methylmagnesium bromide-2-methyltetrahydrofuran solution (0.5 mL) at 0° C., and the mixture was stirred at room temperature for 4 hr. To the reaction mixture was added aqueous ammonium chloride solution, and the mixture was extracted with ethyl acetate. The organic layer was separated, dried over anhydrous magnesium sulfate, and concentrated under reduced pressure. The residue was purified by silica gel column chromatography (ethyl acetate/hexane and MeOH/ethyl acetate) to give the title compound (52.2 mg).

MS: [M+H]+ 353.1.

C) rac-6-(1-hydroxyethyl)-4-[2-(2,2,2-trifluoroethoxy)phenyl]-2-[4-(2,2,2-trifluoroethoxy)phenyl]-2,3-dihydro-1H-pyrrolo[3,4-c]pyridin-1-one To a mixture of rac-6-(1-hydroxyethyl)-4-[2-(2,2,2-trifluoroethoxy)phenyl]-2,3-dihydro-1H-pyrrolo[3,4-c]pyridin-1-one (51 mg), 1-bromo-4-(2,2,2-trifluoroethoxy)benzene (49.4 mg), sodium tert-butoxide (22.6 mg) and toluene (2 mL) was added chloro(2-dicyclohexylphosphino-2',4',6'-triisopropyl-1,1'-biphenyl) [2-(2'-amino-1,1'-biphenyl)]palladium(II) (12.0 mg), and the mixture was stirred under argon atmosphere at 110° C. for 1 hr. The reaction mixture was purified by silica gel column chromatography (ethyl acetate/hexane) to give the title compound (3.7 mg).

$^1$H NMR (300 MHz, DMSO-$d_6$) δ 1.44 (3H, d, J=6.8 Hz), 4.70-5.02 (7H, m), 5.57 (1H, d, J=4.9 Hz), 7.09-7.18 (2H, m), 7.23 (1H, t, J=7.5 Hz), 7.31 (1H, d, J=8.7 Hz), 7.49-7.59 (2H, m), 7.78-7.92 (3H, m).

Example 343

6-(2-hydroxypropan-2-yl)-4-[2-(2,2,2-trifluoroethoxy)phenyl]-2-[4-(2,2,2-trifluoroethoxy)phenyl]-2,3-dihydro-1H-pyrrolo[3,4-c]pyridin-1-one A) 1-oxo-4-[2-(2,2,2-trifluoroethoxy)phenyl]-2,3-dihydro-1H-pyrrolo[3,4-c]pyridine-6-carboxylic acid To a solution of 1-oxo-4-[2-(2,2,2-trifluoroethoxy)phenyl]-2,3-dihydro-1H-pyrrolo[3,4-c]pyridine-6-carbaldehyde (262.6 mg) in DMSO (3 mL) was added a mixture of sodium dihydrogen phosphate (189.6 mg) and water (0.6 mL) at room temperature. A mixture of sodium chlorite (142.5 mg) and water (0.6 mL) was added thereto at 0° C., and the mixture was stirred overnight at room temperature. To the reaction mixture was added water, and the precipitate was collected by filtration, and washed with water to give the title compound (230.7 mg).
MS: [M+H]$^+$ 353.0.

B) methyl 1-oxo-4-[2-(2,2,2-trifluoroethoxy)phenyl]-2,3-dihydro-1H-pyrrolo[3,4-c]pyridine-6-carboxylate To a solution of 1-oxo-4-[2-(2,2,2-trifluoroethoxy)phenyl]-2,3-dihydro-1H-pyrrolo[3,4-c]pyridine-6-carboxylic acid (230 mg) in toluene (3 mL) was added 2M (diazomethyl) (trimethyl)silane-diethyl ether solution (0.5 mL) at 0° C., and the mixture was stirred at 0° C. for 30 min. To the reaction mixture was added AcOH (0.04 mL) at 0° C., and the mixture was stirred at room temperature for 1 hr. The reaction mixture was concentrated under reduced pressure, and the precipitate was collected by filtration, and washed with ethyl acetate/IPE to give the title compound (179.2 mg).
MS: [M+H]$^+$ 367.1.

C) 6-(2-hydroxypropan-2-yl)-4-[2-(2,2,2-trifluoroethoxy)phenyl]-2,3-dihydro-1H-pyrrolo[3,4-c]pyridin-1-one To a mixture of methyl 1-oxo-4-[2-(2,2,2-trifluoroethoxy)phenyl]-2,3-dihydro-1H-pyrrolo[3,4-c]pyridine-6-carboxylate (89.1 mg) and THF (2 mL) was added dropwise 3M methylmagnesium bromide-2-methyltetrahydrofuran solution (0.5 mL) at 0° C., and the mixture was stirred at room temperature for 1 hr. 3M methylmagnesium bromide-2-methyltetrahydrofuran solution (0.1 mL) was added dropwise thereto at 0° C., and the mixture was stirred at room temperature for 30 min. To the reaction mixture was added saturated aqueous ammonium chloride solution, and the mixture was extracted with ethyl acetate. The organic layer was separated, dried over anhydrous magnesium sulfate, and concentrated under reduced pressure. The residue was purified by silica gel column chromatography (ethyl acetate/hexane) to give the title compound (80.4 mg).
$^1$H NMR (300 MHz, DMSO-d$_6$) δ 1.49 (6H, s), 4.30 (2H, s), 4.79 (2H, q, J=8.8 Hz), 5.36 (1H, s), 7.15-7.24 (1H, m), 7.28 (1H, d, J=8.3 Hz), 7.44-7.56 (2H, m), 7.91 (1H, s), 8.89 (1H, s).

D) 6-(2-hydroxypropan-2-yl)-4-[2-(2,2,2-trifluoroethoxy)phenyl]-2-[4-(2,2,2-trifluoroethoxy)phenyl]-2,3-dihydro-1H-pyrrolo[3,4-c]pyridin-1-one To a mixture of 6-(2-hydroxypropan-2-yl)-4-[2-(2,2,2-trifluoroethoxy)phenyl]-2,3-dihydro-1H-pyrrolo[3,4-c]pyridin-1-one (79 mg), sodium tert-butoxide (31.8 mg) and toluene (2 mL) was added chloro(2-dicyclohexylphosphino-2',4',6'-triisopropyl-1,1'-biphenyl) [2-(2'-amino-1,1'-biphenyl)]palladium(II) (19.87 mg), and the mixture was stirred under argon atmosphere at 110° C. for 5 hr. To the reaction mixture were added chloro(2-dicyclohexylphosphino-2',4',6'-triisopropyl-1,1'-biphenyl) [2-(2'-amino-1,1'-biphenyl)]palladium(II) (22.5 mg) and sodium tert-butoxide (37.3 mg), and the mixture was stirred under argon atmosphere at 110° C. for 4 hr. The reaction mixture was purified by silica gel column chromatography (ethyl acetate/hexane), and the solid was washed with ethyl acetate/IPE to give the title compound (53.4 mg).
$^1$H NMR (300 MHz, DMSO-d$_6$) δ 1.51 (6H, s), 4.70-4.91 (4H, m), 4.95 (2H, s), 5.43 (1H, s), 7.09-7.18 (2H, m), 7.19-7.27 (1H, m), 7.31 (1H, d, J=8.3 Hz), 7.48-7.59 (2H, m), 7.80-7.90 (2H, m), 7.99 (1H, s).

Example 346

2-[4-(1-hydroxycyclobutyl)phenyl]-4-[4-(2-hydroxypropan-2-yl)-2-(2,2,2-trifluoroethoxy)phenyl]-6-methyl-2,3-dihydro-1H-pyrrolo[3,4-c]pyridin-1-one A) 2-[4-bromo-3-(2,2,2-trifluoroethoxy)phenyl]propan-2-ol To a mixture of methyl 4-bromo-3-(2,2,2-trifluoroethoxy)benzoate (537.3 mg) and THF (10 mL) was added 3M methyl bromide-2-methyltetrahydrofuran solution (2.86 mL) at 0° C. The mixture was stirred under nitrogen atmosphere at room temperature for 2 hr. To the mixture was added 1M hydrochloric acid at 0° C., and the mixture was extracted with ethyl acetate. The organic layer was separated, washed with water and saturated brine, dried over anhydrous sodium sulfate, and concentrated under reduced pressure. The residue was purified by silica gel column chromatography (ethyl acetate/hexane) to give the title compound (516.4 mg).
$^1$H NMR (300 MHz, DMSO-d$_6$) δ 1.42 (6H, s), 4.84 (2H, q, J=8.9 Hz), 5.12 (1H, s), 7.09 (1H, dd, J=8.3, 1.9 Hz), 7.27 (1H, d, J=2.3 Hz), 7.52 (1H, d, J=8.3 Hz).

B) 4-[4-(2-hydroxypropan-2-yl)-2-(2,2,2-trifluoroethoxy)phenyl]-6-methyl-2,3-dihydro-1H-pyrrolo[3,4-c]pyridin-1-one To a mixture of 2-[4-bromo-3-(2,2,2-trifluoroethoxy)phenyl]propan-2-ol (513.0 mg), 4,4,4',4',5,5,5',5'-octamethyl-2,2'-bi-1,3,2-dioxaborolane (832 mg), potassium acetate (482 mg) and DMF (10 mL) was added [1,1-bis(diphenylphosphino)ferrocene]dichloropalladium(II) (120 mg) at room temperature. The mixture was stirred overnight under nitrogen atmosphere at 80° C. To the mixture was added ethyl acetate, and the insoluble substance was removed by filtration. The filtrate was washed with water and saturated brine, dried over anhydrous sodium sulfate, and concentrated under reduced pressure to give 2-[4-(4,4,5,5-tetramethyl-1,3,2-dioxaborolan-2-yl)-3-(2,2,2-trifluoroethoxy)phenyl] propan-2-ol as a crude product. To a mixture of the obtained crude product, ethyl 2-chloro-3-cyano-6-methylisonicotinate (253.0 mg), sodium carbonate (298 mg), DME (10 mL) and water (0.250 mL) was added [1,1-bis(diphenylphosphino)ferrocene]dichloropalladium(II) (82 mg) at room temperature. The mixture was stirred overnight under nitrogen atmosphere at 85° C. To the mixture was added ethyl acetate at room temperature, and the insoluble substance was removed by filtration. The filtrate was washed with water and saturated brine, dried over anhydrous sodium sulfate, and concentrated under reduced pressure. The residue was purified by silica gel column chromatography (SI and NH, ethyl acetate/hexane) to give ethyl 3-cyano-2-[4-(2-hydroxypropan-2-yl)-2-(2,2,2-trifluoroethoxy)phenyl]-6-methylpyridine-4-carboxylate as a crude product. A mixture of the obtained crude product, a suspension (0.5 mL) of Raney nickel in water, and EtOH (10 mL) was stirred overnight under normal pressure of hydrogen atmosphere at 60° C. To the mixture was added a suspension (0.5 mL) of Raney nickel in water at room temperature. The mixture was stirred under normal pressure of hydrogen atmosphere at 60° C. for 5 hr. The insoluble substance was removed by filtration, and the filtrate was concentrated under reduced pressure. The residue was partitioned between ethyl acetate-saturated aqueous sodium hydrogencarbonate solution, and the organic layer was washed with saturated brine, dried over anhydrous sodium sulfate, and concentrated under reduced pressure. The residue was washed with ethyl acetate/IPE to give the title compound (112.8 mg).

MS: [M+H]$^+$ 381.1.

C) 2-[4-(1-hydroxycyclobutyl)phenyl]-4-[4-(2-hydroxypropan-2-yl)-2-(2,2,2-trifluoroethoxy)phenyl]-6-methyl-2,3-dihydro-1H-pyrrolo[3,4-c]pyridin-1-one To a mixture of 4-[2-(2,2,2-trifluoroethoxy)phenyl]-6-methyl-2,3-dihydro-1H-pyrrolo[3,4-c]pyridin-1-one (35.3 mg), 1-(4-bromophenyl)cyclobutan-1-ol (31.6 mg), sodium tert-butoxide (13.38 mg) and toluene (2 mL) was added chloro(2-dicyclohexylphosphino-2',4',6'-triisopropyl-1,1'-biphenyl) [2-(2'-amino-1,1'-biphenyl)]palladium(II) (7.30 mg) at room temperature. The mixture was stirred under nitrogen atmosphere at 110° C. for 1 hr. To the mixture were added ethyl acetate and water at room temperature, and the mixture was extracted with ethyl acetate. The organic layer so was separated, washed with water and saturated brine, dried over anhydrous sodium sulfate, and concentrated under reduced pressure. The residue was purified by silica gel column chromatography (ethyl acetate/hexane) and preparative HPLC (L-Column 2 ODS, mobile phase: water/acetonitrile (containing 0.1% TFA)). To the obtained fraction was added saturated aqueous sodium hydrogencarbonate solution, and the mixture was extracted with ethyl acetate. The extract was dried over anhydrous sodium sulfate, the solvent was evaporated under reduced pressure, and the residue was washed with ethyl acetate/IPE to give the title compound (15.0 mg).

$^1$H NMR (300 MHz, DMSO-d$_6$) δ 1.51 (6H, s), 1.55-1.74 (1H, m), 1.81-1.99 (1H, m), 2.17-2.33 (2H, m), 2.33-2.45 (2H, m), 2.65 (3H, s), 4.83 (2H, q, J=8.8 Hz), 4.96 (2H, s), 5.16 (1H, s), 5.48 (1H, s), 7.26-7.39 (2H, m), 7.46 (1H, d, J=7.9 Hz), 7.49-7.57 (2H, m), 7.63 (1H, s), 7.82-7.90 (2H, m).

Example 347

2-(4-hydroxyphenyl)-4-[2-(2,2,2-trifluoroethoxy)phenyl]-2,3-dihydro-1H-pyrrolo[3,4-c]pyridin-1-one To a mixture of 4-[2-(2,2,2-trifluoroethoxy)phenyl]-2,3-dihydro-1H-pyrrolo[3,4-c]pyridin-1-one (200 mg), 4-bromophenol (168 mg), sodium tert-butoxide (125 mg) and toluene (5 mL) was added chloro(2-dicyclohexylphosphino-2',4',6'-triisopropyl-1,1'-biphenyl) [2-(2'-amino-1,1'-biphenyl)]palladium(II) (51.0 mg) at room temperature. The mixture was stirred under argon atmosphere at 120° C. for 3 hr. The mixture was poured into water at room temperature, and extracted with ethyl acetate. The organic layer was separated, washed with water and saturated brine, dried over anhydrous magnesium sulfate, and concentrated under reduced pressure. The residue was purified by silica gel column chromatography (ethyl acetate/hexane) to give the title compound (36 mg).

$^1$H NMR (300 MHz, DMSO-d$_6$) δ 4.76-4.92 (4H, m), 6.74-6.85 (2H, m), 7.16-7.36 (2H, m), 7.47-7.67 (4H, m), 7.76 (1H, d, J=4.9 Hz), 8.86 (1H, d, J=4.9 Hz), 9.50 (1H, s).

Example 349

2-(4-{2-[3-(but-3-yn-1-yl)-3H-diaziren-3-yl]ethoxy}phenyl)-4-[2-(2,2,2-trifluoroethoxy)phenyl]-2,3-dihydro-1H-pyrrolo[3,4-c]pyridin-1-one To a mixture of 2-(4-hydroxyphenyl)-4-[2-(2,2,2-trifluoroethoxy)phenyl]-2,3-dihydro-1H-pyrrolo[3,4-c]pyridin-1-one (30 mg) and DMF (1 mL) were added 3-(but-3-yn-1-yl)-3-(2-iodoethyl)-3H-diazirene (27.9 mg) and potassium carbonate (20.71 mg) at room temperature. The mixture was stirred at 60° C. for 5 hr. To the mixture was added 3-(but-3-yn-1-yl)-3-(2-iodoethyl)-3H-diazirene (27.9 mg), and the mixture was stirred at 60° C. for 2 hr. The mixture was poured into water, and extracted with ethyl acetate. The organic layer was separated, washed with water and saturated brine, dried over anhydrous magnesium sulfate, and concentrated under reduced pressure. The residue was purified by silica gel column chromatography (ethyl acetate/hexane), and crystallized from ethyl acetate/hexane, and the solid was washed with IPE to give the title compound (8 mg).

$^1$H NMR (300 MHz, DMF-d$_7$) δ 1.81-1.92 (2H, m), 2.08 (2H, t, J=6.2 Hz), 2.24 (2H, td, J=7.5, 2.6 Hz), 3.03 (1H, t, J=2.6 Hz), 4.04 (2H, t, J=6.0 Hz), 5.04 (2H, q, J=8.7 Hz), 5.14 (2H, s), 7.15-7.21 (2H, m), 7.38-7.47 (1H, m), 7.52 (1H, d, J=8.3 Hz), 7.67-7.80 (2H, m), 7.93-8.03 (3H, m), 9.07 (1H, d, J=4.9 Hz).

Example 351

4-[4-fluoro-2-(2,2,2-trifluoroethoxy)phenyl]-2-[4-(2-hydroxypropan-2-yl)phenyl]-6-methyl-2,3-dihydro-1H-pyrrolo[3,4-c]pyridin-1-one A) ethyl 3-cyano-2-[4-fluoro-2-(2,2,2-trifluoroethoxy)phenyl]-6-methylpyridine-4-carboxylate To a mixture of 1-bromo-4-fluoro-2-(2,2,2-trifluoroethoxy)benzene (3.65 g), 4,4,4',4',5,5,5',5'-octamethyl-2,2'-bi-1,3,2-dioxaborolane (6.79 g), potassium acetate (3.94 g) and DMF (80 mL) was added [1,1-bis(diphenylphosphino)ferrocene]dichloropalladium(II) (0.978 g) at room temperature. The mixture was stirred overnight under nitrogen atmosphere at 80° C. To the mixture was added ethyl acetate, and the insoluble substance was removed by filtration. The filtrate was washed with water and saturated brine, dried over anhydrous sodium sulfate, and concentrated under reduced pressure to give 2-[4-fluoro-2-(2,2,2-trifluoroethoxy)phenyl]-4,4,5,5-tetramethyl-1,3,2-dioxaborolane as a crude product. To a mixture of the obtained crude product, ethyl 2-chloro-3-cyano-6-methylisonicotinate (2.02 g), sodium carbonate (2.39 g), DME (60 mL) and water (1.5 mL) was added [1,1-bis(diphenylphosphino)ferrocene]dichloropalladium(II) (0.658 g) at room temperature. The mixture was stirred overnight under nitrogen atmosphere at 85° C. To the mixture was added ethyl acetate, and the insoluble substance was removed by filtration. The filtrate was washed with water and saturated brine, dried over anhydrous sodium sulfate, and concentrated under reduced pressure. The residue was purified by silica gel column chromatography (ethyl acetate/hexane) to give the title compound (2.76 g).

MS: [M+H]$^+$ 383.1.

B) 4-[4-fluoro-2-(2,2,2-trifluoroethoxy)phenyl]-6-methyl-2,3-dihydro-1H-pyrrolo[3,4-c]pyridin-1-one A mixture of ethyl 3-cyano-2-[4-fluoro-2-(2,2,2-trifluoroethoxy)phenyl]-6-methylpyridine-4-carboxylate (2.76 g), a suspension (2.5 mL) of Raney nickel in water, and EtOH (60 mL) was stirred overnight under normal pressure of hydrogen atmosphere at 60° C. To the mixture was added a suspension (2.5 mL) of Raney nickel in water at room temperature. The mixture was stirred under normal pressure of hydrogen atmosphere at so 60° C. for 6 hr. The insoluble substance was removed by filtration, and the filtrate was concentrated under reduced pressure. The residue was partitioned between ethyl acetate-saturated aqueous sodium hydrogencarbonate solution, and the organic layer was washed with saturated brine, dried over anhydrous sodium sulfate, and concentrated under reduced pressure. The residue was washed with ethyl acetate/IPE to give the title compound (1.13 g).

MS: [M+H]$^+$ 341.1.

C) 4-[4-fluoro-2-(2,2,2-trifluoroethoxy)phenyl]-2-[4-(2-hydroxypropan-2-yl)phenyl]-6-methyl-2,3-dihydro-1H-pyrrolo[3,4-c]pyridin-1-one To a mixture of 4-[4-fluoro-2-(2,2,2-trifluoroethoxy)phenyl]-6-methyl-2,3-dihydro-1H-pyrrolo[3,4-c]pyridin-1-one (50.2 mg), 2-(4-bromophenyl)propan-2-ol (47.6 mg), sodium tert-butoxide (21.4 mg) and toluene (2 mL) was added chloro(2-dicyclohexylphosphino-2',4',6'-triisopropyl-1,1'-biphenyl) [2-(2'-amino-1,1'-biphenyl)]palladium(II) (12.2 mg) at room temperature, and the mixture was stirred under nitrogen atmosphere at 110° C. for 2 hr. To the mixture was added water, and the mixture was extracted with ethyl acetate. The organic layer was separated, washed with water and saturated brine, dried over anhydrous sodium sulfate, and concentrated under reduced pressure. The residue was purified by silica gel column chromatography (ethyl acetate/hexane), and washed with ethyl acetate/IPE to give the title compound (30.6 mg).

$^1$H NMR (300 MHz, DMSO-d$_6$) δ 1.43 (6H, s), 2.65 (3H, s), 4.80-4.96 (4H, m), 5.01 (1H, s), 7.06 (1H, td, J=8.5, 2.3 Hz), 7.29 (1H, dd, J=11.1, 2.4 Hz), 7.44-7.60 (3H, m), 7.65 (1H, s), 7.75-7.86 (2H, m).

Example 353

4-[2-fluoro-6-(2,2,2-trifluoroethoxy)phenyl]-2-[4-(2-hydroxypropan-2-yl)phenyl]-6-methyl-2,3-dihydro-1H-pyrrolo[3,4-c]pyridin-1-one

A) 2-bromo-1-fluoro-3-(2,2,2-trifluoroethoxy)benzene

To a mixture of 2-bromo-3-fluorophenol (1.50 g), cesium carbonate (3.33 g) and DMF (15 mL) was added 2,2,2-trifluoroethyl trifluoromethanesulfonate (2.005 g) at 0° C. The mixture was stirred at room temperature for 66 hr. To the mixture was added water, and the mixture was extracted with ethyl acetate. The organic layer was separated, washed with water and saturated brine, dried over anhydrous sodium sulfate, and concentrated under reduced pressure. The residue was purified by silica gel column chromatography (ethyl acetate/hexane) to give the title compound (2.10 g).

$^1$H NMR (300 MHz, DMSO-d$_6$) δ 4.91 (2H, q, J=8.9 Hz), 7.00-7.18 (2H, m), 7.44 (1H, td, J=8.5, 6.8 Hz).

B) ethyl 3-cyano-2-[2-fluoro-6-(2,2,2-trifluoroethoxy)phenyl]-6-methylpyridine-4-carboxylate To a mixture of 2-bromo-1-fluoro-3-(2,2,2-trifluoroethoxy)benzene (2.10 g), 4,4,4',4',5,5,5',5'-octamethyl-2,2'-bi-1,3,2-dioxaborolane (3.91 g), potassium acetate (2.27 g) and DMF (40 mL) was added [1,1-bis(diphenylphosphino)ferrocene]dichloropalladium(II) (0.563 g) at room temperature. The mixture was stirred overnight under nitrogen atmosphere at 80° C. To the mixture was added ethyl acetate at room temperature, and the insoluble substance was removed by filtration. The filtrate was washed with water and saturated brine, dried over anhydrous sodium sulfate, and concentrated under reduced pressure to give 2-[2-fluoro-6-(2,2,2-trifluoroethoxy)phenyl]-4,4,5,5-tetramethyl-1,3,2-dioxaborolane as a crude product. To a mixture of the obtained crude product, ethyl 2-chloro-3-cyano-6-methylisonicotinate (1.11 g), sodium carbonate (1.30 g), DME (30 mL) and water (0.750 mL) was added [1,1-bis(diphenylphosphino)ferrocene]dichloropalladium(II) (0.362 g), and the mixture was stirred overnight under nitrogen atmosphere at 85° C. To the mixture was added ethyl acetate, and the insoluble substance was removed by filtration. The filtrate was washed with water and saturated brine, dried over anhydrous sodium sulfate, and concentrated under reduced pressure. The residue was purified by silica gel column chromatography (ethyl acetate/hexane), and purified by silica gel column chromatography (NH, ethyl acetate/hexane) to give the title compound (30.9 mg).

MS: [M+H]$^+$ 383.1.

C) 4-[2-fluoro-6-(2,2,2-trifluoroethoxy)phenyl]-6-methyl-2,3-dihydro-1H-pyrrolo[3,4-c]pyridin-1-one A mixture of ethyl 3-cyano-2-[2-fluoro-6-(2,2,2-trifluoroethoxy)phenyl]-6-methylpyridine-4-carboxylate (30.9 mg), a suspension (0.1 mL) of Raney nickel in water, and EtOH (2 mL) was stirred under normal pressure of hydrogen atmosphere at 60° C. for 3 hr. The insoluble substance was removed by filtration, and the filtrate was concentrated under reduced pressure. The residue was partitioned between ethyl acetate-saturated aqueous sodium hydrogencarbonate solution, and the organic layer was washed with saturated brine, dried over anhydrous sodium sulfate, and concentrated under reduced pressure to give the title compound (24.0 mg).

MS: [M+H]$^+$ 341.1.

D) 4-[2-fluoro-6-(2,2,2-trifluoroethoxy)phenyl]-2-[4-(2-hydroxypropan-2-yl)phenyl]-6-methyl-2,3-dihydro-1H-pyrrolo[3,4-c]pyridin-1-one To a mixture of 4-[2-fluoro-6-(2,2,2-trifluoroethoxy)phenyl]-6-methyl-2,3-dihydro-1H-pyrrolo[3,4-c]pyridin-1-one (22.5 mg), 2-(4-bromophenyl)propan-2-ol (21.3 mg), sodium tert-butoxide (10.4 mg) and toluene (2 mL) was added chloro(2-dicyclohexylphosphino-2',4',6'-triisopropyl-1,1'-biphenyl) [2-(2'-amino-1,1'-biphenyl)]palladium(II) (5.20 mg) at room temperature. The mixture was stirred under nitrogen atmosphere at 110° C. for 1 hr. To the mixture was added water, and the mixture was extracted with ethyl acetate. The organic layer was separated, washed with water and saturated brine, dried over anhydrous sodium sulfate, and concentrated under reduced pressure. The residue was purified by silica gel column chromatography (ethyl acetate/hexane), and purified by preparative HPLC (YMC-Actus Triant C18, mobile phase: water/acetonitrile (containing 0.1% TFA)) to give the title compound (16.8 mg).

$^1$H NMR (300 MHz, DMSO-$d_6$) δ 1.42 (6H, s), 2.64 (3H, s), 4.84 (4H, s), 5.01 (1H, s), 7.11 (1H, t, J=8.5 Hz), 7.18 (1H, d, J=8.6 Hz), 7.49 (2H, d, J=8.9 Hz), 7.58 (1H, td, J=8.5, 6.8 Hz), 7.69 (1H, s), 7.79 (2H, d, J=8.9 Hz).

Example 354

4-[2-(2,2-difluoroethoxy)phenyl]-6-(2-hydroxypropan-2-yl)-2-[4-(2,2,2-trifluoroethoxy)phenyl]-2,3-dihydro-1H-pyrrolo[3,4-c]pyridin-1-one A) ethyl 6-[(acetyloxy)methyl]-3-cyano-2-[2-(2,2-difluoroethoxy)phenyl]pyridine-4-carboxylate A mixture of 3-cyano-2-[2-(2,2-difluoroethoxy)phenyl]-4-(ethoxycarbonyl)-6-methylpyridine 1-oxide (5.96 g) and acetic anhydride (60 mL) was stirred at 100° C. for 11 hr, and the reaction solution was concentrated. The residue was purified by silica gel column chromatography (ethyl acetate/hexane) to give the title compound (3.60 g).

MS: [M+H]$^+$ 405.1.

B) ethyl 3-cyano-2-[2-(2,2-difluoroethoxy)phenyl]-6-(hydroxymethyl)pyridine-4-carboxylate To a mixture of ethyl 6-[(acetyloxy)methyl]-3-cyano-2-[2-(2,2-difluoroethoxy)phenyl]pyridine-4-carboxylate (3.6 g) and so EtOH (50 mL) was added potassium carbonate (1.84 g) at 0° C. The mixture was stirred at 0° C. for 30 min, and then at room temperature for 2 hr. The reaction solution was concentrated, and the obtained residue was partitioned between ethyl acetate-saturated aqueous ammonium chloride solution, and the organic layer was washed with saturated brine, dried over anhydrous magnesium sulfate, and concentrated under reduced pressure. The residue was purified by silica gel column chromatography (ethyl acetate/hexane) to give the title compound (2.69 g).

MS: [M+H]$^+$ 363.1.

C) 4-[2-(2,2-difluoroethoxy)phenyl]-6-(hydroxymethyl)-2,3-dihydro-1H-pyrrolo[3,4-c]pyridin-1-one To a mixture of ethyl 3-cyano-2-[2-(2,2-difluoroethoxy)phenyl]-6-(hydroxymethyl)pyridine-4-carboxylate (2.83 g) and EtOH (30 mL) was added a suspension (6 mL) of Raney nickel in water at room temperature, and the mixture was stirred overnight under normal pressure of hydrogen atmosphere at 60° C. The catalyst was removed by filtration, and the filtrate was concentrated under reduced pressure. To the obtained mixture were added EtOH (30 mL) and a suspension (6 mL) of Raney nickel in water at room temperature, and the mixture was stirred overnight under normal pressure of hydrogen atmosphere at 60° C. The catalyst was removed by filtration, the filtrate was concentrated under reduced pressure, and the obtained residue was washed with ethyl acetate/IPE to give the title compound (1.82 g).

MS: [M+H]$^+$ 321.0.

D) 4-[2-(2,2-difluoroethoxy)phenyl]-1-oxo-2,3-dihydro-1H-pyrrolo[3,4-c]pyridine-6-carbaldehyde To a mixture of 4-[2-(2,2-difluoroethoxy)phenyl]-6-(hydroxymethyl)-2,3-dihydro-1H-pyrrolo[3,4-c]pyridin-1-one (1.95 g) and acetonitrile (30 mL) was added Dess-Martin periodinane (3.16 g) at room temperature. The mixture was stirred at the same temperature for 30 min, to the mixture was added saturated aqueous sodium thiosulfate solution, and the mixture was extracted with ethyl acetate. The organic layer was separated, washed with saturated aqueous sodium hydrogencarbonate solution and saturated brine, dried over anhydrous magnesium sulfate, and concentrated under reduced pressure. The obtained residue was washed with ethyl acetate/IPE to give the title compound (1.24 g).

MS: [M+H]$^+$ 319.0.

E) 4-[2-(2,2-difluoroethoxy)phenyl]-1-oxo-2,3-dihydro-1H-pyrrolo[3,4-c]pyridine-6-carboxylic acid To a mixture of 4-[2-(2,2-difluoroethoxy)phenyl]-1-oxo-2,3-dihydro-1H-pyrrolo[3,4-c]pyridine-6-carbaldehyde (1.52 g) and DMSO (15 mL) was added a mixture of sodium dihydrogen phosphate (1.09 g) and water (3 mL) at 0° C., and a mixture of sodium chlorite (812.9 mg) and water (3 mL) was added dropwise thereto at the same temperature. The mixture was stirred at room temperature for 2.5 hr, and to the reaction mixture was added water. The precipitate was collected by filtration, and washed with water to give the title compound (1.19 g).

MS: [M+H]$^+$ 335.0.

F) methyl 4-[2-(2,2-difluoroethoxy)phenyl]-1-oxo-2,3-dihydro-1H-pyrrolo[3,4-c]pyridine-6-carboxylate To a mixture of 4-[2-(2,2-difluoroethoxy)phenyl]-1-oxo-2,3-dihydro-1H-pyrrolo[3,4-c]pyridine-6-carboxylic acid (1.14 g), MeOH (4 mL) and toluene (12 mL) was added 2M (diazomethyl) (trimethyl)silane-diethyl ether solution (2.5 mL) at 0° C., and the mixture was stirred at 0° C. for 1.5 hr. To the reaction mixture was added again 2M (diazomethyl) (trimethyl)silane-diethyl ether solution (0.8 mL) at 0° C., and the mixture was stirred at 0° C. for 30 min. To the reaction mixture was added AcOH (300 μL) at 0° C., and the mixture was stirred at room temperature for 30 min. The reaction solution was concentrated, and the obtained residue was collected by filtration, and washed with ethyl acetate/IPE to give the title compound (874.4 mg).

MS: [M+H]$^+$ 349.0.

G) 4-[2-(2,2-difluoroethoxy)phenyl]-6-(2-hydroxypropan-2-yl)-2,3-dihydro-1H-pyrrolo[3,4-c]pyridin-1-one To a mixture of methyl 4-[2-(2,2-difluoroethoxy)phenyl]-1-oxo-2,3-dihydro-1H-pyrrolo[3,4-c]pyridine-6-carboxylate (902.8 mg) and THF (20 mL) was added 3M methylmagnesium bromide-2-methyltetrahydrofuran solution (4.5 mL) at 0° C. The mixture was stirred under argon atmosphere at room temperature for 1 hr. To the mixture was added saturated aqueous ammonium chloride solution at 0° C., and the mixture was extracted with ethyl acetate. The organic layer was separated, washed with saturated brine, dried over anhydrous magnesium sulfate, and concentrated under reduced pressure. The residue was purified by silica gel column chromatography (ethyl acetate/hexane) to give the title compound (752.7 mg).

MS: [M+H]$^+$ 349.1.

H) 4-[2-(2,2-difluoroethoxy)phenyl]-6-(2-hydroxypropan-2-yl)-2-[4-(2,2,2-trifluoroethoxy)phenyl]-2,3-dihydro-1H-pyrrolo[3,4-c]pyridin-1-one To a mixture of 4-[2-(2,2-difluoroethoxy)phenyl]-6-(2-hydroxypropan-2-yl)-2,3-dihydro-1H-pyrrolo[3,4-c]pyridin-1-one (49.7 mg), 1-bromo-4-(2,2,2-trifluoroethoxy)benzene (48.1 mg), sodium tert-butoxide (20.6 mg) and toluene (1.5 mL) was added chloro(2-dicyclohexylphosphino-2',4',6'-triisopropyl-1,1'-biphenyl) [2-(2'-amino-1,1'-biphenyl)]palladium(II) (11.0 mg) at room temperature. The mixture was stirred under argon atmosphere at 110° C. for 5 hr. To the reaction mixture were added again chloro(2-dicyclohexylphosphino-2',4',6'-triisopropyl-1,1'-biphenyl) [2-(2'-amino-1,1'-biphenyl)]palladium(II) (5.2 mg) and sodium tert-butoxide (10.0 mg), and the mixture was stirred under argon atmosphere at 110° C. for 3 hr. The reaction mixture was purified by silica gel column chromatography (ethyl acetate/hexane) to give the title compound (37.6 mg).

$^1$H NMR (300 MHz, DMSO-$d_6$) δ 1.52 (6H, s), 4.43 (2H, td, J=14.9, 3.4 Hz), 4.78 (2H, q, J=8.8 Hz), 4.95 (2H, s), 5.43 (1H, s), 6.07-6.51 (1H, m), 7.08-7.15 (2H, m), 7.19 (1H, td, J=7.4, 0.9 Hz), 7.24-7.32 (1H, m), 7.47-7.56 (2H, m), 7.80-7.89 (2H, m), 7.99 (1H, s).

Example 358 rac-4-[2-(2,2-difluoroethoxy)phenyl]-2-[4-(difluoromethoxy)phenyl]-6-(1-hydroxyethyl)-2,3-dihydro-1H-pyrrolo[3,4-c]pyridin-1-one A) 6-acetyl-4-[2-(2,2-difluoroethoxy)phenyl]-2,3-dihydro-1H-pyrrolo[3,4-c]pyridin-1-one To a mixture of methyl 4-[2-(2,2-difluoroethoxy)phenyl]-1-oxo-2,3-dihydro-1H-pyrrolo[3,4-c]pyridine-6-carboxylate (902.8 mg) and THF (20 mL) was added 3M methylmagnesium bromide-2-methyltetrahydrofuran solution (4.5 mL) at 0° C. The mixture was stirred under argon atmosphere at room temperature for 1 hr. To the mixture was added saturated aqueous ammonium chloride solution at 0° C., and the mixture was extracted with ethyl acetate. The organic layer was separated, washed with saturated brine, dried over anhydrous magnesium sulfate, and concentrated under reduced pressure. The residue was purified by silica gel column chromatography (ethyl acetate/hexane) to give the title compound (50.5 mg).

MS: [M+H]$^+$ 333.0.

B) 6-acetyl-4-[2-(2,2-difluoroethoxy)phenyl]-2-[4-(difluoromethoxy)phenyl]-2,3-dihydro-1H-pyrrolo[3,4-c]pyridin-1-one To a mixture of 6-acetyl-4-[2-(2,2-difluoroethoxy)phenyl]-2,3-dihydro-1H-pyrrolo[3,4-c]pyridin-1-one (49 mg), 1-bromo-4-(difluoromethoxy)benzene (59 mg), sodium tert-butoxide (23 mg) and toluene (1.8 mL) was added chloro(2-dicyclohexylphosphino-2',4',6'-triisopropyl-1,1'-biphenyl) [2-(2'-amino-1,1'-biphenyl)]palladium(II) (20 mg) at room temperature. The mixture was stirred under argon atmosphere at 120° C. for 30 min. To the reaction mixture was added again 1-bromo-4-(difluoromethoxy)benzene (59 mg), and the mixture was stirred under argon atmosphere at 120° C. for 30 min. To the mixture was added saturated aqueous ammonium chloride solution at room temperature, and the mixture was extracted with ethyl acetate. The organic layer was separated, washed with saturated brine, dried over anhydrous sodium sulfate, and concentrated under reduced pressure. The residue was purified by silica gel column chromatography (ethyl acetate/hexane) to give the title compound (35 mg).

MS: [M+H]$^+$ 475.1.

C) rac-4-[2-(2,2-difluoroethoxy)phenyl]-2-[4-(difluoromethoxy)phenyl]-6-(1-hydroxyethyl)-2,3-dihydro-1H-pyrrolo[3,4-c]pyridin-1-one To a mixture of 6-acetyl-4-[2-(2,2-difluoroethoxy)phenyl]-2-[4-(difluoromethoxy)phenyl]-2,3-dihydro-1H-pyrrolo[3,4-c]pyridin-1-one (33 mg), THF (0.5 mL) and MeOH (0.1 mL) was added sodium borohydride (5 mg) at 0° C., and the mixture was at 0° C. for 45 min stirred. To the mixture was added water at 0° C., and the mixture was stirred at room temperature for 15 min, and extracted with ethyl acetate. The organic layer was separated, dried over anhydrous sodium sulfate, and concentrated under reduced pressure. The residue was purified by silica gel column chromatography (ethyl acetate/hexane) to give the title compound (17 mg).

$^1$H NMR (300 MHz, DMSO-$d_6$) δ 1.46 (3H, d, J=6.4 Hz), 4.42 (2H, tt, J=14.7, 2.8 Hz), 4.83-5.07 (3H, m), 5.56 (1H, d, J=4.9 Hz), 6.04-6.51 (1H, m), 7.14-7.31 (5H, m), 7.44-7.58 (2H, m), so 7.85 (1H, s), 7.91-8.00 (2H, m).

Example 362

3-(4-{4-[2-(2,2-difluoroethoxy)phenyl]-6-(2-hydroxypropan-2-yl)-1-oxo-1,3-dihydro-2H-pyrrolo[3,4-c]pyridin-2-yl}phenoxy)-2,2-dimethylpropanenitrile A) 3-(4-bromophenoxy)-2,2-dimethylpropanenitrile To a mixture of 2-cyano-2-methylpropyl 4-methylbenzenesulfonate (150 mg) and DMF (2 mL) were added 4-bromophenol (113 mg) and potassium carbonate (123 mg) at room temperature. The mixture was stirred at 100° C. for 10 hr, to the reaction mixture was added cesium carbonate (289 mg), and the mixture was stirred overnight at 100° C. To the mixture was added water at room temperature, and the mixture was extracted with ethyl acetate. The organic layer was separated, washed with water and saturated brine, dried over anhydrous magnesium sulfate, and concentrated under reduced pressure. The residue was purified by silica gel column chromatography (NH, ethyl acetate/hexane) to give the title compound (126.6 mg).

$^1$H NMR (300 MHz, DMSO) δ 1.40 (6H, s), 4.01 (2H, s), 6.98 (2H, d, J=9.0 Hz), 7.48 (2H, d, J=9.0 Hz).

B) 3-(4-{4-[2-(2,2-difluoroethoxy)phenyl]-6-(2-hydroxypropan-2-yl)-1-oxo-1,3-dihydro-2H-pyrrolo[3,4-c]pyridin-2-yl}phenoxy)-2,2-dimethylpropanenitrile To a mixture of 4-[2-(2,2-difluoroethoxy)phenyl]-6-(2-hydroxypropan-2-yl)-2,3-dihydro-1H-pyrrolo[3,4-c]pyridin-1-one (50 mg), 3-(4-bromophenoxy)-2,2-dimethylpropanenitrile (41.9 mg), sodium tert-butoxide (27.6 mg) and toluene (1 mL) was added chloro(2-dicyclohexylphosphino-2',4',6'-triisopropyl-1,1'-biphenyl) [2-(2'-amino-1,1'-biphenyl)]palladium(II) (22.59 mg) at room temperature. The mixture was stirred under argon atmosphere at 110° C. for 3 hr. To the reaction mixture were added again chloro(2-dicyclohexylphosphino-2',4',6'-triisopropyl-1,1'-biphenyl) [2-(2'-amino-1,1'-biphenyl)]palladium(II) (22.59 mg) and 3-(4-bromophenoxy)-2,2-dimethylpropanenitrile (10 mg), and the mixture was stirred under argon atmosphere at 110° C. for 2 hr. To the mixture was added water at room temperature, and the mixture was extracted with ethyl acetate. The organic layer was separated, washed with saturated brine, dried over anhydrous magnesium sulfate, and concentrated under reduced pressure. The residue was purified by silica gel column chromatography (ethyl acetate/hexane) to give the title compound (18.2 mg).

$^1$H NMR (300 MHz, DMSO) δ 1.42 (6H, s), 1.52 (6H, s), 4.03 (2H, s), 4.43 (2H, td, J=14.9, 3.4 Hz), 4.95 (2H, s), 5.44 (1H, s), 6.05-6.54 (1H, m), 7.03-7.10 (2H, m), 7.19 (1H, t, J=7.3 Hz), 7.28 (1H, d, J=8.3 Hz), 7.48-7.56 (2H, m), 7.82 (2H, d, J=9.0 Hz), 7.98 (1H, s).

Example 365

4-[2-(2,2-difluoroethoxy)phenyl]-2-[4-(2-hydroxy-2-methylpropoxy)phenyl]-6-methyl-2,3-dihydro-1H-pyrrolo[3,4-c]pyridin-1-one A) 1-(4-bromophenoxy)-2-methylpropan-2-ol To a mixture of 4-bromophenol (12 g) and DMF (150 mL) were added potassium carbonate (28.8 g) and 2,2-dimethyloxirane (18.57 mL) at room temperature, and the mixture was stirred overnight at 110° C. To the mixture was added water at 0° C., and the mixture was extracted with ethyl acetate. The organic layer was separated, washed with saturated brine, dried over anhydrous magnesium sulfate, and concentrated under reduced pressure. The residue was purified by silica gel column chromatography (ethyl acetate/hexane) to give the title compound (16.5 g).

$^1$H NMR (300 MHz, DMSO-d$_6$) δ 1.18 (6H, s), 3.69 (2H, s), 4.61 (1H, s), 6.85-6.98 (2H, m), 7.36-7.51 (2H, m).

B) 4-[2-(2,2-difluoroethoxy)phenyl]-2-[4-(2-hydroxy-2-methylpropoxy)phenyl]-6-methyl-2,3-dihydro-1H-pyrrolo[3,4-c]pyridin-1-one To a mixture of 4-[2-(2,2-difluoroethoxy)phenyl]-6-methyl-2,3-dihydro-1H-pyrrolo[3,4-c]pyridin-1-one (4.0 g), 1-(4-bromophenoxy)-2-methylpropan-2-ol (4.83 g), sodium tert-butoxide (2.53 g) and toluene (80 mL) was added chloro(2-dicyclohexylphosphino-2',4',6'-triisopropyl-1,1'-biphenyl) [2-(2'-amino-1,1'-biphenyl)]palladium(II) (2.069 g) at room temperature. The mixture was stirred under argon atmosphere at 120° C. for 4 hr. To the mixture was added water at room temperature, and the mixture was extracted with ethyl acetate. The organic layer was separated, washed with saturated brine, dried over anhydrous sodium sulfate, and concentrated under reduced pressure. The residue was purified by silica gel column chromatography (SI and NH, ethyl acetate/hexane), and the obtained solid was crystallized from ethyl acetate/hexane to give the title compound (720 mg).

$^1$H NMR (300 MHz, DMSO-d$_6$) δ 1.20 (6H, s), 2.65 (3H, s), 3.71 (2H, s), 4.32-4.50 (2H, m), 4.62 (1H, s), 4.89 (2H, s), 6.04-6.48 (1H, m), 6.95-7.03 (2H, m), 7.14-7.22 (1H, m), 7.26 (1H, d, J=7.9 Hz), 7.43-7.56 (2H, m), 7.62 (1H, s), 7.72-7.82 (2H, m).

Example 368

5-(difluoromethyl)-2-[4-(2-hydroxypropan-2-yl)phenyl]-7-[2-(2,2,2-trifluoroethoxy)phenyl]-1H-pyrrolo[3,4-c]pyridine-3,6(2H,5H)-dione A) 5-bromo-1-(difluoromethyl)-4-methylpyridin-2(1H)-one To a mixture of 5-bromo-4-methylpyridin-2-ol (10 g) and DMF (100 mL) were added sodium chloro(difluoro)acetate (16.22 g) and potassium carbonate (14.70 g) at room temperature, and the mixture was stirred at 100° C. for 1 hr. To the reaction mixture were added again sodium chloro(difluoro)acetate (8.11 g) and potassium carbonate (7.35 g), and the mixture was stirred overnight at 100° C. To the mixture was added water at 0° C., and the mixture was extracted with ethyl acetate. The organic layer was separated, washed with saturated brine, dried over anhydrous magnesium sulfate, and concentrated under reduced pressure. The residue was purified by silica gel column chromatography (NH, ethyl acetate/hexane) to give the title compound (4 g).

$^1$H NMR (300 MHz, DMSO-d$_6$) δ 2.22 (3H, d, J=1.1 Hz), 6.57 (1H, s), 7.54-8.00 (1H, m), 8.07 (1H, s).

B) methyl 1-(difluoromethyl)-4-methyl-6-oxo-1,6-dihydropyridine-3-carboxylate

A mixture of 5-bromo-1-(difluoromethyl)-4-methylpyridin-2(1H)-one (4 g), dichloro[1,1'-bis(diphenylphosphino)ferrocene]palladium(II) dichloromethane complex (0.686 g), TEA (4.68 mL) and MeOH (80 mL) was stirred under carbon monoxide (0.5 MPa) atmosphere at 80° C. for 4 hr. The reaction mixture was filtered through pad filled with Celite, and the filtrate was concentrated under reduced pressure. The residue was purified by silica gel column chromatography (ethyl acetate/hexane) to give the title compound (2.97 g).

MS: [M+H]$^+$ 218.1.

C) methyl 5-bromo-1-(difluoromethyl)-4-methyl-6-oxo-1,6-dihydropyridine-3-carboxylate To a mixture of methyl 1-(difluoromethyl)-4-methyl-6-oxo-1,6-dihydropyridine-3-carboxylate (2.13 g) and DMF (20 mL) was added NBS (2.62 g), and the mixture was stirred overnight at room temperature. To the reaction mixture was added water, and the precipitate was collected by filtration, and washed with water to give the title compound (2.90 g).

$^1$H NMR (300 MHz, DMSO-d$_6$) δ 2.58 (3H, s), 3.81 (3H, s), 7.63-8.11 (1H, m), 8.31 (1H, s).

D) methyl 5-bromo-4-(bromomethyl)-1-(difluoromethyl)-6-oxo-1,6-dihydropyridine-3-carboxylate To a mixture of methyl 5-bromo-1-(difluoromethyl)-4-methyl-6-oxo-1,6-dihydropyridine-3-carboxylate (2.90 g) and trifluoromethylbenzene (30 mL) were added NBS (3.49 g) and AIBN (0.161 g) at room temperature, and the mixture was stirred at 80° C. for 5 hr. To the mixture was added water at room temperature, and the mixture was extracted with ethyl acetate. The organic layer was separated, washed with saturated brine, dried over anhydrous sodium sulfate, and concentrated under reduced pressure. The residue was purified by silica gel column chromatography (ethyl acetate/hexane) to give the title compound (3.60 g).

$^1$H NMR (300 MHz, DMSO-d$_6$) δ 3.84 (3H, s), 4.98 (2H, s), 7.57-8.07 (1H, m), 8.42 (1H, s).

E) 7-bromo-5-(difluoromethyl)-1H-pyrrolo[3,4-c]pyridine-3,6(2H,5H)-dione

To a mixture of methyl 5-bromo-4-(bromomethyl)-1-(difluoromethyl)-6-oxo-1,6-dihydropyridine-3-carboxylate (3.60 g) and acetonitrile (40 mL) was added 28% aqueous ammonia (12.83 mL) at 0° C., and the mixture was stirred at room temperature for 1 hr. The resulting precipitate was collected by filtration, and washed with water to give the title compound (2.64 g).

MS: [M+H]$^+$ 279.0.

F) 5-(difluoromethyl)-7-[2-(2,2,2-trifluoroethoxy) phenyl]-1H-pyrrolo[3,4-c]pyridine-3,6(2H,5H)-dione A mixture of 7-bromo-5-(difluoromethyl)-1H-pyrrolo[3,4-c]pyridine-3,6(2H,5H)-dione (1.50 g), [2-(2,2,2-trifluoroethoxy)phenyl]boronic acid (1.301 g), dichloro[1,1'-bis(diphenylphosphino)ferrocene]palladium(II) dichloromethane complex (0.439 g), cesium carbonate (4.38 g), CPME (15 mL) and water (3 mL) was subjected to microwave irradiation at 120° C. for 30 min. The insoluble substance was removed by filtration, and the filtrate was partitioned between ethyl acetate-water. The organic layer was washed with saturated brine, dried over anhydrous sodium sulfate, and concentrated under reduced pressure. The residue was purified by silica gel column chromatography (ethyl acetate/hexane), and the obtained solid was washed with IPE to give the title compound (475 mg).

MS: [M+H]$^+$ 375.0.

G) 5-(difluoromethyl)-2-[4-(2-hydroxypropan-2-yl) phenyl]-7-[2-(2,2,2-trifluoroethoxy)phenyl]-1H-pyrrolo[3,4-c]pyridine-3,6(2H,5H)-dione To a mixture of 5-(difluoromethyl)-7-[2-(2,2,2-trifluoroethoxy)phenyl]-1H-pyrrolo[3,4-c]pyridine-3,6(2H,5H)-dione (100 mg), 2-(4-bromophenyl)propan-2-ol (115 mg), sodium tert-butoxide (51.4 mg) and toluene (5.0 mL) was added chloro(2-dicyclohexylphosphino-2',4',6'-triisopropyl-1,1'-biphenyl) [2-(2'-amino-1,1'-biphenyl)]palladium(II) (42.0 mg) at room temperature. The mixture was stirred under nitrogen atmosphere at 120° C. for 3.5 hr. The insoluble substance was removed by filtration, the filtrate was concentrated under reduced pressure, and the obtained residue was purified by silica gel column chromatography (ethyl acetate/hexane) to give the title compound (107 mg).

$^1$H NMR (300 MHz, DMSO-d$_6$) δ 1.41 (6H, s), 4.58-4.95 (4H, m), 4.99 (1H, s), 7.12-7.24 (1H, m), 7.26-7.35 (1H, m), 7.38-7.56 (4H, m), 7.64-8.16 (3H, m), 8.42 (1H, s).

Example 370

4-[2-(2,2-difluoroethoxy)phenyl]-2-[4-(2-hydroxypropan-2-yl)phenyl]-6-(3-methyloxetan-3-yl)-2,3-dihydro-1H-pyrrolo[3,4-c]pyridin-1-one A) 4-[2-(2,2-difluoroethoxy)phenyl]-6-(3-methyloxetan-3-yl)-2,3-dihydro-1H-pyrrolo[3,4-c]pyridin-1-one A mixture of 4-[2-(2,2-difluoroethoxy)phenyl]-2,3-dihydro-1H-pyrrolo[3,4-c]pyridin-1-one (200 mg), 3-methyloxetane-3-carboxylic acid (400 mg), [bis(trifluoroacetoxy)iodo]benzene (593 mg), 3,6-di-tert-butyl-10-phenyl-9-(2,4,6-trimethylphenyl)acridin-10-ium tetrafluoroborate (7.90 mg) and methylene chloride (5 mL) was degassed with nitrogen for 15 min, and subjected to blue LED irradiation at room temperature for 20 hr. To the mixture was added water at room temperature, and the mixture was extracted with ethyl acetate. The organic layer was separated, washed with water and saturated brine, dried over anhydrous magnesium sulfate, and concentrated under reduced pressure. The residue was purified by HPLC (YMC-Actus Triart C18, mobile phase: water/acetonitrile (containing 10 mM ammonium bicarbonate)) to give the title compound (28.9 mg).

MS: [M+H]$^+$ 361.1.

B) 4-[2-(2,2-difluoroethoxy)phenyl]-2-[4-(2-hydroxypropan-2-yl)phenyl]-6-(3-methyloxetan-3-yl)-2,3-dihydro-1H-pyrrolo[3,4-c]pyridin-1-one To a mixture of 4-[2-(2,2-difluoroethoxy)phenyl]-6-(3-methyloxetan-3-yl)-2,3-dihydro-1H-pyrrolo[3,4-c]pyridin-1-one (28.9 mg), 2-(4-bromophenyl)propan-2-ol (0.019 mL), sodium tert-butoxide (15.41 mg) and toluene (3 mL) was added chloro(2-dicyclohexylphosphino-2',4',6'-triisopropyl-1,1'-biphenyl) [2-(2'-amino-1,1'-biphenyl)]palladium(II) (12.62 mg) at room temperature. The mixture was stirred under argon atmosphere at 110° C. for 1 hr. To the mixture was added water at room temperature, and the mixture was extracted with ethyl acetate. The organic layer was separated, washed with saturated brine, dried over anhydrous magnesium sulfate, and concentrated under reduced pressure. The residue was purified by silica gel column chromatography (NH, ethyl acetate/hexane), and the obtained solid was crystallized from ethyl acetate/hexane to give the title compound (29 mg).

$^1$H NMR (300 MHz, DMSO) δ 1.43 (6H, s), 1.75 (3H, s), 4.44 (2H, td, J=15.1, 3.4 Hz), 4.58 (2H, d, J=6.0 Hz), 4.89-5.12 (5H, m), 6.08-6.52 (1H, m), 7.15-7.25 (1H, m), 7.29 (1H, d, J=7.9 Hz), 7.47-7.58 (4H, m), 7.72 (1H, s), 7.81 (2H, d, J=8.7 Hz).

Example 371

5-cyclopropyl-2-[4-(2-hydroxypropan-2-yl)phenyl]-7-[2-(2,2,2-trifluoroethoxy)phenyl]-1H-pyrrolo[3,4-c]pyridine-3,6(2H,5H)-dione A)
5-bromo-1-cyclopropyl-4-methylpyridin-2(1H)-one A mixture of 5-bromo-4-methylpyridin-2-ol (3 g), pyridine (45 mL), cyclopropylboronic acid (2.74 g) and copper (II) acetate (4.35 g) was stirred at 80° C. for 2 hr. The reaction mixture was filtered, and the filtrate was concentrated under reduced pressure. To the residue was added ethyl acetate, and the mixture was washed with water and saturated brine, dried over anhydrous magnesium sulfate, and concentrated under reduced pressure. The residue was purified by silica gel column chromatography (NH, ethyl acetate/hexane) to give the title compound (1.36 g).

MS: [M+H]$^+$ 228.0.

B) methyl 1-cyclopropyl-4-methyl-6-oxo-1,6-dihydropyridine-3-carboxylate

A mixture of 5-bromo-1-cyclopropyl-4-methylpyridin-2(1H)-one (1.71 g), dichloro[1,1'-bis(diphenylphosphino)ferrocene]palladium(II) dichloromethane complex (0.306 g), TEA (2.090 mL) and MeOH (30 mL) was stirred under carbon monoxide (0.5 MPa) atmosphere at 80° C. for 4 hr. The reaction mixture was filtered through pad filled with Celite, and the filtrate was concentrated under reduced pressure. The residue was purified by silica gel column chromatography (NH, ethyl acetate/hexane) to give the title compound (1.05 g).

MS: [M+H]$^+$ 208.1.

C) methyl 5-bromo-1-cyclopropyl-4-methyl-6-oxo-1,6-dihydropyridine-3-carboxylate To a mixture of methyl 1-cyclopropyl-4-methyl-6-oxo-1,6-dihydropyridine-3-carboxylate (700 mg) and DMF (7 mL) was added NBS (1202 mg), and the mixture was stirred overnight at room temperature. To the reaction mixture was added water, the mixture was stirred at room temperature for 1 hr. The precipitate was collected by filtration, and washed with water to give the title compound (879 mg).
MS: [M+H]$^+$ 286.0.

D) methyl 5-bromo-4-(bromomethyl)-1-cyclopropyl-6-oxo-1,6-dihydropyridine-3-carboxylate To a mixture of methyl 5-bromo-1-cyclopropyl-4-methyl-6-oxo-1,6-dihydropyridine-3-carboxylate (877 mg) and trifluoromethylbenzene (9 mL) were added NBS (1.091 g) and AIBN (50.3 mg) at room temperature, and the mixture was stirred overnight at 80° C. To the mixture was added saturated aqueous sodium thiosulfate solution at room temperature, and the mixture was extracted with ethyl acetate. The organic layer was separated, washed with saturated brine, dried over anhydrous magnesium sulfate, and concentrated under reduced pressure. The residue was purified by silica gel column chromatography (ethyl acetate/hexane) to give the title compound (896 mg).
MS: [M+H]$^+$ 363.9.

E) 7-bromo-5-cyclopropyl-H-pyrrolo[3,4-c]pyridine-3,6(2H,5H)-dione

To a mixture of methyl 5-bromo-4-(bromomethyl)-1-cyclopropyl-6-oxo-1,6-dihydropyridine-3-carboxylate (825 mg) and acetonitrile (9 mL) was added 28% aqueous ammonia (4.2 mL) at room temperature, and the mixture was stirred at the same temperature for 15 min. The resulting precipitate was collected by filtration, and washed with water to give the title compound (223 mg).
$^1$H NMR (300 MHz, DMSO-d$_6$) δ 0.91-1.08 (4H, m), 3.37 (1H, s), 4.22 (2H, s), 8.07 (1H, s), 8.44 (1H, s).

F) 5-cyclopropyl-7-[2-(2,2,2-trifluoroethoxy)phenyl]-1H-pyrrolo[3,4-c]pyridine-3,6(2H,5H)-dione A mixture of 7-bromo-5-cyclopropyl-1H-pyrrolo[3,4-c]pyridine-3,6(2H,5H)-dione (275 mg), [2-(2,2,2-trifluoroethoxy)phenyl]boronic acid (247 mg), dichloro[1,1'-bis(diphenylphosphino)ferrocene]palladium(II) dichloromethane complex (83 mg), cesium carbonate (832 mg), CPME (3 mL) and water (0.6 mL) was subjected to microwave irradiation at 120° C. for 20 min. The insoluble substance was removed by filtration, and the filtrate was partitioned between ethyl acetate-water. The organic layer was washed with saturated brine, dried over anhydrous magnesium sulfate, and concentrated under reduced pressure. The residue was purified by silica gel column chromatography (ethyl acetate/hexane) to give the title compound (50.8 mg).
MS: [M+H]$^+$ 365.1.

G) 5-cyclopropyl-2-[4-(2-hydroxypropan-2-yl)phenyl]-7-[2-(2,2,2-trifluoroethoxy)phenyl]-1H-pyrrolo[3,4-c]pyridine-3,6(2H,5H)-dione To a mixture of 5-cyclopropyl-7-[2-(2,2,2-trifluoroethoxy)phenyl]-1H-pyrrolo[3,4-c]pyridine-3,6(2H,5H)-dione (25 mg), 2-(4-bromophenyl)propan-2-ol (29.5 mg), sodium tert-butoxide (13.19 mg) and toluene (1 mL) was added chloro(2-dicyclohexylphosphino-2',4',6'-triisopropyl-1,1'-biphenyl) [2-(2'-amino-1,1'-biphenyl)]palladium(II) (10.8 mg) at room temperature. The mixture was stirred under nitrogen atmosphere at 120° C. for 4 hr. The insoluble substance was removed by filtration, the filtrate was concentrated under reduced pressure, and the obtained residue was purified by silica gel column chromatography (ethyl acetate/hexane) to give the title compound (22.1 mg).
$^1$H NMR (300 MHz, DMSO-d$_6$) δ 0.87-0.96 (1H, m), 1.02-1.08 (3H, m), 1.40 (6H, s), 3.47 (1H, s), 4.54-4.70 (2H, m), 4.73-4.86 (2H, m), 4.97 (1H, s), 7.09-7.18 (1H, m), 7.26 (1H, d, J=8.3 Hz), 7.37-7.48 (4H, m), 7.68 (2H, d, J=9.0 Hz), 8.19 (1H, s).

Example 374 rac-6-methyl-2-[4-({1-[(oxan-2-yl)oxy]cyclopropyl}methoxy)phenyl]-4-[2-(2,2,2-trifluoroethoxy)phenyl]-2,3-dihydro-1H-pyrrolo[3,4-c]pyridin-1-one

A) rac-methyl 1-[(oxan-2-yl)oxy]cyclopropane-1-carboxylate

To a mixture of methyl 1-hydroxycyclopropane-1-carboxylate (1.6 g) and THF (25 mL) were added 3,4-dihydro-2H-pyran (1.509 mL) and pyridinium p-toluenesulfonate (0.693 g) at room temperature. The mixture was stirred at room temperature for 3 hr, and 3,4-dihydro-2H-pyran (1 mL) was added again thereto. The reaction solution was stirred at room temperature for 2 hr, and concentrated. The obtained residue was partitioned between ethyl acetate-saturated sodium carbonate aqueous solution, and the organic layer was washed with saturated brine, dried over anhydrous sodium sulfate, and concentrated under reduced pressure. The residue was purified by silica gel column chromatography (ethyl acetate/hexane) to give the title compound (2.55 g).
$^1$H NMR (300 MHz, DMSO-d$_6$) δ 1.09-1.22 (3H, m), 1.36-1.57 (5H, m), 1.61-1.73 (2H, m), 3.36-3.47 (1H, m), 3.63 (3H, s), 3.74 (1H, ddd, J=11.2, 7.6, 3.8 Hz), 4.77-4.86 (1H, m).

B) rac-{1-[(oxan-2-yl)oxy]cyclopropyl}methanol

To a mixture of lithium aluminium hydride (0.580 g) and THF (15 mL) was added a solution of rac-methyl 1-[(oxan-2-yl)oxy]cyclopropane-1-carboxylate (2.55 g) in THF (20 mL) at 0° C. The mixture was stirred at room temperature for 3 hr, to the mixture were added water, 15% aqueous sodium hydroxide solution and anhydrous magnesium sulfate at 0° C. The reaction mixture was stirred at room temperature for 30 min, filtered through Celite, and washed with ethyl acetate, and the filtrate was concentrated under reduced pressure to give the title compound (2.22 g).
$^1$H NMR (300 MHz, DMSO-d$_6$) δ 0.45-0.71 (3H, m), 0.78-0.88 (1H, m), 1.30-1.77 (6H, m), 3.36-3.50 (2H, m), 3.52-3.61 (1H, m), 3.81 (1H, ddd, J=11.2, 7.4, 3.6 Hz), 4.52 (1H, dd, J=6.8, 5.3 Hz), 4.79 (1H, dd, J=4.9, 2.6 Hz).

C) 2-[4-(benzyloxy)phenyl]-6-methyl-4-[2-(2,2,2-trifluoroethoxy)phenyl]-2,3-dihydro-1H-pyrrolo[3,4-c]pyridin-1-one To a mixture of 6-methyl-4-[2-(2,2,2-trifluoroethoxy)phenyl]-2,3-dihydro-1H-pyrrolo[3,4-c]pyridin-1-one (300 mg), 1-(benzyloxy)-4-bromobenzene (367 mg), sodium tert-butoxide (134 mg) and toluene (5 mL) was added chloro(2-dicyclohexylphosphino-2',4',6'-triisopropyl-1,1'-biphenyl)[2-(2'-amino-1,1'-biphenyl)]palladium(II) (150 mg) at room temperature. The mixture was stirred under argon atmosphere at 120° C. for 3 hr. To the mixture were added water and saturated brine at room temperature, and the mixture was extracted with ethyl acetate. The organic layer was separated, washed with saturated brine, dried over anhydrous sodium sulfate, and concentrated under reduced pressure. The obtained solid was collected by filtration, and washed with ethyl acetate/IPE to give the title compound (330 mg).

MS: [M+H]$^+$ 505.2.

D) 2-(4-hydroxyphenyl)-6-methyl-4-[2-(2,2,2-trifluoroethoxy)phenyl]-2,3-dihydro-1H-pyrrolo[3,4-c]pyridin-1-one A mixture of 2-[4-(benzyloxy)phenyl]-6-methyl-4-[2-(2,2,2-trifluoroethoxy)phenyl]-2,3-dihydro-1H-pyrrolo[3,4-c]pyridin-1-one (405 mg), 10% palladium-carbon (55% wet, 90 mg), MeOH (4 mL) and THF (4 mL) was stirred under normal pressure of hydrogen atmosphere at room temperature for 1.5 hr. To the reaction mixture was added again 10% palladium-carbon (55% wet, 150 mg), and the mixture was stirred overnight under normal pressure of hydrogen atmosphere at room temperature. To the reaction mixture was added again 10% palladium-carbon (55% wet, 150 mg), and the mixture was stirred under normal pressure of hydrogen atmosphere at room temperature for 3 hr. The catalyst was removed by filtration, and the filtrate was concentrated under reduced pressure. The obtained solid was collected by filtration, and washed with ethyl acetate/IPE to give the title compound (216 mg).

MS: [M+H]$^+$ 415.1.

E) rac-6-methyl-2-[4-({1-[(oxan-2-yl)oxy]cyclopropyl}methoxy)phenyl]-4-[2-(2,2,2-trifluoroethoxy)phenyl]-2,3-dihydro-1H-pyrrolo[3,4-c]pyridin-1-one To a mixture of 2-(4-hydroxyphenyl)-6-methyl-4-[2-(2,2,2-trifluoroethoxy)phenyl]-2,3-dihydro-1H-pyrrolo[3,4-c]pyridin-1-one (216 mg) and THF (3.5 mL) were added rac-{1-[(oxan-2-yl)oxy]cyclopropyl}methanol (135 mg), triphenylphosphine (205 mg) and bis(2-methoxyethyl)azodicarboxylate (183 mg) at 0° C. The mixture was stirred overnight at room temperature, to the reaction mixture was added water at room temperature, and the mixture was extracted with ethyl acetate. The organic layer was separated, washed with water and saturated brine, dried over anhydrous sodium sulfate, and concentrated under reduced pressure. The residue was purified by silica gel column chromatography (ethyl acetate/hexane) to give the title compound (218 mg).

$^1$H NMR (300 MHz, DMSO-d$_6$) δ 0.62-0.78 (2H, m), 0.79-0.89 (1H, m), 0.99-1.10 (1H, m), 1.31-1.75 (6H, m), 2.65 (3H, s), 3.33-3.42 (1H, m), 3.73-3.88 (2H, m), 4.36 (1H, dd, J=10.7, 0.9 Hz), 4.76-4.93 (5H, m), 6.95-7.03 (2H, m), 7.17-7.26 (1H, m), 7.30 (1H, d, J=8.3 Hz), 7.48-7.58 (2H, m), 7.63 (1H, s), 7.71-7.81 (2H, m).

Example 375

2-{4-[(1-hydroxycyclopropyl)methoxy]phenyl}-6-methyl-4-[2-(2,2,2-trifluoroethoxy)phenyl]-2,3-dihydro-1H-pyrrolo[3,4-c]pyridin-1-one To a mixture of rac-6-methyl-2-[4-({1-[(oxan-2-yl)oxy]cyclopropyl}methoxy)phenyl]-4-[2-(2,2,2-trifluoroethoxy)phenyl]-2,3-dihydro-1H-pyrrolo[3,4-c]pyridin-1-one (215 mg), EtOH (3 mL) and THF (3 mL) was added p-toluenesulfonic acid (38 mg) at room temperature. The mixture was stirred at room temperature for 1 hr, p-toluenesulfonic acid (100 mg) was added again thereto, and the mixture was stirred for 1.5 hr. To the reaction mixture was added TEA (0.25 mL) at room temperature, and the reaction solution was concentrated. The obtained residue was partitioned between ethyl acetate-water, and the organic layer was dried over anhydrous sodium sulfate, and concentrated under reduced pressure. The residue was purified by silica gel column chromatography (ethyl acetate/hexane), and the obtained solid was collected by filtration, and washed with ethyl acetate to give the title compound (127 mg).

$^1$H NMR (300 MHz, DMSO-d$_6$) δ 0.57-0.71 (4H, m), 2.65 (3H, s), 3.96 (2H, s), 4.77-4.92 (4H, m), 5.57 (1H, s), 6.95-7.05 (2H, m), 7.18-7.26 (1H, m), 7.30 (1H, d, J=7.9 Hz), 7.52 (2H, d, J=7.2 Hz), 7.63 (1H, s), 7.72-7.81 (2H, m).

The compounds of Examples are shown in the following tables. MS in the tables means actual measured value. The compounds of Examples 3 to 6, 8 to 14, 16 to 20, 22 to 33, 37 to 39, 42 to 56, 58 to 77, 80 to 82, 84, 86, 88, 89, 93 to 97, 99, 100, 102 to 105, 108 to 110, 113, 114, 117, 118, 120 to 129, 131 to 133, 135, 136, 139 to 143, 147, 152 to 163, 165, 166, 168 to 173, 175, 177, 179 to 182, 185, 187 to 194, 196 to 199, 203, 207, 208, 210 to 212, 214 to 218, 220, 223 to 226, 229 to 245, 247, 248, 251 to 258, 260, 262 to 264, 268 to 275, 280 to 290, 292 to 296, 298 to 309, 312, 318, 319, 322, 323, 326, 331 to 335, 338 to 340, 342, 344, 345, 348, 350, 352, 355 to 357, 359 to 361, 363, 364, 366, 367, 369, 372, 373 and 376 to 390 in the following tables were produced according to the methods described in the above-mentioned Examples, or methods analogous thereto.

TABLE 1-1

| Ex. No. | IUPAC Name | Structure | Additive | MS |
|---|---|---|---|---|
| 1 | 2-(4-fluorophenyl)-4-(2-methoxyphenyl)-2,3-dihydro-1H-pyrrolo[3,4-c]pyridin-1-one | | | 335.1 |

TABLE 1-1-continued

| Ex. No. | IUPAC Name | Structure | Additive | MS |
|---|---|---|---|---|
| 2 | 1-(4-fluoro-2-methoxyphenyl)-6-(4-fluorophenyl)-6,7-dihydro-1H-pyrrolo[3,4-b]pyridine-2,5-dione | | | 368.9 |
| 3 | 4-(2-methoxyphenyl)-2-[4-(trifluoromethoxy)phenyl]-2,3-dihydro-1H-pyrrolo[3,4-c]pyridin-1-one | | | 401.0 |
| 4 | 2-(4-cyclopropylphenyl)-4-(2-methoxyphenyl)-2,3-dihydro-1H-pyrrolo[3,4-c]pyridin-1-one | | | 357.0 |
| 5 | 4-(2-methoxyphenyl)-2-(4-phenoxyphenyl)-2,3-dihydro-1H-pyrrolo[3,4-c]pyridin-1-one | | | 409.0 |
| 6 | 4-(2-methoxyphenyl)-2-[4-(trifluoromethyl)phenyl]-2,3-dihydro-1H-pyrrolo[3,4-c]pyridin-1-one | | | 385.1 |

TABLE 1-1-continued

| Ex. No. | IUPAC Name | Structure | Additive | MS |
|---|---|---|---|---|
| 7 | 4-(4-fluoro-2-methoxyphenyl)-2-(4-fluorophenyl)-2,3-dihydro-1H-pyrrolo[3,4-c]pyridin-1-one | 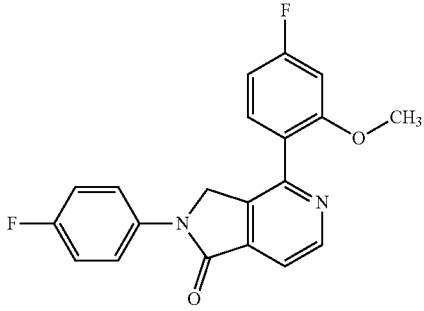 [SMILES: COc1cc(F)ccc1-c1nccc2c1CN(c1ccc(F)cc1)C2=O] | | 352.9 |
| 8 | 4-(4,5-difluoro-2-methoxyphenyl)-2-(4-fluorophenyl)-2,3-dihydro-1H-pyrrolo[3,4-c]pyridin-1-one | 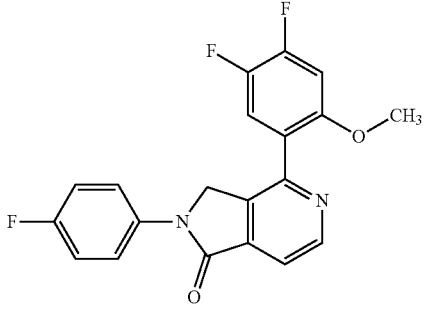 [SMILES: COc1cc(F)c(F)cc1-c1nccc2c1CN(c1ccc(F)cc1)C2=O] | | 370.9 |

TABLE 1-2

| Ex. No. | IUPAC Name | Structure | Additive | MS |
|---|---|---|---|---|
| 9 | 4-(5-fluoro-2-methoxyphenyl)-2-(4-fluorophenyl)-2,3-dihydro-1H-pyrrolo[3,4-c]pyridin-1-one | 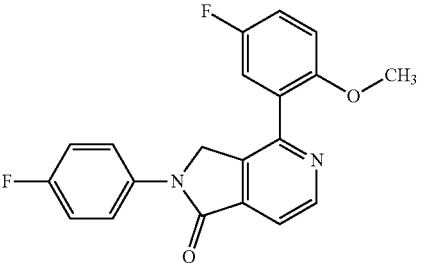 [SMILES: COc1ccc(F)cc1-c1nccc2c1CN(c1ccc(F)cc1)C2=O] | | 352.9 |
| 10 | 4-[2-(4-fluorophenyl)-1-oxo-2,3-dihydro-1H-pyrrolo[3,4-c]pyridin-4-yl]-3-methoxybenzonitrile | 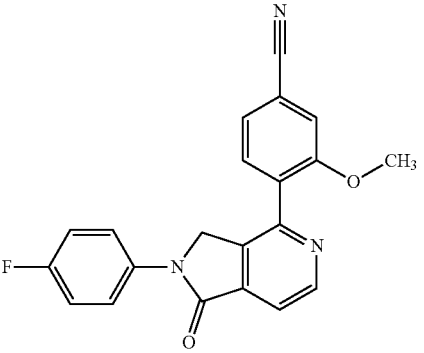 [SMILES: COc1cc(C#N)ccc1-c1nccc2c1CN(c1ccc(F)cc1)C2=O] | | 359.9 |

TABLE 1-2-continued

| Ex. No. | IUPAC Name | Structure | Additive | MS |
|---|---|---|---|---|
| 11 | 4-(2-methoxyphenyl)-2-(1-methyl-1H-pyrazol-4-yl)-2,3-dihydro-1H-pyrrolo[3,4-c]pyridin-1-one | | | 320.9 |
| 12 | 4-(2-methoxyphenyl)-2-(1-methyl-1H-pyrazol-3-yl)-2,3-dihydro-1H-pyrrolo[3,4-c]pyridin-1-one | | | 320.9 |
| 13 | 2-(4-fluorophenyl)-4-[4-fluoro-2-(2,2,2-trifluoroethoxy)phenyl]-2,3-dihydro-1H-pyrrolo[3,4-c]pyridin-1-one | | | 421.1 |
| 14 | 2-(4-fluorophenyl)-4-(3-methoxypyridin-2-yl)-2,3-dihydro-1H-pyrrolo[3,4-c]pyridin-1-one | | | 336.1 |
| 15 | 1-(5-fluoro-2-methoxyphenyl)-6-(4-fluorophenyl)-6,7-dihydro-1H-pyrrolo[3,4-b]pyridine-2,5-dione | | | 369.1 |

TABLE 1-2-continued

| Ex. No. | IUPAC Name | Structure | Additive | MS |
|---|---|---|---|---|
| 16 | 4-[2-(2,2-difluoroethoxy)-4-fluorophenyl]-2-(4-fluorophenyl)-2,3-dihydro-1H-pyrrolo[3,4-c]pyridin-1-one | | | 403.2 |

TABLE 1-3

| Ex. No. | IUPAC Name | Structure | Additive | MS |
|---|---|---|---|---|
| 17 | 4-[2-(difluoromethoxy)-4-fluorophenyl]-2-(4-fluorophenyl)-2,3-dihydro-1H-pyrrolo[3,4-c]pyridin-1-one | | | 389.1 |
| 18 | 4-[4-(2-methoxyphenyl)-1-oxo-1,3-dihydro-2H-pyrrolo[3,4-c]pyridin-2-yl]benzonitrile | | | 342.1 |
| 19 | 2-(4-fluorophenyl)-4-(3-methoxypyridin-4-yl)-2,3-dihydro-1H-pyrrolo[3,4-c]pyridin-1-one | | | 336.1 |

TABLE 1-3-continued

| Ex. No. | IUPAC Name | Structure | Additive | MS |
|---|---|---|---|---|
| 20 | 4-(2-methoxyphenyl)-2-(5-methyl-1,3,4-thiadiazol-2-yl)-2,3-dihydro-1H-pyrrolo[3,4-c]pyridin-1-one | 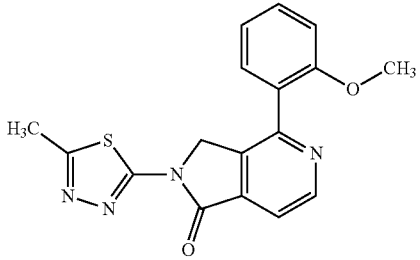 | | 339.1 |
| 21 | 7-(4-fluoro-2-methoxyphenyl)-2-(4-fluorophenyl)-1,2-dihydro-3H-imidazo[1,5-c]imidazol-3-one | 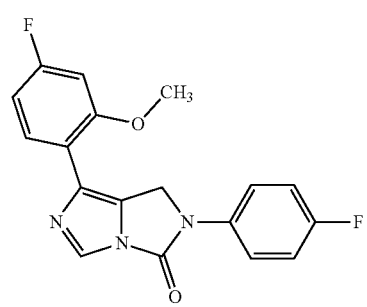 [SMILES: COc1cc(F)ccc1-c1ncn2c1CN(c1ccc(F)cc1)C2=O] | | 342.2 |
| 22 | 2-(4-fluorophenyl)-4-(3-methoxy-5-methylpyridin-4-yl)-2,3-dihydro-1H-pyrrolo[3,4-c]pyridin-1-one | 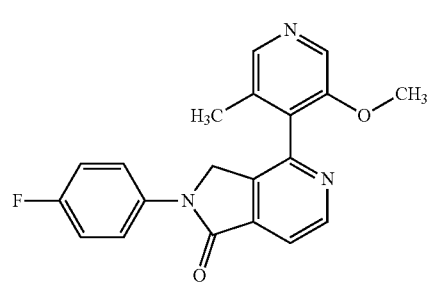 [SMILES: COc1cncc(C)c1-c1nccc2c1CN(c1ccc(F)cc1)C2=O] | | 350.2 |
| 23 | 4-(2-methoxyphenyl)-2-(4-methylphenyl)-2,3-dihydro-1H-pyrrolo[3,4-c]pyridin-1-one | 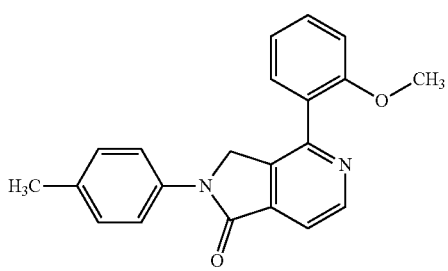 | | 331.1 |
| 24 | 4-(2-methoxyphenyl)-2-(4-methoxyphenyl)-2,3-dihydro-1H-pyrrolo[3,4-c]pyridin-1-one | 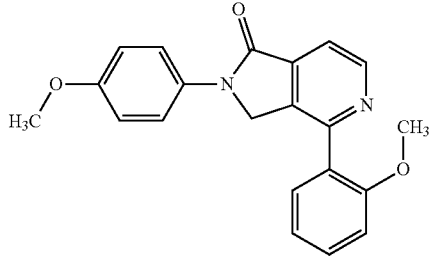 | | 347.1 |

TABLE 1-4

| Ex. No. | IUPAC Name | Structure | Additive | MS |
|---|---|---|---|---|
| 25 | 2-[4-(difluoromethoxy)phenyl]-4-(2-methoxyphenyl)-2,3-dihydro-1H-pyrrolo[3,4-c]pyridin-1-one | | | 383.1 |
| 26 | 4-(2-methoxyphenyl)-2-[6-(trifluoromethoxy)pyridin-3-yl]-2,3-dihydro-1H-pyrrolo[3,4-c]pyridin-1-one | | | 402.1 |
| 27 | 2-[6-(difluoromethoxy)pyridin-3-yl]-4-(2-methoxyphenyl)-2,3-dihydro-1H-pyrrolo[3,4-c]pyridin-1-one | | | 384.1 |
| 28 | 4-[2-(difluoromethoxy)phenyl]-2-(4-fluorophenyl)-2,3-dihydro-1H-pyrrolo[3,4-c]pyridin-1-one | | | 371.2 |
| 29 | 4-(2-methoxyphenyl)-2-[5-(trifluoromethoxy)pyridin-2-yl]-2,3-dihydro-1H-pyrrolo[3,4-c]pyridin-1-one | | | 402.1 |

TABLE 1-4-continued

| Ex. No. | IUPAC Name | Structure | Additive | MS |
|---|---|---|---|---|
| 30 | 2-(4-fluorophenyl)-4-[2-(morpholin-4-yl)phenyl]-2,3-dihydro-1H-pyrrolo[3,4-c]pyridin-1-one | | | 390.2 |
| 31 | 2-(4-fluorophenyl)-4-[2-(methylsulfanyl)phenyl]-2,3-dihydro-1H-pyrrolo[3,4-c]pyridin-1-one | | | 351.1 |
| 32 | 4-(2-methoxyphenyl)-2-[5-(trifluoromethyl)pyridin-2-yl]-2,3-dihydro-1H-pyrrolo[3,4-c]pyridin-1-one | | | 386.2 |

TABLE 1-5

| Ex. No. | IUPAC Name | Structure | Additive | MS |
|---|---|---|---|---|
| 33 | 2-(4-fluorophenyl)-4-(5-methoxy-2-methylpyridin-4-yl)-2,3-dihydro-1H-pyrrolo[3,4-c]pyridin-1-one | | | 350.1 |

TABLE 1-5-continued

| Ex. No. | IUPAC Name | Structure | Additive | MS |
|---|---|---|---|---|
| 34 | methyl 3-(difluoromethoxy)-4-[2-(4-fluorophenyl)-1-oxo-2,3-dihydro-1H-pyrrolo[3,4-c]pyridin-4-yl]benzoate | | | 429.1 |
| 35 | 3-(difluoromethoxy)-4-[2-(4-fluorophenyl)-1-oxo-2,3-dihydro-1H-pyrrolo[3,4-c]pyridin-4-yl]benzoic acid | | | 415.1 |
| 36 | 2-(4-fluorophenyl)-4-[3-(morpholin-4-yl)pyridin-4-yl]-2,3-dihydro-1H-pyrrolo[3,4-c]pyridin-1-one | | | 391.2 |
| 37 | 4-(2-methoxyphenyl)-2-(1-phenyl-1H-pyrazol-3-yl)-2,3-dihydro-1H-pyrrolo[3,4-c]pyridin-1-one | | | 383.1 |
| 38 | 4-(2-methoxyphenyl)-2-[1-(2,2,2-trifluoroethyl)-1H-pyrazol-3-yl]-2,3-dihydro-1H-pyrrolo[3,4-c]pyridin-1-one | | | 389.1 |

TABLE 1-5-continued

| Ex. No. | IUPAC Name | Structure | Additive | MS |
|---|---|---|---|---|
| 39 | 2-[5-(difluoromethoxy)pyridin-2-yl]-4-(2-methoxyphenyl)-2,3-dihydro-1H-pyrrolo[3,4-c]pyridin-1-one | | | 384.1 |
| 40 | 3-(difluoromethoxy)-4-[2-(4-fluorophenyl)-1-oxo-2,3-dihydro-1H-pyrrolo[3,4-c]pyridin-4-yl]benzamide | | | 414.1 |

TABLE 1-6

| Ex. No. | IUPAC Name | Structure | Additive | MS |
|---|---|---|---|---|
| 41 | 3-(difluoromethoxy)-4-[2-(4-fluorophenyl)-1-oxo-2,3-dihydro-1H-pyrrolo[3,4-c]pyridin-4-yl]benzonitrile | | | 396.1 |
| 42 | 2-(4-fluorophenyl)-4-[2-(2,2,2-trifluoroethoxy)phenyl]-2,3-dihydro-1H-pyrrolo[3,4-c]pyridin-1-one | | | 403.1 |

TABLE 1-6-continued

| Ex. No. | IUPAC Name | Structure | Additive | MS |
|---|---|---|---|---|
| 43 | 2-(5-fluoropyridin-2-yl)-4-(2-methoxyphenyl)-2,3-dihydro-1H-pyrrolo[3,4-c]pyridin-1-one | | | 336.1 |
| 44 | 4-[2-(difluoromethyl)phenyl]-2-(4-fluorophenyl)-2,3-dihydro-1H-pyrrolo[3,4-c]pyridin-1-one | | | 355.1 |
| 45 | 4-[4-fluoro-2-(2,2,2-trifluoroethoxy)phenyl]-2-(1-methyl-1H-pyrazol-3-yl)-2,3-dihydro-1H-pyrrolo[3,4-c]pyridin-1-one | | | 407.1 |
| 46 | 3-(difluoromethoxy)-4-[2-(4-fluorophenyl)-1-oxo-2,3-dihydro-1H-pyrrolo[3,4-c]pyridin-4-yl]-N,N-dimethylbenzamide | | | 442.1 |
| 47 | 4-[2-(difluoromethoxy)-4-(morpholine-4-carbonyl)phenyl]-2-(4-fluorophenyl)-2,3-dihydro-1H-pyrrolo[3,4-c]pyridin-1-one | | | 484.1 |

TABLE 1-6-continued

| Ex. No. | IUPAC Name | Structure | Additive | MS |
|---|---|---|---|---|
| 48 | ethyl 4-[2-(4-fluorophenyl)-1-oxo-2,3-dihydro-1H-pyrrolo[3,4-c]pyridin-4-yl]-3-methoxybenzoate | | | 407.3 |

TABLE 1-7

| Ex. No. | IUPAC Name | Structure | Additive | MS |
|---|---|---|---|---|
| 49 | 4-[2-(4-fluorophenyl)-1-oxo-2,3-dihydro-1H-pyrrolo[3,4-c]pyridin-4-yl]-3-methoxybenzoic acid | | | 379.2 |
| 50 | 4-(2-methoxyphenyl)-2-[4-(2,2,2-trifluoroethoxy)phenyl]-2,3-dihydro-1H-pyrrolo[3,4-c]pyridin-1-one | | | 415.3 |
| 51 | 2-(5-fluoropyridin-2-yl)-4-[2-(2,2,2-trifluoroethoxy)phenyl]-2,3-dihydro-1H-pyrrolo[3,4-c]pyridin-1-one | | | 404.2 |

TABLE 1-7-continued

| Ex. No. | IUPAC Name | Structure | Additive | MS |
|---|---|---|---|---|
| 52 | 4-[2-(difluoromethoxy)-4-fluorophenyl]-2-(5-fluoropyridin-2-yl)-2,3-dihydro-1H-pyrrolo[3,4-c]pyridin-1-one | | | 390.2 |
| 53 | 4-[2-(difluoromethoxy)-4-fluorophenyl]-2-[5-(difluoromethoxy)pyridin-2-yl]-2,3-dihydro-1H-pyrrolo[3,4-c]pyridin-1-one | | | 438.2 |
| 54 | 2-[5-(difluoromethoxy)pyridin-2-yl]-4-[2-(2,2,2-trifluoroethoxy)phenyl]-2,3-dihydro-1H-pyrrolo[3,4-c]pyridin-1-one | | | 452.2 |
| 55 | 2-[5-(difluoromethoxy)pyridin-2-yl]-4-[4-fluoro-2-(2,2,2-trifluoroethoxy)phenyl]-2,3-dihydro-1H-pyrrolo[3,4-c]pyridin-1-one | | | 470.1 |
| 56 | 4-[2-(2,2,2-trifluoroethoxy)phenyl]-2-[5-(trifluoromethoxy)pyridin-2-yl]-2,3-dihydro-1H-pyrrolo[3,4-c]pyridin-1-one | | | 470.1 |

TABLE 1-8

| Ex. No. | IUPAC Name | Structure | Additive | MS |
|---|---|---|---|---|
| 57 | 4-[2-(difluoromethoxy)-4-fluorophenyl]-2-[5-(trifluoromethoxy)pyridin-2-yl]-2,3-dihydro-1H-pyrrolo[3,4-c]pyridin-1-one | | | 456.2 |
| 58 | 4-[4-fluoro-2-(2,2,2-trifluoroethoxy)phenyl]-2-[5-(trifluoromethoxy)pyridin-2-yl]-2,3-dihydro-1H-pyrrolo[3,4-c]pyridin-1-one | | | 488.1 |
| 59 | 2-(5-fluoropyridin-2-yl)-4-[4-fluoro-2-(2,2,2-trifluoroethoxy)phenyl]-2,3-dihydro-1H-pyrrolo[3,4-c]pyridin-1-one | | | 422.2 |
| 60 | 4-[2-(2,2,2-trifluoroethoxy)phenyl]-2-[5-(trifluoromethyl)pyridin-2-yl]-2,3-dihydro-1H-pyrrolo[3,4-c]pyridin-1-one | | | 454.2 |
| 61 | 4-[4-fluoro-2-(2,2,2-trifluoroethoxy)phenyl]-2-[5-(trifluoromethyl)pyridin-2-yl]-2,3-dihydro-1H-pyrrolo[3,4-c]pyridin-1-one | | | 472.1 |

TABLE 1-8-continued

| Ex. No. | IUPAC Name | Structure | Additive | MS |
|---|---|---|---|---|
| 62 | 4-[2-(difluoromethoxy)phenyl]-2-[5-(trifluoromethoxy)pyridin-2-yl]-2,3-dihydro-1H-pyrrolo[3,4-c]pyridin-1-one | | | 438.2 |
| 63 | 4-[2-(difluoromethoxy)phenyl]-2-(5-fluoropyridin-2-yl)-2,3-dihydro-1H-pyrrolo[3,4-c]pyridin-1-one | | | 372.2 |
| 64 | 4-[2-(difluoromethoxy)phenyl]-2-[5-(difluoromethoxy)pyridin-2-yl]-2,3-dihydro-1H-pyrrolo[3,4-c]pyridin-1-one | | | 420.2 |

TABLE 1-9

| Ex. No. | IUPAC Name | Structure | Additive | MS |
|---|---|---|---|---|
| 65 | 2-[6-(difluoromethoxy)pyridin-3-yl]-4-[4-fluoro-2-(2,2,2-trifluoroethoxy)phenyl]-2,3-dihydro-1H-pyrrolo[3,4-c]pyridin-1-one | | | 470.1 |
| 66 | 4-[2-(difluoromethoxy)-4-fluorophenyl]-2-[5-(trifluoromethyl)pyridin-2-yl]-2,3-dihydro-1H-pyrrolo[3,4-c]pyridin-1-one | | | 440.2 |

TABLE 1-9-continued

| Ex. No. | IUPAC Name | Structure | Additive | MS |
|---|---|---|---|---|
| 67 | 4-[2-(difluoromethoxy)phenyl]-2-[5-(trifluoromethyl)pyridin-2-yl]-2,3-dihydro-1H-pyrrolo[3,4-c]pyridin-1-one | | | 422.2 |
| 68 | 4-{1-oxo-4-[2-(2,2,2-trifluoroethoxy)phenyl]-1,3-dihydro-2H-pyrrolo[3,4-c]pyridin-2-yl}benzonitrile | | | 410.3 |
| 69 | 4-[2-(4-fluorophenyl)-1-oxo-2,3-dihydro-1H-pyrrolo[3,4-c]pyridin-4-yl]-3-methoxy-N,N-dimethylbenzamide | | | 406.3 |
| 70 | 6-{4-[2-(difluoromethoxy)-4-fluorophenyl]-1-oxo-1,3-dihydro-2H-pyrrolo[3,4-c]pyridin-2-yl}pyridine-3-carbonitrile | | | 395.1 |
| 71 | 6-{4-[4-fluoro-2-(2,2,2-trifluoroethoxy)phenyl]-1-oxo-1,3-dihydro-2H-pyrrolo[3,4-c]pyridin-2-yl}pyridine-3-carbonitrile | | | 429.2 |

TABLE 1-9-continued

| Ex. No. | IUPAC Name | Structure | Additive | MS |
|---|---|---|---|---|
| 72 | 6-{1-oxo-4-[2-(2,2,2-trifluoroethoxy)phenyl]-1,3-dihydro-2H-pyrrolo[3,4-c]pyridin-2-yl}pyridine-3-carbonitrile | | | 411.2 |

TABLE 1-10

| Ex. No. | IUPAC Name | Structure | Additive | MS |
|---|---|---|---|---|
| 73 | 6-{4-[2-(difluoromethoxy)phenyl]-1-oxo-1,3-dihydro-2H-pyrrolo[3,4-c]pyridin-2-yl}pyridine-3-carbonitrile | | | 379.2 |
| 74 | 4-[2-(difluoromethoxy)phenyl]-2-[6-(difluoromethoxy)pyridin-3-yl]-2,3-dihydro-1H-pyrrolo[3,4-c]pyridin-1-one | | | 420.2 |
| 75 | 2-[6-(difluoromethoxy)pyridin-3-yl]-4-[2-(2,2,2-trifluoroethoxy)phenyl]-2,3-dihydro-1H-pyrrolo[3,4-c]pyridin-1-one | | | 452.2 |
| 76 | 4-[2-(difluoromethoxy)-4-fluorophenyl]-2-[6-(difluoromethoxy)pyridin-3-yl]-2,3-dihydro-1H-pyrrolo[3,4-c]pyridin-1-one | | | 436.1 |

TABLE 1-10-continued

| Ex. No. | IUPAC Name | Structure | Additive | MS |
|---|---|---|---|---|
| 77 | 2-(4-fluorophenyl)-4-[3-(2,2,2-trifluoroethoxy)pyridin-4-yl]-2,3-dihydro-1H-pyrrolo[3,4-c]pyridin-1-one | | | 404.2 |
| 78 | 4-[4-(azetidine-1-carbonyl)-2-(difluoromethoxy)phenyl]-2-(4-fluorophenyl)-2,3-dihydro-1H-pyrrolo[3,4-c]pyridin-1-one | | | 454.2 |
| 79 | 5-(4-fluorophenyl)-1-[4-fluoro-2-(2,2,2-trifluoroethoxy)phenyl]-5,6-dihydropyrrolo[3,4-c]pyrazol-4(1H)-one | | | 410.2 |
| 80 | 7-(4-fluoro-2-methoxyphenyl)-2-(4-fluorophenyl)-1,2-dihydro-3H-pyrrolo[3,4-c]pyridin-3-one | | | 353.2 |

TABLE 1-11

| Ex. No. | IUPAC Name | Structure | Additive | MS |
|---|---|---|---|---|
| 81 | 4-[4-fluoro-2-(2,2,2-trifluoroethoxy)phenyl]-2-(1-methyl-1H-pyrazol-4-yl)-2,3-dihydro-1H-pyrrolo[3,4-c]pyridin-1-one | | | 407.2 |
| 82 | 2-(1,5-dimethyl-1H-pyrazol-3-yl)-4-[4-fluoro-2-(2,2,2-trifluoroethoxy)phenyl]-2,3-dihydro-1H-pyrrolo[3,4-c]pyridin-1-one | | | 421.2 |
| 83 | 4-[4-fluoro-2-(2,2,2-trifluoroethoxy)phenyl]-2-[1-(2,2,2-trifluoroethyl)-1H-pyrazol-4-yl]-2,3-dihydro-1H-pyrrolo[3,4-c]pyridin-1-one | | | 473.1 |
| 84 | 4-[4-fluoro-2-(2,2,2-trifluoroethoxy)phenyl]-2-[1-(2,2,2-trifluoroethyl)-1H-pyrazol-3-yl]-2,3-dihydro-1H-pyrrolo[3,4-c]pyridin-1-one | | | 475.1 |

TABLE 1-11-continued

| Ex. No. | IUPAC Name | Structure | Additive | MS |
|---|---|---|---|---|
| 85 | 2-(4-fluorophenyl)-4-(3-methoxy-2-methylpyridin-4-yl)-2,3-dihydro-1H-pyrrolo[3,4-c]pyridin-1-one | | | 350.2 |
| 86 | 2-(4-fluorophenyl)-7-[4-fluoro-2-(2,2,2-trifluoroethoxy)phenyl]-1,2-dihydro-3H-pyrrolo[3,4-c]pyridin-3-one | | | 421.2 |
| 87 | 2-(4-fluorophenyl)-7-[2-(2,2,2-trifluoroethoxy)phenyl]-1,2-dihydro-3H-pyrrolo[3,4-c]pyridin-3-one | | | 403.2 |
| 88 | 4-[4-fluoro-2-(2,2,2-trifluoroethoxy)phenyl]-2-[4-(methanesulfonyl)phenyl]-2,3-dihydro-1H-pyrrolo[3,4-c]pyridin-1-one | | | 481.1 |

TABLE 1-12

| Ex. No. | IUPAC Name | Structure | Additive | MS |
|---|---|---|---|---|
| 89 | 4-[4-fluoro-2-(2,2,2-trifluoroethoxy)phenyl]-2-(6-methylpyridin-3-yl)-2,3-dihydro-1H-pyrrolo[3,4-c]pyridin-1-one | | | 418.2 |

TABLE 1-12-continued

| Ex. No. | IUPAC Name | Structure | Additive | MS |
|---|---|---|---|---|
| 90 | 2-[6-(difluoromethoxy)pyridazin-3-yl]-4-[4-fluoro-2-(2,2,2-trifluoroethoxy)phenyl]-2,3-dihydro-1H-pyrrolo[3,4-c]pyridin-1-one | | | 471.1 |
| 91 | 2-[5-(difluoromethoxy)pyridin-2-yl]-4-[3-(2,2,2-trifluoroethoxy)pyridin-4-yl]-2,3-dihydro-1H-pyrrolo[3,4-c]pyridin-1-one | | | 451.1 |
| 92 | 5-(4-fluorophenyl)-1-[4-fluoro-2-(2,2,2-trifluoroethoxy)phenyl]-3-methyl-5,6-dihydropyrrolo[3,4-c]pyrazol-4(1H)-one | | | 424.1 |
| 93 | 2-[1-(2,2-difluoroethyl)-1H-pyrazol-4-yl]-4-[4-fluoro-2-(2,2,2-trifluoroethoxy)phenyl]-2,3-dihydro-1H-pyrrolo[3,4-c]pyridin-1-one | | | 457.1 |
| 94 | 2-(1-cyclopropyl-1H-pyrazol-4-yl)-4-[4-fluoro-2-(2,2,2-trifluoroethoxy)phenyl]-2,3-dihydro-1H-pyrrolo[3,4-c]pyridin-1-one | | | 433.2 |

TABLE 1-12-continued

| Ex. No. | IUPAC Name | Structure | Additive | MS |
|---|---|---|---|---|
| 95 | 2-[1-(difluoromethyl)-1H-pyrazol-4-yl]-4-[4-fluoro-2-(2,2,2-trifluoroethoxy)phenyl]-2,3-dihydro-1H-pyrrolo[3,4-c]pyridin-1-one | | | 441.1 |
| 96 | 4-[4-fluoro-2-(2,2,2-trifluoroethoxy)phenyl]-2-[1-(2-methylpropyl)-1H-pyrazol-4-yl]-2,3-dihydro-1H-pyrrolo[3,4-c]pyridin-1-one | | | 449.2 |

TABLE 1-13

| Ex. No. | IUPAC Name | Structure | Additive | MS |
|---|---|---|---|---|
| 97 | 4-[4-fluoro-2-(2,2,2-trifluoroethoxy)phenyl]-2-[1-(propan-2-yl)-1H-pyrazol-4-yl]-2,3-dihydro-1H-pyrrolo[3,4-c]pyridin-1-one | | | 435.1 |
| 98 | 4-[4-fluoro-2-(2,2,2-trifluoroethoxy)phenyl]-2-{4-[(oxan-4-yl)oxy]phenyl}-2,3-dihydro-1H-pyrrolo[3,4-c]pyridin-1-one | | | 502.9 |

TABLE 1-13-continued

| Ex. No. | IUPAC Name | Structure | Additive | MS |
|---|---|---|---|---|
| 99 | 2-[5-(difluoromethoxy)pyrimidin-2-yl]-4-[4-fluoro-2-(2,2,2-trifluoroethoxy)phenyl]-2,3-dihydro-1H-pyrrolo[3,4-c]pyridin-1-one | | | 469.1 |
| 100 | 2-[5-(difluoromethoxy)pyrazin-2-yl]-4-[4-fluoro-2-(2,2,2-trifluoroethoxy)phenyl]-2,3-dihydro-1H-pyrrolo[3,4-c]pyridin-1-one | | | 469.1 |
| 101 | 4-[2-(benzyloxy)-4-fluorophenyl]-2-[6-(difluoromethoxy)pyridin-3-yl]-2,3-dihydro-1H-pyrrolo[3,4-c]pyridin-1-one | | | 478.2 |
| 102 | 4-{4-[4-fluoro-2-(2,2,2-trifluoroethoxy)phenyl]-1-oxo-1,3-dihydro-2H-pyrrolo[3,4-c]pyridin-2-yl}-N,N-dimethylbenzamide | | | 474.2 |
| 103 | 4-{2-[(3,3-difluorocyclobutyl)methoxy]phenyl}-2-(4-fluorophenyl)-2,3-dihydro-1H-pyrrolo[3,4-c]pyridin-1-one | | | 423.2 |

TABLE 1-13-continued

| Ex. No. | IUPAC Name | Structure | Additive | MS |
|---|---|---|---|---|
| 104 | 2-[4-(difluoromethoxy)phenyl]-4-[3-(2,2,2-trifluoroethoxy)pyridin-4-yl]-2,3-dihydro-1H-pyrrolo[3,4-c]pyridin-1-one | | | 450.1 |

TABLE 1-14

| Ex. No. | IUPAC Name | Structure | Additive | MS |
|---|---|---|---|---|
| 105 | 2-[6-(difluoromethoxy)pyridin-3-yl]-4-[3-(2,2,2-trifluoroethoxy)pyridin-4-yl]-2,3-dihydro-1H-pyrrolo[3,4-c]pyridin-1-one | | | 451.1 |
| 106 | 4-[4-fluoro-2-(2,2,2-trifluoroethoxy)phenyl]-2-{4-[(oxetan-3-yl)oxy]phenyl}-2,3-dihydro-1H-pyrrolo[3,4-c]pyridin-1-one | | | 475.1 |
| 107 | 2-[6-(difluoromethoxy)pyridin-3-yl]-4-(4-fluoro-2-hydroxyphenyl)-2,3-dihydro-1H-pyrrolo[3,4-c]pyridin-1-one | | | 386.1 |

TABLE 1-14-continued

| Ex. No. | IUPAC Name | Structure | Additive | MS |
|---|---|---|---|---|
| 108 | 4-[4-fluoro-2-(2,2,2-trifluoroethoxy)phenyl]-2-[5-(methanesulfonyl)pyridin-2-yl]-2,3-dihydro-1H-pyrrolo[3,4-c]pyridin-1-one | | | 482.0 |
| 109 | 2-(2,3-dihydro-1-benzofuran-6-yl)-4-[4-fluoro-2-(2,2,2-trifluoroethoxy)phenyl]-2,3-dihydro-1H-pyrrolo[3,4-c]pyridin-1-one | | | 445.2 |
| 110 | 2-[4-(ethanesulfonyl)phenyl]-4-[4-fluoro-2-(2,2,2-trifluoroethoxy)phenyl]-2,3-dihydro-1H-pyrrolo[3,4-c]pyridin-1-one | | | 493.1 |
| 111 | 2-(4-fluorophenyl)-4-[4-fluoro-2-(2,2,2-trifluoroethoxy)phenyl]-2,3-dihydro-1H-pyrrolo[3,4-c]pyridine | | | 407.3 |
| 112 | (2-{2-[6-(difluoromethoxy)pyridin-3-yl]-1-oxo-2,3-dihydro-1H-pyrrolo[3,4-c]pyridin-4-yl}-5-fluorophenoxy)acetonitrile | | | 425.1 |

TABLE 1-15

| Ex. No. | IUPAC Name | Structure | Additive | MS |
|---|---|---|---|---|
| 113 | 2-[6-(difluoromethoxy)pyridin-3-yl]-4-[4-fluoro-2-(2-methoxyethoxy)phenyl]-2,3-dihydro-1H-pyrrolo[3,4-c]pyridin-1-one | | | 446.2 |
| 114 | 4-[2-(benzyloxy)-4-fluorophenyl]-2-[4-(difluoromethoxy)phenyl]-2,3-dihydro-1H-pyrrolo[3,4-c]pyridin-1-one | | | 477.3 |
| 115 | 6-(4-fluorophenyl)-1-[4-fluoro-2-(2,2,2-trifluoroethoxy)phenyl]-6,7-dihydro-1H-pyrrolo[3,4-c]pyridazine-3,5(2H,4H)-dione | | | 440.1 |
| 116 | methyl (2-{2-[6-(difluoromethoxy)pyridin-3-yl]-1-oxo-2,3-dihydro-1H-pyrrolo[3,4-c]pyridin-4-yl}-5-fluorophenoxy)acetate | | | 460.0 |
| 117 | 2-[4-(difluoromethoxy)phenyl]-4-(4-fluoro-2-hydroxyphenyl)-2,3-dihydro-1H-pyrrolo[3,4-c]pyridin-1-one | | | 385.1 |

TABLE 1-15-continued

| Ex. No. | IUPAC Name | Structure | Additive | MS |
|---|---|---|---|---|
| 118 | 4-[4-(azetidine-1-carbonyl)-2-(2,2,2-trifluoroethoxy)phenyl]-2-[6-(difluoromethoxy)pyridin-3-yl]-2,3-dihydro-1H-pyrrolo[3,4-c]pyridin-1-one | | | 535.1 |
| 119 | 4-[4-fluoro-2-(2,2,2-trifluoroethoxy)phenyl]-2-[4-(2-hydroxypropan-2-yl)phenyl]-2,3-dihydro-1H-pyrrolo[3,4-c]pyridin-1-one | | | 461.2 |
| 120 | 4-[4-(azetidine-1-carbonyl)-2-methoxyphenyl]-2-(4-fluorophenyl)-2,3-dihydro-1H-pyrrolo[3,4-c]pyridin-1-one | | | 418.3 |

TABLE 1-16

| Ex. No. | IUPAC Name | Structure | Additive | MS |
|---|---|---|---|---|
| 121 | 2-(4-fluorophenyl)-4-[2-methoxy-4-(2-oxa-6-azaspiro[3.3]heptane-6-carbonyl)phenyl]-2,3-dihydro-1H-pyrrolo[3,4-c]pyridin-1-one | | | 460.2 |

TABLE 1-16-continued

| Ex. No. | IUPAC Name | Structure | Additive | MS |
| --- | --- | --- | --- | --- |
| 122 | 4-[4-(azetidine-1-carbonyl)-2-methoxyphenyl]-2-[4-(difluoromethoxy)phenyl]-2,3-dihydro-1H-pyrrolo[3,4-c]pyridin-1-one | | | 466.3 |
| 123 | 4-[4-(azetidine-1-carbonyl)-2-methoxyphenyl]-2-[6-(difluoromethoxy)pyridin-3-yl]-2,3-dihydro-1H-pyrrolo[3,4-c]pyridin-1-one | | | 467.2 |
| 124 | 4-[4-(azetidine-1-carbonyl)-2-(difluoromethoxy)phenyl]-2-[4-(difluoromethoxy)phenyl]-2,3-dihydro-1H-pyrrolo[3,4-c]pyridin-1-one | | | 502.1 |
| 125 | 4-[4-(azetidine-1-carbonyl)-2-(difluoromethoxy)phenyl]-2-[6-(difluoromethoxy)pyridin-3-yl]-2,3-dihydro-1H-pyrrolo[3,4-c]pyridin-1-one | | | 501.1 |

TABLE 1-16-continued

| Ex. No. | IUPAC Name | Structure | Additive | MS |
|---|---|---|---|---|
| 126 | 2-[4-(difluoromethoxy)phenyl]-4-{4-fluoro-2-[(oxetan-3-yl)methoxy]phenyl}-2,3-dihydro-1H-pyrrolo[3,4-c]pyridin-1-one | | | 457.1 |
| 127 | 2-[4-(difluoromethoxy)phenyl]-4-{4-fluoro-2-[(3-fluorooxetan-3-yl)methoxy]phenyl}-2,3-dihydro-1H-pyrrolo[3,4-c]pyridin-1-one | | | 475.1 |
| 128 | 2-[4-(difluoromethoxy)phenyl]-4-{4-fluoro-2-[(1-fluorocyclopropyl)methoxy]phenyl}-2,3-dihydro-1H-pyrrolo[3,4-c]pyridin-1-one | | | 457.1 |

TABLE 1-17

| Ex. No. | IUPAC Name | Structure | Additive | MS |
|---|---|---|---|---|
| 129 | 4-[2-(cyclopropylmethoxy)-4-fluorophenyl]-2-[4-(difluoromethoxy)phenyl]-2,3-dihydro-1H-pyrrolo[3,4-c]pyridin-1-one | | | 441.2 |

TABLE 1-17-continued

| Ex. No. | IUPAC Name | Structure | Additive | MS |
|---|---|---|---|---|
| 130 | (2-{2-[6-(difluoromethoxy)pyridin-3-yl]-1-oxo-2,3-dihydro-1H-pyrrolo[3,4-c]pyridin-4-yl}-5-fluorophenoxy)acetic acid | | | 446.1 |
| 131 | 2-[6-(2,2-difluoroethoxy)pyridin-3-yl]-4-[4-fluoro-2-(2,2,2-trifluoroethoxy)phenyl]-2,3-dihydro-1H-pyrrolo[3,4-c]pyridin-1-one | | | 484.1 |
| 132 | 2-(4-fluorophenyl)-4-[4-(methanesulfonyl)-2-methoxyphenyl]-2,3-dihydro-1H-pyrrolo[3,4-c]pyridin-1-one | | | 413.2 |
| 133 | 2-(2-{2-[6-(difluoromethoxy)pyridin-3-yl]-1-oxo-2,3-dihydro-1H-pyrrolo[3,4-c]pyridin-4-yl}-5-fluorophenoxy)-N,N-dimethylacetamide | | | 473.1 |
| 134 | 4-{2-[2-(azetidin-1-yl)-2-oxoethoxy]-4-fluorophenyl}-2-[6-(difluoromethoxy)pyridin-3-yl]-2,3-dihydro-1H-pyrrolo[3,4-c]pyridin-1-one | | | 485.2 |

TABLE 1-17-continued

| Ex. No. | IUPAC Name | Structure | Additive | MS |
|---|---|---|---|---|
| 135 | 2-[6-(difluoromethoxy)pyridin-3-yl]-4-{4-fluoro-2-[2-(morpholin-4-yl)-2-oxoethoxy]phenyl}-2,3-dihydro-1H-pyrrolo[3,4-c]pyridin-1-one | | | 515.2 |
| 136 | 4-{2-[2-(3,3-difluoroazetidin-1-yl)-2-oxoethoxy]-4-fluorophenyl}-2-[6-(difluoromethoxy)pyridln-3-yl]-2,3-dihydro-1H-pyrrolo[3,4-c]pyridin-1-one | | | 521.2 |

TABLE 1-18

| Ex. No. | IUPAC Name | Structure | Additive | MS |
|---|---|---|---|---|
| 137 | tert-butyl 4-{2-[2-(4-fluorophenyl)-1-oxo-2,3-dihydro-1H-pyrrolo[3,4-c]pyridin-4-yl]phenyl}piperazine-1-carboxylate | | | 489.2 |
| 138 | 2-(4-fluorophenyl)-4-[2-(piperazin-1-yl)phenyl]-2,3-dihydro-1H-pyrrolo[3,4-c]pyridin-1-one | | HCl | 389.3 |

TABLE 1-18-continued

| Ex. No. | IUPAC Name | Structure | Additive | MS |
|---|---|---|---|---|
| 139 | 2-[4-(difluoromethanesulfonyl)phenyl]-4-[4-fluoro-2-(2,2,2-trifluoroethoxy)phenyl]-2,3-dihydro-1H-pyrrolo[3,4-c]pyridin-1-one | | | 515.0 |
| 140 | 4-[4-fluoro-2-(2,2,2-trifluoroethoxy)phenyl]-2-[4-(methanesulfonyl)phenyl]-2,3-dihydro-1H-pyrrolo[3,4-c]pyridine | | | 467.1 |
| 141 | 4-{4-[4-fluoro-2-(2,2,2-trifluoroethoxy)phenyl]-1,3-dihydro-2H-pyrrolo[3,4-c]pyridin-2-yl}-N,N-dimethylbenzamide | | | 460.2 |
| 142 | 4-(2-fluoro-6-methoxyphenyl)-2-(4-fluorophenyl)-2,3-dihydro-1H-pyrrolo[3,4-c]pyridin-1-one | | | 353.2 |
| 143 | 4-(2,4-dimethoxyphenyl)-2-(4-fluorophenyl)-2,3-dihydro-1H-pyrrolo[3,4-c]pyridin-1-one | | | 365.2 |

TABLE 1-18-continued

| Ex. No. | IUPAC Name | Structure | Additive | MS |
|---|---|---|---|---|
| 144 | 4-[2-(4-acetylpiperazin-1-yl)phenyl]-2-(4-fluorophenyl)-2,3-dihydro-1H-pyrrolo[3,4-c]pyridin-1-one | | | 431.3 |

TABLE 1-19

| Ex. No. | IUPAC Name | Structure | Additive | MS |
|---|---|---|---|---|
| 145 | 7-(4-fluorophenyl)-5-[4-fluoro-2-(2,2,2-trifluoroethoxy)phenyl]-2,3,6,7-tetrahydropyrrolo[3,4-e][1,4]diazepin-8(1H)-one | | | 437.9 |
| 146 | 5-(4-fluorophenyl)-3-[4-fluoro-2-(2,2,2-trifluoroethoxy)phenyl]-4,5-dihydropyrrolo[3,4-c]pyrazol-6(1H)-one | | | 407.9 |
| 147 | 4-[4-fluoro-2-(2,2,2-trifluoroethoxy)phenyl]-2-[4-(methoxymethyl)phenyl]-2,3-dihydro-1H-pyrrolo[3,4-c]pyridin-1-one | | | 444.9 |

TABLE 1-19-continued

| Ex. No. | IUPAC Name | Structure | Additive | MS |
|---|---|---|---|---|
| 148 | 5-(4-fluorophenyl)-3-[4-fluoro-2-(2,2,2-trifluoroethoxy)phenyl]-1-(2,2,2-trifluoroethyl)-4,5-dihydropyrrolo[3,4-c]pyrazol-6(1H)-one | | | 491.9 |
| 149 | 1-[2-(2,2,2-trifluoroethoxy)phenyl]-6-[4-(trifluoromethoxy)phenyl]-6,7-dihydro-1H-pyrrolo[3,4-b]pyridine-2,5-dione | | | 485.1 |
| 150 | 7-(4-fluorophenyl)-1-[4-fluoro-2-(2,2,2-trifluoroethoxy)phenyl]-2,3,7,8-tetrahydropyrrolo[3,4-e][1,4]diazepin-6(1H)-one | | | 437.7 |
| 151 | 2-[2-(difluoromethoxy)pyrimidin-5-yl]-4-[4-fluoro-2-(2,2,2-trifluoroethoxy)phenyl]-2,3-dihydro-1H-pyrrolo[3,4-c]pyridin-1-one | | | 468.8 |
| 152 | 4-[4-fluoro-2-(2,2,2-trifluoroethoxy)phenyl]-2-[4-(morpholine-4-carbonyl)phenyl]-2,3-dihydro-1H-pyrrolo[3,4-c]pyridin-1-one | | | 513.9 |

TABLE 1-20

| Ex. No. | IUPAC Name | Structure | Additive | MS |
|---|---|---|---|---|
| 153 | 2-[1-(cyclopropylmethyl)-1H-pyrazol-4-yl]-4-[4-fluoro-2-(2,2,2-trifluoroethoxy)phenyl]-2,3-dihydro-1H-pyrrolo[3,4-c]pyridin-1-one | | | 446.9 |
| 154 | 4-[4-fluoro-2-(2,2,2-trifluoroethoxy)phenyl]-2-[1-(2-methoxyethyl)-1H-pyrazol-4-yl]-2,3-dihydro-1H-pyrrolo[3,4-c]pyridin-1-one | | | 450.9 |
| 155 | 4-[4-fluoro-2-(2,2,2-trifluoroethoxy)phenyl]-2-[4-(3-hydroxyoxetan-3-yl)phenyl]-2,3-dihydro-1H-pyrrolo[3,4-c]pyridin-1-one | | | 475.2 |
| 156 | 6-{4-[4-fluoro-2-(2,2,2-trifluoroethoxy)phenyl]-1,3-dihydro-2H-pyrrolo[3,4-c]pyridin-2-yl}pyridine-3-carbonitrile | | | 415.1 |
| 157 | 5-(4-fluorophenyl)-3-[4-fluoro-2-(2,2,2-trifluoroethoxy)phenyl]-1-methyl-4,5-dihydropyrrolo[3,4-c]pyrazol-6(1H)-one | | | 424.2 |

TABLE 1-20-continued

| Ex. No. | IUPAC Name | Structure | Additive | MS |
|---|---|---|---|---|
| 158 | [5-(4-fluorophenyl)-3-[4-fluoro-2-(2,2,2-trifluoroethoxy)phenyl]-6-oxo-5,6-dihydropyrrolo[3,4-c]pyrazol-1(4H)-yl]acetonitrile | | | 447.2 |
| 159 | 2-[4-(2-hydroxypropan-2-yl)phenyl]-4-[2-(2,2,2-trifluoroethoxy)phenyl]-2,3-dihydro-1H-pyrrolo[3,4-c]pyridin-1-one | | | 443.2 |
| 160 | 2-[4-(ethanesulfonyl)phenyl]-4-[2-(2,2,2-trifluoroethoxy)phenyl]-2,3-dihydro-1H-pyrrolo[3,4-c]pyridin-1-one | | | 477.1 |

TABLE 1-21

| Ex. No. | IUPAC Name | Structure | Additive | MS |
|---|---|---|---|---|
| 161 | 2-[4-(methanesulfonyl)phenyl]-4-[2-(2,2,2-trifluoroethoxy)phenyl]-2,3-dihydro-1H-pyrrolo[3,4-c]pyridin-1-one | | | 463.0 |
| 162 | N,N-dimethyl-4-{1-oxo-4-[2-(2,2,2-trifluoroethoxy)phenyl]-1,3-dihydro-2H-pyrrolo[3,4-c]pyridin-2-yl}benzamide | | | 456.2 |

TABLE 1-21-continued

| Ex. No. | IUPAC Name | Structure | Additive | MS |
|---|---|---|---|---|
| 163 | 4-[4-fluoro-2-(2,2,2-trifluoroethoxy)phenyl]-2-[4-(1-hydroxycyclobutyl)phenyl]-2,3-dihydro-1H-pyrrolo[3,4-c]pyridin-1-one | | | 473.2 |
| 164 | 4-[4-fluoro-2-(2,2,2-trifluoroethoxy)phenyl]-2-(4-{[(3R)-oxolan-3-yl]oxy}phenyl)-2,3-dihydro-1H-pyrrolo[3,4-c]pyridin-1-one | | | 489.1 |
| 165 | 4-[4-fluoro-2-(2,2,2-trifluoroethoxy)phenyl]-2-(4-{[(3S)-oxolan-3-yl]oxy}phenyl)-2,3-dihydro-1H-pyrrolo[3,4-c]pyridin-1-one | | | 489.1 |
| 166 | 2-[4-(azetidine-1-carbonyl)phenyl]-4-[4-fluoro-2-(2,2,2-trifluoroethoxy)phenyl]-2,3-dihydro-1H-pyrrolo[3,4-c]pyridin-1-one | | | 486.1 |
| 167 | 4-[4-fluoro-2-(2,2,2-trifluoroethoxy)phenyl]-2-{6-[(oxan-4-yl)oxy]pyridin-3-yl}-2,3-dihydro-1H-pyrrolo[3,4-c]pyridin-1-one | | | 504.1 |

TABLE 1-21-continued

| Ex. No. | IUPAC Name | Structure | Additive | MS |
|---|---|---|---|---|
| 168 | 2-(4-fluorophenyl)-4-[2-(2,2,2-trifluoroethoxy)phenyl]-2,3-dihydro-1H-pyrrolo[3,4-c]pyridine | | | 389.1 |

TABLE 1-22

| Ex. No. | IUPAC Name | Structure | Additive | MS |
|---|---|---|---|---|
| 169 | 2-(5-fluoropyridin-2-yl)-4-[4-fluoro-2-(2,2,2-trifluoroethoxy)phenyl]-2,3-dihydro-1H-pyrrolo[3,4-c]pyridine | | | 408.2 |
| 170 | 2-(4-fluorophenyl)-4-(3-methoxypyridin-4-yl)-2,3-dihydro-1H-pyrrolo[3,4-c]pyridine | | | 322.1 |
| 171 | 3-(2-{2-[6-(difluoromethoxy)pyridin-3-yl]-1-oxo-2,3-dihydro-1H-pyrrolo[3,4-c]pyridin-4-yl}-5-fluorophenoxy)-2,2-dimethylpropanenitrile | | | 469.2 |
| 172 | 2-(4-fluorophenyl)-4-(2-methoxyphenyl)-2,3-dihydro-1H-pyrrolo[3,4-c]pyridine | | | 321.2 |

TABLE 1-22-continued

| Ex. No. | IUPAC Name | Structure | Additive | MS |
|---|---|---|---|---|
| 173 | 7-(4-fluorophenyl)-5-[4-fluoro-2-(2,2,2-trifluoroethoxy)phenyl]-1-methyl-2,3,6,7-tetrahydropyrrolo[3,4-e][1,4]diazepin-8(1H)-one | | | 452.1 |
| 174 | 2-[6-(difluoromethoxy)pyridin-3-yl]-4-{4-fluoro-2-[2-(trifluoromethoxy)ethoxy]phenyl}-2,3-dihydro-1H-pyrrolo[3,4-c]pyridin-1-one | | | 500.0 |
| 175 | 2-[4-(difluoromethoxy)phenyl]-4-[3-methyl-5-(2,2,2-trifluoroethoxy)pyridin-4-yl]-2,3-dihydro-1H-pyrrolo[3,4-c]pyridin-1-one ditrifluoroacetate | | 2CF$_3$COOH | 466.1 |
| 176 | 5-[4-fluoro-2-(2,2,2-trifluoroethoxy)phenyl]-7-[4-(2,2,2-trifluoroethoxy)phenyl]-2,3,6,7-tetrahydropyrrolo[3,4-e][1,4]diazepin-8(1H)-one | | | 518.1 |

TABLE 1-23

| Ex. No. | IUPAC Name | Structure | Additive | MS |
|---|---|---|---|---|
| 177 | 4-[4-fluoro-2-(2,2,2-trifluoroethoxy)phenyl]-2-[6-(morpholin-4-yl)pyridin-3-yl]-2,3-dihydro-1H-pyrrolo[3,4-c]pyridin-1-one | | | 489.1 |
| 178 | 4-[4-fluoro-2-(2,2,2-trifluoroethoxy)phenyl]-2-[4-(3-methoxyoxetan-3-yl)phenyl]-2,3-dihydro-1H-pyrrolo[3,4-c]pyridin-1-one | | | 489.1 |
| 179 | 5-[4-fluoro-2-(2,2,2-trifluoroethoxy)phenyl]-1-methyl-7-[4-(2,2,2-trifluoroethoxy)phenyl]-2,3,6,7-tetrahydropyrrolo[3,4-e][1,4]diazepin-8(1H)-one | | | 532.1 |
| 180 | 4-[4-fluoro-2-(2,2,2-trifluoroethoxy)phenyl]-2-[4-(pyrrolidine-1-carbonyl)phenyl]-2,3-dihydro-1H-pyrrolo[3,4-c]pyridin-1-one | | | 500.1 |
| 181 | 2-[4-(3,3-difluoroazetidine-1-carbonyl)phenyl]-4-[4-fluoro-2-(2,2,2-trifluoroethoxy)phenyl]-2,3-dihydro-1H-pyrrolo[3,4-c]pyridin-1-one | | | 522.1 |

TABLE 1-23-continued

| Ex. No. | IUPAC Name | Structure | Additive | MS |
|---|---|---|---|---|
| 182 | 2-[4-(4,4-difluoropiperidine-1-carbonyl)phenyl]-4-[4-fluoro-2-(2,2,2-trifluoroethoxy)phenyl]-2,3-dihydro-1H-pyrrolo[3,4-c]pyridin-1-one | | | 550.1 |
| 183 | 5-(4-fluorophenyl)-1-(2-methoxyphenyl)-1,4,5,6-tetrahydropyrrolo[3,4-c]pyrazole | | | 310.1 |
| 184 | 2-[6-(2-hydroxypropan-2-yl)pyridin-3-yl]-4-[2-(2,2,2-trifluoroethoxy)phenyl]-2,3-dihydro-1H-pyrrolo[3,4-c]pyridin-1-one | | | 443.9 |

TABLE 1-24

| Ex. No. | IUPAC Name | Structure | Additive | MS |
|---|---|---|---|---|
| 185 | 6-(4-fluorophenyl)-4-[4-fluoro-2-(2,2,2-trifluoroethoxy)phenyl]-5,6-dihydro-7H-pyrrolo[3,4-d]pyrimidin-7-one | | | 421.9 |

TABLE 1-24-continued

| Ex. No. | IUPAC Name | Structure | Additive | MS |
|---|---|---|---|---|
| 186 | 1-(4,5-difluoro-2-methoxyphenyl)-5-(4-fluorophenyl)-5,6-dihydropyrrolo[3,4-d]imidazol-4(1H)-one | 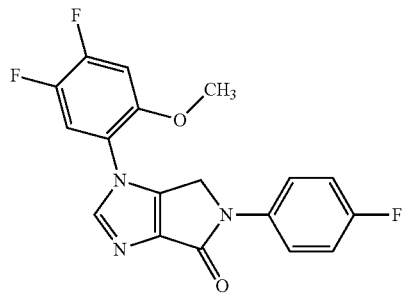 [SMILES: COc1cc(F)c(F)cc1-n1cnc2c1CN(c1ccc(F)cc1)C2=O] | | 360.0 |
| 187 | 2-(4-{[(3R)-oxolan-3-yl]oxy}phenyl)-4-[2-(2,2,2-trifluoroethoxy)phenyl]-2,3-dihydro-1H-pyrrolo[3,4-c]pyridin-1-one | 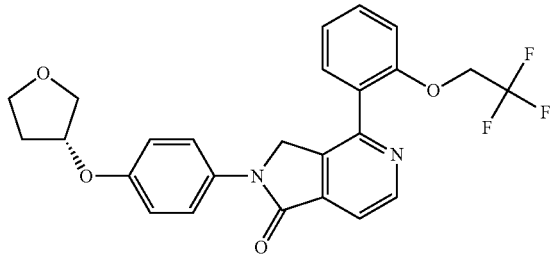 [SMILES: O=C1c2ccnc(-c3ccccc3OCC(F)(F)F)c2CN1c1ccc(O[C@@H]2CCOC2)cc1] | | 470.9 |
| 188 | 2-(4-{[(3S)-oxolan-3-yl]oxy}phenyl)-4-[2-(2,2,2-trifluoroethoxy)phenyl]-2,3-dihydro-1H-pyrrolo[3,4-c]pyridin-1-one | 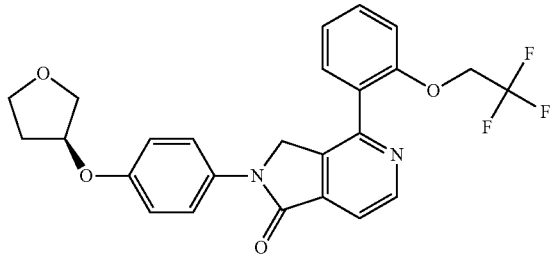 [SMILES: O=C1c2ccnc(-c3ccccc3OCC(F)(F)F)c2CN1c1ccc(O[C@H]2CCOC2)cc1] | | 470.9 |
| 189 | 4-[4-fluoro-2-(2,2,2-trifluoroethoxy)phenyl]-2-(4-propanoylphenyl)-2,3-dihydro-1H-pyrrolo[3,4-c]pyridin-1-one | 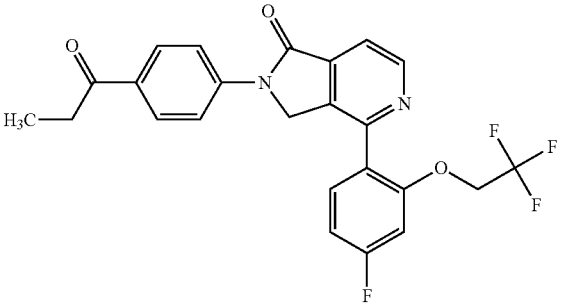 [SMILES: CCC(=O)c1ccc(N2Cc3c(ccnc3-c3ccc(F)cc3OCC(F)(F)F)C2=O)cc1] | | 458.9 |
| 190 | 2-(4-propanoylphenyl)-4-[2-(2,2,2-trifluoroethoxy)phenyl]-2,3-dihydro-1H-pyrrolo[3,4-c]pyridin-1-one | 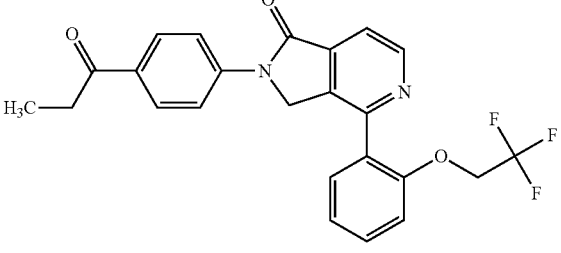 | | 440.9 |

TABLE 1-24-continued

| Ex. No. | IUPAC Name | Structure | Additive | MS |
|---|---|---|---|---|
| 191 | 2-[4-(1-hydroxycyclobutyl)phenyl]-4-[2-(2,2,2-trifluoroethoxy)phenyl]-2,3-dihydro-1H-pyrrolo[3,4-c]pyridin-1-one | | | 454.9 |
| 192 | 4-[4-fluoro-2-(2,2,2-trifluoroethoxy)phenyl]-6-[4-(2-hydroxypropan-2-yl)phenyl]-5,6-dihydro-7H-pyrrolo[3,4-d]pyrimidin-7-one | | | 461.9 |

TABLE 1-25

| Ex. No. | IUPAC Name | Structure | Additive | MS |
|---|---|---|---|---|
| 193 | 5-(4-fluorophenyl)-1-[2-(2,2,2-trifluoroethoxy)phenyl]-1,4,5,6-tetrahydropyrrolo[3,4-c]pyrazole | | | 378.0 |
| 194 | 2-{4-[(3-fluorooxetan-3-yl)methoxy]phenyl}-4-[4-fluoro-2-(2,2,2-trifluoroethoxy)phenyl]-2,3-dihydro-1H-pyrrolo[3,4-c]pyridin-1-one | | | 506.9 |
| 195 | 2-[4-(2-hydroxy-2-methylpropoxy)phenyl]-4-[2-(2,2,2-trifluoroethoxy)phenyl]-2,3-dihydro-1H-pyrrolo[3,4-c]pyridin-1-one | | | 472.9 |

TABLE 1-25-continued

| Ex. No. | IUPAC Name | Structure | Additive | MS |
|---|---|---|---|---|
| 196 | 2-[4-(difluoromethoxy)phenyl]-7-[4-fluoro-2-(2,2,2-trifluoroethoxy)phenyl]-5-methyl-1H-pyrrolo[3,4-c]pyridine-3,6(2H,5H)-dione | | | 498.8 |
| 197 | 4-[4-fluoro-2-(2,2,2-trifluoroethoxy)phenyl]-2-[6-(2-hydroxypropan-2-yl)pyridin-3-yl]-2,3-dihydro-1H-pyrrolo[3,4-c]pyridin-1-one | | | 461.9 |
| 198 | 2-[4-(difluoromethoxy)phenyl]-4-[3-methyl-5-(2,2,2-trifluoroethoxy)pyridin-4-yl]-2,3-dihydro-1H-pyrrolo[3,4-c]pyridin-1-one | | | 465.9 |
| 199 | 4-[4-fluoro-2-(2,2,2-trifluoroethoxy)phenyl]-2-[5-(3-hydroxyoxetan-3-yl)pyridin-2-yl]-2,3-dihydro-1H-pyrrolo[3,4-c]pyridin-1-one | | | 475.9 |
| 200 | 6-[4-(2-hydroxypropan-2-yl)phenyl]-4-[2-(2,2,2-trifluoroethoxy)phenyl]-5,6-dihydro-7H-pyrrolo[3,4-d]pyrimidin-7-one | | | 444.0 |

TABLE 1-26

| Ex. No. | IUPAC Name | Structure | Additive | MS |
|---|---|---|---|---|
| 201 | 2-[4-(difluoromethanesulfonyl)phenyl]-4-[2-methyl-6-(2,2,2-trifluoroethoxy)phenyl]-2,3-dihydro-1H-pyrrolo[3,4-c]pyridin-1-one | | | 512.8 |
| 202 | 2-{1-[(3-fluorooxetan-3-yl)methyl]-1H-pyrazol-4-yl}-4-[4-fluoro-2-(2,2,2-trifluoroethoxy)phenyl]-2,3-dihydro-1H-pyrrolo[3,4-c]pyridin-1-one | | | 480.9 |
| 203 | 2-[6-(1-hydroxycyclobutyl)pyridin-3-yl]-4-[2-(2,2,2-trifluoroethoxy)phenyl]-2,3-dihydro-1H-pyrrolo[3,4-c]pyridin-1-one | | | 455.9 |
| 204 | 2-{6-[(3-methyloxetan-3-yl)oxy]pyridin-3-yl}-4-[2-(2,2,2-trifluoroethoxy)phenyl]-2,3-dihydro-1H-pyrrolo[3,4-c]pyridin-1-one | | | 471.9 |
| 205 | 5-(4-fluorophenyl)-1-methyl-3-[2-(2,2,2-trifluoroethoxy)phenyl]-1,4,5,6-tetrahydropyrrolo[3,4-c]pyrazole | | | 392.0 |

TABLE 1-26-continued

| Ex. No. | IUPAC Name | Structure | Additive | MS |
|---|---|---|---|---|
| 206 | 5-(4-fluorophenyl)-2-methyl-3-[2-(2,2,2-trifluoroethoxy)phenyl]-2,4,5,6-tetrahydropyrrolo[3,4-c]pyrazole | | | 391.9 |
| 207 | 5-[4-(methanesulfonyl)phenyl]-1-[2-(2,2,2-trifluoroethoxy)phenyl]-1,4,5,6-tetrahydropyrrolo[3,4-c]pyrazole | | | 437.9 |
| 208 | 4-[4-fluoro-2-(2,2,2-trifluoroethoxy)phenyl]-2-[4-(4-hydroxyoxatan-4-yl)phenyl]-2,3-dihydro-1H-pyrrolo[3,4-c]pyridin-1-one | | | 502.9 |

TABLE 1-27

| Ex. No. | IUPAC Name | Structure | Additive | MS |
|---|---|---|---|---|
| 209 | 5-[4-fluoro-2-(2,2,2-trifluoroethoxy)phenyl]-7-[4-(2,2,2-trifluoroethoxy)phenyl]-2,3,6,7-tetrahydro-8H-pyrrolo[3,4-f][1,4]oxazepin-8-one | | | 519.1 |
| 210 | 2-[4-(1-hydroxycyclobutyl)phenyl]-4-[3-(2,2,2-trifluoroethoxy)pyridin-4-yl]-2,3-dihydro-1H-pyrrolo[3,4-c]pyridin-1-one | | | 456.1 |

TABLE 1-27-continued

| Ex. No. | IUPAC Name | Structure | Additive | MS |
|---|---|---|---|---|
| 211 | 4-[4-fluoro-2-(2,2,2-trifluoroethoxy)phenyl]-2-{4-[(2-oxopyrrolidin-1-yl)methyl]phenyl}-2,3-dihydro-1H-pyrrolo[3,4-c]pyridin-1-one | | | 500.1 |
| 212 | 2-[3-fluoro-4-(2-hydroxypropan-2-yl)phenyl]-4-[4-fluoro-2-(2,2,2-trifluoroethoxy)phenyl]-2,3-dihydro-1H-pyrrolo[3,4-c]pyridin-1-one | | | 479.1 |
| 213 | 2-{1-[(1-fluorocyclopropyl)methyl]-1H-pyrazol-4-yl}-4-[4-fluoro-2-(2,2,2-trifluoroethoxy)phenyl]-2,3-dihydro-1H-pyrrolo[3,4-c]pyridin-1-one | | | 465.1 |
| 214 | 2-[4-(3-fluorooxetan-3-yl)phenyl]-4-[2-(2,2,2-trifluoroethoxy)phenyl]-2,3-dihydro-1H-pyrrolo[3,4-c]pyridin-1-one | | | 459.1 |
| 215 | 5-[5-(methanesulfonyl)pyridin-2-yl]-1-[2-(2,2,2-trifluoroethoxy)phenyl]-1,4,5,6-tetrahydropyrrolo[3,4-c]pyrazole | | | 439.2 |

TABLE 1-27-continued

| Ex. No. | IUPAC Name | Structure | Additive | MS |
|---|---|---|---|---|
| 216 | 6-{1-[2-(2,2,2-trifluoroethoxy)phenyl]-4,6-dihydropyrrolo[3,4-c]pyrazol-5(1H)-yl}pyridine-3-carbonitrile | | | 386.2 |

TABLE 1-28

| Ex. No. | IUPAC Name | Structure | Additive | MS |
|---|---|---|---|---|
| 217 | N,N-dimethyl-4-{1-[2-(2,2,2-trifluoroethoxy)phenyl]-4,6-dihydropyrrolo[3,4-c]pyrazol-5(1H)-yl}benzamide | | | 431.2 |
| 218 | 4-(4-{4-[4-fluoro-2-(2,2,2-trifluoroethoxy)phenyl]-1-oxo-1,3-dihydro-2H-pyrrolo[3,4-c]pyridin-2-yl}phenyl)oxan-4-carbonitrile | | | 512.1 |
| 219 | 2-[3-fluoro-4-(4-hydroxyoxan-4-yl)phenyl]-4-[4-fluoro-2-(2,2,2-trifluoroethoxy)phenyl]-2,3-dihydro-1H-pyrrolo[3,4-c]pyridin-1-one | | | 521.1 |

TABLE 1-28-continued

| Ex. No. | IUPAC Name | Structure | Additive | MS |
|---|---|---|---|---|
| 220 | 2-[3-fluoro-4-(3-hydroxyoxetan-3-yl)phenyl]-4-[4-fluoro-2-(2,2,2-trifluoroethoxy)phenyl]-2,3-dihydro-1H-pyrrolo[3,4-c]pyridin-1-one | | | 493.1 |
| 221 | 2-[4-(1-{[tert-butyl(dimethyl)silyl]oxy}-cyclopropyl)phenyl]-4-[2-(2,2,2-trifluoroethoxy)phenyl]-2,3-dihydro-1H-pyrrolo[3,4-c]pyridin-1-one | | | 555.2 |
| 222 | 2-[4-(1-hydroxycyclopropyl)phenyl]-4-[2-(2,2,2-trifluoroethoxy)phenyl]-2,3-dihydro-1H-pyrrolo[3,4-c]pyridin-1-one | | | 441.1 |
| 223 | rac-2-[3-fluoro-4-(3-hydroxyoxolan-3-yl)phenyl]-4-[4-fluoro-2-(2,2,2-trifluoroethoxy)phenyl]-2,3-dihydro-1H-pyrrolo[3,4-c]pyridin-1-one | | | 507.1 |
| 224 | 2-[4-(1-{[tert-butyl(dimethyl)silyl]oxy}-cyclopropyl)phenyl]-4-[4-fluoro-2-(2,2,2-trifluoroethoxy)phenyl]-2,3-dihydro-1H-pyrrolo[3,4-c]pyridin-1-one | | | 573.1 |

TABLE 1-29

| Ex. No. | IUPAC Name | Structure | Additive | MS |
|---|---|---|---|---|
| 225 | 4-[4-fluoro-2-(2,2,2-trifluoroethoxy)phenyl]-2-[4-(1-hydroxycyclopropyl)phenyl]-2,3-dihydro-1H-pyrrolo[3,4-c]pyridin-1-one | | | 459.1 |
| 226 | 2-[4-(3-fluorooxetan-3-yl)phenyl]-4-[4-fluoro-2-(2,2,2-trifluoroethoxy)phenyl]-2,3-dihydro-1H-pyrrolo[3,4-c]pyridin-1-one | | | 477.1 |
| 227 | (cis or trans)-2-{4-[3-(benzyloxy)-1-hydroxycyclobutyl]phenyl}-4-[2-(2,2,2-trifluoroethoxy)phenyl]-2,3-dihydro-1H-pyrrolo[3,4-c]pyridin-1-one | | | 561.2 |
| 228 | (cis or trans)-2-[4-(1,3-dihydroxycyclobutyl)phenyl]-4-[2-(2,2,2-trifluoroethoxy)phenyl]-2,3-dihydro-1H-pyrrolo[3,4-c]pyridin-1-one | | | 471.1 |
| 229 | 2-[4-(2-hydroxy-2-methylpropyl)phenyl]-4-[2-(2,2,2-trifluoroethoxy)phenyl]-2,3-dihydro-1H-pyrrolo[3,4-c]pyridin-1-one | | | 457.2 |

TABLE 1-29-continued

| Ex. No. | IUPAC Name | Structure | Additive | MS |
|---|---|---|---|---|
| 230 | N,N-dimethyl-6-{1-[2-(2,2,2-trifluoroethoxy)phenyl]-4,6-dihydropyrrolo[3,4-c]pyrazol-5(1H)-yl}pyridine-3-carboxamide | | | 432.2 |
| 231 | 6-{1-[4-fluoro-2-(2,2,2-trifluoroethoxy)phenyl]-4,6-dihydropyrrolo[3,4-c]pyrazol-5(1H)-yl}-N,N-dimethylpyridine-3-carboxamide | | | 450.1 |
| 232 | rac-4-[4-fluoro-2-(2,2,2-trifluoroethoxy)phenyl]-2-{4-[1-(2-oxopyrrolidin-1-yl)ethyl]phenyl}-2,3-dihydro-1H-pyrrolo[3,4-c]pyridin-1-one | | | 514.1 |

TABLE 1-30

| Ex. No. | IUPAC Name | Structure | Additive | MS |
|---|---|---|---|---|
| 233 | 2-[6-(2-hydroxy-2-methylpropoxy)pyridin-3-yl]-4-[2-(2,2,2-trifluoroethoxy)phenyl]-2,3-dihydro-1H-pyrrolo[3,4-c]pyridin-1-one | | | 474.2 |

TABLE 1-30-continued

| Ex. No. | IUPAC Name | Structure | Additive | MS |
|---|---|---|---|---|
| 234 | 4-[4-fluoro-2-(2,2,2-trifluoroethoxy)phenyl]-2-[5-(2-hydroxypropan-2-yl)pyridin-2-yl]-2,3-dihydro-1H-pyrrolo[3,4-c]pyridin-1-one | | | 462.1 |
| 235 | rac-2-[3-fluoro-4-(3-hydroxyoxolan-3-yl)phenyl]-4-[4-fluoro-2-(2,2,2-trifluoroethoxy)phenyl]-2,3-dihydro-1H-pyrrolo[3,4-c]pyridin-1-one | | | 507.1 |
| 236 | 2-[4-(difluoromethoxy)phenyl]-5-methyl-7-[2-(2,2,2-trifluoroethoxy)phenyl]-1H-pyrrolo[3,4-c]pyridine-3,6(2H,5H)-dione | | | 481.1 |
| 237 | (4-{4-[4-fluoro-2-(2,2,2-trifluoroethoxy)phenyl]-1-oxo-1,3-dihydro-2H-pyrrolo[3,4-c]pyridin-2-yl}phenyl)acetonitrile | | | 442.1 |
| 238 | rac-2-[3-fluoro-4-(3-hydroxyoxolan-3-yl)phenyl]-4-[4-fluoro-2-(2,2,2-trifluoroethoxy)phenyl]-2,3-dihydro-1H-pyrrolo[3,4-c]pyridin-1-one | | | 507.1 |

TABLE 1-30-continued

| Ex. No. | IUPAC Name | Structure | Additive | MS |
|---|---|---|---|---|
| 239 | 2-(5-cyclopropyl-1-methyl-1H-pyrazol-3-yl)-4-[4-fluoro-2-(2,2,2-trifluoroethoxy)phenyl]-2,3-dihydro-1H-pyrrolo[3,4-c]pyridin-1-one | | | 447.1 |
| 240 | 4-[2-(2,2-difluoroethoxy)phenyl]-2-[4-(2-hydroxypropan-2-yl)phenyl]-2,3-dihydro-1H-pyrrolo[3,4-c]pyridin-1-one | | | 425.2 |

TABLE 1-31

| Ex. No. | IUPAC Name | Structure | Additive | MS |
|---|---|---|---|---|
| 241 | 4-[2-(2,2-difluoroethoxy)-4-fluorophenyl]-2-[4-(2-hydroxypropan-2-yl)phenyl]-2,3-dihydro-1H-pyrrolo[3,4-c]pyridin-1-one | | | 443.1 |
| 242 | 2-[4-(4-hydroxyoxan-4-yl)phenyl]-4-[2-(2,2,2-trifluoroethoxy)phenyl]-2,3-dihydro-1H-pyrrolo[3,4-c]pyridin-1-one | | | 485.1 |

TABLE 1-31-continued

| Ex. No. | IUPAC Name | Structure | Additive | MS |
|---|---|---|---|---|
| 243 | (R or S)-4-[4-fluoro-2-(2,2,2-trifluoroethoxy)phenyl]-2-[4-(3-hydroxyoxolan-3-yl)phenyl]-2,3-dihydro-1H-pyrrolo[3,4-c]pyridin-1-one | | | 489.1 |
| 244 | 1-(4-{4-[4-fluoro-2-(2,2,2-trifluoroethoxy)phenyl]-1-oxo-1,3-dihydro-2H-pyrrolo[3,4-c]pyridin-2-yl}phenyl)cyclopropane-1-carbonitrile | | | 468.1 |
| 245 | 4-[4-fluoro-2-(2,2,2-trifluoroethoxy)phenyl]-2-[4-(1,1,3,3-tetrafluoro-2-hydroxypropan-2-yl)phenyl]-2,3-dihydro-1H-pyrrolo[3,4-c]pyridin-1-one | | | 533.1 |
| 246 | 2-[4-(1,1,3,3-tetrafluoro-2-hydroxypropan-2-yl)phenyl]-4-[2-(2,2,2-trifluoroethoxy)phenyl]-2,3-dihydro-1H-pyrrolo[3,4-c]pyridin-1-one | | | 515.1 |
| 247 | 2-{1-[(3-fluorooxetan-3-yl)methyl]-1H-pyrazol-4-yl}-4-[2-(2,2,2-trifluoroethoxy)phenyl]-2,3-dihydro-1H-pyrrolo[3,4-c]pyridin-1-one | | | 463.1 |

TABLE 1-31-continued

| Ex. No. | IUPAC Name | Structure | Additive | MS |
|---|---|---|---|---|
| 248 | 2-{1-[(1-fluorocyclopropyl)methyl]-1H-pyrazol-4-yl}-4-[2-(2,2,2-trifluoroethoxy)phenyl]-2,3-dihydro-1H-pyrrolo[3,4-c]pyridin-1-one | | | 447.2 |

TABLE 1-32

| Ex. No. | IUPAC Name | Structure | Additive | MS |
|---|---|---|---|---|
| 249 | rac-4-[2-(2,2,2-trifluoroethoxy)phenyl]-2-[6-(2,2,2-trifluoro-1-hydroxyethyl)pyridin-3-yl]-2,3-dihydro-1H-pyrrolo[3,4-c]pyridin-1-one | | | 484.1 |
| 250 | rac-2-[4-(2,2-difluoro-1-hydroxyethyl)phenyl]-4-[4-fluoro-2-(2,2,2-trifluoroethoxy)phenyl]-2,3-dihydro-1H-pyrrolo[3,4-c]pyridin-1-one | | | 483.0 |
| 251 | rac-4-[4-fluoro-2-(2,2,2-trifluoroethoxy)phenyl]-2-[4-(2,2,2-trifluoro-1-hydroxyethyl)phenyl]-2,3-dihydro-1H-pyrrolo[3,4-c]pyridin-1-one | | | 501.1 |

TABLE 1-32-continued

| Ex. No. | IUPAC Name | Structure | Additive | MS |
|---|---|---|---|---|
| 252 | 2-[5-(3-hydroxyoxetan-3-yl)pyridin-2-yl]-4-[2-(2,2,2-trifluoroethoxy)phenyl]-2,3-dihydro-1H-pyrrolo[3,4-c]pyridin-1-one | | | 458.1 |
| 253 | 4-[4-fluoro-2-(2,2,2-trifluoroethoxy)phenyl]-2-[4-(1-hydroxy-2-methylpropan-2-yl)phenyl]-2,3-dihydro-1H-pyrrolo[3,4-c]pyridin-1-one | | | 475.2 |
| 254 | 4-[4-fluoro-2-(2,2,2-trifluoroethoxy)phenyl]-2-[4-(2-hydroxy-2-methylpropoxy)phenyl]-2,3-dihydro-1H-pyrrolo[3,4-c]pyridin-1-one | | | 491.1 |
| 255 | 4-[4-fluoro-2-(2,2,2-trifluoroethoxy)phenyl]-2-[5-(2-hydroxy-2-methylpropoxy)pyridin-2-yl]-2,3-dihydro-1H-pyrrolo[3,4-c]pyridin-1-one | | | 492.1 |
| 256 | rac-4-[4-fluoro-2-(2,2,2-trifluoroethoxy)phenyl]-2-[5-(3-hydroxyoxolan-3-yl)pyridin-2-yl]-2,3-dihydro-1H-pyrrolo[3,4-c]pyridin-1-one | | | 490.1 |

TABLE 1-33

| Ex. No. | IUPAC Name | Structure | Additive | MS |
|---|---|---|---|---|
| 257 | 4-[4-fluoro-2-(2,2,2-trifluoroethoxy)phenyl]-2-[5-(4-hydroxyoxan-4-yl)pyridin-2-yl]-2,3-dihydro-1H-pyrrolo[3,4-c]pyridin-1-one | | | 504.1 |
| 258 | 2-[4-(1-acetyl-3-hydroxyazetidin-3-yl)phenyl]-4-[2-(2,2,2-trifluoroethoxy)phenyl]-2,3-dihydro-1H-pyrrolo[3,4-c]pyridin-1-one | | | 498.1 |
| 259 | 2-[4-(3-hydroxyazetidin-3-yl)phenyl]-4-[2-(2,2,2-trifluoroethoxy)phenyl]-2,3-dihydro-1H-pyrrolo[3,4-c]pyridin-1-one | | | 456.1 |
| 260 | 2-[4-(1,1,1,3,3,3-hexafluoro-2-hydroxypropan-2-yl)phenyl]-4-[2-(2,2,2-trifluoroethoxy)phenyl]-2,3-dihydro-1H-pyrrolo[3,4-c]pyridin-1-one | | | 551.0 |
| 261 | 2-{4-[1-(cyclopropanecarbonyl)-3-hydroxyazetidin-3-yl]phenyl}-4-[2-(2,2,2-trifluoroethoxy)phenyl]-2,3-dihydro-1H-pyrrolo[3,4-c]pyridin-1-one | | | 524.1 |

TABLE 1-33-continued

| Ex. No. | IUPAC Name | Structure | Additive | MS |
|---|---|---|---|---|
| 262 | 2-[3-fluoro-4-(2-hydroxypropan-2-yl)phenyl]-4-[2-(2,2,2-trifluoroethoxy)phenyl]-2,3-dihydro-1H-pyrrolo[3,4-c]pyridin-1-one | | | 461.1 |
| 263 | (R or S)-4-[4-fluoro-2-(2,2,2-trifluoroethoxy)phenyl]-2-[4-(3-hydroxyoxolan-3-yl)phenyl]-2,3-dihydro-1H-pyrrolo[3,4-c]pyridin-1-one | | | 489.1 |
| 264 | (R or S)-4-[4-fluoro-2-(2,2,2-trifluoroethoxy)phenyl]-2-[4-(3-hydroxyoxolan-3-yl)phenyl]-2,3-dihydro-1H-pyrrolo[3,4-c]pyridin-1-one | | | 489.1 |

TABLE 1-34

| Ex. No. | IUPAC Name | Structure | Additive | MS |
|---|---|---|---|---|
| 265 | 2-[5-(1-hydroxycyclopropyl)pyridin-2-yl]-4-[2-(2,2,2-trifluoroethoxy)phenyl]-2,3-dihydro-1H-pyrrolo[3,4-c]pyridin-1-one | | | 442.1 |

TABLE 1-34-continued

| Ex. No. | IUPAC Name | Structure | Additive | MS |
|---|---|---|---|---|
| 266 | 2-[5-(1-{[tert-butyl(dimethyl)silyl]oxy}-cyclopropyl)pyridin-2-yl]-4-[2-(2,2,2-trifluoroethoxy)phenyl]-2,3-dihydro-1H-pyrrolo[3,4-c]pyridin-1-one | | | 556.1 |
| 267 | 4-[2-(2,2-difluoroethoxy)-4-fluorophenyl]-2-[4-(1-hydroxycyclobutyl)phenyl]-2,3-dihydro-1H-pyrrolo[3,4-c]pyridin-1-one | | | 455.1 |
| 268 | 2-[5-(methanesulfonyl)pyridin-2-yl]-4-[2-(2,2,2-trifluoroethoxy)phenyl]-2,3-dihydro-1H-pyrrolo[3,4-c]pyridin-1-one | | | 464.1 |
| 269 | 2-(4-{4-[4-fluoro-2-(2,2,2-trifluoroethoxy)phenyl]-1-oxo-1,3-dihydro-2H-pyrrolo[3,4-c]pyridin-2-yl}phenyl)-2-methylpropanenitrile | | | 470.1 |
| 270 | 4-[4-fluoro-2-(2,2,2-trifluoroethoxy)phenyl]-2-[4-(1,1,1,3,3,3-hexafluoro-2-hydroxypropan-2-yl)phenyl]-2,3-dihydro-1H-pyrrolo[3,4-c]pyridin-1-one | | | 569.0 |

TABLE 1-34-continued

| Ex. No. | IUPAC Name | Structure | Additive | MS |
|---|---|---|---|---|
| 271 | 1-(4-{1-oxo-4-[2-(2,2,2-trifluoroethoxy)phenyl]-1,3-dihydro-2H-pyrrolo[3,4-c]pyridin-2-yl}phenyl)cyclopropane-1-carbonitrile | | | 450.1 |
| 272 | 2-[3-fluoro-4-(2-hydroxypropan-2-yl)phenyl]-4-[3-(2,2,2-trifluoroethoxy)pyridin-4-yl]-2,3-dihydro-1H-pyrrolo[3,4-c]pyridin-1-one | | | 462.1 |

TABLE 1-35

| Ex. No. | IUPAC Name | Structure | Additive | MS |
|---|---|---|---|---|
| 273 | 2-[5-(2-hydroxypropan-2-yl)pyridin-2-yl]-4-[2-(2,2,2-trifluoroethoxy)phenyl]-2,3-dihydro-1H-pyrrolo[3,4-c]pyridin-1-one | | | 444.1 |
| 274 | 4-[2-(2,2-difluoroethoxy)-4-fluorophenyl]-2-[3-fluoro-4-(2-hydroxypropan-2-yl)phenyl]-2,3-dihydro-1H-pyrrolo[3,4-c]pyridin-1-one | | | 461.1 |

| Ex. No. | IUPAC Name | Structure | Additive | MS |
|---|---|---|---|---|
| 275 | 2-[5-(2-hydroxypropan-2-yl)pyridin-2-yl]-4-[3-(2,2,2-trifluoroethoxy)pyridin-4-yl]-2,3-dihydro-1H-pyrrolo[3,4-c]pyridin-1-one | | | 445.2 |
| 276 | (R or S)-4-[2-(2,2,2-trifluoroethoxy)phenyl]-2-[6-(2,2,2-trifluoro-1-hydroxyethyl)pyridin-3-yl]-2,3-dihydro-1H-pyrrolo[3,4-c]pyridin-1-one | | | 484.1 |
| 277 | (R or S)-4-[2-(2,2,2-trifluoroethoxy)phenyl]-2-[6-(2,2,2-trifluoro-1-hydroxyethyl)pyridin-3-yl]-2,3-dihydro-1H-pyrrolo[3,4-c]pyridin-1-one | | | 484.0 |
| 278 | (R or S)-2-[4-(2,2-difluoro-1-hydroxyethyl)phenyl]-4-[4-fluoro-2-(2,2,2-trifluoroethoxy)phenyl]-2,3-dihydro-1H-pyrrolo[3,4-c]pyridin-1-one | | | 483.1 |
| 279 | (R or S)-2-[4-(2,2-difluoro-1-hydroxyethyl)phenyl]-4-[4-fluoro-2-(2,2,2-trifluoroethoxy)phenyl]-2,3-dihydro-1H-pyrrolo[3,4-c]pyridin-1-one | | | 483.0 |

TABLE 1-35-continued

| Ex. No. | IUPAC Name | Structure | Additive | MS |
|---|---|---|---|---|
| 280 | rac-2-[4-(1-hydroxyethyl)phenyl]-4-[2-(2,2,2-trifluoroethoxy)phenyl]-2,3-dihydro-1H-pyrrolo[3,4-c]pyridin-1-one | | | 429.1 |

TABLE 1-36

| Ex. No. | IUPAC Name | Structure | Additive | MS |
|---|---|---|---|---|
| 281 | 3-{4-[4-fluoro-2-(2,2,2-trifluoroethoxy)phenyl]-1-oxo-1,3-dihydro-2H-pyrrolo[3,4-c]pyridin-2-yl}-N,N,1-trimethyl-1H-pyrazole-5-carboxamide | | | 478.1 |
| 282 | rac-4-[4-fluoro-2-(2,2,2-trifluoroethoxy)phenyl]-2-[4-(1-hydroxyethyl)phenyl]-2,3-dihydro-1H-pyrrolo[3,4-c]pyridin-1-one | | | 447.1 |
| 283 | 2-[4-(1,1-difluoro-2-hydroxy-2-methylpropyl)phenyl]-4-[3-(2,2,2-trifluoroethoxy)pyridin-4-yl]-2,3-dihydro-1H-pyrrolo[3,4-c]pyridin-1-one | | | 494.1 |

TABLE 1-36-continued

| Ex. No. | IUPAC Name | Structure | Additive | MS |
|---|---|---|---|---|
| 284 | 2-[4-(1,1,3,3-tetrafluoro-2-hydroxypropan-2-yl)phenyl]-4-[3-(2,2,2-trifluoroethoxy)pyridin-4-yl]-2,3-dihydro-1H-pyrrolo[3,4-c]pyridin-1-one | | | 516.1 |
| 285 | (R or S)-4-[4-fluoro-2-(2,2,2-trifluoroethoxy)phenyl]-2-[4-(2,2,2-trifluoro-1-hydroxyethyl)phenyl]-2,3-dihydro-1H-pyrrolo[3,4-c]pyridin-1-one | | | 501.0 |
| 286 | (R or S)-4-[4-fluoro-2-(2,2,2-trifluoroethoxy)phenyl]-2-[4-(2,2,2-trifluoro-1-hydroxyethyl)phenyl]-2,3-dihydro-1H-pyrrolo[3,4-c]pyridin-1-one | | | 501.0 |
| 287 | 2-[4-(3,3-difluoro-1-hydroxycyclobutyl)-3-fluorophenyl]-4-[3-(2,2,2-trifluoroethoxy)pyridin-4-yl]-2,3-dihydro-1H-pyrrolo[3,4-c]pyridin-1-one | | | 510.0 |
| 288 | 4-[2-(2,2-difluoroethoxy)phenyl]-2-[5-(2-hydroxypropan-2-yl)pyridin-2-yl]-2,3-dihydro-1H-pyrrolo[3,4-c]pyridin-1-one | | | 426.2 |

TABLE 1-37

| Ex. No. | IUPAC Name | Structure | Additive | MS |
|---|---|---|---|---|
| 289 | 4-[2-(2,2-difluoroethoxy)-4-fluorophenyl]-2-[5-(2-hydroxypropan-2-yl)pyridin-2-yl]-2,3-dihydro-1H-pyrrolo[3,4-c]pyridin-1-one | | | 444.2 |
| 290 | 4-[2-(2,2-difluoroethoxy)phenyl]-2-[4-(1-hydroxycyclobutyl)phenyl]-2,3-dihydro-1H-pyrrolo[3,4-c]pyridin-1-one | | | 437.1 |
| 291 | 2-[6-(1,1-difluoro-2-hydroxy-2-methylpropyl)pyridin-3-yl]-4-[4-fluoro-2-(2,2,2-trifluoroethoxy)phenyl]-2,3-dihydro-1H-pyrrolo[3,4-c]pyridin-1-one | | | 512.1 |
| 292 | rac-2-[3-fluoro-4-(1-hydroxyethyl)phenyl]-4-[4-fluoro-2-(2,2,2-trifluoroethoxy)phenyl]-2,3-dihydro-1H-pyrrolo[3,4-c]pyridin-1-one | | | 465.1 |
| 293 | rac-4-[4-fluoro-2-(2,2,2-trifluoroethoxy)phenyl]-2-[3-fluoro-4-(2,2,2-trifluoro-1-hydroxyethyl)phenyl]-2,3-dihydro-1H-pyrrolo[3,4-c]pyridin-1-one | | | 519.0 |

TABLE 1-37-continued

| Ex. No. | IUPAC Name | Structure | Additive | MS |
|---|---|---|---|---|
| 294 | 2-[4-(3-fluorooxetan-3-yl)phenyl]-4-[3-(2,2,2-trifluoroethoxy)pyridin-4-yl]-2,3-dihydro-1H-pyrrolo[3,4-c]pyridin-1-one | | | 460.1 |
| 295 | rac-4-[2-(2,2,2-trifluoroethoxy)phenyl]-2-[4-(1,1,1-trifluoro-2-hydroxypropan-2-yl)phenyl]-2,3-dihydro-1H-pyrrolo[3,4-c]pyridin-1-one | | | 497.1 |
| 296 | rac-2-[4-(1,1-difluoro-2-hydroxypropan-2-yl)phenyl]-4-[4-fluoro-2-(2,2,2-trifluoroethoxy)phenyl]-2,3-dihydro-1H-pyrrolo[3,4-c]pyridin-1-one | | | 497.0 |

TABLE 1-38

| Ex. No. | IUPAC Name | Structure | Additive | MS |
|---|---|---|---|---|
| 297 | 2-[5-(2-hydroxy-2-methylpropoxy)pyridin-2-yl]-4-[2-(2,2,2-trifluoroethoxy)phenyl]-2,3-dihydro-1H-pyrrolo[3,4-c]pyridin-1-one | | | 474.2 |
| 298 | 2-[5-(2-hydroxy-2-methylpropoxy)pyrazin-2-yl]-4-[2-(2,2,2-trifluoroethoxy)phenyl]-2,3-dihydro-1H-pyrrolo[3,4-c]pyridin-1-one | | | 475.1 |

TABLE 1-38-continued

| Ex. No. | IUPAC Name | Structure | Additive | MS |
|---|---|---|---|---|
| 299 | 4-[4-fluoro-2-(2,2,2-trifluoroethoxy)phenyl]-2-[5-(2-hydroxy-2-methylpropoxy)pyrazin-2-yl]-2,3-dihydro-1H-pyrrolo[3,4-c]pyridin-1-one | | | 493.2 |
| 300 | (R or S)-4-[4-fluoro-2-(2,2,2-trifluoroethoxy)phenyl]-2-[5-(3-hydroxyoxolan-3-yl)pyridin-2-yl]-2,3-dihydro-1H-pyrrolo[3,4-c]pyridin-1-one | | | 490.1 |
| 301 | (R or S)-4-[4-fluoro-2-(2,2,2-trifluoroethoxy)phenyl]-2-[5-(3-hydroxyoxolan-3-yl)pyridin-2-yl]-2,3-dihydro-1H-pyrrolo[3,4-c]pyridin-1-one | | | 490.1 |
| 302 | 1-(4-{4-[2-(2,2-difluoroethoxy)-4-fluorophenyl]-1-oxo-1,3-dihydro-2H-pyrrolo[3,4-c]pyridin-2-yl}phenyl)cyclopropane-1-carbonitrile | | | 450.1 |
| 303 | 2-(4-{4-[2-(2,2-difluoroethoxy)-4-fluorophenyl]-1-oxo-1,3-dihydro-2H-pyrrolo[3,4-c]pyridin-2-yl}phenyl)-2-methylpropanenitrile | | | 452.1 |

TABLE 1-38-continued

| Ex. No. | IUPAC Name | Structure | Additive | MS |
|---|---|---|---|---|
| 304 | 1-(4-{4-[2-(2,2-difluoroethoxy)phenyl]-1-oxo-1,3-dihydro-2H-pyrrolo[3,4-c]pyridin-2-yl}phenyl)cyclopropane-1-carbonitrile | | | 432.1 |

TABLE 1-39

| Ex. No. | IUPAC Name | Structure | Additive | MS |
|---|---|---|---|---|
| 305 | 4-[4-fluoro-2-(2,2,2-trifluoroethoxy)phenyl]-2-[4-(2-hydroxy-2-methylpropyl)phenyl]-2,3-dihydro-1H-pyrrolo[3,4-c]pyridin-1-one | | | 475.1 |
| 306 | 4-[2-(2,2-difluoroethoxy)phenyl]-2-[5-(2-hydroxy-2-methylpropoxy)pyridin-2-yl]-2,3-dihydro-1H-pyrrolo[3,4-c]pyridin-1-one | | | 456.1 |
| 307 | 2-[4-(2-hydroxy-2-methylpropyl)phenyl]-4-[3-(2,2,2-trifluoroethoxy)pyridin-4-yl]-2,3-dihydro-1H-pyrrolo[3,4-c]pyridin-1-one | | | 458.1 |
| 308 | rac-2-[4-(1,1-difluoro-2-hydroxypropan-2-yl)phenyl]-4-[2-(2,2,2-trifluoroethoxy)phenyl]-2,3-dihydro-1H-pyrrolo[3,4-c]pyridin-1-one | | | 479.2 |

TABLE 1-39-continued

| Ex. No. | IUPAC Name | Structure | Additive | MS |
|---|---|---|---|---|
| 309 | 2-[5-(difluoromethoxy)-1-methyl-1H-pyrazol-3-yl]-4-[4-fluoro-2-(2,2,2-trifluoroethoxy)phenyl]-2,3-dihydro-1H-pyrrolo[3,4-c]pyridin-1-one | | | 473.1 |
| 310 | 6-[5-(difluoromethoxy)pyridin-2-yl]-1-[4-fluoro-2-(2,2,2-trifluoroethoxy)phenyl]-6,7-dihydro-1H-pyrrolo[3,4-b]pyridine-2,5-dione | | | 486.0 |
| 311 | (R or S)-2-[4-(1,1-difluoro-2-hydroxypropan-2-yl)phenyl]-4-[4-fluoro-2-(2,2,2-trifluoroethoxy)phenyl]-2,3-dihydro-1H-pyrrolo[3,4-c]pyridin-1-one | | | 497.1 |
| 312 | rac-4-[4-fluoro-2-(2,2,2-trifluoroethoxy)phenyl]-2-[4-(1,1,1-trifluoro-2-hydroxypropan-2-yl)phenyl]-2,3-dihydro-1H-pyrrolo[3,4-c]pyridin-1-one | | | 515.1 |

TABLE 1-40

| Ex. No. | IUPAC Name | Structure | Additive | MS |
|---|---|---|---|---|
| 313 | (R or S)-2-[4-(1,1-difluoro-2-hydroxypropan-2-yl)phenyl]-4-[4-fluoro-2-(2,2,2-trifluoroethoxy)phenyl]-2,3-dihydro-1H-pyrrolo[3,4-c]pyridin-1-one | | | 497.1 |
| 314 | (R or S)-2-[4-(1,1-difluoro-2-hydroxypropan-2-yl)phenyl]-4-[2-(2,2,2-trifluoroethoxy)phenyl]-2,3-dihydro-1H-pyrrolo[3,4-c]pyridin-1-one | | | 479.1 |
| 315 | (R os S)-2-[4-(1,1-difluoro-2-hydroxypropan-2-yl)phenyl]-4-[2-(2,2,2-trifluoroethoxy)phenyl]-2,3-dihydro-1H-pyrrolo[3,4-c]pyridin-1-one | | | 479.1 |
| 316 | 2-[6-(3,3-difluoro-1-hydroxycyclobutyl)pyridin-3-yl]-4-[2-(2,2,2-trifluoroethoxy)phenyl]-2,3-dihydro-1H-pyrrolo[3,4-c]pyridin-1-one | | | 492.1 |
| 317 | rac-2-{6-[cyclopropyl(hydroxy)methyl]pyridin-3-yl}-4-[2-(2,2,2-trifluoroethoxy)phenyl]-2,3-dihydro-1H-pyrrolo[3,4-c]pyridin-1-one | | | 456.1 |

TABLE 1-40-continued

| Ex. No. | IUPAC Name | Structure | Additive | MS |
|---|---|---|---|---|
| 318 | 3-{4-[4-fluoro-2-(2,2,2-trifluoroethoxy)phenyl]-1-oxo-1,3-dihydro-2H-pyrrolo[3,4-c]pyridin-2-yl}-1-methyl-1H-pyrazole-5-carbonitrile | | | 432.1 |
| 319 | 2-(4-acetylphenyl)-4-[2-fluoro-6-(2,2,2-trifluoroethoxy)phenyl]-2,3-dihydro-1H-pyrrolo[3,4-c]pyridin-1-one | | | 445.1 |
| 320 | 4-[2,4-difluoro-6-(2,2,2-trifluoroethoxy)phenyl]-2-[4-(2-hydroxypropan-2-yl)-phenyl]-2,3-dihydro-1H-pyrrolo[3,4-c]pyridin-1-one | | | 479.1 |

TABLE 1-41

| Ex. No. | IUPAC Name | Structure | Additive | MS |
|---|---|---|---|---|
| 321 | 2-[4-(2-hydroxypropan-2-yl)phenyl]-5-methyl-7-[2-(2,2,2-trifluoroethoxy)phenyl]-1H-pyrrolo[3,4-c]pyridin-3,6(2H,5H)-dione | | | 473.2 |

TABLE 1-41-continued

| Ex. No. | IUPAC Name | Structure | Additive | MS |
|---|---|---|---|---|
| 322 | 4-[4,5-difluoro-2-(2,2,2-trifluoroethoxy)phenyl]-2-[4-(2-hydroxypropan-2-yl)phenyl]-2,3-dihydro-1H-pyrrolo[3,4-c]pyridin-1-one | | | 479.1 |
| 323 | 4-[5-fluoro-2-(2,2,2-trifluoroethoxy)phenyl]-2-[4-(2-hydroxypropan-2-yl)phenyl]-2,3-dihydro-1H-pyrrolo[3,4-c]pyridin-1-one | | | 461.1 |
| 324 | 2-[4-(2-hydroxypropan-2-yl)phenyl]-6-methyl-4-[2-(2,2,2-trifluoroethoxy)phenyl]-2,3-dihydro-1H-pyrrolo[3,4-c]pyridin-1-one | | | 457.2 |
| 325 | 4-[2-(2,2-difluoroethoxy)phenyl]-2-[4-(2-hydroxypropan-2-yl)phenyl]-6-methyl-2,3-dihydro-1H-pyrrolo[3,4-c]pyridin-1-one | | | 439.1 |
| 326 | 2-[6-(2-hydroxypropan-2-yl)pyridin-3-yl]-6-methyl-4-[2-(2,2,2-trifluoroethoxy)phenyl]-2,3-dihydro-1H-pyrrolo[3,4-c]pyridin-1-one | | | 458.2 |

TABLE 1-41-continued

| Ex. No. | IUPAC Name | Structure | Additive | MS |
|---|---|---|---|---|
| 327 | 6-(difluoromethyl)-2-[4-(2-hydroxypropan-2-yl)phenyl]-4-[2-(2,2,2-trifluoroethoxy)phenyl]-2,3-dihydro-1H-pyrrolo[3,4-c]pyridin-1-one | | | 493.1 |
| 328 | 6-(difluoromethyl)-2-[6-(2-hydroxypropan-2-yl)pyridin-3-yl]-4-[2-(2,2,2-trifluoroethoxy)phenyl]-2,3-dihydro-1H-pyrrolo[3,4-c]pyridin-1-one | | | 494.2 |

TABLE 1-42

| Ex. No. | IUPAC Name | Structure | Additive | MS |
|---|---|---|---|---|
| 329 | rac-2-{4-[cyclopropyl(hydroxy)methyl]phenyl}-4-[2-(2,2,2-trifluoroethoxy)phenyl]-2,3-dihydro-1H-pyrrolo[3,4-c]pyridin-1-one | | | 455.2 |
| 330 | 2-[4-(2-hydroxypropan-2-yl)phenyl]-6-(methoxymethyl)-4-[2-(2,2,2-trifluoroethoxy)phenyl]-2,3-dihydro-1H-pyrrolo[3,4-c]pyridin-1-one | | | 487.2 |
| 331 | methyl 4-{(3S)-3-methyl-8-oxo-5-[2-(2,2,2-trifluoroethoxy)phenyl]-2,3,6,8-tetrahydro-7H-pyrrolo[3,4-f][1,4]oxazepin-7-yl}benzoate | | | 475.2 |

TABLE 1-42-continued

| Ex. No. | IUPAC Name | Structure | Additive | MS |
|---|---|---|---|---|
| 332 | rac-methyl 4-{2-methyl-8-oxo-5-[2-(2,2,2-trifluoroethoxy)phenyl]-2,3,6,8-tetrahydro-7H-pyrrolo[3,4-f][1,4]oxazepin-7-yl}benzoate | | | 475.2 |
| 333 | methyl 4-{(3R)-3-methyl-8-oxo-5-[2-(2,2,2-trifluoroethoxy)phenyl]-2,3,6,8-tetrahydro-7H-pyrrolo[3,4-f][1,4]oxazepin-7-yl}benzoate | | | 475.2 |
| 334 | (3S)-7-(4-acetylphenyl)-3-methyl-5-[2-(2,2,2-trifluoroethoxy)phenyl]-2,3,6,7-tetrahydro-8H-pyrrolo[3,4-f][1,4]oxazepin-8-one | | | 459.2 |
| 335 | methyl 4-{8-oxo-5-[2-(2,2,2-trifluoroethoxy)phenyl]-2,3,6,8-tetrahydro-7H-pyrrolo[3,4-f][1,4]oxazepin-7-yl}benzoate | | | 461.1 |
| 336 | 3-bromo-6-[4-(2-hydroxypropan-2-yl)phenyl]-1-[2-(2,2,2-trifluoroethoxy)phenyl]-6,7-dihydro-1H-pyrrolo[3,4-b]pyridine-2,5-dione | | | 537.0 |

TABLE 1-43

| Ex. No. | IUPAC Name | Structure | Additive | MS |
|---|---|---|---|---|
| 337 | 6-[4-(2-hydroxypropan-2-yl)phenyl]-3-methyl-1-[2-(2,2,2-trifluoroethoxy)phenyl]-6,7-dihydro-1H-pyrrolo[3,4-b]pyridine-2,5-dione | | | 473.1 |
| 338 | 2-[4-(1,1-difluoro-2-hydroxyethyl)phenyl]-6-methyl-4-[2-(2,2,2-trifluoroethoxy)phenyl]-2,3-dihydro-1H-pyrrolo[3,4-c]pyridin-1-one | | | 479.2 |
| 339 | 4-[2-(2,2-difluoroethoxy)phenyl]-2-[4-(1,1-difluoro-2-hydroxy-2-methylpropyl)phenyl]-2,3-dihydro-1H-pyrrolo[3,4-c]pyridin-1-one | | | 475.2 |
| 340 | 2-[4-(1,1-difluoro-2-hydroxy-2-methylpropyl)phenyl]-4-[2-(2,2,2-trifluoroethoxy)phenyl]-2,3-dihydro-1H-pyrrolo[3,4-c]pyridin-1-one | | | 493.1 |
| 341 | rac-6-(1-hydroxyethyl)-4-[2-(2,2,2-trifluoroethoxy)phenyl]-2-[4-(2,2,2-trifluoroethoxy)phenyl]-2,3-dihydro-1H-pyrrolo[3,4-c]pyridin-1-one | | | 527.1 |

TABLE 1-43-continued

| Ex. No. | IUPAC Name | Structure | Additive | MS |
|---|---|---|---|---|
| 342 | 2-[4-(1,1-difluoro-2-hydroxy-2-methylpropyl)phenyl]-6-methyl-4-[2-(2,2,2-trifluoroethoxy)phenyl]-2,3-dihydro-1H-pyrrolo[3,4-c]pyridin-1-one | | | 507.2 |
| 343 | 6-(2-hydroxypropan-2-yl)-4-[2-(2,2,2-trifluoroethoxy)phenyl]-2-[4-(2,2,2-trifluoroethoxy)phenyl]-2,3-dihydro-1H-pyrrolo[3,4-c]pyridin-1-one | | | 541.1 |
| 344 | 2-[4-(difluoromethoxy)phenyl]-4-[4-(2-hydroxypropan-2-yl)-2-(2,2,2-trifluoroethoxy)phenyl]-6-methyl-2,3-dihydro-1H-pyrrolo[3,4-c]pyridine-1-one | | | 523.1 |

TABLE 1-44

| Ex. No. | IUPAC Name | Structure | Additive | MS |
|---|---|---|---|---|
| 345 | 4-[4-(2-hydroxypropan-2-yl)-2-(2,2,2-trifluoroethoxy)phenyl]-6-methyl-2-[4-(2,2,2-trifluoroethoxy)phenyl]-2,3-dihydro-1H-pyrrolo[3,4-c]pyridin-1-one | | | 555.2 |

TABLE 1-44-continued

| Ex. No. | IUPAC Name | Structure | Additive | MS |
|---|---|---|---|---|
| 346 | 2-[4-(1-hydroxycyclobutyl)phenyl]-4-[4-(2-hydroxypropan-2-yl)-2-(2,2,2-trifluoroethoxy)phenyl]-6-methyl-2,3-dihydro-1H-pyrrolo[3,4-c]pyridin-1-one | | | 527.2 |
| 347 | 2-(4-hydroxyphenyl)-4-[2-(2,2,2-trifluoroethoxy)phenyl]-2,3-dihydro-1H-pyrrolo[3,4-c]pyridin-1-one | | | 401.1 |
| 348 | 2-[4-(4-hydroxyoxan-4-yl)phenyl]-6-methyl-4-[2-(2,2,2-trifluoroethoxy)phenyl]-2,3-dihydro-1H-pyrrolo[3,4-c]pyridin-1-one | | | 499.0 |
| 349 | 2-(4-{2-[3-(but-3-yn-1-yl)-3H-dihydro-3-yl]ethoxy}phenyl)-4-[2-(2,2,2-trifluoroethoxy)phenyl]-2,3-dihydro-1H-pyrrolo[3,4-c]pyridin-1-one | | | 520.9 |
| 350 | 2-[4-(2-hydroxy-2-methylpropoxy)phenyl]-5-methyl-7-[2-(2,2,2-trifluoroethoxy)phenyl]-1H-pyrrolo[3,4-c]pyridine-3,6(2H,5H)-dione | | | 503.0 |

TABLE 1-44-continued

| Ex. No. | IUPAC Name | Structure | Additive | MS |
|---|---|---|---|---|
| 351 | 4-[4-fluoro-2-(2,2,2-trifluoroethoxy)phenyl]-2-[4-(2-hydroxypropan-2-yl)phenyl]-6-methyl-2,3-dihydro-1H-pyrrolo[3,4-c]pyridin-1-one | | | 475.2 |
| 352 | 4-[4-fluoro-2-(2,2,2-trifluoroethoxy)phenyl]-2-[4-(4-hydroxyoxan-4-yl)phenyl]-6-methyl-2,3-dihydro-1H-pyrrolo[3,4-c]pyridin-1-one | | | 517.2 |

TABLE 1-45

| Ex. No. | IUPAC Name | Structure | Additive | MS |
|---|---|---|---|---|
| 353 | 4-[2-fluoro-6-(2,2,2-trifluoroethoxy)phenyl]-2-[4-(2-hydroxypropan-2-yl)phenyl]-6-methyl-2,3-dihydro-1H-pyrrolo[3,4-c]pyridin-1-one | | | 475.1 |
| 354 | 4-[2-(2,2-difluoroethoxy)phenyl]-6-(2-hydroxypropan-2-yl)-2-[4-(2,2,2-trifluoroethoxy)phenyl]-2,3-dihydro-1H-pyrrolo[3,4-c]pyridin-1-one | | | 522.9 |

TABLE 1-45-continued

| Ex. No. | IUPAC Name | Structure | Additive | MS |
|---|---|---|---|---|
| 355 | 4-[2-(2,2-difluoroethoxy) phenyl]-2-[4-(difluoromethoxy) phenyl]-6-(2-hydroxypropan-2-yl)-2,3-dihydro-1H-pyrrolo[3,4-c]pyridin-1-one | | | 490.9 |
| 356 | 4-[2-(2,2-difluoroethoxy) phenyl]-2-(4-fluorophenyl)-6-(2-hydroxypropan-2-yl)-2,3-dihydro-1H-pyrrolo[3,4-c]pyridin-1-one | | | 443.0 |
| 357 | 4-[2-(2,2-difluoroethoxy) phenyl]-2-[4-(difluoromethyl) phenyl]-6-(2-hydroxypropan-2-yl)-2,3-dihydro-1H-pyrrolo[3,4-c]pyridin-1-one | | | 474.9 |
| 358 | rac-4-[2-(2,2-difluoroethoxy)phenyl]-2-[4-(difluoromethoxy) phenyl]-6-(1-hydroxyethyl)-2,3-dihydro-1H-pyrrolo[3,4-c]pyridin-1-one | | | 476.9 |
| 359 | 4-[2-(2,2-difluoroethoxy) phenyl]-6-(2-hydroxypropan-2-yl)-2-[4-(2-hydroxypropan-2-yl)phenyl]-2,3-dihydro-1H-pyrrolo[3,4-c]pyridin-1-one | | | 483.2 |

TABLE 1-45-continued

| Ex. No. | IUPAC Name | Structure | Additive | MS |
|---|---|---|---|---|
| 360 | 2-(4-{4-[2-(2,2-difluoroethoxy)phenyl]-6-(2-hydroxypropan-2-yl)-1-oxo-1,3-dihydro-2H-pyrrolo[3,4-c]pyridin-2-yl}phenyl)-2-methylpropanenitrile | | | 492.2 |

TABLE 1-46

| Ex. No. | IUPAC Name | Structure | Additive | MS |
|---|---|---|---|---|
| 361 | 4-[2-(2,2-difluoroethoxy)phenyl]-6-(difluoromethyl)-2-[4-(2-hydroxypropan-2-yl)phenyl]-2,3-dihydro-1H-pyrrolo[3,4-c]pyridin-1-one | | | 475.2 |
| 362 | 3-(4-{4-[2-(2,2-difluoroethoxy)phenyl]-6-(2-hydroxypropan-2-yl)-1-oxo-1,3-dihydro-2H-pyrrolo[3,4-c]pyridin-2-yl}phenoxy)-2,2-dimethylpropanenitrile | | | 522.0 |
| 363 | 4-[2-(2,2-difluoroethoxy)phenyl]-6-(2-hydroxypropan-2-yl)-2-[6-(2-hydroxypropan-2-yl)pyridin-3-yl]-2,3-dihydro-1H-pyrrolo[3,4-c]pyridin-1-one | | | 484.0 |
| 364 | 2-[4-(2-hydroxy-2-methylpropoxy)phenyl]-6-methyl-4-[2-(2,2,2-trifluoroethoxy)phenyl]-2,3-dihydro-1H-pyrrolo[3,4-c]pyridin-1-one | | | 486.9 |

TABLE 1-46-continued

| Ex. No. | IUPAC Name | Structure | Additive | MS |
|---|---|---|---|---|
| 365 | 4-[2-(2,2-difluoroethoxy)phenyl]-2-[4-(2-hydroxy-2-methylpropoxy)phenyl]-6-methyl-2,3-dihydro-1H-pyrrolo[3,4-c]pyridin-1-one | | | 469.0 |
| 366 | 4-[2-(2,2-difluoroethoxy)phenyl]-2-[4-(2-hydroxy-2-methylpropoxy)phenyl]-2,3-dihydro-1H-pyrrolo[3,4-c]pyridin-1-one | | | 455.0 |
| 367 | 2-[6-(2-hydroxy-2-methylpropoxy)pyridin-3-yl]-6-methyl-4-[2-(2,2,2-trifluoroethoxy)phenyl]-2,3-dihydro-1H-pyrrolo[3,4-c]pyridin-1-one | | | 488.1 |
| 368 | 5-(difluoromethyl)-2-[4-(2-hydroxypropan-2-yl)phenyl]-7-[2-(2,2,2-trifluoroethoxy)phenyl]-1H-pyrrolo[3,4-c]pyridine-3,6(2H,5H)-dione | | | 508.9 |

TABLE 1-47

| Ex. No. | IUPAC Name | Structure | Additive | MS |
|---|---|---|---|---|
| 369 | 5-(difluoromethyl)-2-[4-(2-hydroxy-2-methylpropoxy)phenyl]-7-[2-(2,2,2-trifluoroethoxy)phenyl]-1H-pyrrolo[3,4-c]pyridine-3,6(2H,5H)-dione | | | 539.1 |

TABLE 1-47-continued

| Ex. No. | IUPAC Name | Structure | Additive | MS |
|---|---|---|---|---|
| 370 | 4-[4-(2,2-difluoroethoxy) phenyl]-2-[4-(2-hydroxypropan-2-yl)phenyl]-6-(3-methyloxetan-3-yl)-2,3-dihydro-1H-pyrrolo[3,4-c]pyridin-1-one | | | 495.1 |
| 371 | 5-cyclopropyl-2-[4-(2-hydroxypropan-2-yl)phenyl]-7-[2-(2,2,2-trifluoroethoxy)phenyl]-1H-pyrrolo[3,4-c]pyridine-3,6(2H,5H)-dione | | | 499.2 |
| 372 | 5-cyclopropyl-2-[4-(2-hydroxy-2-methylpropoxy)phenyl]-7-[2-(2,2,2-trifluoroethoxy)phenyl]-1H-pyrrolo[3,4-c]pyridine-3,6(2H,5H)-dione | | | 529.1 |
| 373 | 2-[4-(2-hydroxypropan-2-yl)phenyl]-6-(3-methyloxetan-3-yl)-4-[2-(2,2,2-trifluoroethoxy)phenyl]-2,3-dihydro-1H-pyrrolo[3,4-c]pyridin-1-one | | | 513.0 |
| 374 | rac-6-methyl-2-[4-({1-[(oxan-2-yl)oxy]cyclopropyl}methoxy)phenyl]-4-[2-(2,2,2-trifluoroethoxy)phenyl]-2,3-dihydro-1H-pyrrolo[3,4-c]pyridin-1-one | | | 568.9 |

TABLE 1-47-continued

| Ex. No. | IUPAC Name | Structure | Additive | MS |
|---|---|---|---|---|
| 375 | 2-{4-[(1-hydroxyclopropyl)methoxy)phenyl}-6-methyl-4-[2-(2,2,2-trifluoroethoxy)phenyl]-2,3-dihydro-1H-pyrrolo[3,4-c]pyridin-1-one | | | 484.9 |
| 376 | 2-[4-(2-hydroxypropan-2-yl)phenyl]-5-(propan-2-yl)-7-[2-(2,2,2-trifluoroethoxy)phenyl]-1H-pyrrolo[3,4-c]pyridine-3,6(2H,5H)-dione | | | 501.2 |

TABLE 1-48

| Ex. No. | IUPAC Name | Structure | Additive | MS |
|---|---|---|---|---|
| 377 | 2-[4-(2-hydroxy-2-methylpropoxy)phenyl]-5-(propan-2-yl)-7-[2-(2,2,2-trifluoroethoxy)phenyl]-1H-pyrrolo[3,4-c]pyridine-3,6(2H,5H)-dione | | | 531.0 |
| 378 | 6-cyclohexyl-4-[2-(2,2-difluoroethoxy)phenyl]-2-[4-(2-hydroxypropan-2-yl)phenyl]-2,3-dihydro-1H-pyrrolo[3,4-c]pyridin-1-one | | | 507.0 |
| 379 | 2-[4-(2-hydroxypropan-2-yl)phenyl]-6-(oxan-4-yl)-4-[2-(2,2,2-trifluoroethoxy)phenyl]-2,3-dihydro-1H-pyrrolo[3,4-c]pyridin-1-one | | | 527.1 |

TABLE 1-48-continued

| Ex. No. | IUPAC Name | Structure | Additive | MS |
|---|---|---|---|---|
| 380 | 4-[2-(2,2-difluoroethoxy)phenyl]-2-[4-(2-hydroxypropan-2-yl)phenyl]-6-(oxan-4-yl)-2,3-dihydro-1H-pyrrolo[3,4-c]pyridin-1-one | | | 509.0 |
| 381 | 6-cyclohexyl-2-(4-fluorophenyl)-4-[4-fluoro-2-(2,2,2-trifluoroethoxy)phenyl]-2,3-dihydro-1H-pyrrolo[3,4-c]pyridin-1-one | | | 502.9 |
| 382 | 2-(4-fluorophenyl)-4-[4-fluoro-2-(2,2,2-trifluoroethoxy)phenyl]-6-(oxan-4-yl)-2,3-dihydro-1H-pyrrolo[3,4-c]pyridin-1-one | | | 505.1 |
| 383 | 4-[2-(2,2-difluoroethoxy)phenyl]-6-(2-fluoropropan-2-yl)-2-[4-(2-hydroxypropan-2-yl)phenyl]-2,3-dihydro-1H-pyrrolo[3,4-c]pyridin-1-one | | | 485.1 |
| 384 | 6-(2-fluoropropan-2-yl)-2-[4-(2-hydroxypropan-2-yl)phenyl]-4-[2-(2,2,2-trifluoroethoxy)phenyl]-2,3-dihydro-1H-pyrrolo[3,4-c]pyridin-1-one | | | 503.1 |

TABLE 1-49

| Ex. No. | IUPAC Name | Structure | Additive | MS |
|---|---|---|---|---|
| 385 | 2-(4-fluorophenyl)-6-(2-fluoropropan-2-yl)-4-[4-fluoro-2-(2,2,2-trifluoroethoxy)phenyl]-2,3-dihydro-1H-pyrrolo[3,4-c]pyridin-1-one | | | 481.1 |
| 386 | rac-2-(4-fluorophenyl)-4-[4-fluoro-2-(2,2,2-trifluoroethoxy)phenyl]-6-(oxan-3-yl)-2,3-dihydro-1H-pyrrolo[3,4-c]pyridin-1-one | | | 505.1 |
| 387 | rac-2-[4-(2-hydroxypropan-2-yl)phenyl]-6-(oxan-3-yl)-4-[2-(2,2,2-trifluoroethoxy)phenyl]-2,3-dihydro-1H-pyrrolo[3,4-c]pyridin-1-one | | | 527.1 |
| 388 | rac-4-[2-(2,2-difluoroethoxy)phenyl]-2-[4-(2-hydroxypropan-2-yl)phenyl]-6-(oxan-3-yl)-2,3-dihydro-1H-pyrrolo[3,4-c]pyridin-1-one | | | 509.1 |
| 389 | 6-tert-butyl-2-[4-(2-hydroxypropan-2-yl)phenyl]-4-[2-(2,2,2-trifluoroethoxy)phenyl]-2,3-dihydro-1H-pyrrolo[3,4-c]pyridin-1-one | | | 499.1 |

TABLE 1-49-continued

| Ex. No. | IUPAC Name | Structure | Additive | MS |
|---|---|---|---|---|
| 390 | rac-4-[2-(2,2-difluoroethoxy)phenyl]-2-[4-(2-hydroxypropan-2-yl)phenyl]-6-(oxolan-3-yl)-2,3-dihydro-1H-pyrrolo[3,4-c]pyridin-1-one | | | 495.1 |

Experimental Example 1

Glucosylceramide Synthase (GCS) Assay

In enzyme assay, a microsome fraction obtained by transient expression by Expi293F™ cells (catalog number: A14527, Thermo Fisher Scientific) was used as a glucosylceramide synthase source. Liposomal C8 ceramide and UDP-glucose were used as substrates. For each substrate concentration, 1.7 µM UDP-glucose, which is equal to the Km value, and 3 µM C8 ceramide were used. After the enzymatic reaction, the analysis was performed with Rapidfire MS/MS (API-4000™, SCIEX), and C8 glucosylceramide was quantified to evaluate the inhibitory activity of the test compound against glucosylceramide synthase activity.

PcDNA3.3TOPO vector (catalog number: K830001, Thermo Fisher Scientific) into which the human GCS gene was inserted was introduced into Expi293F™ Cells (catalog number: A14527, Thermo Fisher Scientific) by using Expi-Fectamine™ 293 Transfection Kit (catalog number: A14525, Thermo Fisher Scientific). The cultured cells were dissolved in D-PBS (catalog number: 048-29805, Fuji Film Wako Pure Chemical Industries, Ltd.) containing 1 mM PMSF, and the solution was allowed to stand on ice for 30 minutes, and then subjected to cell disruption (homogenized). The disruption solution was centrifuged at 10,000×g for 20 minutes at 4° C., and the obtained supernatant was centrifuged at 142,400×g for 60 minutes at 4° C. The obtained precipitate was resuspended in a D-PBS solution containing 1 mM PMSF, and homogenized again to prepare as a microsome fraction. Protein quantification was performed by the CBB method.

A 1 mM compound solution prepared by dissolving the test compound in DMSO was added to a 384-well plate by 100 nL so that the final concentration of the test compound was 10 µM. Next, a substrate solution consisting of 3.4 µM UDP-glucose and 6 µM C8 ceramide was added by 5 µL, followed by an enzyme solution consisting of a 25 µg/mL microsome fraction by 5 µL. C8 ceramide was prepared from liposomes composed of 15 mol % C8 ceramide and 85 mol % dioleoyl phosphatidylcholine (1,2-dioleoyl-sn-glycero-3-phosphocholine: DOPC). The enzymatic reaction was carried out in a solution consisting of 20 mM tris-hydrochloric acid buffer (pH 7.5), 0.01% Tween 20, 0.01% bovine serum albumin and 1 mM dithiothreitol at room temperature for 60 min. Then, a solution consisting of 75% isopropanol and 1% formic acid containing 0.25 µM N-Octadecanoyl-D35-psichosine (catalog number: 1914, Matreya) as an internal standard substance was added by 60 µL to stop the enzymatic reaction. 5 µL of the centrifugal supernatant of the obtained reaction product was analyzed by Rapidfire MS/MS (Agilent Technologies) using API-4000™ (SCIEX), and the C8 glucosylceramide was quantified to evaluate the inhibitory activity of the test compound against the glucosylceramide synthase activity. The inhibitory activity of the test compound was evaluated when the C8 glucosylceramide level in the enzyme-free solution was considered as 100% inhibitory and the enzyme activity of the DMSO group in the absence of the compound was considered as 0% inhibitory.

The results are shown in Table 2 below.

TABLE 2

| Example | GCS enzyme inhibitory rate at 10 µM (%) (% of control) |
|---|---|
| 1 | 78 |
| 3 | 98 |
| 4 | 99 |
| 5 | 100 |
| 6 | 95 |
| 7 | 70 |
| 13 | 63 |
| 16 | 73 |
| 18 | 56 |
| 23 | 99 |
| 24 | 89 |
| 25 | 99 |
| 26 | 92 |
| 27 | 93 |
| 28 | 84 |
| 29 | 96 |
| 30 | 91 |
| 31 | 93 |
| 32 | 93 |
| 33 | 68 |
| 34 | 83 |
| 39 | 93 |
| 40 | 54 |
| 42 | 94 |
| 43 | 95 |
| 45 | 89 |
| 48 | 70 |
| 50 | 99 |
| 51 | 99 |
| 52 | 67 |
| 53 | 67 |
| 54 | 100 |
| 55 | 98 |
| 56 | 100 |
| 57 | 74 |
| 58 | 96 |
| 59 | 88 |
| 60 | 99 |
| 61 | 85 |
| 62 | 95 |
| 63 | 96 |
| 64 | 96 |
| 65 | 95 |

TABLE 2-continued

| Example | GCS enzyme inhibitory rate at 10 μM (%) (% of control) |
|---|---|
| 67 | 95 |
| 68 | 87 |
| 70 | 53 |
| 71 | 99 |
| 72 | 100 |
| 73 | 90 |
| 74 | 91 |
| 75 | 100 |
| 77 | 91 |
| 78 | 79 |
| 79 | 75 |
| 80 | 72 |
| 81 | 86 |
| 82 | 88 |
| 83 | 91 |
| 87 | 86 |
| 88 | 89 |
| 89 | 96 |
| 90 | 85 |
| 91 | 99 |
| 92 | 57 |
| 93 | 95 |
| 94 | 97 |
| 96 | 99 |
| 97 | 96 |
| 98 | 100 |
| 99 | 92 |
| 100 | 96 |
| 101 | 79 |
| 102 | 90 |
| 103 | 98 |
| 104 | 99 |
| 105 | 96 |
| 106 | 94 |
| 108 | 64 |
| 110 | 97 |
| 111 | 92 |
| 112 | 98 |
| 113 | 66 |
| 114 | 99 |
| 115 | 65 |
| 118 | 96 |
| 119 | 100 |
| 120 | 61 |
| 122 | 95 |
| 123 | 85 |
| 124 | 98 |
| 125 | 94 |
| 126 | 97 |
| 127 | 100 |
| 128 | 99 |
| 129 | 99 |
| 131 | 87 |
| 139 | 96 |
| 140 | 86 |
| 141 | 90 |
| 142 | 77 |
| 145 | 63 |
| 146 | 55 |
| 147 | 94 |
| 149 | 99 |
| 151 | 94 |
| 152 | 90 |
| 153 | 98 |
| 154 | 85 |
| 155 | 93 |
| 156 | 94 |
| 159 | 100 |
| 160 | 99 |
| 161 | 98 |
| 162 | 95 |
| 163 | 100 |
| 164 | 99 |
| 165 | 98 |
| 166 | 87 |
| 167 | 98 |
| 168 | 100 |

TABLE 2-continued

| Example | GCS enzyme inhibitory rate at 10 μM (%) (% of control) |
|---|---|
| 169 | 95 |
| 170 | 88 |
| 171 | 52 |
| 172 | 91 |
| 174 | 99 |
| 175 | 100 |
| 176 | 100 |
| 177 | 98 |
| 178 | 98 |
| 179 | 91 |
| 180 | 92 |
| 181 | 89 |
| 182 | 99 |
| 183 | 83 |
| 184 | 96 |
| 185 | 71 |
| 187 | 100 |
| 188 | 100 |
| 189 | 94 |
| 190 | 98 |
| 191 | 100 |
| 192 | 88 |
| 193 | 98 |
| 194 | 98 |
| 195 | 100 |
| 196 | 100 |
| 197 | 88 |
| 198 | 99 |
| 199 | 91 |
| 200 | 95 |
| 201 | 99 |
| 202 | 95 |
| 203 | 98 |
| 204 | 97 |
| 205 | 83 |
| 206 | 66 |
| 207 | 99 |
| 208 | 99 |
| 209 | 98 |
| 210 | 99 |
| 211 | 81 |
| 212 | 99 |
| 213 | 94 |
| 214 | 100 |
| 215 | 93 |
| 216 | 98 |
| 217 | 98 |
| 218 | 99 |
| 219 | 98 |
| 220 | 89 |
| 221 | 99 |
| 222 | 100 |
| 223 | 96 |
| 224 | 99 |
| 225 | 94 |
| 226 | 96 |
| 227 | 100 |
| 228 | 86 |
| 229 | 99 |
| 230 | 73 |
| 231 | 61 |
| 232 | 82 |
| 233 | 96 |
| 234 | 99 |
| 235 | 97 |
| 236 | 100 |
| 237 | 91 |
| 238 | 95 |
| 239 | 51 |
| 240 | 100 |
| 241 | 98 |
| 242 | 100 |
| 243 | 97 |
| 244 | 89 |
| 245 | 100 |
| 246 | 100 |
| 247 | 97 |

TABLE 2-continued

| Example | GCS enzyme inhibitory rate at 10 μM (%) (% of control) |
|---|---|
| 248 | 99 |
| 249 | 98 |
| 250 | 99 |
| 251 | 96 |
| 252 | 98 |
| 253 | 98 |
| 254 | 99 |
| 255 | 100 |
| 256 | 97 |
| 257 | 99 |
| 258 | 70 |
| 259 | 85 |
| 260 | 100 |
| 261 | 93 |
| 262 | 100 |
| 263 | 98 |
| 264 | 98 |
| 265 | 100 |
| 266 | 99 |
| 267 | 99 |
| 268 | 91 |
| 269 | 99 |
| 270 | 99 |
| 271 | 100 |
| 272 | 96 |
| 273 | 100 |
| 274 | 97 |
| 275 | 94 |
| 276 | 98 |
| 277 | 98 |
| 278 | 99 |
| 279 | 99 |
| 280 | 99 |
| 282 | 99 |
| 283 | 94 |
| 284 | 99 |
| 285 | 97 |
| 286 | 96 |
| 287 | 99 |
| 288 | 99 |
| 289 | 98 |
| 290 | 100 |
| 291 | 79 |
| 292 | 99 |
| 293 | 88 |
| 294 | 99 |
| 295 | 100 |
| 296 | 100 |
| 297 | 100 |
| 298 | 98 |
| 299 | 97 |
| 300 | 98 |
| 301 | 97 |
| 302 | 92 |
| 303 | 100 |
| 304 | 99 |
| 305 | 99 |
| 306 | 99 |
| 307 | 91 |
| 308 | 100 |
| 309 | 60 |
| 310 | 99 |
| 311 | 100 |
| 312 | 99 |
| 313 | 100 |
| 314 | 400 |
| 315 | 100 |
| 316 | 99 |
| 317 | 99 |
| 318 | 52 |
| 319 | 97 |
| 320 | 99 |
| 321 | 100 |
| 322 | 95 |
| 323 | 99 |
| 324 | 100 |
| 325 | 100 |
| 326 | 99 |
| 327 | 100 |
| 328 | 100 |
| 329 | 100 |
| 330 | 100 |
| 331 | 91 |
| 332 | 96 |
| 333 | 97 |
| 334 | 88 |
| 335 | 95 |
| 336 | 98 |
| 337 | 98 |
| 338 | 100 |
| 339 | 99 |
| 340 | 99 |
| 341 | 100 |
| 342 | 100 |
| 343 | 100 |
| 347 | 76 |
| 348 | 100 |
| 349 | 100 |
| 350 | 100 |
| 351 | 100 |
| 352 | 100 |
| 353 | 100 |
| 354 | 100 |
| 355 | 100 |
| 356 | 99 |
| 357 | 100 |
| 358 | 100 |
| 359 | 100 |
| 360 | 100 |
| 361 | 100 |
| 362 | 100 |
| 363 | 97 |
| 364 | 100 |
| 365 | 100 |
| 366 | 99 |
| 367 | 99 |
| 368 | 100 |
| 369 | 100 |
| 370 | 100 |
| 371 | 100 |
| 372 | 100 |
| 373 | 100 |
| 374 | 100 |
| 375 | 100 |
| 376 | 100 |
| 377 | 100 |
| 378 | 100 |
| 379 | 101 |
| 380 | 100 |
| 381 | 95 |
| 382 | 97 |
| 383 | 100 |
| 384 | 100 |
| 385 | 99 |
| 386 | 99 |
| 387 | 101 |
| 388 | 101 |
| 389 | 100 |
| 390 | 77 |

As is clear from Table 2, it was confirmed that the compound of the present invention had a glucosylceramide synthase inhibitory action.

Experimental Example 2

Pharmacodynamic Test Using Mouse
(Glucosylceramide Lowering Effect)

For the experiment, C57BL/6J mice were purchased from CLEA Japan, Inc. and used. Glucosylceramide synthase is an enzyme that synthesizes glucosylceramide (GlcCer) from uridine diphosphate glucose and ceramide. Therefore, the glucosylceramide synthase inhibitory effect of the compound of Example 119 was evaluated by measuring the GlcCer concentration in the tissue.

The test compound was prepared in a 0.5% methylcellulose suspension to a dose of 10 mg/kg, and orally administered. Six hours after the administration, the blood and cerebral cortex were collected, the plasma was prepared from the blood, and methanol is added to the cerebral cortex to prepare a homogenate. A mixed solution of isopropanol and ethanol was added to the obtained plasma and the methanol homogenate of the cerebral cortex, and the lipids were extracted. The GlcCer concentrations of the extracted samples were measured by LC/MS/MS.

The results of GlcCer lowering effect by administration of the test compound are shown in the table. The results were calculated from the following formula:

(GlcCer concentration in the test compound administration group)/(GlcCer concentration in the 0.5% methylcellulose suspension administration group)×100.

The standard deviation values were also shown.

TABLE 3

|  | plasma | cerebral cortex |
| --- | --- | --- |
| GlcCer (% Control) | 49 ± 14 | 52 ± 7 |

Experimental Example 3

Pharmacodynamic Test Using Gaucher's Disease Model Mouse (Glucosylceramide and Glucosylsphingosine Lowering Effects)

Glucosylsphingosine (GlcSph) is known to be produced by deacylation of GlcCer and accumulated in tissues in patient with Gaucher's disease. Therefore, the GlcSph lowering effect of the compound of Example 119 due to the glucosylceramide synthase inhibitory effect was evaluated by measuring the GlcSph concentration in the tissue. For the experiment, Gba D409V KI mice, which were Gaucher's disease model mice in which GlcSph is accumulated, were purchased from Jackson Laboratory and used.

The test compound was prepared in a 0.5% methylcellulose suspension to a dose of 10 or 30 mg/kg, and orally administered. The administration was performed once a day for 2 months. Two hours after the last administration, the blood and cerebral cortex were collected, the plasma was prepared from the blood, and methanol is added to the cerebral cortex to prepare a homogenate. A mixed solution of isopropanol and ethanol was added to the obtained plasma and the methanol homogenate of the cerebral cortex, and the lipids were extracted. The GlcCer and GlcSph concentrations of the extracted samples were measured by LC/MS/MS.

The results of GlcCer and GlcSph lowering effects by administration of the test compound are shown in the table. The results of GlcCer were calculated from the following formula:

(GlcCer concentration in the test compound administration group)/(GlcCer concentration in the 0.5% methylcellulose suspension administration group)×100.

The results of GlcSph were calculated from the following formula:

(GlcSph concentration in the test compound administration group)/(GlcSph concentration in the 0.5% methylcellulose suspension administration group)×100.

The standard deviation values were also shown.

TABLE 4

|  | Plasma (10 mg/kg) | Plasma (30 mg/kg) | cerebral cortex (10 mg/kg) | cerebral cortex (30 mg/kg) |
| --- | --- | --- | --- | --- |
| GlcCer (% Control) | 40 ± 10 | 21 ± 4 | 58 ± 6 | 40 ± 7 |
| GlcSph (% Control) | 58 ± 16 | 36 ± 9 | 73 ± 27 | 61 ± 20 |

Formulation Examples

Medicaments containing the compound of the present invention as an active ingredient can be produced, for example, by the following formulations.

1. Capsule

| (1) compound obtained in Example 1 | 10 mg |
| --- | --- |
| (2) lactose | 90 mg |
| (3) microcrystalline cellulose | 70 mg |
| (4) magnesium stearate | 10 mg |
| 1 capsule | 180 mg |

The total amount of the above-mentioned (1), (2) and (3) and 5 mg of (4) are blended and granulated, and 5 mg of the remaining (4) is added. The whole mixture is sealed in a gelatin capsule.

2. Tablet

| (1) compound obtained in Example 1 | 10 mg |
| --- | --- |
| (2) lactose | 35 mg |
| (3) cornstarch | 150 mg |
| (4) microcrystalline cellulose | 30 mg |
| (5) magnesium stearate | 5 mg |
| 1 tablet | 230 mg |

The total amount of the above-mentioned (1), (2) and (3), 20 mg of (4) and 2.5 mg of (5) are blended and granulated, and 10 mg of the remaining (4) and 2.5 mg of the remaining (5) are added, and the mixture is compression formed to give a tablet.

INDUSTRIAL APPLICABILITY

According to the present invention, a compound having an excellent glucosylceramide synthase inhibitory action, which is expected to be useful as an agent for the prophylaxis or treatment of lysosomal storage diseases (e.g., Gaucher's disease), neurodegenerative diseases (e.g., Parkinson's disease, Lewy body dementia, multiple-system atrophy) and the like, can be provided.

This application is based on patent application No. 2019-139178 filed on Jul. 29, 2019 in Japan, the contents of which are encompassed in full herein.

The invention claimed is:
1. A compound represented by the formula (I):

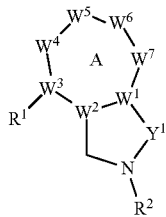

wherein
Ring A is a 5- to 7-membered unsaturated ring containing 1 to 3 double bonds in the ring,
$W^1$ is C,
$W^2$ is C,
$W^3$ is C or N,
$W^4$ is
(1) CH,
(2) $CH_2$,
(3) $NR^{g'}$ wherein $R^{g'}$ is (i) absent, (ii) a hydrogen atom, or (iii) a $C_{1-6}$ alkyl group, or
(4) C(O),
$W^5$ is
(1) $CR^{h'}$ wherein $R^{h'}$ is (i) a hydrogen atom, (ii) a halogen atom, (iii) a $C_{1-6}$ alkyl group optionally substituted by 1 to 3 substituents selected from (a) a halogen atom, (b) a hydroxy group, and (c) a $C_{1-6}$ alkoxy group, (iv) a $C_{3-6}$ cycloalkyl group, or (v) a 3- to 8-membered non-aromatic heterocyclic group optionally substituted by 1 to 3 $C_{1-6}$ alkyl groups,
(2) $CHR^{i'}$ wherein $R^{i'}$ is (i) a hydrogen atom, or (ii) a $C_{1-6}$ alkyl group,
(3) $NR^{k'}$ wherein $R^{k'}$ is (i) absent, (ii) a hydrogen atom, or (iii) a $C_{1-6}$ alkyl group optionally substituted by 1 to 3 substituents selected from a halogen atom and a cyano group, or
(iv) a $C_{3-6}$ cycloalkyl group, or
(4) C(O),
$W^6$ is
(1) a bond,
(2) CH,
(3) $CHR^{m'}$ wherein $R^{m'}$ is (i) a hydrogen atom, or (ii) a $C_{1-6}$ alkyl group, or
(4) N,
$W^7$ is
(1) a bond,
(2) CH,
(3) $NR^{s'}$ wherein $R^{s'}$ is (i) a hydrogen atom, or (ii) a $C_{1-6}$ alkyl group, or
(4) O,
$R^1$ is a group represented by the formula:

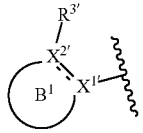

wherein
$X^{1'}$ is C,
$X^{2'}$ is C,

Ring $B^{1'}$ is a 6-membered aromatic ring optionally further substituted by 1 to 3 substituents selected from
(1) a halogen atom,
(2) a cyano group,
(3) a carboxy group,
(4) a $C_{1-6}$ alkyl group optionally substituted by 1 to 3 hydroxy groups,
(5) a $C_{1-6}$ alkoxy group,
(6) a $C_{1-6}$ alkoxy-carbonyl group,
(7) a carbamoyl group,
(8) a N,N-di$C_{1-6}$ alkyl-carbamoyl group,
(9) a 3- to 8-membered heterocyclylcarbonyl group, and
(10) a $C_{1-6}$ alkylsulfonyl group, and
$R^{3'}$ is
(1) an optionally halogenated $C_{1-6}$ alkyl group,
(2) a $C_{1-6}$ alkoxy group optionally substituted by 1 to 3 substituents selected from
(i) a halogen atom,
(ii) a cyano group,
(iii) a $C_{3-6}$ cycloalkyl group optionally substituted by 1 to 3 halogen atoms,
(iv) a $C_{6-10}$ aryl group,
(v) an optionally halogenated $C_{1-6}$ alkoxy group,
(vi) a 3- to 8-membered non-aromatic heterocyclic group optionally substituted by 1 to 3 halogen atoms,
(vii) a 3- to 8-membered non-aromatic heterocyclyl-carbonyl group optionally substituted by 1 to 3 halogen atoms,
(viii) a carboxy group,
(ix) a $C_{1-6}$ alkoxy-carbonyl group, and
(x) a N,N-di$C_{1-6}$ alkyl-carbamoyl group,
(3) a hydroxy group,
(4) a $C_{1-6}$ alkylthio group, or
(5) a 3- to 8-membered non-aromatic heterocyclic group optionally substituted by 1 to 3 substituents selected from a $C_{1-6}$ alkyl-carbonyl group and a $C_{1-6}$ alkoxy-carbonyl group,
$Y^1$ is C(=O) or $CH_2$, and
$R^2$ is a group represented by the formula:

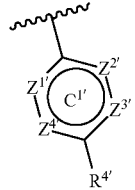

wherein
$Z^{1'}$ is CH or N,
$Z^{2'}$ is CH or N,
$Z^{3'}$ is $CR^{z'}$ wherein $R^{z'}$ is a hydrogen atom or a halogen atom, or N,
$Z^{4'}$ is CH or N,
Ring $C^{1'}$ is a benzene ring, a pyridine ring, a pyrimidine ring, a pyrazine ring or a pyridazine ring, and
$R^{4'}$ is
(1) a halogen atom,
(2) a cyano group,
(3) a hydroxy group, (4) a $C_{1-6}$ alkyl group optionally substituted by 1 to 6 substituents selected from
  (i) a halogen atom,
  (ii) a cyano group,
  (iii) a hydroxy group,
  (iv) a $C_{1-6}$ alkoxy group,
  (v) a $C_{3-6}$ cycloalkyl group, and
  (vi) a 3- to 6-membered non-aromatic heterocyclic group optionally having an oxo group,
(5) a $C_{3-6}$ cycloalkyl group optionally substituted by 1 to 3 substituents selected from
  (i) a halogen atom,
  (ii) a cyano group,
  (iii) a hydroxy group,
  (iv) a $C_{7-16}$ aralkyloxy group, and
  (v) a tri-$C_{1-6}$ alkyl silyloxy group,
(6) a $C_{1-6}$ alkyl-carbonyl group,
(7) a $C_{1-6}$ alkoxy-carbonyl group,
(8) a N,N-di$C_{1-6}$ alkyl-carbamoyl group,
(9) a $C_{1-6}$ alkoxy group optionally substituted by 1 to 3 substituents selected from
  (i) a halogen atom,
  (ii) a hydroxy group,
  (iii) a cyano group,
  (iv) a $C_{2-6}$ alkynyl group,
  (v) a $C_{3-6}$ cycloalkyl group optionally substituted by 1 to 3 substituents selected from a hydroxy group and a 3- to 8-membered non-aromatic heterocyclyloxy group,
  (vi) a diazirene group, and
  (vii) a 3- to 8-membered non-aromatic heterocyclic group optionally substituted by 1 to 3 halogen atoms,
(10) a $C_{6-10}$ aryloxy group,
(11) an optionally halogenated $C_{1-6}$ alkylsulfonyl group,
(12) a 3- to 8-membered non-aromatic heterocyclic group optionally substituted by 1 to 3 substituents selected from
  (i) a halogen atom,
  (ii) a hydroxy group,
  (iii) a cyano group,
  (iv) a $C_{1-6}$ alkoxy group,
  (v) a $C_{1-6}$ alkyl-carbonyl group, and
  (vi) a $C_{3-6}$ cycloalkyl-carbonyl group,
(13) a 3- to 8-membered non-aromatic heterocyclyloxy group optionally substituted by 1 to 3 $C_{1-6}$ alkyl groups, or
(14) a 3- to 8-membered non-aromatic heterocyclylcarbonyl group optionally substituted by 1 to 3 halogen atoms,
a group represented by the formula:

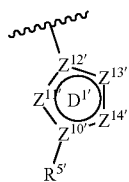

wherein
$Z^{10'}$ is C or N,
$Z^{11'}$ is CH, N or S,
$Z^{12'}$ is C,
$Z^{13'}$ is CH or N,
$Z^{14'}$ is $CR^{ii'}$ wherein $R^{ii'}$ is a hydrogen atom or a $C_{1-6}$ alkyl group, or $NR^{jj'}$ wherein $R^{jj'}$ is absent, or a $C_{1-6}$ alkyl group,
Ring $D^1$ is a 5-membered aromatic ring, and
$R^{5'}$ is
(1) a cyano group,
(2) a $C_{1-6}$ alkyl group optionally substituted by 1 to 3 substituents selected from
  (i) a halogen atom,
  (ii) a $C_{3-6}$ cycloalkyl group optionally substituted by 1 to 3 halogen atoms,
  (iii) a $C_{1-6}$ alkoxy group, and
  (iv) a 3- to 8-membered non-aromatic heterocyclic group optionally substituted by 1 to 3 halogen atoms,
(3) a $C_{3-6}$ cycloalkyl group,
(4) a $C_{6-10}$ aryl group,
(5) an optionally halogenated $C_{1-6}$ alkoxy group, or
(6) a N,N-di$C_{1-6}$ alkyl-carbamoyl group, or
a dihydrobenzofuryl group;
or a salt thereof.

2. The compound or salt according to claim 1, wherein
Ring A is a 6-membered unsaturated ring;
$W^1$ is C;
$W^2$ is C;
$W^3$ is C;
$W^4$ is N or C(O);
$W^5$ is $CR^{h''}$ wherein $R^{h''}$ is (i) a hydrogen atom, or (ii) a $C_{1-6}$ alkyl group optionally substituted by 1 to 3 halogen atoms, or $NR^{k''}$ wherein $R^{k''}$ is a $C_{1-6}$ alkyl group optionally substituted by 1 to 3 halogen atoms;
$W^6$ is CH;
$W^7$ is bond;
$R^1$ is a group represented by the formula:

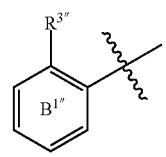

wherein
$R^{3''}$ is a $C_{1-6}$ alkoxy group optionally substituted by 1 to 3 halogen atoms, and
Ring $B^{1''}$ is a benzene ring optionally further substituted by 1 to 3 halogen atoms;
$Y^1$ is C(=O); and
$R^2$ is a group represented by the formula:

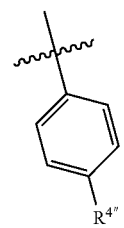

wherein $R^{4''}$ is a $C_{1-6}$ alkyl group optionally substituted by 1 to 3 hydroxy groups, or a $C_{1-6}$ alkoxy group optionally substituted by 1 to 3 hydroxy groups, a group represented by the formula:

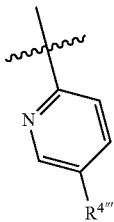

wherein R⁴''' is a $C_{1-6}$ alkoxy group optionally substituted by 1 to 3 hydroxy groups, or a group represented by the formula:

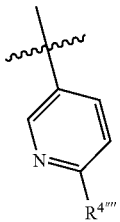

wherein R⁴'''' is a $C_{1-6}$ alkyl group optionally substituted by 1 to 3 hydroxy groups.

3. 4-[4-Fluoro-2-(2,2,2-trifluoroethoxy)phenyl]-2-[4-(2-hydroxypropan-2-yl)phenyl]-2,3-dihydro-1H-pyrrolo[3,4-c]pyridin-1-one or a salt thereof.

4. 4-[2-(2,2-Difluoroethoxy)phenyl]-2-[4-(2-hydroxy-2-methylpropoxy)phenyl]-6-methyl-2,3-dihydro-1H-pyrrolo[3,4-c]pyridin-1-one or a salt thereof.

5. 5-(Difluoromethyl)-2-[4-(2-hydroxypropan-2-yl)phenyl]-7-[2-(2,2,2-trifluoroethoxy)phenyl]-1H-pyrrolo[3,4-c]pyridine-3,6(2H,5H)-dione or a salt thereof.

6. A medicament comprising the compound or salt according to claim 1.

7. The medicament according to claim 6, which is a glucosylceramide synthase inhibitor.

8. The medicament according to claim 6, which is an agent for the prophylaxis or treatment of a lysosomal storage disease or a neurodegenerative disease.

9. The medicament according to claim 8, wherein the lysosomal storage disease is Gaucher's disease, Fabry's disease, GM1-gangliosidosis, GM2 activator deficiency, Tay-Sachs disease or Sandhoff's disease.

10. The medicament according to claim 8, wherein the neurodegenerative disease is Parkinson's disease, Lewy body dementia or multiple-system atrophy.

11. The compound or salt according to claim 1 for use in the prophylaxis or treatment of a lysosomal storage disease or a neurodegenerative disease.

12. The compound or salt according to claim 11, wherein the lysosomal storage disease is Gaucher's disease, Fabry's disease, GM1-gangliosidosis, GM2 activator deficiency, Tay-Sachs disease or Sandhoff's disease.

13. The compound or salt according to claim 11, wherein the neurodegenerative disease is Parkinson's disease, Lewy body dementia or multiple-system atrophy.

14. A method for inhibiting glucosylceramide synthase in a mammal, which comprises administering an effective amount of the compound or salt according to claim 1 to the mammal.

15. A method for preventing or treating a lysosomal storage disease or a neurodegenerative disease in a mammal, which comprises administering an effective amount of the compound or salt according to claim 1 to the mammal.

16. The method according to claim 15, wherein the lysosomal storage disease is Gaucher's disease, Fabry's disease, GM1-gangliosidosis, GM2 activator deficiency, Tay-Sachs disease or Sandhoff's disease.

17. The method according to claim 15, wherein the neurodegenerative disease is Parkinson's disease, Lewy body dementia or multiple-system atrophy.

* * * * *